(12) United States Patent
Alonso et al.

(10) Patent No.: US 11,023,303 B2
(45) Date of Patent: Jun. 1, 2021

(54) METHODS AND APPARATUS TO CORRELATE UNIQUE IDENTIFIERS AND TAG-INDIVIDUAL CORRELATORS BASED ON STATUS CHANGE INDICATIONS

(71) Applicant: Zebra Technologies Corporation, Lincolnshire, IL (US)

(72) Inventors: Rodrigo Alonso, Lincolnshire, IL (US); Anthony R. Brown, Spring Grove, IL (US); James J. O'Hagan, McHenry, IL (US); Michael A. Wohl, Talbott, TN (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/538,356

(22) Filed: Aug. 12, 2019

(65) Prior Publication Data
US 2019/0361765 A1 Nov. 28, 2019

Related U.S. Application Data

(63) Continuation of application No. 14/523,449, filed on Oct. 24, 2014, now Pat. No. 10,437,658, which is a
(Continued)

(51) Int. Cl.
*G06F 11/07* (2006.01)
*H04W 4/38* (2018.01)
(Continued)

(52) U.S. Cl.
CPC ...... *G06F 11/0772* (2013.01); *G06K 7/10227* (2013.01); *G06K 7/10306* (2013.01);
(Continued)

(58) Field of Classification Search
CPC ..... G06F 11/0772; H04W 4/38; H04W 4/029; G06K 7/10227; G06K 7/10306;
(Continued)

(56) References Cited

U.S. PATENT DOCUMENTS 3,732,500 A   5/1973   Dishal et al.
4,270,145 A   6/1981   Farina
(Continued)

FOREIGN PATENT DOCUMENTS

EP   1235077   8/2002
EP   1241616   9/2002
(Continued)

OTHER PUBLICATIONS

International Search Report and Written opinion from International Application No. PCT/US2014/040881 dated Nov. 4, 2014. (available in U.S. Appl. No. 14/523,449 to which priority is claimed.).
(Continued)

*Primary Examiner* — Corbett B Coburn

(57) ABSTRACT

A method includes generating registration data, wherein the registration data comprises at least a tag-individual correlator and a status, receiving a status change indication, for at least one tag, wherein the at least one tag is identified by a tag unique identifier; correlating the tag unique identifier and the tag-individual correlator in the registration data; and updating the status in the registration data for the status change indication.

18 Claims, 54 Drawing Sheets

Related U.S. Application Data continuation-in-part of application No. 13/942,316, filed on Jul. 15, 2013, now Pat. No. 9,002,485.

(60) Provisional application No. 61/895,548, filed on Oct. 25, 2013, provisional application No. 61/831,990, filed on Jun. 6, 2013.

(51) Int. Cl.

| | |
|---|---|
| *H04W 4/029* | (2018.01) |
| *G06K 7/10* | (2006.01) |
| *G06Q 10/06* | (2012.01) |
| *G07F 17/32* | (2006.01) |
| *G08C 17/02* | (2006.01) |
| *G09B 19/00* | (2006.01) |
| *H04L 29/08* | (2006.01) |
| *G06K 9/00* | (2006.01) |
| *G06Q 90/00* | (2006.01) |

(52) U.S. Cl.
CPC ..... *G06K 7/10366* (2013.01); *G06Q 10/0639* (2013.01); *G07F 17/32* (2013.01); *G07F 17/3237* (2013.01); *G07F 17/3239* (2013.01); *G08C 17/02* (2013.01); *G09B 19/0038* (2013.01); *H04L 67/08* (2013.01); *H04W 4/029* (2018.02); *H04W 4/38* (2018.02); *G06K 9/00342* (2013.01); *G06Q 90/00* (2013.01); *G07F 17/3288* (2013.01)

(58) Field of Classification Search
CPC .......... G06K 9/00342; G06Q 10/0639; G06Q 90/00; G07F 17/32; G07F 17/3237; G07F 17/3239; G07F 17/3288; G08C 17/02; G09B 19/0038; H04L 67/08
See application file for complete search history.

(56) References Cited

U.S. PATENT DOCUMENTS

| | | | |
|---|---|---|---|
| 5,046,133 A | 9/1991 | Watanabe et al. | |
| 5,119,104 A | 6/1992 | Heller | |
| 5,469,409 A | 11/1995 | Anderson et al. | |
| 5,513,854 A | 5/1996 | Daver | |
| 5,645,077 A | 7/1997 | Foxlin | |
| 5,699,244 A | 12/1997 | Clark et al. | |
| 5,793,630 A | 8/1998 | Theimer et al. | |
| 5,901,172 A | 5/1999 | Fontana et al. | |
| 5,920,287 A | 7/1999 | Belcher et al. | |
| 5,930,741 A | 7/1999 | Kramer | |
| 6,025,780 A | 2/2000 | Bowers et al. | |
| 6,028,626 A | 2/2000 | Aviv | |
| 6,121,926 A | 9/2000 | Belcher et al. | |
| 6,176,837 B1 | 1/2001 | Foxlin | |
| 6,204,813 B1 | 3/2001 | Wadell et al. | |
| 6,366,242 B1 | 4/2002 | Boyd et al. | |
| 6,380,894 B1 | 4/2002 | Boyd et al. | |
| 6,593,885 B2 | 7/2003 | Wisherd et al. | |
| 6,655,582 B2 | 10/2003 | Wohl et al. | |
| 6,710,713 B1 | 3/2004 | Russo | |
| 6,812,884 B2 | 11/2004 | Richley et al. | |
| 6,836,744 B1 | 12/2004 | Asphahani et al. | |
| 6,882,315 B2 | 4/2005 | Richley et al. | |
| 7,009,638 B2 | 3/2006 | Gruber et al. | |
| 7,061,376 B2 | 6/2006 | Wang et al. | |
| 7,190,271 B2 | 3/2007 | Boyd et al. | |
| 7,263,133 B1 | 8/2007 | Miao | |
| 7,667,604 B2 | 2/2010 | Ebert et al. | |
| 7,671,802 B2 | 3/2010 | Walsh et al. | |
| 7,710,322 B1 | 5/2010 | Ameti et al. | |
| 7,739,076 B1 | 6/2010 | Vock et al. | |
| 7,751,971 B2 | 7/2010 | Chang et al. | |
| 7,755,541 B2 | 7/2010 | Wisherd et al. | |
| 7,899,006 B2 | 3/2011 | Boyd | |
| 7,932,827 B2 | 4/2011 | Chand | |
| 7,969,348 B2 | 6/2011 | Baker et al. | |
| 8,009,727 B2 | 8/2011 | Hui et al. | |
| 8,023,917 B2 | 9/2011 | Popescu | |
| 8,077,981 B2 | 12/2011 | Elangovan et al. | |
| 8,224,664 B1 | 7/2012 | Louie et al. | |
| 8,269,835 B2 | 9/2012 | Grigsby | |
| 8,279,051 B2 | 10/2012 | Khan | |
| 8,289,185 B2 | 10/2012 | Alonso | |
| 8,477,046 B2 | 3/2013 | Alonso | |
| 8,457,392 B2 | 6/2013 | Cavallaro et al. | |
| 8,568,278 B2 | 10/2013 | Riley et al. | |
| 8,577,802 B1* | 11/2013 | Nichols .................. | G06Q 10/08 705/35 |
| 8,665,152 B1 | 3/2014 | Kling et al. | |
| 8,696,458 B2 | 4/2014 | Foxlin et al. | |
| 8,731,239 B2 | 5/2014 | Gefen | |
| 8,775,916 B2 | 7/2014 | Pulsipher et al. | |
| 8,795,045 B2 | 8/2014 | Sorrells et al. | |
| 8,842,002 B2 | 9/2014 | Rado | |
| 8,780,204 B2 | 10/2014 | DeAngelis et al. | |
| 8,989,880 B2 | 3/2015 | Wohl et al. | |
| 9,002,485 B2 | 4/2015 | Wohl et al. | |
| 9,081,076 B2 | 7/2015 | DeAngelis et al. | |
| 9,375,628 B2 | 6/2016 | DeAangelis et al. | |
| 9,381,645 B1 | 7/2016 | Yarlagadda et al. | |
| 9,404,998 B2 | 8/2016 | Larose et al. | |
| 9,489,552 B2 | 11/2016 | Hansen | |
| 9,602,152 B2 | 3/2017 | Wohl | |
| 9,619,617 B2* | 4/2017 | Skirble .................. | G06Q 10/087 |
| 9,742,450 B2 | 8/2017 | O'Hagan | |
| 2001/0010541 A1 | 8/2001 | Fernandez et al. | |
| 2001/0030625 A1 | 10/2001 | Doles et al. | |
| 2002/0004398 A1 | 1/2002 | Ogino et al. | |
| 2002/0041284 A1 | 4/2002 | Konishi et al. | |
| 2002/0114493 A1 | 8/2002 | McNitt et al. | |
| 2002/0116147 A1 | 8/2002 | Vock et al. | |
| 2002/0135479 A1 | 9/2002 | Belcher et al. | |
| 2003/0090387 A1 | 5/2003 | Lestienne et al. | |
| 2003/0095186 A1 | 5/2003 | Aman et al. | |
| 2003/0128100 A1 | 7/2003 | Burkhardt et al. | |
| 2003/0163287 A1 | 8/2003 | Vock et al. | |
| 2003/0227453 A1 | 12/2003 | Beier et al. | |
| 2004/0022227 A1 | 2/2004 | Lynch et al. | |
| 2004/0062216 A1 | 4/2004 | Nicholls et al. | |
| 2004/0108954 A1 | 6/2004 | Richley et al. | |
| 2004/0178960 A1 | 9/2004 | Sun | |
| 2004/0189521 A1 | 9/2004 | Smith et al. | |
| 2004/0249969 A1 | 12/2004 | Price | |
| 2004/0260470 A1 | 12/2004 | Rast | |
| 2004/0260828 A1 | 12/2004 | Price | |
| 2005/0026563 A1 | 2/2005 | Leeper et al. | |
| 2005/0035860 A1* | 2/2005 | Taylor .................. | G06K 7/0008 340/572.1 |
| 2005/0059998 A1 | 3/2005 | Norte et al. | |
| 2005/0073418 A1 | 4/2005 | Kelliher et al. | |
| 2005/0075079 A1 | 4/2005 | Jei et al. | |
| 2005/0093976 A1 | 5/2005 | Valleriano | |
| 2005/0148281 A1 | 7/2005 | Sanchez-Castro et al. | |
| 2005/0207617 A1 | 9/2005 | Sarnoff | |
| 2005/0242922 A1* | 11/2005 | Sakamoto ................ | G07C 9/28 340/5.61 |
| 2006/0004635 A1* | 1/2006 | Siefke .................... | G06Q 10/02 705/22 |
| 2006/0067324 A1 | 3/2006 | Kim | |
| 2006/0139167 A1 | 6/2006 | Davie et al. | |
| 2006/0164213 A1 | 7/2006 | Burghard et al. | |
| 2006/0252476 A1 | 11/2006 | Bahou | |
| 2006/0264730 A1 | 11/2006 | Stivoric et al. | |
| 2006/0271912 A1 | 11/2006 | Mickle et al. | |
| 2006/0281061 A1 | 12/2006 | Hightower et al. | |
| 2007/0018820 A1 | 1/2007 | Chand et al. | |
| 2007/0032247 A1 | 2/2007 | Shaffer et al. | |
| 2007/0091292 A1 | 4/2007 | Cho et al. | |
| 2007/0176749 A1 | 8/2007 | Boyd et al. | |
| 2007/0214296 A1 | 9/2007 | Takamatsu et al. | |
| 2007/0296723 A1 | 12/2007 | Williams | |
| 2008/0001714 A1 | 1/2008 | Ono | |
| 2008/0065684 A1 | 4/2008 | Zilberman | |

(56) References Cited

U.S. PATENT DOCUMENTS

| | | |
|---|---|---|
| 2008/0106381 A1 | 5/2008 | Adamec et al. |
| 2008/0113787 A1 | 5/2008 | Alderucci |
| 2008/0129825 A1 | 6/2008 | DeAngelis et al. |
| 2008/0140233 A1 | 6/2008 | Seacat |
| 2008/0182724 A1 | 7/2008 | Guthrie |
| 2008/0186231 A1 | 8/2008 | Aljadeff et al. |
| 2008/0204248 A1 | 8/2008 | Winget et al. |
| 2008/0224866 A1 | 9/2008 | Rehman |
| 2008/0246613 A1 | 10/2008 | Linstrom |
| 2008/0262885 A1 | 10/2008 | Jain et al. |
| 2008/0266131 A1 | 10/2008 | Richardson et al. |
| 2008/0269016 A1 | 10/2008 | Ungari et al. |
| 2008/0281443 A1 | 11/2008 | Rogers |
| 2008/0285805 A1 | 11/2008 | Luinge et al. |
| 2008/0291024 A1 | 11/2008 | Zhang et al. |
| 2009/0048044 A1 | 2/2009 | Oleson et al. |
| 2009/0102661 A1 | 4/2009 | Barnes et al. |
| 2009/0141736 A1 | 6/2009 | Becker |
| 2009/0160622 A1 | 6/2009 | Bauchot |
| 2009/0195401 A1 | 8/2009 | Maroney et al. |
| 2009/0210078 A1 | 8/2009 | Crowley |
| 2009/0231198 A1 | 9/2009 | Walsh et al. |
| 2010/0026809 A1 | 2/2010 | Curry |
| 2010/0045508 A1 | 2/2010 | Ekbal et al. |
| 2010/0054304 A1 | 3/2010 | Barnes et al. |
| 2010/0060452 A1 | 3/2010 | Schuster et al. |
| 2010/0073188 A1 | 3/2010 | Mickle |
| 2010/0080163 A1 | 4/2010 | Krishnamoorthi et al. |
| 2010/0102993 A1 | 4/2010 | Johnson |
| 2010/0117837 A1 | 5/2010 | Stirling et al. |
| 2010/0150117 A1 | 6/2010 | Aweya et al. |
| 2010/0174506 A1 | 7/2010 | Joseph et al. |
| 2010/0228314 A1 | 9/2010 | Goetz |
| 2010/0250305 A1 | 9/2010 | Lee et al. |
| 2010/0278386 A1 | 11/2010 | Hoeflinger |
| 2010/0283630 A1 | 11/2010 | Alonso |
| 2010/0295943 A1* | 11/2010 | Cha ............. G01S 13/82 348/143 |
| 2010/0328073 A1 | 12/2010 | Nikitin et al. |
| 2011/0002223 A1 | 1/2011 | Gross |
| 2011/0013087 A1 | 1/2011 | House et al. |
| 2011/0025496 A1 | 2/2011 | Cova |
| 2011/0025847 A1 | 2/2011 | Park et al. |
| 2011/0054782 A1 | 3/2011 | Kaahui et al. |
| 2011/0063114 A1 | 3/2011 | Ikoyan |
| 2011/0064023 A1 | 3/2011 | Yamamoto et al. |
| 2011/0084806 A1 | 4/2011 | Pekins et al. |
| 2011/0132378 A1 | 6/2011 | Levendowski et al. |
| 2011/0134240 A1 | 6/2011 | Anderson et al. |
| 2011/0137775 A1* | 6/2011 | Killian ............. G06Q 10/00 705/34 |
| 2011/0140970 A1 | 6/2011 | Fukagawa et al. |
| 2011/0151953 A1 | 6/2011 | Kim et al. |
| 2011/0159939 A1 | 6/2011 | Lin |
| 2011/0169959 A1 | 7/2011 | DeAngelis et al. |
| 2011/0188513 A1 | 8/2011 | Christoffersson et al. |
| 2011/0195701 A1 | 8/2011 | Cook et al. |
| 2011/0261195 A1 | 10/2011 | Martin et al. |
| 2011/0300905 A1 | 12/2011 | Levi |
| 2011/0320322 A1 | 12/2011 | Roslak et al. |
| 2012/0014278 A1 | 1/2012 | Ameti et al. |
| 2012/0015665 A1 | 1/2012 | Farley et al. |
| 2012/0024516 A1 | 2/2012 | Bhadurt et al. |
| 2012/0042326 A1 | 2/2012 | Jain et al. |
| 2012/0057640 A1 | 3/2012 | Shi et al. |
| 2012/0065483 A1 | 3/2012 | Chung et al. |
| 2012/0081531 A1 | 4/2012 | DeAngelis et al. |
| 2012/0112904 A1 | 5/2012 | Nagy et al. |
| 2012/0126973 A1 | 5/2012 | DeAngelis et al. |
| 2012/0136231 A1 | 5/2012 | Market |
| 2012/0139708 A1 | 6/2012 | Paradiso et al. |
| 2012/0184878 A1 | 7/2012 | Najafi et al. |
| 2012/0212505 A1 | 8/2012 | Burroughs et al. |
| 2012/0218301 A1 | 8/2012 | Miller |
| 2012/0225676 A1 | 9/2012 | Boyd et al. |
| 2012/0231739 A1 | 9/2012 | Chen et al. |
| 2012/0246795 A1 | 10/2012 | Scheffler et al. |
| 2012/0256745 A1 | 10/2012 | Plett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0040574 A1 | 2/2013 | Hillyard |
| 2013/0041590 A1 | 2/2013 | Burich et al. |
| 2013/0041775 A1 | 2/2013 | Rosenberg |
| 2013/0057392 A1 | 3/2013 | Bullock |
| 2013/0066448 A1 | 3/2013 | Alonso |
| 2013/0076645 A1 | 3/2013 | Anantha et al. |
| 2013/0096704 A1 | 4/2013 | Case |
| 2013/0115904 A1 | 5/2013 | Kapoor et al. |
| 2013/0138386 A1 | 5/2013 | Jain et al. |
| 2013/0138518 A1 | 5/2013 | White et al. |
| 2013/0142384 A1 | 6/2013 | Ofek |
| 2013/0147608 A1 | 6/2013 | Sadr |
| 2013/0169416 A1* | 7/2013 | Rezayee ............. G06K 7/10316 340/10.1 |
| 2013/0197981 A1 | 8/2013 | Vendetti |
| 2013/0257598 A1 | 10/2013 | Kawaguchi et al. |
| 2013/0268185 A1 | 10/2013 | Rabbath et al. |
| 2013/0289382 A1 | 10/2013 | Karaoguz et al. |
| 2013/0339156 A1 | 12/2013 | Sanjay et al. |
| 2014/0038544 A1 | 2/2014 | Jones et al. |
| 2014/0055588 A1 | 2/2014 | Bangera et al. |
| 2014/0062728 A1 | 3/2014 | Soto et al. |
| 2014/0074510 A1 | 3/2014 | McClung et al. |
| 2014/0077934 A1 | 3/2014 | Schwiers |
| 2014/0089243 A1 | 3/2014 | Oppenheimer |
| 2014/0100978 A1* | 4/2014 | Forster ............. G06Q 20/20 705/21 |
| 2014/0145828 A1 | 5/2014 | Bassan-Eskenazi |
| 2014/0148196 A1 | 5/2014 | Bassan-Eskenazi |
| 2014/0156036 A1 | 6/2014 | Huang |
| 2014/0170607 A1 | 6/2014 | Hsiao et al. |
| 2014/0183261 A1* | 7/2014 | Ung ............. G06K 7/0008 235/439 |
| 2014/0221137 A1 | 8/2014 | Krysiak et al. |
| 2014/0301427 A1 | 10/2014 | Khalaf-Allah |
| 2014/0320660 A1 | 10/2014 | DeAngelis et al. |
| 2014/0345375 A1 | 11/2014 | Hassell, Jr. |
| 2014/0347193 A1 | 11/2014 | Ljung |
| 2014/0361875 A1 | 12/2014 | O'Hagan et al. |
| 2014/0361906 A1 | 12/2014 | Hughes et al. |
| 2014/0361909 A1 | 12/2014 | Stelfox et al. |
| 2014/0364141 A1 | 12/2014 | O'Hagan et al. |
| 2014/0365415 A1 | 12/2014 | Stelfox et al. |
| 2014/0372133 A1 | 12/2014 | Austrum et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0097653 A1 | 4/2015 | Gibbs et al. |
| 2015/0148129 A1 | 5/2015 | Austerlade et al. |
| 2015/0355311 A1 | 12/2015 | O'Hagan et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0378002 A1 | 12/2015 | Hughes et al. |
| 2015/0379387 A1 | 12/2015 | Richley |
| 2016/0008693 A1 | 1/2016 | Cronin |
| 2016/0059075 A1 | 3/2016 | Molyneux et al. |
| 2016/0097837 A1 | 4/2016 | Richley et al. |
| 2017/0100633 A1 | 4/2017 | DeAngelis et al. |

FOREIGN PATENT DOCUMENTS

| | | |
|---|---|---|
| EP | 1253438 | 10/2002 |
| EP | 1503513 | 2/2005 |
| EP | 2474939 | 11/2012 |
| WO | WO 1998005977 | 2/1998 |
| WO | WO 1999061936 | 12/1999 |
| WO | WO 2001008417 | 2/2001 |
| WO | WO 2006022548 | 3/2006 |
| WO | WO 2010083943 | 7/2010 |

(56) References Cited

FOREIGN PATENT DOCUMENTS

| WO | WO 2012167301 | 12/2012 |
|---|---|---|
| WO | WO 2015051813 | 4/2014 |
| WO | WO 2014197600 | 12/2014 |

OTHER PUBLICATIONS

International Search Report and Written opinion from International Application No. PCT/US2014/040940 dated Dec. 17, 2014. (available in U.S. Appl. No. 14/523,449 to which priority is claimed.).

Complaint before the United States District Court of Massachusetts, Civil Action No. 1:15-cv-12297, *Lynx System Developers, Inc. et al. V. Zebra Enterprise Solutions Corporation et al.*, filed Jun. 10, 2015.(available in U.S. Appl. No. 14/523,449 to which priority is claimed.).

International Search Report and Written Opinion from International Application No. PCT/US2014/041062 dated Oct. 1, 2014.(available in U.S. Appl. No. 14/523,449 to which priority is claimed.).

International Search Report and Written Opinion from International Application No. PCT/US2014/040947 dated Oct. 9, 2014.(available in U.S. Appl. No. 14/523,449 to which priority is claimed.).

Fontana, R.J., Richley, E., Barney, J., "Commercialization of an Ultra Wideband Precision Asset Location System", 2003 IEEE Conference on Ultra Wideband Systems and Technologies, Nov. 16-19, 2003.(available in U.S. Appl. No. 14/523,449 to which priority is claimed.).

Guéziec, A., "Tracking a Baseball Pitch for Broadcast Television," Computer, Mar. 2002, pp. 38-43 <http://www.trianglesoftware.com/pitch_tracking.htm>.(available in U.S. Appl. No. 14/523,449 to which priority is claimed.).

CattleLog Pro, eMerge Interactive, Inc., Sebastian, FL, 2004. (available in U.S. Appl. No. 14/523,449 to which priority is claimed.).

Marchant, J., "Secure Animal Indetification and Source Verification", JM Communications, UK, 2002.(available in U.S. Appl. No. 14/523,449 to which priority is claimed.).

"A guide to Using NLIS Approved Ear Tags and Rumen Boluses", National Livestock Identification Scheme, Meat & Livestock Australia Limited, North Sydney, Australia, May 2003.(available in U.S. Appl. No. 14/523,449 to which priority is claimed.).

King L., "NAIS Cattle ID Pilot Projects Not Needed, Since Proven Advanced Technology Already Exisits", ScoringSystem, Inc., Sarasota, FL, Dec. 27, 2005. (www.prweb.com/releases2005/12prweb325888. htm).(available in U.S. Appl. No. 14/523,449 to which priority is claimed.).

"RFID in the Australian Meat and Livestock Industry", Allflex Australia Pty Ltd., Capalaba, QLD (AU), Data Capture Suppliers Guide, 2003-2004.(available in U.S. Appl. No. 14/523,449 to which priority is claimed.).

Swedberg, Claire, "USDA Reseachers Develop System to Track Livestock Feeding Behavior Unobtrusively", RFID Journal, Jul. 18, 2013.(available in U.S. Appl. No. 14/523,449 to which priority is claimed.).

Invitation to Pay Additional Fees/Partial International Search Report for PCT/IB2015/054099 dated Oct. 6, 2015.(available in U.S. Appl. No. 14/523,449 to which priority is claimed.).

Swedberg, C., "N.J. Company Seeks to Market Passive Sensor RFID Tags," RFID Journal, Jun. 14, 2011, pp. 1-2 <http://www.rfidjournal.com/articles/pdf?8527>.(available in U.S. Appl. No. 14/523,449 to which priority is claimed.).

International Search Report and Written Opinion for International Application No. PCT/IB2015/054099 dated Dec. 9, 2015.(available in U.S. Appl. No. 14/523,449 to which priority is claimed.).

U.S. Appl. No. 14/296,703, filed Jun. 5, 2014; In re: Alonso et al., entitle Method and Apparatus for Associating Radio Frequency Identification Tags with Participants.(available in U.S. Appl. No. 14/523,449 to which priority is claimed.).

U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects."(available in U.S. Appl. No. 14/523,449 to which priority is claimed.).

International Search Report and Written Opinion for International Application No. PCT/IB2015/059264 dated Feb. 10, 2016. (available in U.S. Appl. No. 14/523,449 to which priority is claimed.).

Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.(available in U.S. Appl. No. 14/523,449 to which priority is claimed.).

International Search Report and Written Opinion for International Application No. PCT/US2015/034267 dated Sep. 25, 2015. (available in U.S. Appl. No. 14/523,449 to which priority is claimed.).

International Search Report and Written Opinion for International Application No. PCT/IB2015/054103 dated Aug. 14, 2015. (available in U.S. Appl. No. 14/523,449 to which priority is claimed.).

Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.(available in U.S. Appl. No. 14/523,449 to which priority is claimed.).

International Search Report and Written Opinion for International Application No. PCT/IB2015/054213 dated Aug. 6, 2015.(available in U.S. Appl. No. 14/523,449 to which priority is claimed.).

Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073. (available in U.S. Appl. No. 14/523,449 to which priority is claimed.).

Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.(available in U.S. Appl. No. 14/523,449 to which priority is claimed.).

International Search Report and Written Opinion for International Application PCT/IB2015/054102 dated Nov. 4, 2015.(available in U.S. Appl. No. 14/523,449 to which priority is claimed.).

"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.(available in U.S. Appl. No. 14/523,449 to which priority is claimed.).

Bahle et al., "I See You: How to Improve Wearable Activity Recognition by Leveraging Information from Environmental Cameras," Pervasive Computing and Communications Workshops, IEEE International Conference, (Mar. 18-22, 2013).(available in U.S. Appl. No. 14/523,449 to which priority is claimed.).

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).(available in U.S. Appl. No. 14/523,449 to which priority is claimed.).

Complaint before the United States District Court of Massachusetts, Civil Action No. 1:15-cv-12297, *Lynx System Developers, Inc. et al. V. Zebra Enterprise Solutions Corporation et al.*, filed Mar. 23, 2016.(available in U.S. Appl. No. 14/523,449 to which priority is claimed.).

Defendant's Answer to Complaint before the United States District Court of Massachusetts, Civil Action No. 1:15-cv-12297, *Lynx System Developers, Inc. et al. V. Zebra Enterprise Solutions Corporation et al.*, filed Apr. 6, 2016.(available in U.S. Appl. No. 14/523,449 to which priority is claimed.).

International Search Report for International Application No. PCT/US2014/053647 dated Dec. 19, 2014.(available in U.S. Appl. No. 14/523,449 to which priority is claimed.).

(56) References Cited

OTHER PUBLICATIONS

International Search Report and Written Opinion for International Application No. PCT/US2016/035614 dated Sep. 15, 2016. (available in U.S. Appl. No. 14/523,449 to which priority is claimed.).

Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.(available in U.S. Appl. No. 14/523,449 to which priority is claimed.).

* cited by examiner

PLAYERS

PLAYER ROSTER

| | HOME | | | | | | | | VISITNG | | | | |
|---|---|---|---|---|---|---|---|---|---|---|---|---|---|
| # | NAME | POS. | WARNING | LEFT | RIGHT | | # | NAME | POS. | WARNING | LEFT | RIGHT |
| 99 | Chris Canty | OT | ○ | ☆ ▯ ⊙ | ☆ ▯ ⊙ | | 71 | Adewale Ojomo | WR | ○ | ☆ ▯ ⊙ | ☆ ▯ ⊙ |
| 76 | Chris Snee | CB | ○ | ☆ ▯ ⊙ | ☆ ▯ ⊙ | | 98 | Adrian Tracy | S | ○ | ☆ ▯ ⊙ | ☆ ▯ ⊙ |
| 23 | Corey Webstor | FB | ● | ☆ ▯ ⊙ | ☆ ▯ ⊙ | | 81 | Adrian Robinson | CB | ○ | ☆ ▯ ⊙ | ☆ ▯ ⊙ |
| 64 | David Baas | OG | ○ | ☆ ▯ ⊙ | ☆ ▯ ⊙ | | 44 | Ahmad Bradshaw | CB | ○ | ☆ ▯ ⊙ | ☆ ▯ ⊙ |
| 8 | David Carr | WR | ○ | ☆ ▯ ⊙ | ☆ ▯ ⊙ | | 26 | Antrol Rollo | DE | ○ | ☆ ▯ ⊙ | ☆ ▯ ⊙ |
| 66 | David Diehl | CG | ○ | ☆ ▯ ⊙ | ☆ ▯ ⊙ | | 86 | Bear Pascoe | DG | ○ | ☆ ▯ ⊙ | ☆ ▯ ⊙ |
| 22 | David Wilson | WR | ○ | ☆ ▯ ⊙ | ☆ ▯ ⊙ | | 93 | Chase Blackbum | K | ○ | ☆ ▯ ⊙ | ☆ ▯ ⊙ |
| 87 | Domenik Hixon | P | ○ | ☆ ▯ ⊙ | ☆ ▯ ⊙ | | 99 | Chris Canty | TE | ○ | ☆ ▯ ⊙ | ☆ ▯ ⊙ |
| 10 | Eli Manning | LB | ○ | ☆ ▯ ⊙ | ☆ ▯ ⊙ | | 76 | Chris Snee | FB | ○ | ☆ ▯ ⊙ | ☆ ▯ ⊙ |
| 88 | Hakeem Nicks | QG | ○ | ☆ ▯ ⊙ | ☆ ▯ ⊙ | | 23 | Corey Webstor | DE | ● | ☆ ▯ ⊙ | ☆ ▯ ⊙ |
| 45 | Henry Hynoski | LS | ○ | ☆ ▯ ⊙ | ☆ ▯ ⊙ | | 64 | David Baas | DG | ○ | ☆ ▯ ⊙ | ☆ ▯ ⊙ |
| 57 | Jacqulan Williams | WR | ○ | ☆ ▯ ⊙ | ☆ ▯ ⊙ | | 8 | David Carr | T | ○ | ☆ ▯ ⊙ | ☆ ▯ ⊙ |
| 73 | James Brewer | S | ○ | ☆ ▯ ⊙ | ☆ ▯ ⊙ | | 66 | David Diehl | CG | ○ | ☆ ▯ ⊙ | ☆ ▯ ⊙ |
| 90 | Jason Pierre-Paul | OB | ● | ☆ ▯ ⊙ | ☆ ▯ ⊙ | | 22 | David Wilson | TE | ○ | ☆ ▯ ⊙ | ☆ ▯ ⊙ |
| 28 | Jayron Hosley | FB | ○ | ☆ ▯ ⊙ | ☆ ▯ ⊙ | | 87 | Domenik Hixon | LB | ○ | ☆ ▯ ⊙ | ☆ ▯ ⊙ |
| 12 | Jerrel Jernigan | OT | ○ | ☆ ▯ ⊙ | ☆ ▯ ⊙ | | 10 | Eli Manning | DT | ○ | ☆ ▯ ⊙ | ☆ ▯ ⊙ |
| 63 | Jim Cordle | LG | ○ | ☆ ▯ ⊙ | ☆ ▯ ⊙ | | 88 | Hakeem Nicks | TE | ○ | ☆ ▯ ⊙ | ☆ ▯ ⊙ |
| 30 | Justin Tryon | G | ○ | ☆ ▯ ⊙ | ☆ ▯ ⊙ | | 45 | Henry Hynoski | WR | ○ | ☆ ▯ ⊙ | ☆ ▯ ⊙ |
| 91 | Justin Tuck | CB | ○ | ☆ ▯ ⊙ | ☆ ▯ ⊙ | | 57 | Jacqulan Williams | WR | ○ | ☆ ▯ ⊙ | ☆ ▯ ⊙ |
| 55 | Keith Rivers | T | ○ | ☆ ▯ ⊙ | ☆ ▯ ⊙ | | 73 | James Brewer | TE | ○ | ☆ ▯ ⊙ | ☆ ▯ ⊙ |

FIGURE 22

PLAYERS HISTORY

[BACK]

PLAYER ROSTER

| || HOME | (Bulk) (OS) Q: 1 ②3 4 | || VISITING | (Bulk) (OS) Q: 1 ②3 4 |
|---|---|---|---|

| # | NAME | POS. | | # | NAME | POS. | |
|---|---|---|---|---|---|---|---|
| 99 | Chris Canty | OI | | | Adewale Ojomo | OI | |
| 76 | Chris Snee | CB | | | Adrian Tracy | CB | |
| 23 | Corey Webstor | FB | | 81 | Adrian Robinson | FB | ▨▨▨▨ |
| 64 | David Baas | OG | | 44 | Ahmad Bradshaw | OG | |
| 8 | David Carr | WR | | 26 | Antrol Rollo | WR | ▨▨ |
| 66 | David Diehl | CG | ▨▨▨▨ | 86 | Bear Pascoe | CG | ▨ |
| 22 | David Wilson | WR | | 93 | Chase Blackbum | WR | |
| 87 | Domenik Hixon | P | | 99 | Chris Canty | P | |
| 10 | Eli Manning | LB | | | Chris Snee | LB | |
| 88 | Hakeem Nicks | QG | | 23 | Corey Webstor | QG | |
| 45 | Henry Hynoski | LS | | 64 | David Baas | LS | |
| 57 | Jacqulan Williams | WR | | | David Carr | WR | |
| 73 | James Brewer | S | ▨▨▨▨▨▨ | 66 | David Diehl | S | ▨▨▨▨▨▨ |
| 90 | Jason Pierre-Paul | OG | ▨▨▨▨▨▨ | 22 | David Wilson | OG | ▨▨▨▨▨▨ |
| 28 | Jayron Hosley | FB | ▨▨▨▨▨▨ | 87 | Domenik Hixon | FB | ▨▨▨▨▨▨ |
| 12 | Jerrel Jemigan | OT | ▨▨▨▨▨▨ | 10 | Eli Manning | OT | ▨▨▨▨▨▨ |
| 63 | Jim Cordle | LG | ▨▨▨▨▨▨ | 88 | Hakeem Nicks | LG | ▨▨▨▨▨▨ |
| 30 | Justin Tryon | G | ▨▨▨▨▨▨ | 45 | Henry Hynoski | G | ▨▨▨▨▨▨ |
| 91 | Justin Tuck | CB | ▨▨▨▨▨▨ | 57 | Jacqulan Williams | CB | ▨▨▨▨▨▨ |
| 55 | Keith Rivers | T | ▨▨▨▨▨▨ | 73 | James Brewer | T | ▨▨▨▨▨▨ |
| 12 | Jerrel Jemigan | LG | ▨▨▨▨▨▨ | 90 | Jason Pierre-Paul | LG | ▨▨▨▨▨▨ |
| 63 | Jim Cordle | G | ▨▨▨▨▨▨ | 28 | Jayron Hosley | G | ▨▨▨▨▨▨ |
| 30 | Justin Tryon | CB | ▨▨▨▨▨▨ | 12 | Jerrel Jemigan | CB | ▨▨▨▨▨▨ |
| 91 | Justin Tuck | T | ▨▨▨▨▨▨ | 63 | Jim Cordle | T | ▨▨▨▨▨▨ |
| 55 | Keith Rivers | T | ▨▨▨▨▨▨ | 30 | Justin Tryon | T | ▨▨▨▨▨▨ |

METHODS AND APPARATUS TO CORRELATE UNIQUE IDENTIFIERS AND TAG-INDIVIDUAL CORRELATORS BASED ON STATUS CHANGE INDICATIONS

CROSS-REFERENCE TO RELATED APPLICATION

This patent arises from a continuation of U.S. patent application Ser. No. 14/523,449, filed Oct. 24, 2014, which claims priority to U.S. Provisional Patent App. No. 61/895,548, filed Oct. 25, 2013 and is a continuation-in-part of U.S. patent application Ser. No. 13/942,316, filed Jul. 15, 2013, which claims priority to U.S. Provisional App. No. 61/831,990, filed Jun. 6, 2013. The entire contents of each of the foregoing applications is hereby incorporated herein by reference in its entirety.

FIELD

Embodiments discussed herein are related to radio frequency locating and, more particularly, to systems, methods, apparatus, and computer readable media for providing collecting and displaying sporting event data based on real time data for proximity and movement of objects.

BACKGROUND

Producing analysis of performance for sports events and/or teams is generally a resource intensive process often involving experienced individuals manually reviewing games or recordings of games to compile events and statistics for a game and the participants. Such analysis may be error prone as it requires reviewing a large number of participants moving among complex formations at each moment of a game.

A number of deficiencies and problems associated with providing performance analytics are identified herein. Through applied effort, ingenuity, and innovation, exemplary solutions to many of these identified problems are embodied by the present invention, which is described in detail below.

BRIEF SUMMARY

A method, apparatus and computer program product are provided in accordance with an example embodiment for collecting and displaying sporting event data based on real time data for proximity and movement of objects. In an example embodiment, a method is provided that includes generating registration data. The registration data includes at least a tag-individual correlator and a status. The method also includes receiving a status change indication, for at least one tag, wherein the at least one tag is identified by a tag unique identifier, correlating the tag unique identifier and the tag-individual correlator in the registration data. The method also including updating the registration data for the status change indication.

In an example embodiment, the method also includes causing the at least one tag to be activated such that the tag transmits the tag unique identifier at a predetermined interval. Receiving the status change indication further includes receiving an indication that the tag has changed status to active; and updating the status in the registration data further comprises updating the status in the registration data as active. In an example embodiment, the method also includes causing the at least one tag to be deactivated such that the tag stops transmitting the tag unique identifier at a predetermined interval. Receiving the status change indication further compromises receiving an indication that the tag has changed status to deactivated, and updating the status in the registration data further comprises updating the status in the registration data as deactivated.

In some example embodiments of the method the at least one tag transmits the tag unique identifier at a first blink rate and the method further includes causing the at least one tag to be adjusted such that the at least one tag transmits the tag unique identifier at a second blink rate. In an example embodiment, the method also includes receiving an indication of a tag replacement, updating the tag-Individual correlator with the replaced tag data, and replacing the tag unique identifier in the registration data with a replacement tag unique identifier. In some example embodiments of the method, receiving the status change indication further compromises receiving an indication that a tag has been attached to a participant, and updating the status in the registration data further comprises updating the status in the registration data as attached.

In another example embodiment a method is provided including receiving tag blink data from a plurality of receivers. The tag blink data includes a tag unique identifier. The method also includes determining one or more tags detected by the plurality of receivers, based on a comparison of the tag unique identifiers received by a respective receiver and registration data. The registration data comprises a tag individual correlator for a plurality of tags. The method also includes determining a system status based on comparing the one or more tags detected to the plurality of tags of the registration data.

In an example embodiment of the method the one or more tags detected further comprise reference tags, and determining the system status further comprises determining a respective receiver status based on a comparison of a predetermined number of reference tag registration data and the number of detected reference tags by the respective receiver. In some example embodiments of the method, determining the system status further comprises determining a respective receiver status based on the transmission time of the respective receiver. In an example embodiment of the method, the one or more tags detected further comprise reference tags, and determining the system status further comprises determining a respective reference tag status based on a comparison a predetermined number of receivers detecting the respective reference tag and the number of receivers which determined detection of the respective reference tag.

In some example embodiments of the method, tag blink data further includes battery life, and determining the system status further comprises determining a respective tag status based on comparing the battery life of the respective tag to a predetermined value. In an example embodiment, the method also includes determining a tag blink rate, and wherein the determining a system status further comprises determining a respective tag status based on comparing the determined tag blink rate to a predetermined blink rate. In an example embodiment, the method also includes causing the system status to display on a graphic user interface.

In further example embodiments, a method is provided including receiving tag blink data from at least one participant tag, calculating tag location data based on the tag blink data, classifying the tag location data by associating tag location data with a participant tag identifier, filtering tag event data by applying tag location offsets to one or more tag location data, wherein the tag event data comprises at least two classified tag location data, calculating multidimensional player location information per unit time based on the tag event data, and creating a visualization of the multidimensional player location information per unit time.

In an example embodiment, the method also includes creating a raw data file and causing the raw data file to be stored in a data storage. In some example embodiments, the method also includes determining a unit of work, wherein the unit of work comprises the tag location data for a predetermined period of time, and the creating a multidimensional player location per unit time is based on the determined unit of work. In an example embodiment, the method also includes creating a filtered data file and causing the filter data file to be stored in a data storage. In some example embodiments, the method also includes reducing the multidimensional player location information per unit time by associating a first participant multidimensional player location information per unit time with a second participant multidimensional player location information per unit time.

In an example embodiment, the method also includes causing the visualization to be displayed on a graphic user interface. In some example embodiments, the method also includes causing the visualization to be stored in a data storage. In an example embodiment, the method also includes parsing the tag blink data by data field In still a further example embodiment, a method is provided including calculating a tag data filter parameter for a plurality of tag events based on receiving tag blink data and tag location data, wherein the tag data filter parameter includes a blink period, distance span, or velocity, calculating a participant location data adjustment factor based on the tag filter parameter, and calculating multidimensional player location information per unit time based on the plurality of tag events and the participant location adjustment factor.

In an example embodiment, the method also includes determining tag blink data with compromised accuracy by analyzing a tag blink data quality indicator; and dismissing the tag blink data with compromised accuracy from further analysis. In some example embodiments of the method, tag blink data with compromised accuracy is based on at least one of data quality index, received signal strength index, real time location system error rate, or tag error codes. In an example embodiment of the method, determining tag blink data with compromised accuracy further comprises comparing a tag blink data quality or integrity value to a predetermined value, wherein in an instance in which the data quality or integrity value satisfies the predetermined threshold the tag blink data accuracy is determined to be compromised.

In an example embodiment of the method, calculating a participant location adjustment factor further comprises determining an adjustment for a missed blink. In some example embodiments of the method, calculating a participant location adjustment factor further comprises determining an adjustment for pop blink. In an example embodiment of the method, calculating a participant location adjustment factor further comprises determining an adjustment for tag-tag offset.

In yet a further example embodiment, a method is provided which includes receiving analytic or event data corresponding to at least one participant characteristic, wherein the analytic or event data is associated with a tag location associated with a participant, generating at least one display element associated with the analytic or event data corresponding to the at least one participant characteristic at one or more time intervals, and causing the at least one display element to be displayed in an interface, wherein the interface is configured to size the at least one data element within the user interface to enable the display of a plurality of display elements in the display, the interface being further configured to display location data for the participant in at least one display element.

In an example embodiment, the method also includes causing, via a processor, based at least in part on the input, the performance of an operation associated with the display element that has been selected. In some example embodiments of the method, the analytic or event data includes data derived from a tag location over a defined time period. In an example embodiment of the method, the tag is configured to communicate using ultra-wide band signals. In some example embodiments of the method, the interface is configured to display at least one display element configured to display analytic or event data in varying levels of detail.

In an example embodiment of the method, the interface is configured to display the at least one display element configured to display analytic or event data in at least one of an icon form, a graph form, a panel form, and a full function display element form. In some example embodiments of the method, the full function display element form is displayed as a larger display element than the icon form, the graph form, and the panel form. In an example embodiment of the method, the panel form is displayed as a larger display element than the graph form and the icon form. In some example embodiments of the method, the graph form is displayed as a larger display element than the icon form. In some example embodiments of the method, the interface is further configured receive an input corresponding to a user input requesting at least one display element to be change from any one of the display forms to another display form.

In yet another example embodiment, an apparatus is provided including at least one processor and at least one memory including computer program code, the at least one memory and computer program code configured to, with the processor, cause the apparatus to at least generate registration data, wherein the registration data comprises at least a tag-individual correlator and a status, receive a status change indication, for at least one tag, wherein the at least one tag is identified by the tag unique identifier, correlate the tag unique identifier and the tag-individual correlator in the registration data, and update the status in the registration data for the status change indication.

In an example embodiment of the apparatus, the at least one memory and the computer program code are further configured to cause the at least one tag to be activated such that the tag transmits the tag unique identifier at a predetermined interval. Receiving a status change indication further comprises receiving an indication that the tag has changed status to active and updating the status in the registration data further comprises updating the status in the registration data as active. In some example embodiments the at least one memory and the computer program code, of the apparatus, are further configured to cause the at least one tag to be deactivated such that the tag stops transmitting the tag unique identifier at a predetermined interval. Receiving a status change indication further comprises receiving an indication that the tag has changed status to deactivated and updating the status in the registration data further comprises updating the status in the registration data as deactivated.

In an example embodiment of the apparatus, the at least one tag transmits the tag unique identifier at a first blink rate and the at least one memory and the computer program code are further configured to cause the at least one tag to be adjusted such that the tag transmits the tag unique identifier at a second blink rate. In some example embodiments of the apparatus, the at least one memory and the computer program code are further configured to receive an indication of a tag replacement comprising a replacement tag unique identifier, update the tag-individual correlator with the replacement tag unique identifier, and replace the tag unique identifier in the registration data with the replacement tag unique identifier.

In an example embodiment of the apparatus, receiving status change indication further comprises receiving an indication that a tag has been attached to a participant and updating the status in the registration data further comprises updating the status in the registration data as attached.

In another example embodiment an apparatus is provided including at least one processor and at least one memory including computer program code, the at least one memory and computer program code configured to, with the processor, cause the apparatus to at least receive tag blink data from a plurality of receivers, wherein the tag blink data comprises a tag unique identifier, determine one or more tags detected by the plurality of receivers, based on a comparison of the tag unique identifiers received by a respective receiver and registration data, wherein the registration data comprises a tag-individual correlator for a plurality of tags, and determine a system status based on comparing the one or more tags detected to the plurality of tags of the registration data.

In an example embodiment of the apparatus, the one or more tags detected further comprise reference tags and determining the system status also includes determining a respective receiver status based on a comparison of a predetermined number of reference tag registration data and the number of detected reference tags by the respective receiver. In some example embodiments, determining the system status further includes determining a respective receiver status based on the transmission time of the respective receiver.

In an example embodiment of the apparatus, the one or more tags detected further comprise reference tags and determining the system status also includes determining a respective reference tag status based on a comparison a predetermined number of receivers detecting the respective reference tag and the number of receivers which determined detection of the respective reference tag. In some example embodiments of the apparatus, tag blink data further comprises battery life and determining the system status also includes determining a respective tag status based on comparing the battery life of the respective tag to a predetermined value.

In some example embodiments, the at least one memory and the computer program code, of the apparatus, are further configured to determine a tag blink rate and determining the system status further comprises determining a respective tag status based on comparing the determined tag blink rate to a predetermined blink rate. In an example embodiment of the apparatus, the at least one memory and the computer program code are further configured to cause the system status to display on a graphic user interface.

In still another example embodiment, an apparatus is provided including at least one processor and at least one memory including computer program code, the at least one memory and computer program code configured to, with the processor, cause the apparatus to at least receive tag blink data from at least one participant tag, calculate tag location data based on the tag blink data, classify the tag location data associating tag location data with a participant tag identifier, filter tag event data by applying tag location offsets to one or more tag location data, wherein tag event data comprises at least two classified tag location data, calculate multidimensional player location information per unit time based on the tag event data, and create a visualization of the multidimensional player location information per unit time.

In an example embodiment of the apparatus, the at least one memory and the computer program code are further configured to create a raw data file and cause the raw data file to be stored in a data storage. In some example embodiments, the at least one memory and the computer program code, of the apparatus, are further configured to determine a unit of work wherein the unit of work comprises the tag location data for a predetermined period of time; and the creating a multidimensional player location per unit time is based on the determined unit of work.

In an example embodiment of the apparatus, the at least one memory and the computer program code are further configured to create a filtered data file and cause the filter data file to be stored in a data storage. In some example embodiments, the at least one memory and the computer program code, of the apparatus, are further configured to reduce the multidimensional player location information per unit time by associating a first participant multidimensional player location information per unit time with a second participant multidimensional player location information per unit time.

In some example embodiments of the apparatus, the at least one memory and the computer program code are further configured to cause the visualization to be displayed on a graphic user interface. In an example embodiment of the apparatus, the at least one memory and the computer program code are further configured to cause the visualization to be stored in a data storage. In some example embodiments of the apparatus, the at least one memory and the computer program code are further configured to parse the tag blink data by data field.

In a further example embodiment, an apparatus is provided including at least one processor and at least one memory including computer program code, the at least one memory and computer program code configured to, with the processor, cause the apparatus to at least calculate a tag filter parameter for a plurality of tag events based on received tag blink data and tag location data, wherein the tag filter parameter comprises a blink period, distance span, or velocity, calculate a participant location data adjustment factor based on the tag filter parameter, and calculate multidimensional player location information per unit time based on the plurality tag events and the participant location adjustment factor.

In an example embodiment of the apparatus, the at least one memory and the computer program code are further configured to determine tag blink data with compromised accuracy by analyzing a tag blink data quality indication; and dismissing the tag blink data with compromised accuracy from further analysis. In some example embodiments of the apparatus, tag blink data with compromised accuracy is based on at least one of data quality index, received signal strength index, real time location system error rate, or tag error codes.

In some example embodiments of the apparatus, determining tag blink data with compromised accuracy further comprises comparing a tag blink data quality or integrity value to a predetermined value, wherein in an instance in which the data quality or integrity value satisfies the predetermined threshold the tag blink data accuracy is determined to be compromised. In an example embodiment of the apparatus, calculating a participant location adjustment factor further comprises determining an adjustment for a missed blink.

In some example embodiments of the apparatus, calculating a participant location adjustment factor further comprises determining an adjustment for pop blink. In an example embodiment of the apparatus, calculating a participant location adjustment factor further comprises determining an adjustment for tag-tag offset.

In yet another example embodiment, an apparatus is provided including at least one processor and at least one memory including computer program code, the at least one memory and the computer program code configured to, with the processor, cause the apparatus to receive analytic or event data corresponding to at least one participant characteristic, wherein the analytic or event data is associated with a tag location associated with a participant, generate at least one display element associated with the analytic or event data corresponding to the at least one participant characteristic at one or more time intervals, and cause the at least one display element to be displayed in an interface, wherein the interface is configured to size the at least one data element within the user interface to enable the display of a plurality of display elements in the display, the interface being further configured to display location data for the participant in at least one display element.

In an example embodiment of the apparatus, the at least one memory and the computer program code configured to, with the processor, further cause the apparatus to perform an operation associated with the display element that has been selected. In some example embodiments of the apparatus, the analytic or event data includes data derived from a tag location over a defined time period. In an example embodiment of the apparatus, the tag is configured to communicate using ultra-wide band signals.

In an example embodiment of the apparatus, the interface is configured to display at least one display element configured to display analytic data in varying levels of detail. In some example embodiments of the apparatus, the interface is configured to display the at least one display element configured to display analytic data in at least one of an icon form, a graph form, a panel form, and a full function display element form. In an example embodiment of the apparatus, the full function display element form is displayed as a larger display element than the icon form, the graph form, and the panel form. In some example embodiments, the panel form is displayed as a larger display element than the graph form and the icon form.

In an example embodiment of the apparatus, the graph form is displayed as a larger display element than the icon form. In some example embodiments of the apparatus, the interface is further configured receive an input corresponding to a user input requesting at least one display element to be change from any one of the display forms to another display form.

In yet a further example embodiment, a computer program product is provided including at least one non-transitory computer-readable storage medium having computer-executable program code portions stored therein, the computer-executable program code portions comprising program code instructions configured to generate registration data, wherein the registration data comprises a tag-individual correlator and a status, receive status change indication, for at least one tag, wherein the at least one tag is identified by the unique identifier, correlate the tag unique identifier tag-individual correlator in the registration data, and update the status in the registration data for the status change indication.

In an example embodiment of the computer program product, the computer-executable program code portions further comprise program code instructions configured to cause the at least one tag to be activated such that the tag transmits the tag unique identifier at a predetermined interval. Receiving the status change indication further compromises receiving an indication that the tag has changed status to active, and updating the status in the registration data further comprises updating the status in the registration data as active. In some example embodiments of the computer program product, the computer-executable program code portions further comprise program code instructions configured to cause the at least one tag to be deactivated such that the tag stops transmitting the unique identifier at a predetermined interval. Receiving the status change indication further compromises receiving an indication that the tag has changed status to deactivated and updating the status in the registration data further comprises updating the status in the registration data as deactivated.

In an example embodiment of the computer program product, the at least one tag transmits the tag unique identifier at a first blink rate. The computer-executable program code portions further comprise program code instructions configured to cause the at least one tag to be adjusted such that the tag transmits the tag unique identifier at a second blink rate. In some example embodiments of the computer program product, the computer-executable program code portions further comprise program code instructions configured to receive an indication of a tag replacement comprising a replacement tag unique identifier, update the tag-individual correlator with the replacement tag unique identifier, and replace the tag unique identifier in the registration data with the replacement tag unique identifier.

In an example embodiment of the computer program product, receiving the status change indication further compromises receiving an indication that a tag has been attached to a participant and updating the status in the registration data further comprises updating the status in the registration data as attached.

In another example embodiment, a computer program product is provided including, at least one non-transitory computer-readable storage medium having computer-executable program code portions stored therein, the computer-executable program code portions comprising program code instructions configured to receive tag blink data from a plurality of receivers, wherein the tag blink data comprises a tag unique identifier, determine one or more tags detected by the plurality of receivers, based on a comparison of the tag unique identifiers received by a respective receiver and registration data, wherein the registration data comprises tag-individual correlator, and determine a system status based on comparing the one or more tags detected to the plurality of tags of the registration data.

In some example embodiments of the computer program product, the one or more tags detected further comprise reference tags and determining the system status further comprises determining a respective receiver status based on a comparison of a predetermined number of reference tag registration data and the number of detected reference tags by the respective receiver. In an example embodiment of the computer program product, determining the system status further comprises determining a respective receiver status based on the transmission time of the respective receiver. In some example embodiments of the computer program product, the one or more tags detected further comprise reference tags and determining the system status further comprises determining a respective reference tag status based on a comparison a predetermined number of receivers detecting the respective reference tag and the number of receivers which determined detection of the respective reference tag.

In an example embodiment of the computer program product, the tag blink data further comprises a battery life and determining the system status further comprises determining a respective tag status based on comparing the battery life of the respective tag to a predetermined value. In some example embodiments of the computer program product, the computer-executable program code portions further comprise program code instructions configured to determine a tag blink rate and the determining a system status further comprises determining a respective tag status based on comparing the determined tag blink rate to a predetermined blink rate. In an example embodiment of the computer program product, the computer-executable program code portions further comprise program code instructions configured to cause the system status to display on a graphic user interface.

In yet a further example embodiment, a computer program product is provided including at least one non-transitory computer-readable storage medium having computer-executable program code portions stored therein, the computer-executable program code portions comprising program code instructions configured to receive tag blink data from at least one participant tag, calculate tag location data based on the tag blink data, classify the tag location data by associating tag location data with a participant tag identifier, filter tag event data by applying tag location offsets to one or more tag location data, wherein the tag event data comprises at least two classified tag location data, calculate multidimensional player location information per unit time based on the tag event data, and create a visualization of the multidimensional player location information per unit time.

In an example embodiment of the computer program product, the at least one memory and the computer program code are further configured to create a raw data file and cause the raw data file to be stored in a data storage. In some example embodiments of the computer program product, the computer-executable program code portions further comprise program code instructions configured to determine a unit of work, wherein the unit of work comprises the tag location data for a predetermined period of time and the creating a multidimensional player location per unit time is based on the determined unit of work.

In an example embodiment of the computer program product the computer-executable program code portions further comprise program code instructions configured to create a filtered data file and cause the filter data file to be stored in a data storage. In some example embodiments of the computer program product, the computer-executable program code portions further comprise program code instructions configured to reduce the multidimensional player location information per unit time by associating a first participant multidimensional player location information per unit time with a second participant multidimensional player location information per unit time.

In an example embodiment of the computer program product the computer-executable program code portions further comprise program code instructions configured to cause the visualization to be displayed on a graphic user interface. In some example embodiments of the computer program product, the computer-executable program code portions further comprise program code instructions configured to cause the visualization to be stored in a data storage. In an example embodiment of the computer program product, the computer-executable program code portions further comprise program code instructions configured to parse the tag blink data by data field.

In still another example embodiment, a computer program product is provided including at least one non-transitory computer-readable storage medium having computer-executable program code portions stored therein, the computer-executable program code portions comprising program code instructions configured to calculate a tag data filer parameter for a plurality of tag events based on the received tag blink data and tag location data, wherein the tag data filter parameter comprises a blink period, distance span, or velocity, calculate a participant location data adjustment factor based on the tag filter parameter, and calculate multidimensional player location information per unit time based on the plurality of tag events and the participant location adjustment factor.

In an example embodiment of the computer program product, the computer-executable program code portions further comprise program code instructions configured to determine tag blink data with compromised accuracy based on analyzing a tag blink data quality indicator; and dismissing the determine tag blink data with compromised accuracy from further analysis. In some example embodiments of the computer program product determine tag blink data with compromised accuracy is based on at least one of data quality index, received signal strength index, real time location system error rate, or tag error codes. In an example embodiment of the computer program product, determining tag blink data with compromised accuracy further comprises comparing a tag blink data quality or integrity value to a predetermined value, wherein in an instance in which the data quality or integrity value satisfies the predetermined threshold the tag blink data accuracy is determined to be compromised.

In an example embodiment of the computer program product, calculating a participant location adjustment factor further comprises determining an adjustment for a missed blink. In some example embodiments of the computer program product, calculating a participant location adjustment factor further comprises determining an adjustment for pop blink. In an example embodiment of the computer program product, calculating a participant location adjustment factor further comprises determining an adjustment for tag-tag offset.

In another example embodiment, a computer program product is provided including at least one computer readable non-transitory memory medium having program code instructions stored thereon, the program code instructions which when executed by an apparatus cause the apparatus at least to receive analytic or event data corresponding to at least one participant characteristic, wherein the analytic or event data is associated with a tag location associated with a participant, generate at least one display element associated with the analytic or event data corresponding to the at least one participant characteristic at one or more time intervals, and cause the at least one display element to be displayed in an interface, wherein the interface is configured to size the at least one data element within the user interface to enable the display of a plurality of display elements in the display, the interface being further configured to display location data for the participant in at least one display element.

In an example embodiment of the computer program product, the program code instructions are further configured to, when executed by the apparatus, cause the performance of an operation associated with the display element that has been selected. In some example embodiments of the computer program product, the analytic or event data includes data derived from a tag location over a defined time period.

In some example embodiments of the computer program product, the tag is configured to communicate using ultra-wide band signals. In an example embodiment of the computer program product, the interface is configured to display at least one display element configured to display analytic data in varying levels of detail. In an example embodiment of the computer program product, the interface is configured to display the at least one display element configured to display analytic data in at least one of an icon form, a graph form, a panel form, and a full function display element form.

In an example embodiment of the computer program product, the full function display element form is displayed as a larger display element than the icon form, the graph form, and the panel form. In some example embodiments of the computer program product, the panel form is displayed as a larger display element than the graph form and the icon form. In an example embodiment of the computer program product, the graph form is displayed as a larger display element than the icon form. In an example embodiment of the computer program product, the interface is further configured receive an input corresponding to a user input requesting at least one display element to be change from any one of the display forms to another display form.

In an example embodiment a method is provided including receiving analytic or event data corresponding to one or more participants in a relation to a monitored region at a first time, receiving analytic or event data corresponding to the one or more participants in relation to the monitored region at a second time, and generating a visualization corresponding to the one or more participants to include at least a reference line indicative of a distance traveled by at least one participant between the first time and the second time, wherein the first time and the second time occur during a defined event.

In an example embodiment of the method, the analytic or event data includes location data to a tag location. In some example embodiments of the method, the tag is configured to communicate using ultra-wide band signals.

In still further example embodiments, an apparatus is provided including at least one processor and at least one memory including computer program code, the at least one memory and computer program code configured to, with the processor, cause the apparatus to at least receive analytic or event data corresponding to one or more participants in a relation to a monitored region at a first time, receive analytic or event data corresponding to the one or more participants in relation to the monitored region at a second time, and generate a visualization corresponding to the one or more participants to include at least a reference line indicative of a distance traveled by at least one participant between the first time and the second time, wherein the first time and the second time occur during a defined event.

In an example embodiment of the apparatus, the analytic or event data includes location data to a tag location. In some example embodiments of the apparatus, the tag is configured to communicate using ultra-wide band signals.

In yet a further embodiment, a computer program product is provided including at least one non-transitory computer-readable storage medium having computer-executable program code portions stored therein, the computer-executable program code portions comprising program code instructions configured to receive analytic or event data corresponding to one or more participants in a relation to a monitored region at a first time, receive analytic or event data corresponding to the one or more participants in relation to the monitored region at a second time, and generate a visualization corresponding to the one or more participants to include at least a reference line indicative of a distance traveled by at least one participant between the first time and the second time, wherein the first time and the second time occur during a defined event.

In an example embodiment of the computer program product, the analytic or event data includes location data to a tag location. In some example embodiments of the computer program product, the tag is configured to communicate using ultra-wide band signals.

In another example embodiment a method is provided including receiving an indication corresponding to a selection of at least one participant, receiving an indication corresponding to a selection of at least one criteria of interest, generating a visualization corresponding to the selection of the at least one participant using the at least one criteria of interest and analytic or event data corresponding to the at least one participant, wherein the analytic or event data comprises location data associated with a location of the at least one participant at a given time, tracking the at least one participant and the at least one criteria of interest over a defined time period, and modifying the visualization corresponding to the at least one participant to include changes corresponding to a location of the at least one participant and the at least one criteria of interest over the defined time period.

In an example embodiment of the computer program product, tracking the at least one participant over a defined time period comprises tracking the location of the at least one tag corresponding to the at least one participant. In some example embodiments of the computer program product, the tag is configured to communicate using ultra-wide band signals. In an example embodiment of the computer program product, the visualization corresponding to the selection of the at least one participant using the at least one criteria of interest is displayed on an interface, wherein the interface is configured to size the visualization within the user interface, the interface being further configured to receive an input corresponding to a user input. In some example embodiments of the computer program product, the interface is configured to display the visualization in varying levels of detail.

In another example embodiment, an apparatus is provided including at least one processor and at least one memory including computer program code, the at least one memory and computer program code configured to, with the processor, cause the apparatus to at least receive an indication corresponding to a selection of at least one participant, receive an indication corresponding to a selection of at least one criteria of interest, generate a visualization corresponding to the selection of the at least one participant using the at least one criteria of interest and analytic or event data corresponding to the at least one participant, wherein the analytic or event data comprises location data associated with a location of the at least one participant at a given time, track the at least one participant and the at least one criteria of interest over a defined time period and modify the visualization corresponding to the at least one participant to include changes corresponding to a location of the at least one participant and the at least one criteria of interest over the defined time period.

In an example embodiment of the apparatus, tracking the at least one participant over a defined time period comprises tracking the location of the at least one tag corresponding to the at least one participant. In some example embodiments of the apparatus, the tag is configured to communicate using ultra-wide band signals. In an example embodiment of the apparatus, the visualization corresponding to the selection of the at least one participant using the at least one criteria of interest is displayed on an interface, wherein the interface is configured to size the visualization within the user interface, the interface being further configured to receive an input corresponding to a user input. In some example embodiments of the apparatus, the interface is configured to display the visualization in varying levels of detail.

In a further embodiment, a computer program product is provided including at least one non-transitory computer-readable storage medium having computer-executable program code portions stored therein, the computer-executable program code portions comprising program code instructions configured to receive an indication corresponding to a selection of at least one participant, receive an indication corresponding to a selection of at least one criteria of interest, generate a visualization corresponding to the selection of the at least one participant using the at least one criteria of interest and analytic or event data corresponding to the at least one participant, wherein the analytic or event data comprises location data associated with a location of the at least one participant at a given time, track the at least one participant and the at least one criteria of interest over a defined time period, and modify the visualization corresponding to the at least one participant to include changes corresponding to a location of the at least one participant and the at least one criteria of interest over the defined time period.

In an example embodiment of the computer program product, tracking the at least one participant over a defined time period comprises tracking the location of the at least one tag corresponding to the at least one participant. In some example embodiments of the computer program product, the tag is configured to communicate using ultra-wide band signals. In an example embodiment of the computer program product, the visualization corresponding to the selection of the at least one participant using the at least one criteria of interest is displayed on an interface, wherein the interface is configured to size the visualization within the user interface, the interface being further configured to receive an input corresponding to a user input. In some example embodiments of the computer program product, the interface is configured to display the visualization in varying levels of detail.

In still further example embodiments, a method is provided including receiving an indication corresponding to a request to review one or more visualizations comprising analytic or event data generated associated with one or more participants, receiving an indication corresponding to a selection of a level of detail to display the one or more visualizations, wherein the level of detail defines a level of location data that is displayed in the one or more visualizations, the location data describing the location of the one or more participants at a given time, and causing the one or more visualizations to be arranged on an interface such that the visualizations cover a screen area.

In some example embodiments of the method, the analytic or event data corresponds to at least one tag location. In an example embodiment of the method, the tag is configured to communicate using ultra-wide band signals. In some example embodiments of the method, the interface is configured to display one or more visualizations comprising analytic or event data in at least one of an icon form, a graph form, a panel form, and a full function display element form based at least in part on the selection of a level of detail to display the one or more visualizations. In an example embodiment of the method, the full function display element form displays a greater level of detail than the icon form, the graph form, and the panel form.

In an example embodiment of the method, the panel form displays a greater level of detail than the icon form and the graph form. In some example embodiments of the method, the graph form displays a greater level of detail than the icon form.

In still another example embodiment, an apparatus is provided including at least one processor and at least one memory including computer program code, the at least one memory and computer program code configured to, with the processor, cause the apparatus to at least receive an indication corresponding to a request to review one or more visualizations comprising analytic or event data generated associated with one or more participants, receive an indication corresponding to a selection of a level of detail to display the one or more visualizations, wherein the level of detail defines a level of location data that is displayed in the one or more visualizations, the location data describing the location of the one or more participants at a given time, and cause the one or more visualizations to be arranged on an interface such that the visualizations cover a screen area.

In an example embodiment of the apparatus, analytic or event data corresponds to at least one tag location. In some example embodiments of the apparatus, the tag is configured to communicate using ultra-wide band signals. In an example embodiment of the apparatus, the interface is configured to display one or more visualizations comprising analytic or event data in at least one of an icon form, a graph form, a panel form, and a full function display element form based at least in part on the selection of a level of detail to display the one or more visualizations. In some example embodiments of the apparatus, the full function display element form displays a greater level of detail than the icon form, the graph form, and the panel form.

In an example embodiment of the apparatus, the panel form displays a greater level of detail than the icon form and the graph form. In some example embodiments of the apparatus, the graph form displays a greater level of detail than the icon form.

In yet another example embodiment, a computer program is provided including at least one non-transitory computer-readable storage medium having computer-executable program code portions stored therein, the computer-executable program code portions comprising program code instructions configured to receive an indication corresponding to a request to review one or more visualizations comprising analytic or event data generated associated with one or more participants, receive an indication corresponding to a selection of a level of detail to display the one or more visualizations, wherein the level of detail defines a level of location data that is displayed in the one or more visualizations, the location data describing the location of the one or more participants at a given time, and cause the one or more visualizations to be arranged on an interface such that the visualizations cover a screen area.

In an example embodiment of the computer program product, the analytic or event data corresponds to at least one tag location. In some example embodiments of the computer program product, the tag is configured to communicate using ultra-wide band signals. In an example embodiment of the computer program product, the interface is configured to display one or more visualizations comprising analytic or event data in at least one of an icon form, a graph form, a panel form, and a full function display element form based at least in part on the selection of a level of detail to display the one or more visualizations. In some example embodiments of the computer program product, the full function display element form displays a greater level of detail than the icon form, the graph form, and the panel form.

In an example embodiment of the computer program product, the panel form displays a greater level of detail than the icon form and the graph form. In some example embodiments of the computer program product, the graph form displays a greater level of detail than the icon form.

In yet a further example embodiment, a method is provided including receiving an indication to review one or more visualizations comprising analytics generated based on analytic of event data corresponding to one or more participants, causing the one or more visualizations to be displayed on an interface, wherein at least one of the one or more visualizations comprise location data, the location data describing the location of the one or more participants at a given time, receiving an indication corresponding to a configuration selection of the one or more visualizations on the interface, and causing the one or more visualizations to be arranged on an interface corresponding to the indication corresponding to the configuration selection.

In an example embodiment of the method, the analytic or event data correspond to at least one tag location. In some example embodiments of the method, the tag is configured to communicate using ultra-wide band signals. In an example embodiment of the method, the one or more visualizations displayed on the interface comprise analytics in varying levels of detail. In some example embodiments of the method, the interface is configured to display the one or more visualizations in at least one of an icon form, a graph form, a panel form, and a full function display form.

In an example embodiment of the method, the full function display form comprises analytics in a greater level of detail than the panel form, the graph form, and the icon form. In some example embodiments of the method, the panel form comprises analytics in a greater level of detail than the graph form and the icon form. In an example embodiment of the method, the graph form comprises analytics in a greater level of detail than the icon form.

In an additional example embodiment, an apparatus is provided including at least one processor and at least one memory including computer program code, the at least one memory and computer program code configured to, with the processor, cause the apparatus to at least receive an indication to review one or more visualizations comprising analytics generated based on analytic of event data corresponding to one or more participants, cause the one or more visualizations to be displayed on an interface, wherein at least one of the one or more visualizations comprise location data, the location data describing the location of the one or more participants at a given time, receive an indication corresponding to a configuration selection of the one or more visualizations on the interface, and cause the one or more visualizations to be arranged on an interface corresponding to the indication corresponding to the configuration selection.

In an example embodiment of the apparatus, the analytic or event data correspond to at least one tag location. In some example embodiments of the apparatus, the tag is configured to communicate using ultra-wide band signals. In an example embodiment of the apparatus, the one or more visualizations displayed on the interface comprise analytics in varying levels of detail. In some example embodiments of the apparatus, the interface is configured to display the one or more visualizations in at least one of an icon form, a graph form, a panel form, and a full function display form.

In an example embodiment of the apparatus, the full function display form comprises analytics in a greater level of detail than the panel form, the graph form, and the icon form. In some example embodiments of the apparatus, the panel form comprises analytics in a greater level of detail than the graph form and the icon form. In an example embodiment of the apparatus, the graph form comprises analytics in a greater level of detail than the icon form.

In yet another additional embodiment, a computer program product is provided including at least one non-transitory computer-readable storage medium having computer-executable program code portions stored therein, the computer-executable program code portions comprising program code instructions configured to receive an indication to review one or more visualizations comprising analytics generated based on analytic of event data corresponding to one or more participants, cause the one or more visualizations to be displayed on an interface, wherein at least one of the one or more visualizations comprise location data, the location data describing the location of the one or more participants at a given time, receive an indication corresponding to a configuration selection of the one or more visualizations on the interface, and causing the one or more visualizations to be arranged on an interface corresponding to the indication corresponding to the configuration selection.

In an example embodiment of the computer program product, the analytic or event data correspond to at least one tag location. In some example embodiments of the computer program product, the tag is configured to communicate using ultra-wide band signals. In an example embodiment of the computer program product, the one or more visualizations displayed on the interface comprise analytics in varying levels of detail. In some example embodiments of the computer program product, the interface is configured to display the one or more visualizations in at least one of an icon form, a graph form, a panel form, and a full function display form.

In an example embodiment of the computer program product, the full function display form comprises analytics in a greater level of detail than the panel form, the graph form, and the icon form. In some example embodiments of the computer program product, the panel form comprises analytics in a greater level of detail than the graph form and the icon form. In an example embodiment of the computer program product, the graph form comprises analytics in a greater level of detail than the icon form.

In an example embodiment, a method is provided including receiving a plurality of multidimensional player location data per unit time comprising participant locations at calculated times, generating synchronized participant coordinate data by synchronizing the plurality of multidimensional player location per unit time based on timestamps associated with tag location data and outputting the synchronized participant coordinate data for visualization rendering.

In an example embodiment, the method also includes generating a field event rendering based on the synchronized participant coordinate data. In some example embodiments, the method also includes receiving camera data form one or more cameras and synchronizing the camera data with the synchronized participant coordinate data, wherein the visualization is a video rendering comprising the synchronized participant coordinate data and the camera data.

In an example embodiment, the method also includes rendering the visualization at a 30 Hertz refresh rate for television broadcast. In some example embodiments, this method also includes delaying the rendering the visualization by 2 seconds. In an example embodiment, the method also includes rendering the visualization at 10 Hertz or less refresh rate for digital media rendering. In some example embodiments, this method also includes delaying the rendering the visualization by 2 seconds.

In a further example embodiment, an apparatus is provided including at least one processor and at least one memory including computer program code, the at least one memory and computer program code configured to, with the processor, cause the apparatus to at least receive a plurality of multidimensional player location data per unit time comprising participant locations at calculated times, generate synchronized participant coordinate data by synchronizing the plurality of multidimensional player location per unit time based on timestamps associated with tag location data, and output the synchronized participant coordinate data for visualization rendering.

In an example embodiment, the at least one memory and the computer program code, of the apparatus, are further configured to generate a field event rendering based on the synchronized participant coordinate data. In some example embodiments of the apparatus, the at least one memory and the computer program code are further configured to receive camera data form one or more cameras and synchronize the camera data with the synchronized participant coordinate data, wherein the visualization is a video rendering comprising the synchronized participant coordinate data and the camera data.

In some example embodiments of the apparatus, the at least one memory and the computer program code are further configured to render the visualization at a 30 Hertz refresh rate for television broadcast. In an example embodiment of this apparatus, the at least one memory and the computer program code are further configured to delay the rendering the visualization by 2 seconds. In an example embodiment of the apparatus, the at least one memory and the computer program code are further configured to render the visualization at 10 Hertz or less refresh rate for digital media rendering. In an example embodiment of this apparatus, the at least one memory and the computer program code are further configured to delay the rendering the visualization by 2 seconds.

In yet another example embodiment, a computer program product is provided including at least one non-transitory computer-readable storage medium having computer-executable program code portions stored therein, the computer-executable program code portions comprising program code instructions configured to receive a plurality of multidimensional player location data per unit time comprising participant locations at calculated times, generate synchronized participant coordinate data by synchronizing the plurality of multidimensional player location per unit time based on timestamps associated with tag location data, and output the synchronized participant coordinate data for visualization rendering.

In an example embodiment of the computer program product, the computer-executable program code portions further comprise program code instructions configured to generate a field event rendering based on the synchronized participant coordinate data. In some example embodiments of the computer program product, the computer-executable program code portions further comprise program code instructions configured to receive camera data form one or more cameras and synchronize the camera data with the synchronized participant coordinate data, wherein the visualization is a video rendering comprising the synchronized participant coordinate data and the camera data.

In an example embodiment of the computer program product, the computer-executable program code portions further comprise program code instructions configured to render the visualization at a 30 Hertz refresh rate for television broadcast. In an example embodiment of this computer program product, the computer-executable program code portions further comprise program code instructions configured to delay the rendering the visualization by 2 seconds. In some example embodiments of the computer program product, the computer-executable program code portions further comprise program code instructions configured to render the visualization at 10 Hertz or less refresh rate for digital media rendering. In an example embodiment of this computer program product, the computer-executable program code portions further comprise program code instructions configured to delay the rendering the visualization by 2 seconds.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates a schematic representation of a radio frequency locating system useful for determining the location of an object according to an example embodiment of the present invention;

FIGS. 2A-C illustrate some exemplary participants carrying tags and sensors that may provide information to a performance analytics system in accordance with some example embodiments of the present invention;

FIG. 22 illustrates a player equipment status display according to an exemplary embodiment of the present invention according to an embodiment of the present invention;

FIG. 23 illustrates an exemplary embodiment of a player tag status history display according to an embodiment of the present invention;

FIG. 24 illustrates an exemplary embodiment of an equipment status display according to an embodiment of the present invention;

FIG. 47 illustrates an interface configured to display events and configured to receive an indication corresponding to a selection of an event so as to display analytic data provided by a system that corresponds to the event according to an example embodiment of the present invention;

DETAILED DESCRIPTION

Figure 1:
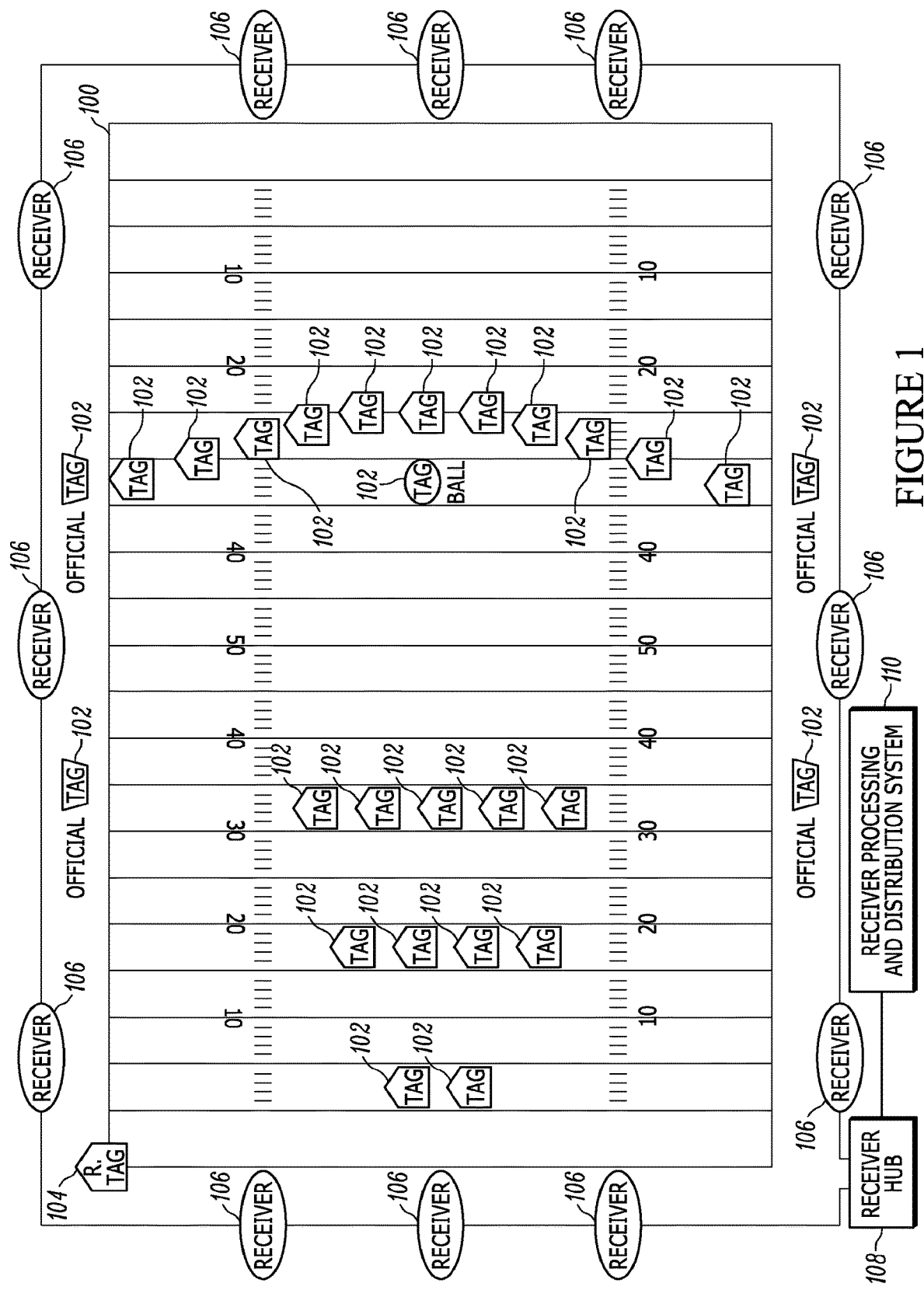

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements Like numbers refer to like elements throughout.

Overview

Existing performance analytics of sporting events have drawbacks in providing accurate data about events and participant actions that occur during a game. Game day data is often manually collected by individuals documenting participant actions and play participation during a game. Performance review of a game often requires individuals to manually review game recordings over a number of hours after a game to compile player actions and events during play. This performance review is also often limited to statistics and data that can be identified or captured by the individuals watching or reviewing a game or game film. In addition, such review and any analytics data flowing therefrom is provided freely on a non-exclusive basis as anyone with access to game film can compile similar analytics data.

Embodiments of the present invention are directed to methods, systems, apparatuses, and computer readable storage media for providing real-time collection of data and analysis of participant performance and play statistics during a game such as by using radio frequency locating systems and radio frequency identification ("RFID").

Embodiments of the present invention may provide for automatic recognition of formations, plays, and events through the processing of real time data (or near real time data) regarding location, change in location, velocity, change in acceleration, orientation, or the like, for participants based on an analysis of relevant models and data as described in detail below. The term "participant" as used herein refers to players, officials, game related objects such as the ball, penalty markers, line of scrimmage and yard to gain markers, and any other movable object proximate a field of play.

In embodiments in which participants are players, a group or plurality of participants may be grouped into squads (e.g., offense, defense, kickoff, punt, kick return, punt return, field goal, infield, outfield, bullpen, etc.) and/or teams (e.g., football team, baseball team, swim team, etc.). Participants on the same team are called teammates; participants on different teams are called adversaries.

Embodiments of the present invention may provide for automated data collection with reduced errors, as well as providing additional statistics that may not be available with current systems. Additionally, embodiments may provide for rapid (i.e., near instantaneous) production of game review documentation (e.g., playbooks). Embodiments of the present invention may also provide additional and exclusive data and analysis that may be securely licensed without concern that similar analytics may be readily reproduced without a system configured as set forth below.

Embodiments of the present invention may allow for the simultaneous tracking of a plurality of participants and may provide for indications of player statistics and/or potential play events in real time (or near real time). Such indications may be output to a variety of systems including, without limitation, a visualization system (e.g., an enhanced television broadcast system or computer graphics visualization system), a game operations system, a camera control system, a team analytics system, a league analytics system, and a statistics system.

Embodiments of the present invention may allow for compilation of location tag data correlated to participants, e.g. tag registration data. The tag registration data may be updated for tag attachment, activation, deactivation, damage, or the like. Further tag registration data may be generated prior to or during events. The tag registration data may allow for the location system to monitor specified tags and correlate location data to specific individuals and/or objects.

In some embodiments, tag registration data may be updated prior to, during, and after events at the location system or one or more mobile units that may be in data communication with the location system. The tag registration data updates associated with mobile units may be synchronized with the location system, allowing for replacement of damaged tags during an event, efficient activation of tags prior to events and deactivation after events.

Embodiments of the present invention may allow for an initialization process to determine system configuration and errors prior to and during use of the location system.

Embodiments of the present invention may allow for dismissal of location data received from location tags in an instance in which the received data is determined to be inaccurate. Additionally, the location system may adjust location calculations based on missed tag location data, location pop, jitter, location tag-to-location tag offsets, or the like.

Embodiments of the present invention may allow for calculation of a participant location over time. The participant location over time may be synchronized with other participant location data and output as a visualization of a monitored activity, for example a play in American football.

Embodiments of the present invention may allow for calculation of statistical data and analytic data based on location data associated with participants and other various sensors. The analytic data and/or statistical data may also be output a visualization of the monitored activity. In some embodiments the participant location over time and analytical/statistical data may be output in a combined visualization.

Embodiments of the present invention are illustrated in the appended figures and description below in relation to the sport of American football. However, as will be apparent to one of ordinary skill in the art in view of this disclosure, the inventive concepts herein described are not limited to football and may be applied to various other applications including, without limitation, other sports or group events such as baseball, basketball, golf, hockey, soccer, racing or motorsports, competitive events, and the like.

Example RF Locating System Architecture

FIG. 1 illustrates an exemplary locating system 100 useful for calculating a location by an accumulation of location data or time of arrivals (TOAs) at a central processor/Hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, for example the junction of the vertical support and cross bar of the goal posts in American football, is used to determine a phase offset between the counters associated with at least a subset of the of the receivers 106. The RTLS tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Central Processor/Hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. In an instance in which each information packet is unique, a higher packet rate results in a higher data rate; in an instance in which each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. In an instance in which reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less than a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of a reference tag 104, e.g. a reference phase offset. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the Central Processor/Hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the Central Processor/Hub 108 (e.g., the data cables may enable a transfer speed of 2 Mbps). In some examples, measurement data is transferred to the Central Processor/Hub at regular polling intervals.

As such, the Central Processor/Hub 108 determines or otherwise computes tag location (i.e., object location) by processing TOA measurements relative to multiple data packets detected by the receivers 106. In some example embodiments, the Central Processor/Hub 108 may be configured to resolve the coordinates of a tag using nonlinear optimization techniques.

In some examples, TOA measurements from multiple receivers 106 are processed by the Central Processor/Hub 108 to determine a location of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated location coordinates ($x_0$, $y_0$, $z_0$) of the transmit tag 102 represents the measurement error for each respective TOA, and the minimization of the sum of the squares of the TOA measurement errors from each receiver participating in the DTOA location estimate provides for both the location coordinates ($x_0$, $y_0$, $z_0$) of the transmit tag and of that tag's transmit time $t_0$.

In some examples, the system described herein may be referred to as an "over-specified" or "over-determined" system. As such, the Central Processor/Hub 108 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (1)$$

In an instance in which N is the number of receivers, c is the speed of light, ($x_j$, $y_j$, $z_j$) are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error $\varepsilon$ in Equation 1 may be the Davidon-Fletcher-Powell (DFP) quasi-Newton algorithm, for example. In some examples, the optimization algorithm to minimize the error $\varepsilon$ in Equation 1 may be a steepest descent algorithm. In each case, the algorithms may be seeded with an initial location estimate (x, y, z) that represents the two-dimensional (2D) or three-dimensional (3D) mean of the positions of the receivers 106 that participate in the tag location determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position ($x_T$, $y_T$, $z_T$). The phase offset serves to resolve the constant offset between counters within the various receivers 106, as described below.

In further example embodiments, a number N of receivers 106 {$R_j$: j=1, ..., N} are positioned at known coordinates ($x_{R_j}$, $y_{R_j}$, $z_{R_j}$), which are respectively positioned at distances $d_{R_j}$ from a reference tag 104, such as given in Equation 2:

$$d_{R_j} = \sqrt{(x_{R_j}-x_T)^2+(y_{R_j}-y_T)^2+(z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta \tau_R + O_j + \beta d_{R_j}/c \quad (3)$$

In an instance in which c is the speed of light and $\beta$ is the number of fine resolution count increments per unit time (e.g., one per nanosecond). Similarly, each object tag $T_i$ of each object to be located transmits a signal at an unknown time $\tau_i$ to produce a count $N_{i_j}$, as given in Equation 4:

$$N_{i_j} = \beta \tau_i + O_j + \beta d_{i_j}/c \quad (4)$$

at receiver $R_j$ in an instance in which $d_{i_j}$ is the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

In an instance in which $\Delta_{jk}$ is constant as long as $d_{R_j}-d_{R_k}$ remains constant, (which means the receivers and reference tag are fixed and there is no multipath situation) and $\beta$ is the same for each receiver. Note that $\Delta_{jk}$ is a known quantity, since $N_{R_j}$, $N_{R_k}$, $\beta$, $d_{R_j}/c$, and $d_{R_k}/c$ are known. That is, the phase offsets between receivers $R_j$ and $R_k$ may be readily determined based on the reference tag 104 transmissions. Thus, again from the above equations, for a tag 102 ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

In some example embodiments, the location of a tag 102 may then be output to a receiver processing and distribution system 110 for further processing of the location data to advantageously provide visualizations, predictive analytics, statistics and/or the like.

The exemplary radio frequency locating system of FIG. 1 may be used in providing performance analytics in accordance with some embodiments of the present invention. In the environment of FIG. 1, data may be captured and analyzed, such as during a sporting event to identify events, statistics, and other data useful to a sports team, league, viewer, licensee, or the like. In some embodiments, data associated with a number of objects or participants (e.g., players, officials, balls, game equipment, etc.) on a playing field, such as monitored area 100, may be generated and provided to a performance analytics system. As such, as further discussed in connection with FIGS. 2A-C below, each object may have one or more attached tags 102 (such as to equipment worn by a player) to be used to track data such as location, change of location, speed, or the like of each object. In some embodiments, additional sensors, such as, without limitation, accelerometers, magnetometers, time-of-flight sensors, health sensors, temperature sensors, moisture sensors, light sensors, or the like, may be attached to each object to provide further data to the performance analytics system. Such additional sensors may provide data to the tag 102, either through a wired or wireless connection, to be transmitted to the receivers 106 or the sensors may be configured to transmit data to receivers (i.e., sensor receivers) separately from tags 102.

One or more of the receivers 106 may receive transmissions from tags 102 and transmit the blink data to a receiver hub 108. The receiver hub 108 may process the received data to determine tag location for the tags 102. The receiver hub 108 may transmit the tag location data to one or more processors, such as receiver processing and distribution system 110. Receiver processing and distribution system 110 may use one or more modules (e.g., processing engines) and one or more databases to identify the object each of the tags 102 is associated with, such as a player, official, ball, or the like.

In some embodiments, multiple tags 102 (as well as other sensors) may be attached to the equipment worn by an individual player, official, or other participant. The receiver processing and distribution system 110 may use one or more databases to associate the tag identifier (e.g., a tag UID) of each tag 102 with each player, official, object, or other participant and correlate the tag location data and/or other tag and sensor derived data for multiple tags 102 that are associated with a particular player, official, object, or other participant.

As discussed in greater detail below, the receiver processing and distribution system 110 may then use the tag location data and/or other tag and sensor derived data to determine player dynamics, such as a player's location, how the location is changing with time, orientation, velocity, acceleration, deceleration, total yardage, or the like. The receiver processing and distribution system 110 may also use the tag location data and/or other tag and sensor derived data to determine dynamics for other participants such as the officials, the ball, penalty markers, line of scrimmage or yards to gain markers, or the like, for use in generating data for performance analytics. The receiver processing and distribution system 110 may also use the data and one or more databases to determine team formations, play activity, events, statistics, or the like, such as by comparing the data to various models to determine the most likely formation or play or the events that have occurred during a game. The receiver processing and distribution system 110 may also use the data to provide statistics or other output data for the players, teams, and the game.

In some embodiments, the receiver processing distribution system 110 may be configured to communicate with a sport analytics interface system 112, which may be configured to advantageously provide for the effective visualization of analytic data, such as sport analytics data, event data, statistical data, or the like, as described herein. In another embodiment, the receiver processing distribution system 110 may include a sport analytics interface system therein. In some embodiments, a sports analytics interface system 112 may include an electronic device, such as a laptop computer, tablet computer, smartphone, smart television, electronic book reader, touch surface, and/or the like configured to display an interface providing sport analytics data corresponding to a particular object, such as a football player.

As will be apparent to one of ordinary skill in the art, the inventive concepts herein described are not limited to use with the UWB based RF locating system shown in FIG. 1. Rather, in various embodiments, the inventive concepts herein described may be applied to various other locating systems especially those that are configured to provide robust location resolution (i.e., subfoot location resolution).

Example Tag/Sensor Positioning and Participant Correlation

FIG. 1 shows a monitored area 100. The monitored area 100 comprises a plurality of positions at one or more time epochs. The plurality of positions may be divided into one or more regions, called zones. Each zone may be described by one or more coordinate systems, such as a local NED (North-East-Down) system, a latitude-longitude system, or even a yard line system as might be used for an American football game. A location is a description of a position, or a plurality of positions, within the monitored area. For example, a field marker at the intersection of the south goal line and west out of bounds line at Bank of America Stadium in Charlotte, N.C. could be described as {0,0,0} in a local NED system, or 35.225336 N 80.85273 W longitude 751 ft. altitude on a latitude-longitude system, or simply "Panthers Goal Line" in a yard line system. Because different types of locating systems or different zones within a single locating system may use different coordinate systems, a Geographical Information System or similar monitored area database may be used to associate location data. One type of Geographical Information System describing at least a field of play may be called Field Data.

Exemplary Participants and Location Tag Mounting

Figure 2A:
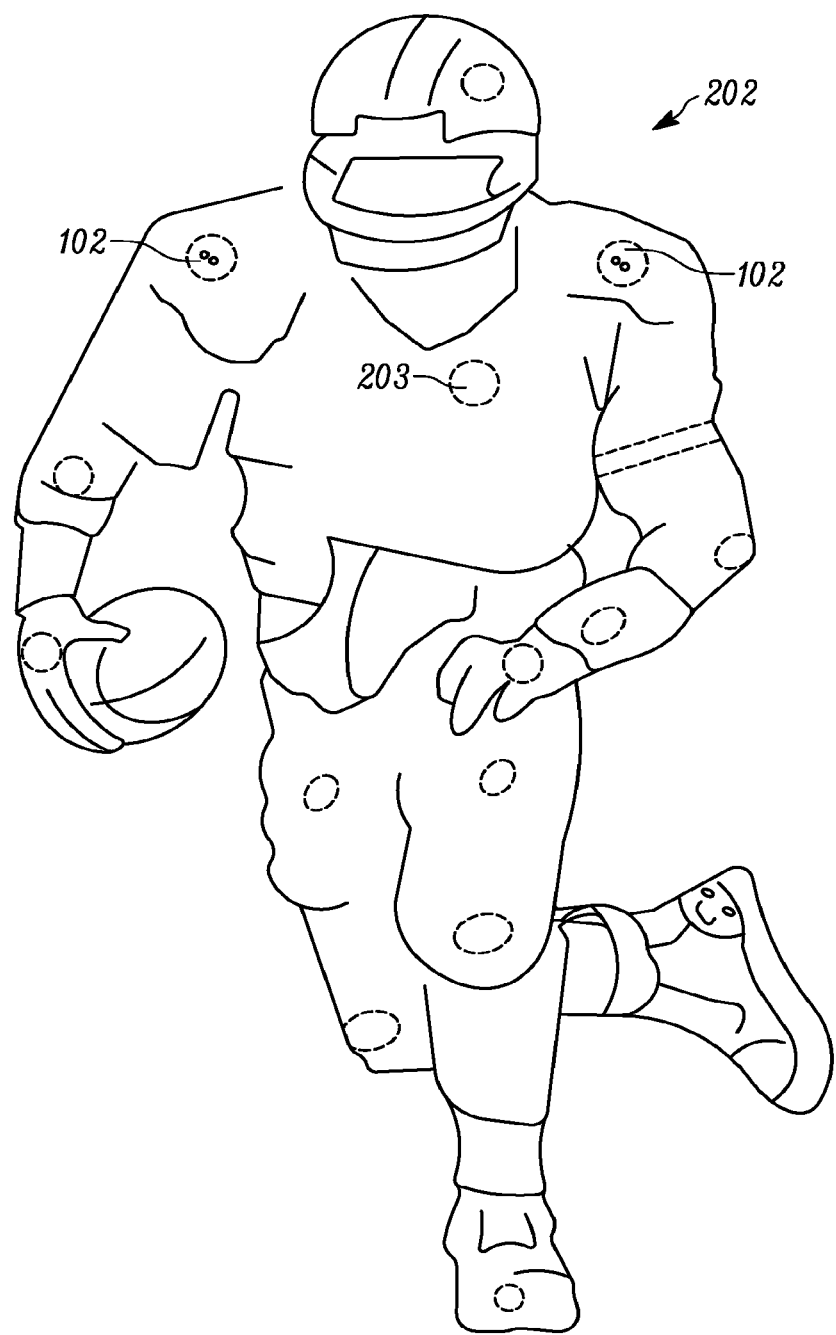
Figure 2B:
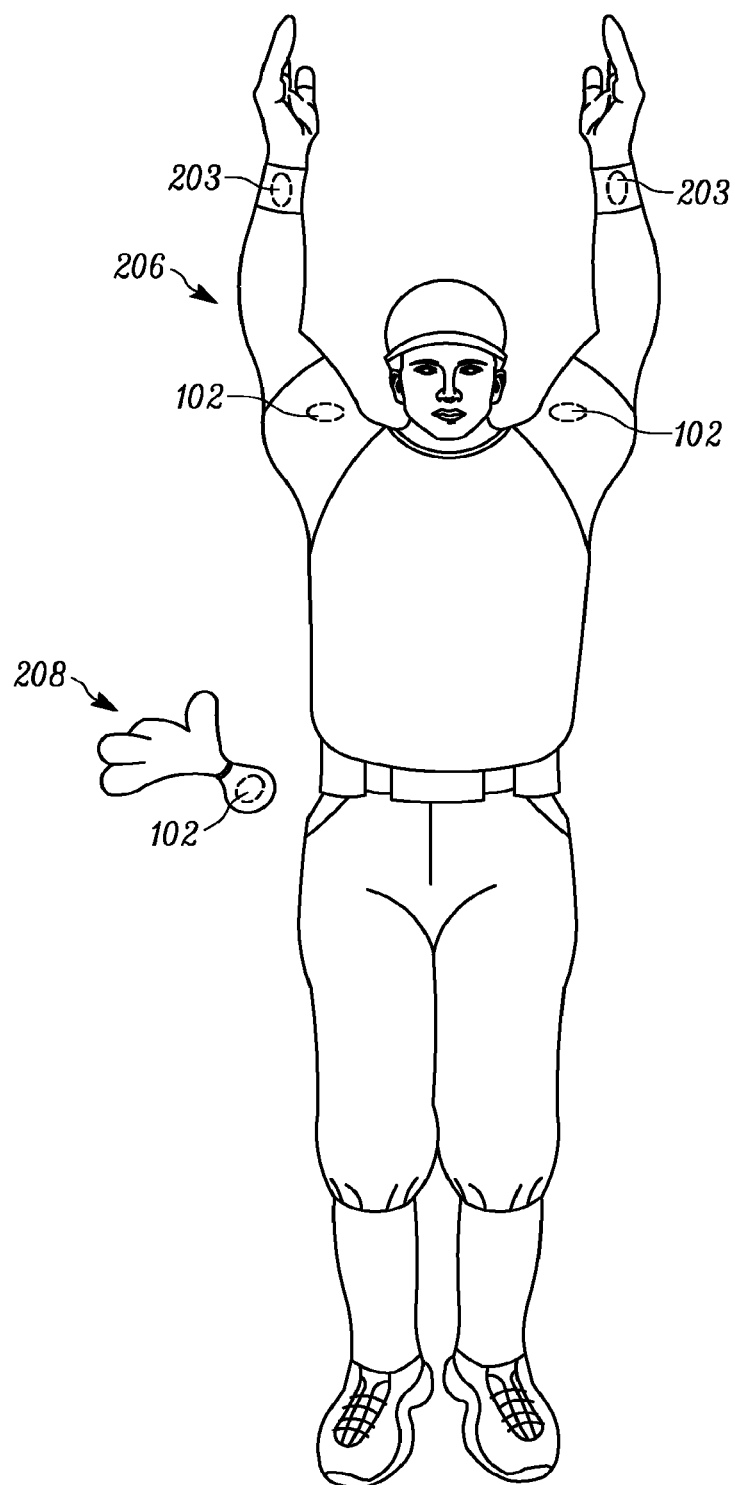
Figure 2C:
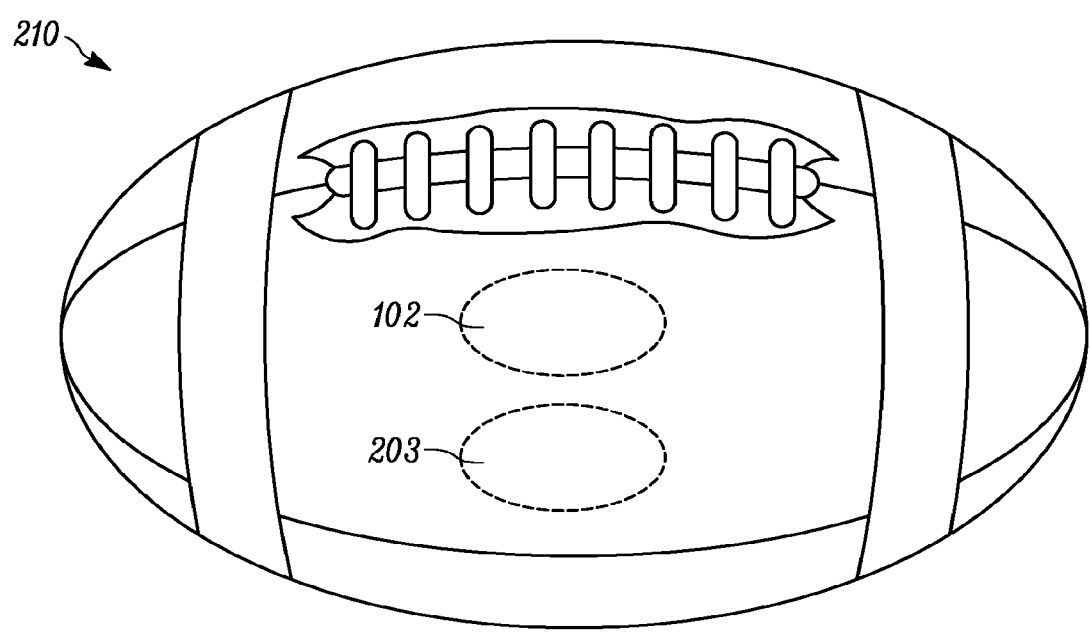

FIGS. 2A-C illustrate some exemplary participants that may provide information to a performance analytics system in accordance with some embodiments of the present invention. FIG. 2A illustrates a player 202 (e.g., a football player) wearing equipment having attached tags 102 in accordance with some embodiments. In particular, the depicted player 202 is wearing shoulder pads having tags 102 affixed to opposite sides thereof. This positioning advantageously provides an elevated broadcast position for each tag 102 thereby increasing its communication effectiveness.

Additional sensors 203 may be attached to equipment worn by player 202, such as accelerometers, magnetometers, time-of-flight sensors, health monitoring sensors (e.g., blood pressure sensors, heart monitors, respiration sensors, moisture sensors, temperature sensors), light sensors, or the like. The additional sensors 203 may be affixed to shoulder pads, the helmet, the shoes, rib pads, elbow pads, the jersey, the pants, a bodysuit undergarment, gloves, arm bands, wristbands, and the like.

Sensors 203 may be configured to communicate with receivers (e.g., receivers 106 of FIG. 1) directly or indirectly through tags 102 or other transmitters. For example, in one embodiment, a sensor 203 may be connected, wired (e.g., perhaps through wires sewn into a jersey or bodysuit undergarment) or wirelessly, to tags 102 to provide sensor data to tags 102, which is then transmitted to the receivers 106. In another embodiment, a plurality of sensors (not shown) may be connected to a dedicated antenna or transmitter, perhaps positioned in the helmet, which may transmit sensor data to one or more receivers.

FIG. 2B illustrates a game official 206 wearing equipment having attached tags 102 and sensors 203 in accordance with some embodiments. In the depicted embodiment, tags 102 are attached to the official's jersey proximate opposite shoulders. Sensors 203 are positioned in wristbands worn on the official's wrists as shown. Sensors 203 may be configured to communicate with receivers (e.g., receivers 106 of FIG. 1) directly or indirectly through tags 102 or other transmitters as discussed above in connection with FIG. 2A.

As discussed in greater detail below, the positioning of sensors 203 (here, accelerometers) proximate the wrists of the official may allow the receiver processing and distribution system 110 to determine particular motions, movements, or activities of the official 206 for use in determining events (e.g., winding of the game clock, first down, touchdown, or the like). The official 206 may also carry other equipment, such as penalty flag 208, which may also have a tag 102 (and optionally one or more sensors) attached to provide additional data to the receiver processing and distribution system 110. For example, the receiver processing and distribution system 110 may use tag location data from the penalty flag 208 to determine when the official is merely carrying the penalty flag 208 versus when the official is using the penalty flag 208 to indicate an event, such as a penalty (e.g., by throwing the penalty flag 208).

FIG. 2C illustrates an example of a ball 210 having tags 102 attached or embedded in accordance with some embodiments. Additionally, sensors 203 may be attached to or embedded in the ball 210, such as accelerometers, time-of-flight sensors, or the like. In some embodiments, the sensor 203 may be connected, wired or wirelessly, to tag 102 to provide sensor data to tag 102 which is then transmitted to the receivers 106. In some embodiments, the sensor 203 may transmit sensor data to receivers separately from the tag 102, such as described above in connection with FIG. 2A.

As will be apparent to one of ordinary skill in the art in view of this disclosure, once the tags 102 and sensors 203 of FIGS. 2A-C are positioned on participants, they may be correlated to such participants. For example, in some embodiments, unique tag or sensor identifiers ("unique IDs") may be correlated to a participant profile (e.g., John Smith—running back, Fred Johnson—line judge official, or ID 027—one of several game balls, etc.) and stored to a remote database accessible to the performance analytics system as discussed in greater detail below. Each participant profile may further include or be correlated with a variety of data including, but not limited to, biometric data (e.g., height, weight, health data, etc.), role data, team ID, performance statistics, and other data that may be apparent to one of skill in the art in view of the foregoing description.

In some embodiments, such participant profile or role data may be pre-defined and stored in association with the unique tag or sensor identifiers. In other embodiments, the participant profile or role data may also be "learned" by the system as a result of received tag or sensor data, formation data, play data, event data, and/or the like. For example, in some embodiments the system may determine that a tag or sensor is not correlated to a participant profile and may analyze data received from the tag and/or sensor to determine possible participant roles, etc., which may be ranked and then selected/confirmed by the system or by a user after being displayed by the system. In some embodiments, the system may determine possible participant roles (i.e., participant role data) based on determined participant location data (e.g., movement patterns, alignment position, etc.).

In some embodiments, as described in greater detail below, the participant profile or role data may also be updated by the system (i.e., to produce a data set for the participant that is far more robust than that established at initial registration) as a result of received tag or sensor data, formation data, play data, event data, and/or the like. In some embodiments, the participant profile and/or role data may be used in a performance analytics system to weight the actions of the participants during analysis to assist in qualifying what is occurring, such as in determining formations, plays, events, etc.

Tag ID and Sensor Data Transmission Architecture

FIGS. 3A, 3B, 3C, 3D, and 3E show block diagrams of various different architectures that may be utilized in transmitting signals from one or more tags and sensors to one or more receivers of a receiver processing and analytics system in accordance with embodiments of the invention. In some embodiments, the depicted architectures may be used in connection with the receiver processing and analytics system 110 of FIG. 1. More than one of these architectures may be used together in a single system.

Figure 3A:
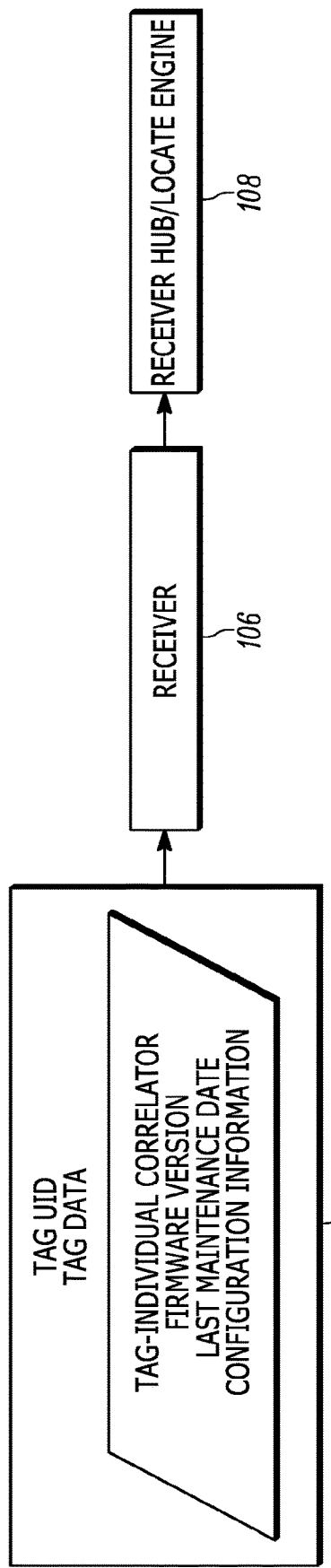
FIGS. 3A-3E are block diagrams showing the input and output of receivers and sensor receivers in accordance with an example embodiment.

FIG. 3A shows a RF location tag 102, such as that shown in FIG. 1, which may be configured to transmit a tag signal to one or more receivers 106. The one or more receivers 106 may transmit a receiver signal to the receiver hub/locate engine 108.

The depicted RF location tag 102 may generate or store a tag unique identifier ("tag UID") and/or tag data as shown. The tag data may include useful information such as the installed firmware version, last tag maintenance date, configuration information, and/or a tag-individual correlator. The tag-individual correlator may comprise data that indicates that a monitored individual (e.g., participant) is associated with the RF location tag 102 (e.g. participant name, uniform number and team, biometric data, tag position on individual, i.e., right wrist, tag UID, or the like). As will be apparent to one of skill in the art in view of this disclosure, the tag-individual correlator may be stored to the RF location tag 102 when the tag is registered or otherwise associated with an individual. While shown as a separate field for illustration purposes, one of ordinary skill in the art may readily appreciate that the tag-individual correlator may be part of any tag data or even omitted from the tag.

The tag signal transmitted from RF location tag 102 to receiver 106 may include "blink data" as it is transmitted at selected intervals. This "blink rate" may be set by the tag designer or the system designer to meet application requirements. In some embodiments it is consistent for one or all tags; in some embodiments it may be data dependent. Blink data includes characteristics of the tag signal that allow the tag signal to be recognized by the receiver 106 so the location of the RF location tag 102 may be determined by the locating system. Blink data may also comprise one or more tag data packets. Such tag data packets may include any data from the tag 102 that is intended for transmission such as, for example in the depicted embodiment, a tag UID, tag data, and a tag-individual correlator. In the case of TDOA systems, the blink data may be or include a specific pattern, code, or trigger that the receiver 106 (or downstream receiver processing and analytics system) detects to identify that the transmission is from a RF location tag 102 (e.g., a UWB tag).

The depicted receiver 106 receives the tag signal, which includes blink data and tag data packets as discussed above. In one embodiment, the receiver 106 may pass the received tag signal directly to the receive receiver hub/locate engine 108 as part of its receiver signal. In another embodiment, the receiver 106 could perform some basic processing on the received tag signal. For instance, the receiver could extract blink data from the tag signal and transmit the blink data to the receive receiver hub/locate engine 108. The receiver could transmit a time measurement to the receive receiver hub/locate engine 108 such as a TOA measurement and/or a TDOA measurement. The time measurement could be based on a clock time generated or calculated in the receiver, it could be based on a receiver offset value as explained in FIG. 1 above, it could be based on a system time, and/or it could be based on the time difference of arrival between the tag signal of the RF location tag 102 and the tag signal of a RF reference tag (e.g., tag 104 of FIG. 1). The receiver 106 could additionally or alternatively determine a signal measurement from the tag signal (such as a received signal strength indication (RSSI), a direction of signal, signal polarity, or signal phase) and transmit the signal measurement to the receive receiver hub/locate engine 108.

Figure 3B:
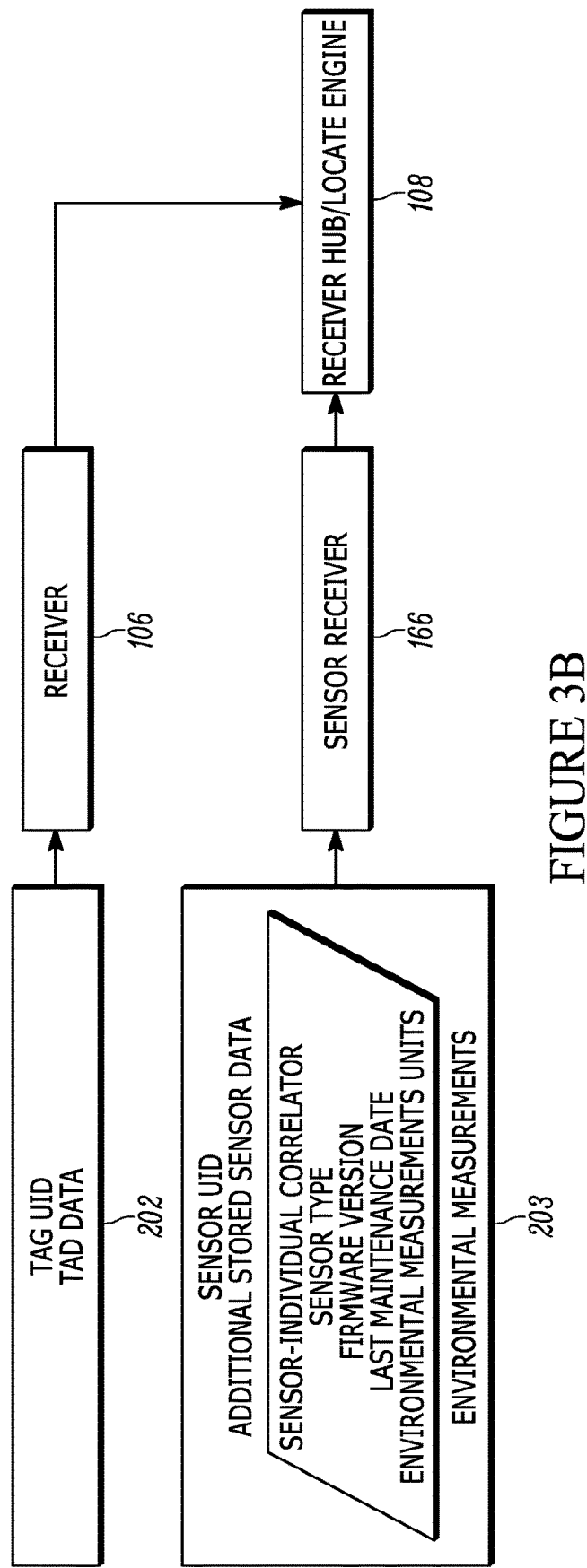

FIG. 3B shows a RF location tag 202 and sensor 203, such as those worn on an individual's person as shown in FIG. 2, which may be configured to transmit tag signals and sensor signals, respectively, to one or more receivers 106, 166. The one or more receivers 106, 166 may then transmit receiver signals to the receiver hub/locate engine 108. One or more receivers 106, 166 may share physical components, such as a housing or antenna.

The depicted RF location tag 202 may comprise a tag UID and tag data (such as a tag-individual correlator) and transmit a tag signal comprising blink data as discussed in connection with FIG. 3A above. The depicted sensor 203 may generate and/or store a sensor UID, additional stored sensor data (e.g. a sensor-individual correlator, sensor type, sensor firmware version, last maintenance date, the units in which environmental measurements are transmitted, etc.), and environmental measurements. The "additional stored sensor data" of the sensor 203 may include any data that is intended for transmission, including but not limited to a RF location tag 202, a reference tag (e.g., 104 of FIG. 1), a sensor receiver, a receiver 106, and/or the receiver/receiver hub locate engine 108.

The sensor-individual correlator may comprise data that indicates that a monitored individual is associated with the sensor 203 (e.g., name, uniform number and team, biometric data, sensor position on individual, i.e., right wrist). As will be apparent to one of skill in the art in view of this disclosure, the sensor-individual correlator may be stored to the sensor 203 when the sensor is registered or otherwise associated with an individual. While shown as a separate field for illustration purposes, one of ordinary skill in the art may readily appreciate that the sensor-individual correlator may be part of any additional stored sensor data or omitted from the sensor altogether.

Sensors such as sensor 203 that are structured according to embodiments of the invention may sense or determine one or more environmental conditions (e.g. temperature, pressure, pulse, heartbeat, rotation, velocity, acceleration, radiation, position, chemical concentration, voltage) and store or transmit "environmental measurements" that are indicative of such conditions. To clarify, the term "environmental measurements" includes measurements concerning the environment proximate the sensor including, without limitation, ambient information (e.g., temperature, position, humidity, etc.) and information concerning an individual's health, fitness, operation, and/or performance. Environmental measurements may be stored or transmitted in either analog or digital form and may be transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator could be determined at least in part from the environmental measurements.

In the depicted embodiment, RF location tag 202 transmits a tag signal to receiver 106 and sensor 203 transmits a sensor signal to sensor receiver 166. The sensor signal may comprise one or more sensor information packets. Such sensor information packets may include any data or information from the sensor 203 that is intended for transmission such as, for example in the depicted embodiment, sensor UID, additional stored sensor data, sensor-individual correlator, and environmental measurements. A receiver signal from receiver 106 and a sensor receiver signal from sensor receiver 166 may be transmitted via wired or wireless communication to receiver hub/locate engine 108 as shown.

Figure 3C:
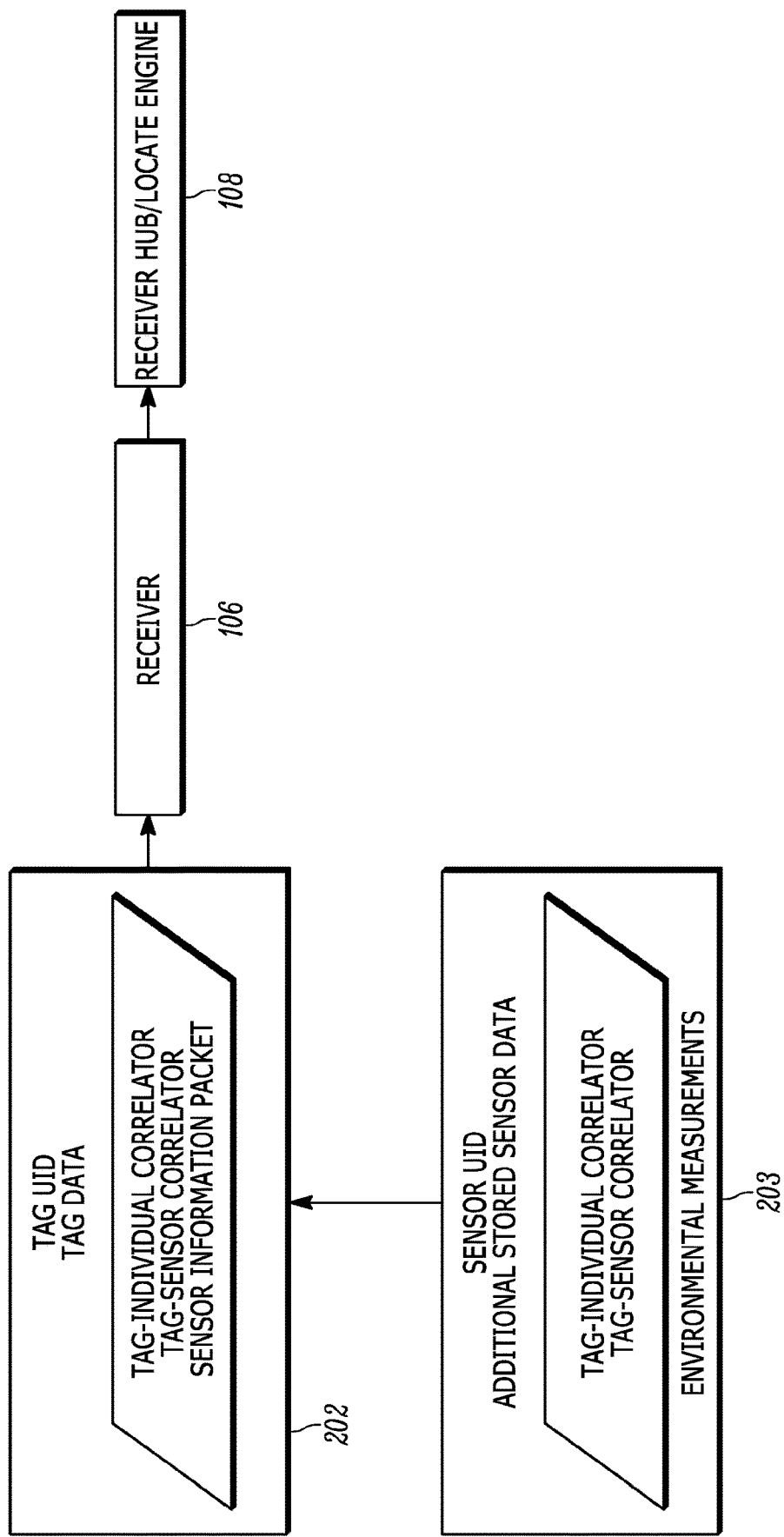

FIG. 3C depicts a sensor 203 communicating through a RF location tag 202 in accordance with various embodiments. In one embodiment, the sensor 203 may be part of (i.e., reside in the same housing or assembly structure) of the RF location tag 202. In another embodiment, the sensor 203 may be distinct from (i.e., not resident in the same housing or assembly structure) the RF location tag 202 but configured to communicate wirelessly or via wired communication with the RF location tag 202.

In one embodiment, the RF location tag 202, the sensor 203, or both, may generate and/or store a tag-sensor correlator that indicates an association between a RF location tag 202 and a sensor 203 (e.g., tag UID/sensor UID, distance from tag to sensor in a particular stance, set of sensors associated with a set of tags, sensor types associated with a tag, etc.). In the depicted embodiment, both the RF location tag 202 and the sensor 203 store the tag-sensor correlator.

In the depicted embodiment, sensor 203 transmits a sensor signal to RF location tag 202. The sensor signal may comprise one or more sensor information packets as discussed above. The sensor information packets may comprise the sensor UID, a sensor-individual correlator, additional stored sensor data, the tag-sensor correlator, and/or the environmental measurements. The RF location tag 202 may store some portion of, or all of, the sensor information packets locally and may package the sensor information packets into one or more tag data packets for transmission to receiver 106 as part of a tag signal or simply pass them along as part of its tag signal.

Figure 3D:
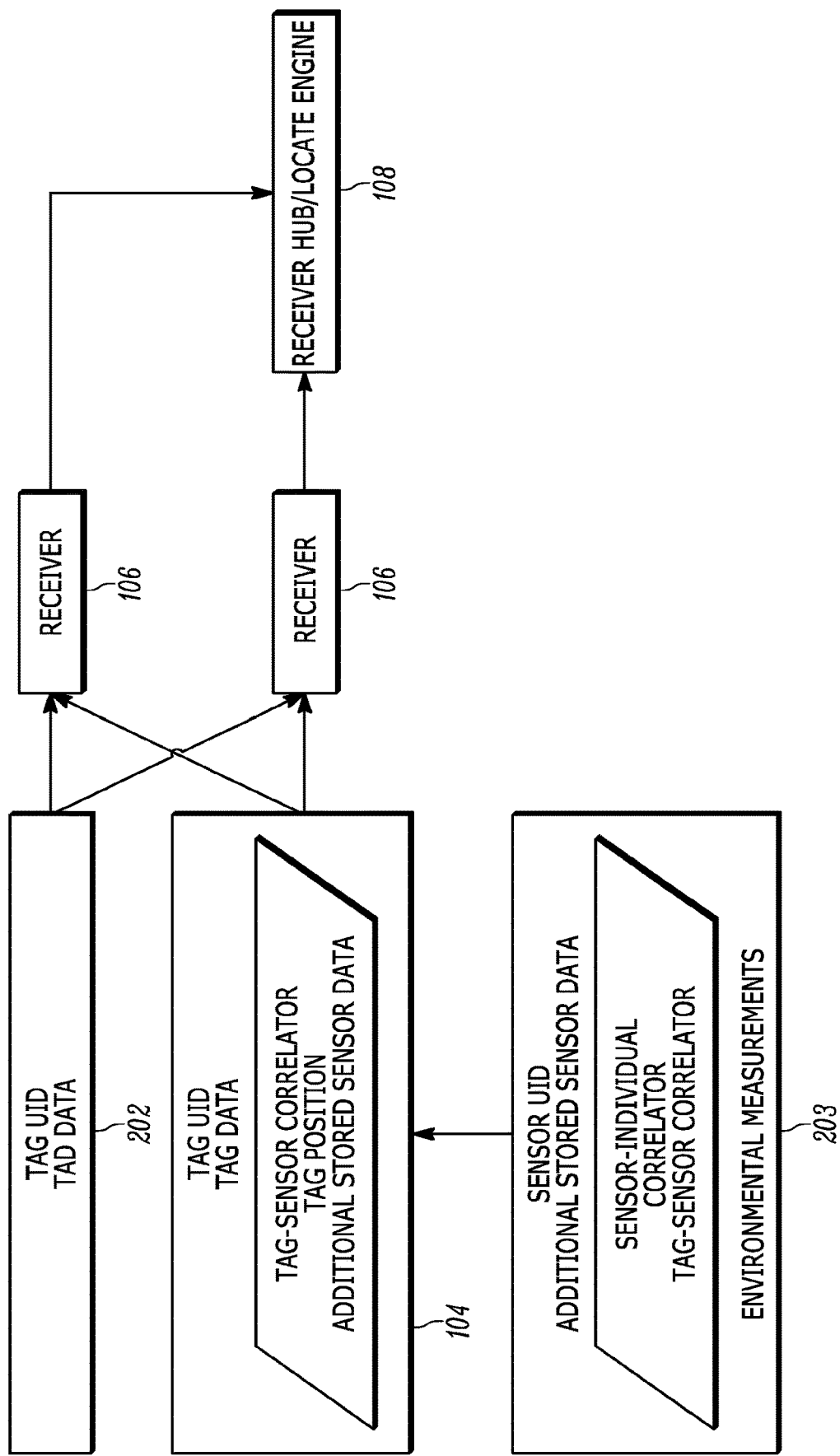

FIG. 3D illustrates an example communication structure for a reference tag 104 (e.g., reference tag 104 of FIG. 1), an RF location tag 202, a sensor 203, and two receivers 106 in accordance with one embodiment. The depicted reference tag 104 is a RF location tag and thus may include tag data, a tag UID, and is capable of transmitting tag data packets. In some embodiments, the reference tag 104 may form part of a sensor and may thus be capable of transmitting sensor information packets.

The depicted sensor 203 transmits a sensor signal to RF reference tag 104. The RF reference tag 104 may store some portion or some or all of the sensor information packets locally and may package the sensor information packets into one or more tag data packets for transmission to receiver 106 as part of a tag signal, or simply pass them along as part of its tag signal.

As was described above in connection with FIG. 1, the receivers 106 of FIG. 3D are configured to receive tag signals from the RF location tag 202 and the reference tag 104. Each of these tag signals may include blink data, which may comprise tag UIDs, tag data packets, and/or sensor information packets. The receivers 106 each transmit receiver signals via wired or wireless communication to the receiver hub/locate engine 108 as shown.

Figure 3E:
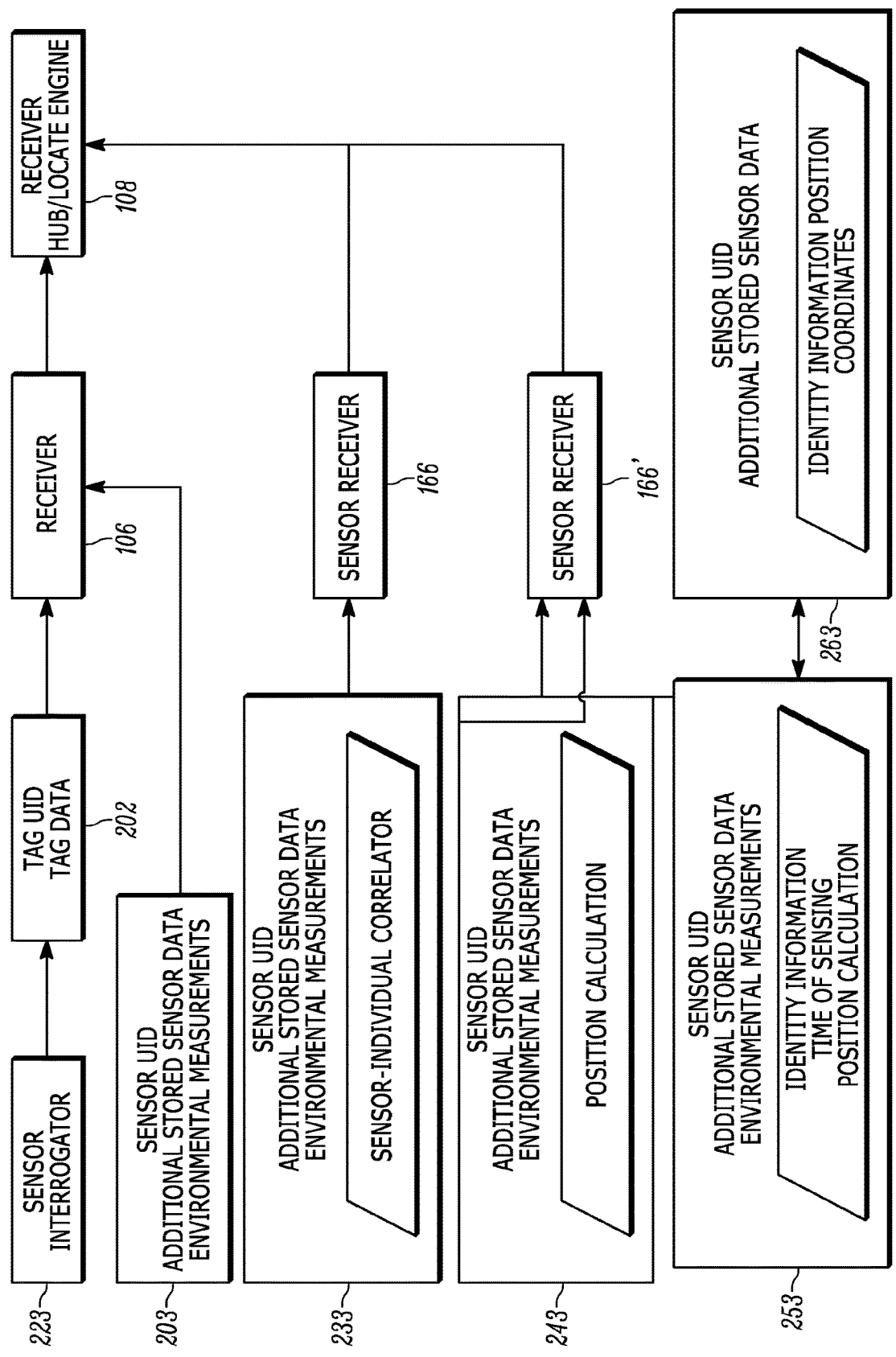

FIG. 3E illustrates an example communication structure between an RF location tag 202, a plurality of receivers 106, and a variety of sensor types including, without limitation, a sensor 203, a diagnostic device 233, a triangulation positioner 243, a proximity positioner 253, and a proximity label 263 in accordance with various embodiments. In the depicted embodiment, none of the sensors 203, 233, 243, 253 form part of an RF location tag 202 or reference tag 104. However, each may comprise a sensor UID and additional stored sensor data. Each of the depicted sensors 203, 233, 243, 253 transmits sensor signals comprising sensor information packets.

In the depicted embodiment, receiver 106 is configured to receive a tag signal from RF location tag 202 and a sensor signal directly from sensor 203. In such embodiments, sensor 203 may be configured to communicate in a communication protocol that is common to RF location tag 202 as will be apparent to one of ordinary skill in the art in view of this disclosure.

FIG. 3E depicts one type of sensor referred to herein as a "proximity interrogator". The proximity interrogator 223 can include circuitry operative to generate a magnetic, electromagnetic, or other field that is detectable by a RF location tag 202. While not shown in FIG. 3E, a proximity interrogator 223 may include a sensor UID and other tag and sensor derived data or information as discussed above.

In some embodiments, the proximity interrogator 223 is operative as a proximity communication device that can trigger a RF location tag 202 (e.g., when the RF location tag 202 detects the field produced by the proximity interrogator 223) to transmit blink data under an alternate blink pattern or blink rate. The RF location tag can initiate a preprogrammed (and typically faster) blink rate to allow more location points for tracking an individual. In some embodiments, the RF location tag may not transmit a tag signal until triggered by the proximity interrogator 223. In some embodiments the RF location tag 202 may be triggered when the RF location tag 202 moves near (e.g., within communication proximity to) a proximity interrogator 223. In some embodiments, the RF location tag may be triggered when the proximity interrogator 223 moves near to the RF location tag 202.

In other embodiments, the RF location tag 202 may be triggered when a button is pressed or a switch is activated on the proximity interrogator 223 or on the RF location tag itself. For example, a proximity interrogator 223 could be placed at the start line of a racetrack. Every time a car passes the start line, a car-mounted RF location tag 202 senses the signal from the proximity interrogator and is triggered to transmit a tag signal indicating that a lap has been completed. As another example, a proximity interrogator 223 could be placed at a Gatorade cooler. Each time a player or other participant fills a cup from the cooler a participant-mounted RF location tag 202 senses the signal from the proximity interrogator and is triggered to transmit a tag signal indicating that Gatorade has been consumed. As another example, a proximity interrogator 223 could be placed on a medical cart. When paramedics use the medical cart to pick up a participant (e.g., a player) and move him/her to the locker room, a participant-mounted RF location tag 202 senses the signal from the proximity interrogator and is triggered to transmit a tag signal indicating that they have been removed from the game. As explained, any of these post-triggered tag signals may differ from pre-triggered tag signals in terms of any aspect of the analog and/or digital attributes of the transmitted tag signal.

FIG. 3E depicts another type of sensor that is generally not worn by an individual but is referred to herein as a "diagnostic device". However, like other sensors, diagnostic devices may measure one or more environmental conditions and store corresponding environmental measurements in analog or digital form.

While the depicted diagnostic device 233 is not worn by an individual, it may generate and store a sensor-individual correlator for association with environmental measurements taken in connection with a specific individual. For example, in one embodiment, the diagnostic device 233 may be a blood pressure meter that is configured to store as environmental measurements blood pressure data for various individuals. Each set of environmental measurements (e.g., blood pressure data) may be stored and associated with a sensor-individual correlator.

The depicted diagnostic device 233 is configured to transmit a sensor signal comprising sensor information packets to a sensor receiver 166. The sensor information packets may comprise one or more of the sensor UID, the additional stored data, the environmental measurements, and/or the sensor-individual correlator as discussed above. The sensor receiver 166 may associate some or all of the data from the sensor information packets with other stored data in the sensor receiver 166 or with data stored or received from other sensors, diagnostic devices, RF location tags 102, or reference tags. The sensor receiver 166 transmits a sensor receiver signal to a receiver hub/locate engine 108.

Another type of sensor shown in FIG. 3E is a triangulation positioner 243. A "triangulation positioner" is a type of sensor that senses position. The depicted triangulation positioner 243 includes a sensor UID, additional stored sensor data, and environmental measurements as discussed above.

In some embodiments, a triangulation positioner (also known as a global positioning system (GPS) receiver) receives clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements.

In another embodiment, a triangulation positioner comprises one or more cameras or image-analyzers that receive emitted or reflected light or heat, and then analyzes the received images to determine the location of an individual or sensor. Although a triangulation positioner may transmit data wirelessly, it is not a RF location tag because it does not transmit blink data or a tag signal that can be used by a receiver hub/locate engine 108 to calculate location. In contrast, a triangulation positioner senses position and computes a position calculation that may then be used as environmental measurements by the receiver hub/locate engine 108.

In one embodiment, a triangulation positioner could be combined with a RF location tag or reference tag (not shown). In such embodiments, the triangulation positioner could compute and transmit its position calculation via the RF location tag to one or more receivers. However, the receiver hub/locate engine would calculate tag location based on the blink data received as part of the tag signal and not based solely on the position calculation. The position calculation would be considered as environmental measurements and may be included in associated sensor information packets.

As will be apparent to one of ordinary skill in the art, position calculations (e.g., GPS receiver position calculations) are not as accurate as the location calculations (e.g., UWB waveform based location calculations) performed by receiver hub/locate engines structured in accordance with various embodiments of the invention. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E is a proximity detector 253. A "proximity detector" is a type of sensor that senses identity within an area (e.g., a local area) that is small with respect to the monitored area 100 of FIG. 1. Many different ways of sensing identity (e.g., a unique ID or other identifier for a sensed object or individual) would be apparent to one of ordinary skill in the art in view of this disclosure including, without limitation, reading a linear bar code, reading a two-dimensional bar code, reading a near field communication (NFC) tag, reading a RFID tag such as a UHF tag, HF tag, or low frequency tag, an optical character recognition device, a biometric scanner, or a facial recognition system.

In some embodiments, a proximity detector senses an attribute of an individual (or an individual's wristband, tag, label, card, badge, clothing, uniform, costume, phone, ticket, etc.). The identity sensed by a proximity detector may be stored locally at the proximity detector 253 as shown and transmitted as environmental measurements via one or more sensor information packets to a sensor receiver 166.

In some embodiments, a proximity detector 253 may have a defined position, which is often stationary, and may be associated with a location in the monitored area 100 of FIG. 1. For example, a proximity detector 253 could be located at a finish line of a race track, an entrance gate of a stadium, with a diagnostic device, at a goal line or goal post of a football field, at a base or home plate of a baseball diamond, or a similar fixed location. In such embodiments in which the proximity detector is stationary, the position coordinates of the proximity detector and a sensor UID could be stored to a monitored area database (not shown) that is accessible by one or more of the receivers 106, 166, the receiver hub/locate engine 108, and/or other components of the receiver processing and analytics system 110. In embodiments in which the proximity detector is movable, a position calculation could be determined with a triangulation positioner, or the proximity detector could be combined with a RF location tag and located by the receiver hub/locate engine 108. While shown as separate fields for illustration purposes in FIG. 3E, identify information and position calculation could comprise part of the additional stored sensor data, the environmental measurements, or both.

In one embodiment, the proximity detector could be associated with a reference tag (e.g., tag 104 of FIG. 1) whose position is recorded in the monitored area database. In other embodiments, the proximity detector is movable, such that it may be transported to in which it is needed. For example, a proximity detector 253 could be located on a medical cart, first down marker, a diagnostic device, goal post, or carried by a paramedic or security guard. In an embodiment in which the proximity detector 253 is movable it would typically be associated with a RF location tag or triangulation positioner so that location (for a RF location tag) or position (for a triangulation positioner) can be determined at the time identity is sensed.

In the embodiment in which the proximity detector includes a RF location tag, the receiver hub/locate engine 108 would locate the associated RF location tag, and the tag data/sensor data filter 112 would associate the tag location data for the associated RF location tag as the position of the proximity detector, while determining the identity of an associated individual from any received sensor information packets. In the alternate embodiment in which the proximity detector includes a triangulation positioner, the triangulation positioner would compute a position calculation that could be stored as additional stored sensor data and/or environmental measurements, and transmitted as one or more sensor information packets. In one embodiment, sensor information packets for a proximity detector may include both sensed identity information and a position calculation.

Another type of sensor shown in FIG. 3E is a proximity label 263. A proximity label has a fixed position and an identification code (e.g., a sensor UID). The proximity label 263 may further comprise additional stored sensor data as shown. The depicted proximity label 263 is configured to be read by proximity detector 253. In some embodiments, proximity detector 253 may be further configured to write information to proximity label 263.

A proximity label 263 may be a sticker, card, tag, passive RFID tag, active RFID tag, NFC tag, ticket, metal plate, electronic display, electronic paper, inked surface, sundial, or otherwise visible or machine readable identification device as is known in the art. The coordinates of the position of the proximity label 263 are stored such that they are accessible to the receive receiver hub/locate engine 108. For example, in one embodiment, the position coordinates of a proximity label 263 could be stored in a field database or monitored area database accessible via a network, or stored locally as additional stored data in the proximity detector 253.

In some embodiments, a position of the proximity label 263 is encoded into the proximity label 263 itself. For example, coordinates of a position of the proximity label 263 could be encoded into a passive RFID tag that is placed in that position. As another example, the coordinates of a position of the proximity label 263 could be encoded into a printed barcode that is placed in that position. As another example, a proximity label 263 comprising a NFC tag could be encoded with the location "end zone", and the NFC tag could be placed at or near an end zone at Bank of America stadium. In some embodiments, the stored coordinates of the proximity label 263 may be offset from the actual coordinates of the proximity label 263 by a known or determinable amount.

In one embodiment, a proximity label 263 such as an NFC tag may be encoded with a position. When a sensor such as a proximity detector approaches the NFC tag it may read the position, then transmit the position in a sensor information packet to the sensor receiver 166' and eventually to the receiver hub/locate engine 108. In another embodiment, a proximity label 263 such as a barcode label may be encoded with an identification code. When a smartphone with a proximity detector (such as a barcode imager) and a triangulation positioner (such as a GPS chip, GPS application, or similar device) approaches the barcode label it may read the identification code from the barcode, determine a position calculation from received clock data, then transmit the identity and the position calculation to sensor receiver 166' and eventually to the receiver hub/locate engine 106 as part of one or more sensor information packets.

In the depicted embodiment, triangulation positioner 243 and proximity detector 253 are each configured to transmit sensor signals carrying sensor information packets to sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, I2C, etc.) may be used. Similarly, sensor receiver 166', and any receiver discussed herein, may use similar wired and wireless protocols to transmit receiver signals to the receiver hub/locate engine.

In one embodiment, upon receiving sensor signals from the triangulation positioner 243 and the proximity detector 253, the sensor receiver 166' may associate some or all of the data from the received sensor information packets with other data stored to the sensor receiver 166', or with data stored or received from other sensors (e.g., sensor 203), diagnostic devices 233, RF location tags 102, or RF reference tags 104. Such associated data is referred to herein as "associated sensor data". In the depicted embodiment, the sensor receiver 166' is configured to transmit some or all of the received sensor information packets and any associated sensor data to the receiver hub/locate engine 108 at part of a sensor receiver signal.

In one embodiment, a smartphone comprising a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub/locate engine 108. In another embodiment, the smartphone could transmit a first sensor information packet including the identification code and the smartphone's unique identifier to another sensor receiver, the smartphone could transmit a second sensor information packet including the position calculation and the smartphone's unique identifier to the sensor receiver, and the sensor receiver could associate the position calculation with the identification code based on the common smartphone unique identifier and transmit such associated sensor data to the receiver hub/locate engine 108. In another embodiment, the sensor receiver could determine a first time measurement associated with the first sensor information packet and a second time measurement associated with the second sensor information packet that, in conjunction with the sensor UID, could be used, by the receiver hub/locate engine 108, to associate the first sensor information packet with the second sensor information packet.

In one embodiment, the receiver hub/locate engine 108 receives receiver signals from the receiver 106 and sensor receiver signals from the sensor receivers 166, 166'. In the depicted embodiment, receiver 106 may receive blink data from the RF location tag 102 and transmits to the receiver hub/locate engine 108 some or all of the blink data, perhaps with additional time measurements or signal measurements. In some embodiments, time measurements or signal measurements may be based on a tag signal received from a RF reference tag (e.g., reference tag 104 of FIG. 1). The receiver hub/locate engine 108 collects the blink data, time measurements (e.g. time of arrival, time difference of arrival, phase), and/or signal measurements (e. g. signal strength, signal direction, signal polarization, signal phase) from the receivers 106 and computes tag location data for the tags 102 as discussed above in connection with FIG. 1. In some embodiments, the receivers 106 may be configured with appropriate RF filters, such as to filter out potentially interfering signals or reflections proximate the field of play or other area to be monitored.

The receiver hub/locate engine 108 may also access stored data or clock data from local storage and from a network location. The receiver hub/locate engine 108 uses this information to determine tag location data for each RF location tag. It may also associate data derived or extracted from tag signals transmitted from one or more RF location tags with information or data derived or extracted from sensor signals transmitted from one or more sensors.

In addition to the TOA or TDOA systems previously described, other real-time location systems (RTLS) such as received signal strength indication based systems could potentially be implemented by a receiver hub/locate engine 108. Any RTLS system using RF location tags, including those described herein could require considerable processing by the receiver hub/locate engine 108 to determine the tag location data from the blink data received from the tags. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

Returning to FIG. 3C, the depicted RF location tag 202 is used to convey (sometimes called backhaul) sensor information packets to a receiver 106. In some embodiments, while not shown, multiple sensors 203 may transmit sensor signals carrying sensor information packets to RF location tag 202. Such received sensor information packets may be associated with blink data that is transmitted to receiver 106.

In one embodiment, the receiver hub/locate engine 108 may parse sensor information packets from received tag data packets and associate such sensor information packets with the RF location tag 202 that transmitted the sensor information packet. Thus, the receiver hub/locate engine 108 may be able to determine tag location data, which may comprise a location and other data (e.g., tag data, tag UID, tag-individual correlator, sensor-individual correlator, additional stored sensor data, environmental measurements, tag-sensor correlator, identity information, position calculation, etc.) from one or more tags or sensors. Such data and information may be transmitted to the receiver processing and analytics system 110.

In some embodiments, once the receiver hub/locate engine 108 determines a location estimate of a RF location tag 102 at the time epoch of the tag signal, the receiver hub/locate engine 108 can also associate a location estimate with the tag data packet included in the blink data of such tag signal. In some embodiments, the location estimate of the tag signal may be used as tag location data for the tag data packet. In some embodiments a Geographical Information System (GIS) may be used by the receive receiver hub/locate engine 108 to refine a location estimate, or to map a location estimate in one coordinate system to a location estimate in a different coordinate system, to provide a location estimate for the tag data packet.

In one embodiment, the location estimated for the tag data packet may be associated with any data in the tag data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub/locate engine 108 could parse the position calculation and use it to refine a location estimate for the tag data packet.

Preferably, the receiver hub/locate engine 108 may access an individual database to determine tag-individual correlators or sensor-individual correlators. Individual data (e.g., an individual profile) may be stored in a server, in tag memory, in sensor memory, or in other storage accessible via a network or communication system, including tag data or additional stored sensor data as explained previously.

In some embodiments, by comparing data accessed using a sensor-individual correlator, the receiver hub/locate engine 108 may associate an individual with a sensor information packet received from a sensor, and/or may associate an individual with such sensor. Because the receiver hub/locate engine 108 may associate a sensor position estimate with a sensor information packet, the receiver hub/locate engine 108 may also estimate an individual position for the associated individual.

In another embodiment, by comparing data accessed using a tag-sensor correlator, the receiver hub/locate engine 108 may associate a sensor with a tag data packet received from a RF location tag 102. Because the receiver hub/locate engine 108 may associate a location estimate with a tag data packet, the receiver hub/locate engine 108 may also create a sensor location estimate for the associated sensor. By comparing a location estimate for a RF location tag with a sensor location estimate or a sensor position estimate, the receiver hub/locate engine 108 may associate a RF location tag with a sensor, or may associate a tag data packet with a sensor information packet. The receiver hub/locate engine 108 could also determine a new or refined tag-sensor correlator based on this association.

In still another embodiment, by comparing a location estimate for a RF location tag with an individual location estimate or an individual position estimate, the receiver hub/locate engine 108 may associate a RF location tag with an individual, or may associate a tag data packet with an individual. The receiver hub/locate engine 108 could also determine a new or refined tag-individual correlator based on this association.

In one embodiment, by comparing a location estimate for a sensor with an individual location estimate or an individual position estimate, the receiver hub/locate engine 108 may associate a sensor with an individual, or may associate a sensor information packet with an individual. The receiver hub/locate engine 108 could also determine a new or refined sensor-individual correlator based on this association.

Data derived or extracted from tag signals transmitted from one or more RF location tags is referred to herein as "tag derived data" and shall include, without limitation, tag data, tag UID, tag-individual correlator, tag-sensor correlator, tag data packets, blink data, time measurements (e.g. time of arrival, time difference of arrival, phase), signal measurements (e.g., signal strength, signal direction, signal polarization, signal phase) and tag location data (e.g., including tag location estimates). Tag derived data is not derived by the RF location tag, but rather, is derived from information transmitted by the RF location tag. Information or data derived or extracted from sensor signals transmitted from one or more sensors is referred to herein as "sensor derived data" and shall include, without limitation, sensor UID, additional stored sensor data, sensor-individual correlator, environmental measurements, sensor information packets, position calculations (including sensor position estimates), position information, identity information, tag-sensor correlator, and associated sensor data. Data derived or extracted from stored individual data is referred to herein as "individual profile information", "participant profile information", or simply "profile information" and shall include, without limitation tag-individual correlator, sensor-individual correlator, identity information, name, uniform number and team, biometric data, tag position on individual. In various embodiments, the receiver hub/locate engine 108 may transmit tag derived data, sensor derived data, individual profile information, various combinations thereof, and/or any information from the GIS, the field database, the monitored area database, and the individual database to the receiver processing and analytics system 110.

Example Receiver Hub and Receiver Processing and Distribution System

Figure 4:
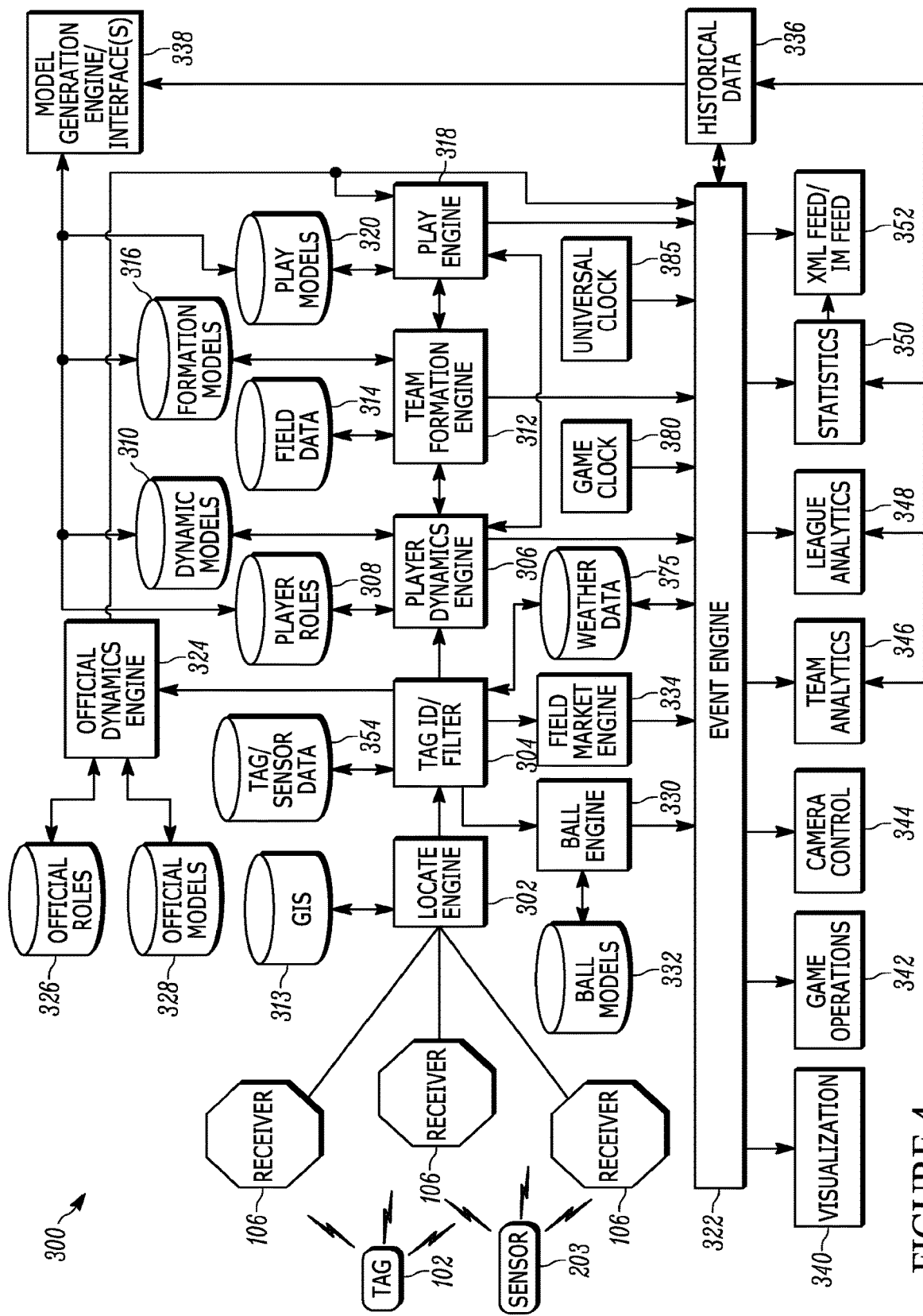
FIG. 4 illustrates an exemplary system for providing performance analytics in accordance with some embodiments of the present invention.

FIG. 4 illustrates an exemplary system 300 for providing performance analytics in accordance with some embodiments of the present invention. The depicted performance analytics system 300 may be distributed in a receiver hub 108 and a receiver processing and distribution system 110 of the type depicted in FIG. 1. For example, locate engine 302 may be part of the receiver hub 108 with the tag ID/Filter 304 through event engine 322 forming part of the receiver processing and distribution system 110. In alternative embodiments, the performance analytics system 300 may be housed or located in a single housing or unit. In still other embodiments, the performance analytics system 300 may be distributed among multiple additional housings or units depending upon the application and other design parameters that will be apparent to one of ordinary skill in the art in view of this disclosure.

The performance analytics system 300 of FIG. 4 may include a plurality of tags 102, and optional sensors 203, associated with participants (e.g., players, officials, balls, field markers, etc.), a plurality of receivers 106 positioned within a monitored environment, a receiver hub/locate engine 302, one or more filters 304, a plurality of databases, a plurality of processing engines, and a plurality of output systems. While only one type of receiver 106, other types of receivers, e.g., sensor receivers 166, 166' of FIG. 3E, may be used in accordance with the embodiments illustrated by FIG. 4. The one or more databases may include databases for tag identifiers 354, player roles 308, player dynamics or kinetics models 310, GIS data or a GIS database 313, field data or a field knowledge database 314, formation models 316, play models 320, official roles 326, official models 328, ball models 332, weather data 375, and the like. The plurality of processing engines may include a player dynamics engine 306, a team formation engine 312, a play engine 318, an event engine 322, an official dynamics engine 324, a field marker engine 334, a ball engine 330, and a model generation engine 338, or the like. The system 300 may further include a game clock 380 and a universal clock 385.

In an exemplary performance analytics system 300, such as illustrated in FIG. 4, the plurality of tags 102 (and sensors 203) may be attached to a participant as discussed in connection with FIGS. 2A-C. In some embodiments, the plurality of tags 102 and/or sensors 203 may be activated and deactivated as needed, such as before and after a game or when damaged or to replace batteries, power suppliers, local memory, etc. Each of the tags 102 may transmit a tag signal, which may include tag derived data, which is received by one or more of the receivers 106. In some embodiments, the receivers 106 may be configured with appropriate RF filters, such as to filter out potentially interfering signals or reflections proximate the field of play or other environment to be monitored.

Each of the receivers 106 may receive tag derived data from the tags 102 and transmit the tag derived data to the receiver hub/locate engine 302. The receiver hub/locate engine 302 collects the tag derived data from the receivers 106 and computes tag location data (based on the blink data) for the tags 102 as discussed above in connection with FIG. 1.

In the depicted embodiment, each of the receivers 106 receives sensor derived data from sensor signals transmitted by sensors 203. In other embodiments, sensor receivers (e.g., sensor receivers 166, 166' of FIG. 3E) may transmit sensor signals comprising sensor derived data to the receiver hub/locate engine 302.

The tag location data, tag derived data, and sensor derived data may be provided from the receiver hub/locate engine 302 to a tag ID/filter 304 that determines the type of participant associated with each received unique tag ID (and/or sensor ID) and routes the associated tag derived data (and optionally, other received tag/sensor derived data) to one or more engines associated with such participant type (e.g., player, ball, official, field marker, etc.). In one embodiment, the tag ID/filter 304 performs this routing, at least in part, by correlating the received unique tag ID (and/or sensor ID) to profile data or prior correlations (i.e., tag ID No. 0047 is correlated to participant John Smith—quarterback, sensor ID No. 12459 is correlated to Marcus Henderson—official, etc.) that may be stored to a tag/sensor identification database 354 (i.e., tag-individual correlators, sensor-individual correlators, tag-sensor correlators, etc.). In some embodiments, the receivers 106 may also receive sensor derived data for other sensors 203, such as through the tags 102 or through separate transmission means.

In one embodiment, perhaps in connection with the player illustration of FIG. 2A, the tag ID/filter 304 identifies tag location data associated with a player and thus routes such data to a player dynamics engine 306 for further processing. The player dynamics engine 306 is disposed in communication with a player role database 308, which comprises player role data correlating tag and sensor UIDs to player profiles (e.g., individual profile information) including, without limitation, which roles (e.g., quarterback, running back, flanker, slot receiver, tight end, left tackle, left guard, center, right guard, right tackle, defensive end, defensive tackle, nose tackle, inside linebacker, outside linebacker, free safety, strong safety, cornerback kicker, punter, etc.) the players perform during a game.

The player dynamics engine 306 may also be disposed in communication with a dynamics/kinetics model database 310. The player dynamics engine 306 may compare the tag location data, other tag and sensor derived data, and player role data to player dynamics/kinetics models to determine aspects of the player dynamics or movement kinetics. The dynamics/kinetics model database 310 may comprise models of different aspects or dimensions that may be based on past player location data or other data generated by the model generation engine 338 as discussed below. The models may include, without limitation, models for a particular player profile (e.g., John Smith), a player type (e.g., quarterback), a player type for a particular team (e.g., a quarterback from the Chicago Wizards), a player type for a particular formation (e.g., a quarterback in a spread offense), and the like. Such models may consider all three dimensions (x, y, z) of the tag location data for each tag (e.g., 102 of FIG. 2A) and may further consider different tag position arrays (e.g., two tag implementations—one proximate each shoulder as in FIG. 2A, eleven tag implementations—one proximate each shoulder, one proximate each elbow, one proximate each hand, one proximate each knee, one proximate each foot, and one proximate the head).

In one embodiment, the player dynamics engine 306 determines a multi-dimensional player location per unit time (e.g., participant location data) for each player based on the tag location data, other tag and sensor derived data, the player role data, and the player dynamics/kinetics models. Such multi-dimensional player location may include relative location of the player relative to the field of play, and/or general orientation of the player (e.g., standing, squatting, laying the ground, sitting, etc.) such as by correlating location data and other tag and sensor derived data.

The player dynamics engine 306 uses the real time tag location data stream from the locate engine 302, as well as the player role database 308 to provide accurate information about what a particular player is doing in real time (or near real time). The player dynamics engine 306 may further use other tag and sensor derived data, received from the locate engine 302 in the depicted embodiment, to aid in determining not only where the player is, but also how that player's location is changing with time, velocity, acceleration, deceleration, orientation, or the like. The player dynamics engine 306 outputs multi-dimensional player location information per unit time (e.g., participant location data).

In one embodiment, sensor derived data may comprise accelerometer data that may indicate that a player (or portion of a player) is accelerating or decelerating. In addition to the variety of other uses that will be apparent to one of ordinary skill in the art in view of this disclosure, the accelerometer data may be used to improve location accuracy for the system. For example, in circumstances where the real time tag location data stream erroneously suggests (perhaps due to interference, multipath effects, signal reflections, signal losses due to line-of-sight blockages, etc.) that one of the possible locations for the player is 10 feet away from a prior location, the accelerometer data could be used to confirm that the player (or accelerometer affixed portion of the player) did not experience an acceleration sufficient to move that distance in the amount of time provided.

In some embodiments, sensor derived data may comprise time-of-flight sensor data, which may indicate distances between participants (e.g., distance of a player to other players, officials, the ball, etc.) or other objects. In applications involving complex tagged object movements such as, the example football application discussed herein, time-of-flight sensor data may be used to enhance the location accuracy of the system especially in circumstances in which one or more tags or sensors are temporally unable to effectively transmit their data to one or more receivers. For example, in one embodiment, a tag positioned within the ball may appear to the system as not moving because the running back carrying the ball has run into a group of other players and the bodies of such other players are actually blocking the line-of-sight transmissions of the ball tag. In this embodiment, time-of-flight sensors positioned on the group of other players may be repeatedly determining and transmitting to one or more receivers the relative distance between such time-of-flight sensors and the ball or ball carrier. In this regard, the system may determine that the ball is no longer at the ten yard line (i.e., the point where the system last received a transmission directly from the ball tag) but rather has advanced toward the opponent's end zone to the six yard line. This and other similar techniques may be used alone or in combination with other tag and sensor derived data (e.g., accelerometer data, etc.) to create a type of mesh network that may adapt to temporary or sustained line-of-sight blockages and improve the accuracy of location determinations, formation determinations, play determinations, etc.

In some embodiments, the player dynamics engine 306 outputs multi-dimensional player location information per unit time to an event engine 322. In some embodiments, the multi-dimensional player location information may include a ranked or weighted list of probable player locations while, in other embodiments, the multi-dimensional player location information includes only a top, or most probable, player location. This information may be used by the event engine 322 to determine a number of important player events. For example, the multi-dimensional player location information may be used to indicate that a player was tackled (i.e., experienced a rapid deceleration and transited from a standing to a laying position) and is subsequently limping (e.g., tag and/or sensor data from tags/sensors proximate the players feet indicate a change in the gait of the player). In such example, the event engine 322 may be configured to transmit an alert (e.g., via text message, email, or the like) to an athletic trainer to have the player checked-out or treated.

The player dynamics engine 306 may further output the multi-dimensional player location information per unit time (e.g., participant location data) to a team formation engine 312. The team formation engine 312 is disposed in communication with a formation models database 316 that contains models of various formations (e.g., offensive formations, defensive formations, special teams formations, etc.) defined for the relevant sport or activity (e.g., football in the depicted embodiment). The models of various formations may be derived from multi-dimensional player location information collected during prior games, practices, etc., (e.g., learned by the system) or as input by one or more teams, such as by using model generation engine 338, historical data store 336, and/or team analytics engine 346.

The team formation engine 312 is further disposed in communication with a field data database 314 to assist in determining the likely team formations. The field data database 314 may comprise, without limitation, survey data for the field (e.g., various distances or coordinates from reference tag(s) or other marker to yard lines, end zones, goal posts, boundaries, benches, locker rooms, spectator areas, other zones of interest, etc.).

In one embodiment, the team formation engine 312 determines one or more formations (e.g., a probable formation or a ranked or weighted list of probable formations) based at least in part on the field data, the multi-dimensional player location information (which may include the tag derived data and/or sensor derived data), and the formation models. The team formation engine 312 may hypothesize the received multi-dimensional player location data against models of every known formation to determine a probable formation or a ranked or weighted list of probable formations. The team formation engine 312 is thus configured to determine and output a data stream of formations versus time, which considers how various formations change and may be used by downstream engines to determine various events including the occurrence of a play.

In one embodiment, the team formation engine 312 may assign weights to the received multi-dimensional player location data (i.e., participant location data), other types of tag derived data and/or sensor derived data, and/or to the formation models when determining a specific formation or ranked list of probable formations. For example, in one embodiment, the team formation engine 312 may be configured to assign a greater weight to the position of the ball (which should remain stationary for a period of time as formations are being established, i.e., at the beginning of a play) than to the position of an official (which may move to some degree as formations are forming). In another embodiment, the team formation engine 312 may be configured to assign a greater weight to the location of the tight-end (which may indicate the strong side of a formation) than to the location of a left guard (whose location seldom effects formation determination). In still another embodiment, the team formation engine 312 may be configured to assign a greater weight to sensor derived data associated with an accelerometer positioned proximate an official's wrist (which may indicate winding of the play clock that often triggers the period during which formations ought to be forming) than to the location of any player.

In one embodiment, the team formation engine 312 outputs the data stream of formations versus time (e.g., formation data) to the play engine 318. The play engine 318 may also receive the output data stream (e.g., multi-dimensional player location information versus time) from the player dynamics engine 306. The play engine 318 is disposed in communication with a play models database 320. The play models database 320 may include play models (e.g., known formation shifts or movements over time). Such play models may be programmatically learned by the system (e.g., based on actual movements of players tracked by the system) or manually entered through an interface or other tool (e.g., perhaps through the model generation engine 338). In this regard, the play models database 320 may include historical plays executed by teams, potential/future plays from a team game plan or playbook, or other historical data (e.g., from historical data store 336).

In one embodiment, the play engine 318 may take the formations versus time data stream from the formation engine 312, the play models, and the player dynamics data stream (which may include tag location data and/or other tag and sensor derived data) to determine whether a play is forming, a play has started, a play is in progress, or a play has ended. For example, the play engine 318 may determine that it is most likely that a pre-snap formation at the line of scrimmage has occurred (e.g., an offensive team has aligned in a "pro set" formation and a defensive team has aligned in a "3-4" formation) indicating a play is about to begin. The play engine 318 may thereafter determine that the offensive and defensive players have begun rapidly accelerating towards and across a line of scrimmage thereby indicating that a play has begun. The play engine may further determine that an offensive player has been tackled by a defensive player thereby indicating that a play has concluded.

In some embodiments, the play engine 318 may use assigned weights (or assign weights) to the received data (e.g., the tag derived data, the sensor derived data, the multi-dimensional player location data, the formations data, officials data, etc.) for use in analyzing the data and determining the most probable play events. For example, the play engine 318 may determine that data for particular participants (e.g., a left guard) has a lower relevance for a particular formation (e.g., a pro set offensive formation) and assign a lower weight to that data during the analysis than to another participant (e.g., the ball, the quarterback, a wide receiver, etc.).

In some embodiments, the play engine 318 is disposed in communication with an official dynamics engine 324 to further improve the play determination accuracy of the system. The official dynamics engine 324 may provide data about the movements, actions, positions of an official, which the play engine 318 may use when determining a probable play and/or the status of a play. For example, as discussed in connection with FIG. 2B above, an official may be provided with wrist based accelerometers or other sensors (e.g., a whistle sensor), which may be used to flag the beginning or ending of a given play based on the movement or action of an official (e.g., rotating an arm to wind the play clock, indicate touchdown with two arms raised, blow a whistle, etc.).

The play engine 318 may analyze how the team formations occur and how they break up to determine both start and stop of a play (e.g., start of play event, end of play event, etc.). For example, the play engine 318 may determine that offensive and defensive formations coalesced proximate a line of scrimmage and then broke up with various receivers heading towards the defensive team's end zone, there was all kinds of activity around a quarterback which eventually dissipated, and that defense players were tracking one of the receivers downfield until the receiver crossed into the end zone and an official raised his arms. The play engine 318 may determine that this participant activity best fits a play model whereby a ball was thrown and caught by a receiver who then scored a touchdown thereby ending the play.

In some embodiments, the play engine 318 may hypothesize the received multi-dimensional player location data (e.g., participant location data) and the data stream of formations versus time against models of every known play to determine a probable play or a ranked list of probable plays. The play engine 318 is thus configured to determine and output a data stream of plays versus time, which may be communicated to the event engine 322.

In some embodiments, the tag ID/filter 304 may determine that received tag derived data and/or sensor derived data corresponds to one or more officials. Such official correlated tag/sensor derived data is routed to the official dynamics engine 324. The official dynamics engine 324 is disposed in communication with an official roles database 326, which comprises official roles data correlating tag and sensor IDs (or other tag/sensor individual correlators) to official profiles including, without limitation, which roles (e.g., referee, umpire, head linesman, line judge, back judge, field judge, side judge, etc.) the officials perform during a game.

The official dynamics engine 324 may also be disposed in communication with a dynamics/kinetics model database 328. The official dynamics engine 324 may compare the tag location data, other tag/sensor derived data, and official role data to official dynamics/kinetics models to determine aspects of the official dynamics or movement kinetics. The dynamics/kinetics model database 328 may comprise models of different aspects or dimensions that may be based on past official location data or other data generated by the model generation engine 338 as discussed below. The models may include, without limitation, models for a particular official profile (e.g., Ralph Stevens), an official type (e.g., referee), an official type for a particular formation (e.g., a referee positioned during a kickoff), and the like. Such models may consider all three dimensions (x, y, z) of the tag location data for each tag (e.g., 102 of FIG. 2B) and may further consider different tag position arrays (e.g., two tag implementations—one proximate each shoulder as in FIG. 2B, eleven tag implementations—one proximate each shoulder, one proximate each elbow, one proximate each hand, one proximate each knee, one proximate each foot, and one proximate the head).

In one embodiment, the official dynamics engine 324 determines a multi-dimensional official location per unit time for each official based on the tag location data, other tag and sensor derived data, the official role data, and the official dynamics/kinetics models. Such multi-dimensional official location may include (1) a relative location of the official relative to the field of play, (2) a general orientation of the official (e.g., standing, squatting, laying the ground, sitting, etc.), and (3) a specific orientation of the official (e.g., arms raised, arms at hips, one hand grasping the wrist of the other arm, etc.).

The official dynamics engine 324 uses the real time tag location data stream from the locate engine 302, as well as the official role database 326 to provide accurate information about what a particular official is doing in real time (or near real time). The official dynamics engine 324 may further use tag and sensor derived data, received from the locate engine 302 in the depicted embodiment, to aid in determining not only where the official is, but also how that official's location is changing with time, velocity, acceleration, deceleration, orientation, or the like. For example, in one embodiment, the sensor derived data may comprise accelerometer data that may indicate that an official (or portion of an official) is accelerating or decelerating. The official dynamics engine 324 outputs multi-dimensional official location information per unit time. Such multi-dimensional official location information may include information regarding the official's location, how the location is changing with time, orientation of the official, motions or gestures of the official, or the like.

In some embodiments, the tag ID/filter 304 may determine that received tag and/or sensor derived data corresponds to the game ball (e.g., a ball such as the ball shown in FIG. 2C, which is used or capable of use in the field of play). Such ball correlated tag/sensor derived data is routed to the ball dynamics engine 330. While the ball engine 330 is not shown in communication with a "roles" database as in the case of some of the other processing engines, one of ordinary skill in the art will readily appreciate some ball role data may be used, such as a ball ID or the like, indicating that the received tag/sensor derived data is associated with a given ball.

The ball engine 330 may access a ball models database 332, which comprises data indicating how location data and other tag and sensor derived data correlates to particular ball events during play. The ball engine 330 may provide information regarding the ball's position/location (vertical and/or horizontal), how the location is changing with time, the velocity of the ball, the rotation of the ball, or the like for determining events during play. The ball engine 330 may output ball data streams to the event engine 322. In some embodiments, although not shown in FIG. 4, the ball engine may also output a data stream to other processing engines for analysis, such as to the play engine 318 for use in determining status of a play.

In some embodiments, the tag ID/filter 304 may determine that received tag and/or sensor derived data corresponds to a field marker (e.g., penalty flags, line of scrimmage markers, yards to gain markers, and the like). The tag ID/filter may then route such field marker correlated tag/sensor derived data to a field marker engine 334 for further processing. The field marker engine 334 may provide information regarding field marker location, how the location is changing with time, or the like, for determining events during play. The field marker engine 334 may output data streams to the event engine 322. In some embodiments, although not shown in FIG. 3, the field marker engine may also output a data stream to other processing engines for analysis, such as to the play engine 318 for use in determining the status of a play.

In some embodiments, a game clock 380 may be provided that is configured to keep an official time for a game or other tracked activity. In applications such as the depicted football application, the game clock is configured to count down from some standard period or quarter length (e.g., 15 minutes) and may be periodically stopped or started by one or more officials and/or the game operations system 342 as discussed in greater detailed below. While not separately illustrated in FIG. 3, the game clock 380 may further include a play clock, shot clock, pitch clock, or the like, which depending upon the application, may also be started and stopped by one or more officials and/or the game operations system 342.

The universal clock 385 provides a system time for the performance and analytics system 300. As will be apparent to one of ordinary skill in the art in view of this disclosure, the universal clock 385 is running clock for tracking, cataloging, and calibrating system actions, processes, and events. For illustrations purposes, the game clock 380 and the universal clock are shown as inputs for the event engine 322; however, in other embodiments, such clocks may provide inputs to any or all of the player dynamics engine 306, the team formation engine 312, the play engine 318, the event engine 322, the official dynamics engine 324, the field marker engine 334, the ball engine 330, and the model generation engine 338.

An event engine 322 may receive the outputs from the player dynamics engine 306, the team formation engine 312, the play engine 318, the official dynamics engine 324, the ball engine 330, the field marker engine 334, the weather data store 375, a game clock 380, and a universal clock 385 to determine events occurring during game play or to perform analytics, including predictive analytics, on game related data. In some embodiments, the event engine 322 determines such events and performs such analytics by comparing its received inputs to a historic data store 336 containing past events or analytics. In some embodiments, the event engine 322 outputs event data streams (e.g., one or more output events) to a number of systems including, without limitation, a visualization system 340, a game operations system 342, a camera control system 344, a team analytics system 346, a league analytics system 348, a statistics system 350, an XML feed and/or instant message feed 352, a historical data store/engine 336, or other systems as may be apparent to one of ordinary skill in the art in view of this disclosure.

In some embodiments, the event engine 322 may output event data streams that include the time delay between tag and/or sensor transmissions and the determination of the events such that other processes, such as a visualization system, game operations system, etc., may properly correlate to different inputs (e.g., video recording versus the determined events) so that the different inputs are synchronized. In other embodiments, the event data streams may include time stamps (game time stamp, universal time stamp, etc.) for determined events or other system processes. In this way, the performance and analytics system 300 or some downstream system can determine, inter alia, which events or processes occurred in-game (i.e., during a running game or play clock) or out-of-game (i.e., while the game or play clock were stopped).

In various embodiments, the event data streams or output events provided by the event engine may include tag events (e.g., battery low indication, error indication, etc.), sensor events (e.g., battery low indication, error indication, etc.), locate engine events (e.g., status indications, error indications), tag ID/Filter events (e.g., status indications, error indications), player dynamics engine events (e.g., status indications, error indications), player events (e.g., player tackled indication, player injured indication, etc.), official dynamics engine events (e.g., status indications, error indications), official events (e.g., official injured indication, etc.), ball engine events (e.g., status indications, error indications), ball events (e.g., new ball required indication, etc.), team formation engine events (e.g., status indications, error indications), team formation events (e.g., formation type indication, new formation indication, illegal formation indication, etc.), play engine events (e.g., status indications, error indications), play events (e.g., play type indications such as run, pass, punt, field goal, etc., play results, and in-play or sub-play events such as bootleg, 3 step drop, 5 step drop, 7 step drop, crossing pattern, hook pattern, fly pattern, drive block, pass block, spin move, swim move, press coverage, zone coverage, etc.), or any other events that may be apparent to one of ordinary skill in the art in view of this disclosure. A variety of additional event data streams or output events are described in connection with the analytics systems and control systems discussed below.

In one embodiment, the event engine 322 outputs an event data stream to the visualization system 340 that may be used by the visualization system to provide enhanced telecasts or game experiences for television broadcasts, streaming mobile device clients, and other media outlets, gaming systems, and other computer graphics visualization systems. Such event data streams may be used to provide enhanced graphics, displays, information, visualizations, and the like. For example, and without limitation, the visualization system 340 may receive real time (or near real time) data including, without limitation, player ID, official ID, team ID, formation identifiers, play identifiers, pre-snap play probabilities, play diagrams, player route data, player speed data, player acceleration data, ball route date, ball speed data, ball acceleration data, player trend information, offensive team trend information, defensive team trend information, special teams trend information, and other tag and/or sensor derived data. In some embodiments, the visualization system 340 may be configured to provide a dynamically configurable interface that may be engaged by a user to select graphics or areas of focus. For example, in one embodiment, a user may configure the system to display possible passing lanes for a quarterback to his eligible receivers. In still other embodiments, the visualization system 340 may output a data stream for use in gaming systems, such as plays, player actions, or the like.

In gaming systems examples, the visualization system 340 may provide output of event data that may be configured for display via a gaming console or handheld device. Such visualization system outputs may, for example, provide for incorporating actual or predicted actions of a "live" player into a gaming environment. In some embodiments, the visualization system may also access stored computer generated or user created avatars for use with the event data stream.

In some example embodiments, the visualization system 340 comprises a set of visualization tools and/or a framework to add additional data visualization tools configured for operation in both a desktop and mobile device. The visualization system 340 may further be configured to implement configurable dashboards that enable one or more dashboard components to be viewed, multiple distinct levels of details (e.g., icon—1/64 of view area, graph—1/16 of view area, panel—1/4 of view area, full function—whole of view area and/or the like), drill down functionality, configurability and, in some examples, a predictable and/or guided software implementation. In some examples, the display and layout that is enabled by the visualization system 340 is supportable by one or more dashboard components, visible or hidden, that enable a user to configure a dashboard to display selected components at differing levels of detail without requiring the user to be concerned with layout adjustments.

In some examples, dashboards or display elements may have links or may respond to click events by enabling or otherwise providing navigation, layout control or resizing functionality. In some examples, full screen views and or drill down views may be provided. In yet further examples, dragging and/or dropping and resizing of the dashboards may be accomplished using a user interface. Alternatively or additionally, the dashboard may take the form of one or more defined sizes as referenced above.

In some examples, visualizations generated by the visualization system 340 may be scalable. For example, the visualization may be scaled in one or more (in some cases 3 or more) directions that include, but are not limited to, quantity of player location data captured and stored, quantity and variety of real time data analysis and/or quantity of users that can visualize and/or track analytics data in real time In one embodiment, the event engine 322 outputs an event data stream to the game operations system 342 that may be used by the game operations system to coordinate, manage, or assist in the coordination or managing of game operations including, without limitation, the game clock 380 (and optionally the play clock), down and distance determination, score board operations, penalty enforcement, and the like. For example, and without limitation, the game operations system 342 may receive real time (or near real time) data from the event engine 322 including, without limitation, a clock start indication, a clock stop indication, a play start indication, a play end indication, a reset play clock indication, a $1^{st}$ down indication, a $2^{nd}$ down indication, a $3^{rd}$ down indication, a $4^{th}$ down indication, a turnover indication, a yard to gain indication, a 5 yard penalty indication, a 10 yard penalty indication, a 15 yard penalty indication, an end of quarter indication, an end of half indication, and an end of game indication.

Said differently, the event engine 322 may determine a number of events that may be output to the game operations system or other devices. Such events may include, without limitation, a ready for play event (e.g., an official has spotted the ball at the line of scrimmage and started a play clock in a football example, a pitcher has received the ball from his catcher in a baseball example, or the pins have been set in a bowling example), a start of play event (e.g., the ball has been snapped in a football example, the pitcher has begun his pitching motion or wind-up in a baseball example, or a bowler has begun his bowling motion in a bowling example), and an end of play event (e.g., the official has blown a whistle in a football example, an umpire has called a third strike in a baseball example, or the nine pins have been knocked down in a bowling example). Such events may be used to determine plays, formations, and to output play diagrams (e.g., graphs or plots of participant location versus time from a start of play event to an end of play event).

The event engine 322 may be further configured to output a play result to the game operations system 342 or other device. Such play results may include, for example and without limitation, a gain of twelve yards, a loss of three yards, an interception, a touchdown, a first down, and the like in football embodiments; a ball, a strike, a fly-out, a single, a double, a home run, a run scored, and the like in baseball embodiments; and a gutter, a strike, a spare, and the like in bowling embodiments.

As would be apparent to one of skill in the art, the various engines and/or output systems may include security measures, such as encryption, access permissions, and the like, to secure system inputs and outputs. In some embodiments, the engines and/or output systems may comprise security measures to prevent hacking, jamming, transmission interception, etc. to prevent interference from outside parties, such as third parties attempting to gain information that may be advantageous in wagering, for example.

In one embodiment, the event engine 322 outputs an event data stream to the camera control system 344 that may be used by the camera control system to engage or transition engagement between one or more television, film, or other cameras to capture game events. For example, and without limitation, the camera control system 344 may receive real time (or near real time) data including, without limitation, an engage or disengage camera 1 indication, an engage or disengage camera 2 indication, an engage or disengage camera 3, . . . and an engage or disengage camera n indication. In some embodiments, the event engine 322 may output camera control indications (e.g., event data) based on real time (or near real time) game activity (e.g., ball location data suggests that the ball is closest to a known field of view for camera 4 and, thus, an engage camera 4 indication is transmitted to the camera control system 344). In other embodiments, the event engine 322 may output camera control indications (e.g., event data) based in part on a prediction of game activity (e.g., ball position, acceleration, and direction data suggests that the ball has just left the quarterback's hand and is being passed along a direction and at a velocity indicative of being caught in the field of view of camera 4 and, thus, an engage camera 3 indication is transmitted to the camera control system 344). In other embodiments, the camera control system 344 may provide indications such as to tilt, pan, or zoom in connection with a particular camera based on event data or predicted actions, or set a location or point of view based on where a player, formation, or play may be best viewed.

In one embodiment, the event engine 322 outputs an event data stream to the team analytics engine 346 that may be used to generate real time (or near real time) analytics (e.g., player performance information, formation performance information, play performance information, and team performance information) concerning game activity that may be useful to individual teams. For example, in one embodiment, the team analytics engine 346 may use event data to determine actual game performance versus playbook design including, without limitation, an evaluation of player routes, offensive, defensive, and special teams formations, offensive blocking protection schemes, defensive blitzing schemes, and the like.

In another embodiment, the team analytics engine 346 may use event data to determine actual game performance versus historical game performance (such as by using historical data store 336) including, without limitation, an evaluation of game performance (e.g., player, team, offense, defense, special teams, etc.) versus prior year performance, prior game performance, prior quarter performance, prior possession performance, prior play performance, and the like. In this regard, as will be apparent to one of ordinary skill in the art, the team analytics engine 346 may be used to evaluate performance (e.g., the left tackle has missed three assignments), identify trends (e.g., the defensive team consistently sends a linebacker blitz against a spread offensive formation), make player substitutions (e.g., a second string left tackle has performed better historically against the right end of the defense and thus should be substituted for the starting left tackle), revise game plans, or provide alerts (e.g., the flanker has experienced significantly reduced speed, acceleration, and performance following being tackled and thus an alert should be generated to the training staff to ensure that such player is medically evaluated).

For example, in one embodiment, a trainer may have a device, such as a handheld device, tablet, etc., that may receive alerts regarding a particular player. The trainer may receive background information and/or past information on a player as well as what change the system has identified to cause the alert, such as a change in gait, slower route running, etc. The trainer may then be able to evaluate the player and provide input to the system regarding the player evaluation, such as in an instance in which further attention is required, or in an instance in which the player can return to play. In some embodiments, such alert and evaluation results may also be provided to the league analysis system, such as for use in determining injury trends or the like.

In some embodiments, the team analytics engine 346 may be used to alert a team (e.g., coaches) to focus on specific players who are performing sub-par versus their normal (historical) performance, such as by plays or by teams. In some embodiments, the team analytics engine 346 may further output analysis results to the historical data store 336 or the like, for use in future analysis and/or the building or updating of various models.

In one embodiment, the performance and analytics system is configured to evaluate player performance by correlating at least one tag to the player; receiving blink data (and other tag derived data) transmitted by the at least one tag; determining tag location data based on the blink data; receiving player role data; comparing the tag location data to player dynamics/kinetics models based at least in part on the player role data; determining player location data based on the comparing the tag location data to the player dynamics/kinetics models; and determining player performance information based on comparing the player location data to stored player location data. In some embodiments, the stored player location data may be stored to the historical data store 336 and may include player location data for the actual player to be evaluated (e.g., Frank Smith, left tackle, #55) and/or player location data for another player (e.g., Fred Johnson, left tackle, #65) who plays a similar position to the actual player to be evaluated. In still other embodiments, the stored player location data may include competitive data based on the performance of the actual player against an opposing player (e.g., the left tackle blocked the right defense end successfully in five prior match-ups, the defensive back caused a delay by the wide receiver of 2 seconds in running a passing route by applying press coverage, etc.).

In another embodiment, the performance and analytics system is configured to evaluate official performance by correlating at least one tag to the official; receiving blink data (and other tag derived data) transmitted by the at least one tag; determining tag location data based on the blink data; receiving official role data; comparing the tag location data to official dynamics/kinetics models based at least in part on the official role data; determining official location data based on the comparing the tag location data to the official dynamics/kinetics models; and determining official performance information based on comparing the official location data to stored official location data. In some embodiments, the stored official location data may be stored to the historical data store 336 and may include official location data for the actual official to be evaluated and/or official location data for another official who held a similar position (e.g., referee, umpire, etc.) to the actual official to be evaluated.

In one embodiment, the event engine 322 outputs an event data stream to the league analytics engine 348 that may be used to generate real time (or near real time) analytics concerning game activity that may be useful to a league (i.e., a collection of teams). For example, in one embodiment, the league analytics engine 348 may use event data to improve game safety by identifying injury trends (e.g., player concussions occur at a higher rate when an offensive team runs crossing passing routes from a spread formation against a 3-4 defense, etc.). In another embodiment, the league analytics engine 348 may use event data to evaluate rule changes (e.g., a rule change intended to speed up game play is or is not achieving its intended result). In still another embodiment, the league analytics engine 348 may use event data to improve officiating (e.g., determining the accuracy of official calls). In some embodiments, the league analytics engine 348 may further output analysis results to the historical data store 336 or the like, for use in future analysis and/or the building or updating of various models.

In one embodiment, the event engine 322 outputs an event data stream to the statistics engine 350 that may be used to generate real time (or near real time) statistics concerning game activity. Such statistic data may include, without limitation, offensive statistics (e.g., passing, rushing, receiving, turnovers, touchdowns scored, etc.), defensive statistics (e.g., tackles, sacks, interceptions, turnovers generated, etc.), special teams statistics (e.g., punt length, punt hang time, average return, long return, field goal accuracy, etc.), play diagrams, length of play statistics (e.g., 4.8 second average play, 22 second average pre-snap formation period, etc.), player participation statistics (e.g., John Smith participation in 42 of 68 offensive plays, etc.), summary statistics (e.g., top scorers, fantasy points, minutes on offense, etc.), official statistics (e.g., penalties called, location tracking diagrams per play, etc.) and the like. In some embodiments, the statistics engine 350 may further output statistics and results to the historical data store 336 or the like, for use in future analysis and/or the building or updating of various models.

In one embodiment, the event engine 322 outputs an event data stream to the XML feed and/or instant messaging feed engine 352 that may be used to generate XML or instant messaging data streams that may include live data such as plays, scoring plays, other scoring info, results, top scorers, summary statistics, or the like.

In one embodiment, the event engine 322 may output an event stream that may be used to annotate or tag a game recording, for example, using visualization system 340, game operations system 342, or the like. For example, in one embodiment, the event engine 322 may flag, tag, or annotate certain events (e.g., plays, penalties, formations, clock start/stop, etc.) into a video recording or live data stream of a game for later playback or analysis. In some embodiments, any event identified by the event engine 322 may be flagged, tagged, or annotated to a video or other data stream to provide for ease of later identification. In this regard, various events may be readily searched, identified, stored to a database in an indexed way, and/or analyzed.

In some embodiments, the event engine 322 may determine events occurring proximate one or more play boundaries. For example, using outputs from the player dynamics engine 306, the ball engine 330, and the official dynamics engine 324 the event engine 322 may determine that a touchdown has been scored (i.e., a player has carried the ball across a goal boundary into the end zone). In particular, the event engine 322 may determine that a running back carried the ball (based on location data received from the ball engine and the player dynamics engine) across the goal boundary (based on field data), which was confirmed by the nearest official signaling touchdown by raising both arms (based on location data received from the official dynamics engine).

In some embodiments, the event engine 322 may output an event data stream to a historical data store/engine 336, which may store data generated by the various processing engines over time. The historical data store/engine 336 may be accessed by various systems, such as for use in providing analytics or generating new models. For example, historical data store/engine 336 may provide historical data to model generation engine 338, which the model generation engine 338 may use in learning (or developing) new play or formation models that should be added to the respective model databases. In some embodiments, the historical data store/engine 336 may be accessed by the analytics and statistics systems to generate more in-depth analytics or statistics. In some embodiments, the historical data store 336 may comprise prior event and tag derived data received by the system for each individual player (e.g., John Smith) and may also comprise player data received from other sources, such as from manual input tools (i.e., such as using a form or template) or external data sources (e.g., other statistics databases, etc.).

In some embodiments, the event engine 322 may output an event data stream that may be used in conjunction with historical results, such as from historical data store 336, for determining odds for outcomes of various team matchups. For example, the event data stream and historical event data may be analyzed to generate and/or change predicted odds for outcomes of each play, etc., which may be used in a wagering system or the like.

In some embodiments, the team analytics system 346 may provide an interface tool (i.e., perhaps through the model generation engine 338) configured to allow a team to input future plays (i.e., a game plan). Such future plays may be tested against historical data stored to the historical data store 336 in order to determine a probability for success. For example, the team analytics system 346 may be configured to allow a team to virtually test an individual play intended to be run from a given offensive formation against defenses that were historically run against such offensive formation. As will be apparent to one of ordinary skill in the art in view of this disclosure, the team analytics system 346 may be configured to allow a team to virtually test its game plan against another team, specific players, specific formations, specific blocking protections, specific blitz packages, specific weather conditions, and the like.

In one embodiment, the team analytics system 346, or any other engine or system, may be configured with access security controls (e.g., password protection schemes, etc.) sufficient to limit access to team proprietary data (e.g., game plan information, player injury data, etc.) to individual teams. In this regard, game integrity may be preserved by ensuring that proprietary data of a first team is not obtained by a competing second team.

In some embodiments, the event engine 322 and its corresponding output systems (i.e., the visualization system 340, the game operations system 342, the camera control system 344, the team analytics system 346, the league analytics system 348, the statistics system 350, the XML feed/IM feed system 352, and the historical data store/engine 336) may be configured to provide different levels of specificity for the output data. For example, an individual team may receive output data breaking down the specific details for each play and the player dynamics for the play, such that the team may determine the performance of each player in executing the specifics of a play versus an intended design. In contrast, similar yet less detailed output may be provided to all teams such as basic play diagrams and standard statistics for the players.

In some embodiments, one or more of the engines shown in FIG. 3, such as, without limitation, the team formation engine, the play engine, the event engine, or the like, may output lists or ranked lists of probable output events (e.g., locations, formations, plays, events, etc.) for display to a user via a graphical user interface (e.g., PC, tablet, mobile device, etc.) and/or for use by downstream engines or systems. In other embodiments, the above described engines may select from the ranked list of probable events a most probable event, or more simply a "probable event" (e.g., probable location, probable formation, probable play, probable blocking technique, probable passing route, etc.), that either has the highest probability indicator among the ranked list or has a probability indicator above a pre-defined threshold.

In some embodiments, the user may validate or confirm an output event (e.g., a location, a formation, a play, or an event) to improve system operation. For example, in one embodiment, the event engine 322 may determine that the following events may have occurred each with a respective probability indicator shown in parenthesis: completed pass—12 yard gain for the offense (68%); completed pass—10 yard gain for the offense (21%); incomplete pass—0 yard gain for the offense (19%). This ranked list may be displayed to an official via a mobile device who may select and confirm the correct output event, which in this example is the completed pass for a 12 yard gain for the offense. In this regard, as will be apparent to one of ordinary skill in the art in view of this disclosure, the system may employ a user to break ties or close calls (e.g., probabilities within 10 percent, etc.) or to improve the accuracy of models, input weighting allocations, and the like.

In still other embodiments, the performance and analytics system may determine or predict participant locations, formations, plays, or other events despite temporary or sustained losses of blink data for one or more tags (e.g., due to transmission failures associated with multipath effects, line-of-sight blockages, etc.). For example, in one embodiment, the performance and analytics system: receives first tag location data for a first participant (e.g., a ball carrier) during a first time period (e.g., an in-play period representing the first 3 seconds of a play); receives subsequent first tag location data for the first participant during a second time period (e.g., a second in-play period representing the second 3 seconds of a play); receives second tag location data for a second participant (e.g., the ball carried by the ball carrier) during the first time period; and determines (or predicts) subsequent second tag location data for the second participant during the second time period based at least on: the first tag location data for the first participant during the first time period, the subsequent first tag location data for the first participant during the second time period, and the second tag location data for the second participant during the first time period.

The above determination or prediction may be further improved using tag derived data and sensor derived data. For example, the performance and analytics system may receive first sensor derived data (e.g., time-of-flight sensor data or other tag and sensor derived data suggestive of a relative proximity between the first participant and the second participant) for the first participant during the first time period; receive subsequent first sensor derived data for the first participant during the second time period; and determine the subsequent second tag location data for the second participant during the second time period further based at least on: the first sensor derived data for the first participant during the first time period, and the subsequent first sensor derived data for the first participant during the second time period.

In still other embodiments, the above determination or prediction of second participant location may be improved by comparing participant location at various times to formation and/or play models. Such comparisons may further include field data, and participant role data. For example, in an instance in which we maintain the above example whereby the first participant is a ball carrier and the second participant is a ball, the performance and analytics system may determine or predict the location of the ball (i.e., in circumstances in which tag or sensor transmissions from the ball are blocked) during a pre-snap period by determining that the ball carrier is aligned in a stationary location in the backfield. By comparing such ball carrier location data to formation models, the system may determine that the ball is most likely positioned at the line of scrimmage proximate the center.

Similarly, in another embodiment, perhaps where the first participant is a quarterback and the second participant is a left guard, the performance and analytics system may determine or predict the location of the left guard in any given play or time period based upon comparing movements of the quarterback to formation and play models. For example, quarterback movement from a snap position to a drop back passing position may be suggestive that the left guard is positioned in a pass blocking position proximate the line of scrimmage. Alternatively, quarterback movement from a snap position to a hand-off position may be suggestive that the left guard is positioned up field of the line of scrimmage in a run blocking position.

In another embodiment, blink data is sent from the tags 102 and received by the receivers 106. The receivers 106 send the blink data to the receiver hub 108 or locate engine 302.

Exemplary System for Collecting Sporting Event Data

Figure 5:
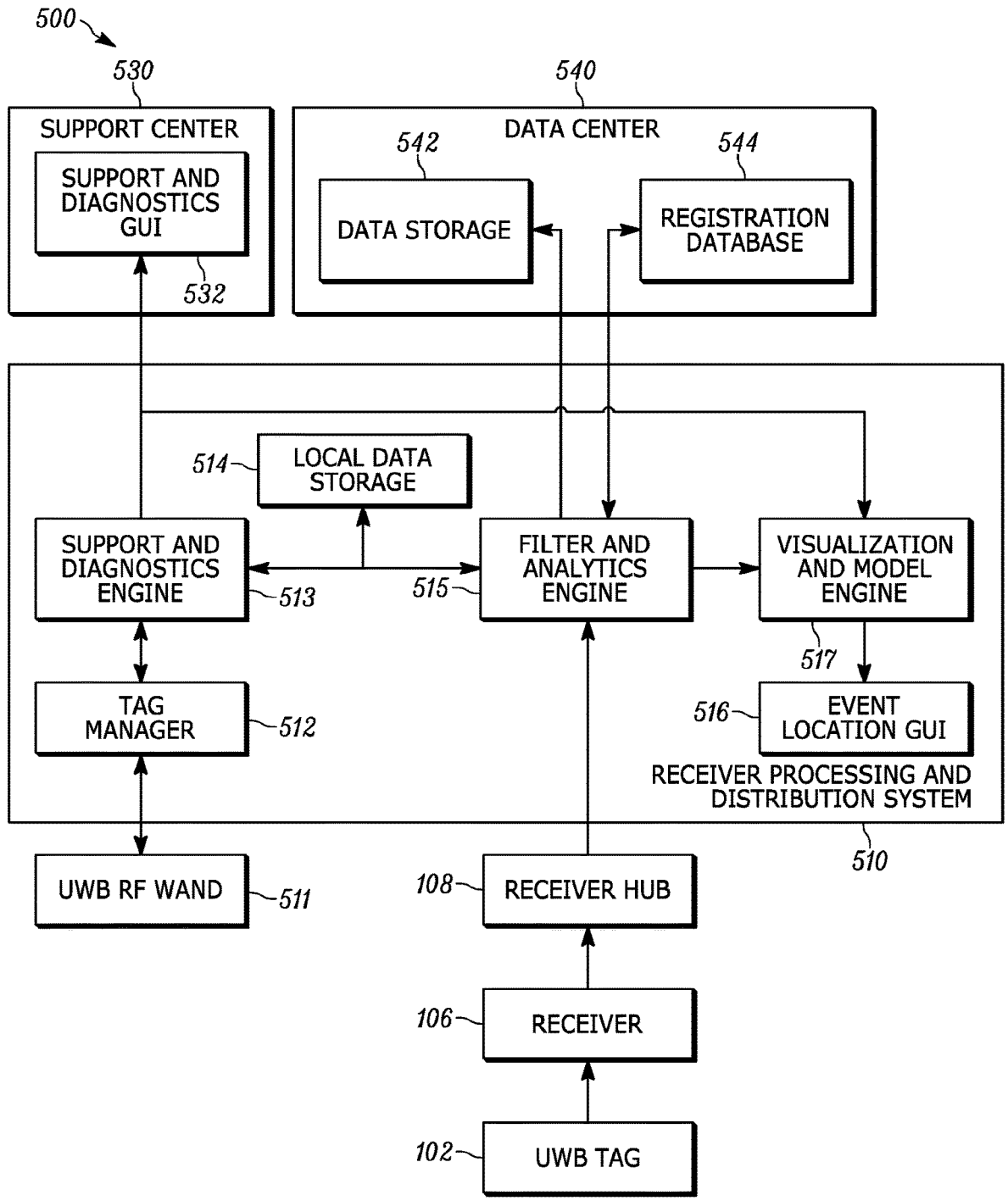
FIG. 5 illustrates an exemplary system diagram for collecting sporting event data according to an embodiment of the present invention.

FIG. 5 illustrates a system diagram for collecting sporting event data according to an embodiment of the present invention. The system 500 comprising a receiver processing and distribution system 510, a support center 530, and a data center 540 illustrating three distinct locations where various elements of the system 500 may be located. In other examples, all elements of the system 500 may be in the receiver processing and distribution system 510, the support center 530 or the data center 540. In yet further examples, individual elements may be displaced from their current locations. For example, the visualization and model engine 517 may be in the data center 540. In other examples one or more elements may be remote, such as in a cloud storage, stored at a headquarters and/or the like.

In some examples, and as shown in one example in FIG. 1 ultra wide band (UWB) tags 102, receivers 106, a receiver hub 108 may be in communication with receiver processing and distribution system 510. Additionally or alternatively, a UWB radio frequency (RF) wand 511 may also be in communication with receiver processing and distribution system 510. The receiver processing and distribution system 510 comprises a tag manager 512, a support and diagnostics engine 513, local data storage 514, a filter and analytics engine 515, an event location graphics user interface (GUI) 516, and a visualization and model engine 517 may also be present at an event location. The support center 530 may comprise, in some examples, a support and diagnostics GUI 532. The data center 540 may comprise, in some examples, a data storage database 542 and a tag identification database 544.

The UWB RF wand (RF Wand) 511 may be in wired or wireless data communication with the tag manager 512. The RF wand 511 may be a low frequency short range transceiver. As such, the tag manager 512 may be configured to communicate with the tags 102 using the RF wand 511. The communications using the RF wand 511 may be uni-directional or bi-directional, such communications configured for various purposes including without limitation, detecting (e.g., identifying the presence of one or more tags 102 within a defined area), activating (e.g., causing a tag 102 to transmit blink data at a specified interval), adjusting (e.g., causing a tag 102 to transmit at a different blink rate, or blink data interval), deactivating (e.g., causing the tag 102 to cease transmission of blink data), diagnosing deficiencies (e.g., access or otherwise receive fault information, log files and/or the like), or the like. Further, the tag manager 512 and RF wand 511 may be used in the process of correlating a tag 102 to a specified participant player or object as described in FIG. 7.

In some example embodiments, the tag manager 512 may take the form of a personal data assistant (PDA), smart phone, tablet computer, laptop computer, or the like in order for it to be a portable or semi portable device that travels to a particular location with RF wand 511. In other examples, the tag manager 512 may act as a module or engine within the receiver processing and distribution system 510 and may be in data communication with the RF Wand 511 that is in such cases configured to perform various functions otherwise described herein as performed by the tag manager 512.

Additionally or alternatively, a proximity communication exciter, such as a low frequency transceiver, may be configured to communicate with tags for detection, activation, deactivation, or adjustment, or the like, in a manner substantially similar to the RF wand 511. The proximity communications exciter may generate a magnetic field for a known area. For example, the proximity communication exciter may be located at or rear the exit of a locker room to the field of play, activating or adjusting blink rates of tags mounted to participants as they go to the field. In another example, a proximity communications exciter may be placed on or near a bench, deactivating or adjusting blink rates of participants which are not on the field to conserve tag battery life.

Figure 7:
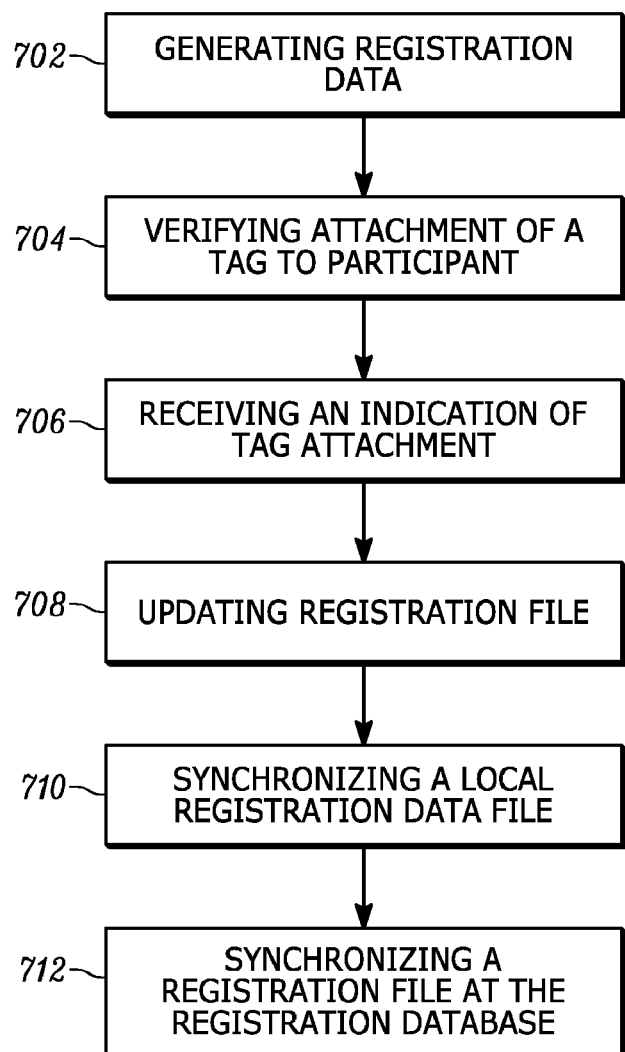
FIG. 7 illustrates a flowchart for an exemplary process of registering location tags to a participant according to an embodiment of the present invention.
Figure 11:
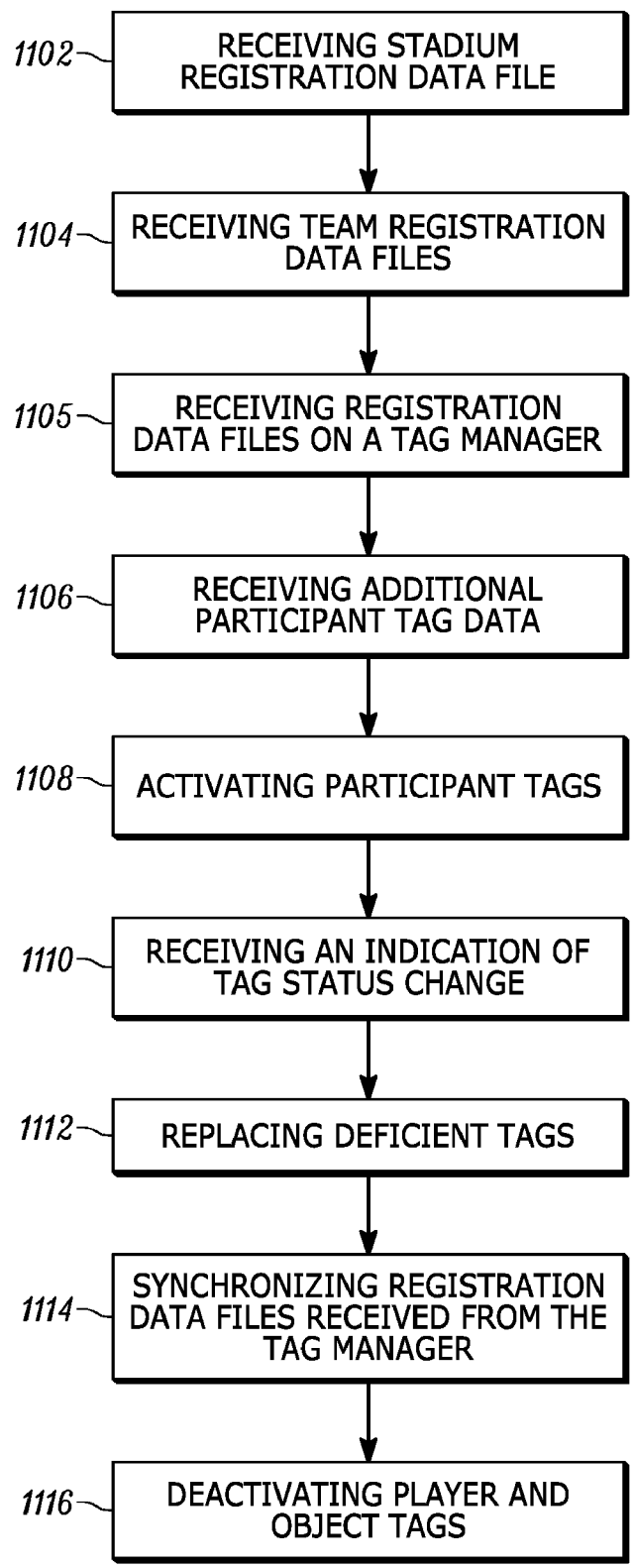
FIG. 11 illustrates a flowchart of an exemplary process for creating an event registration file according to an embodiment of the present invention.

The tag manger 512 may enable the creation of registration data and or changing of such registration data, as discussed in FIGS. 7 and 11. Registration data may be data used to identify the assignment of a tag to a participant and status of the tag. Registration data may include without limitation, a participant identifier, a tag-individual correlator, a tag UID, tag status, or the like, linked to an identifier of an object or participant. Tag status may be a condition of a tag, such as active, e.g. transmitting blink data, deactivated, e.g. not transmitting blink data, or transmitting blink data at a low blink rate, mounted, e.g. attached to the participant, registered, e.g. assigned to a participant, or the like.

In further examples, the tag manager 512 may be in wireless or wired communication with the support and diagnostic engine 513, whereas in other example embodiments the tag manager may embody the support and diagnostic engine 513. The support and diagnostics engine 513 may be configured to receive registration data and/or changes to registration data from the tag manager 512. Such registration data may be received in real time when a change is detected, at a predetermined interval and/or the like.

The support and diagnostics engine 513 may be in wired or wireless communication with the registration database 544. The support and diagnostic engine 513 may receive or otherwise access the registration data from the registration database 544 as sent by the filter and analytics engine 515. The registration database 544 is therefore configured to store and/or otherwise synchronize registration data for event use (e.g., to enable the application of a participant or object identification to a particular calculated position within a field of play). The support and diagnostic engine 513 monitors and analyzes various tag derived data including diagnostic data packets or "D-packets" sent, which may include a diagnostic error code, in some examples, by the receiver hub 108. The support and diagnostic engine 513 may output system status information to a support and diagnostics GUI 532 of the support center 530.

Figure 17:
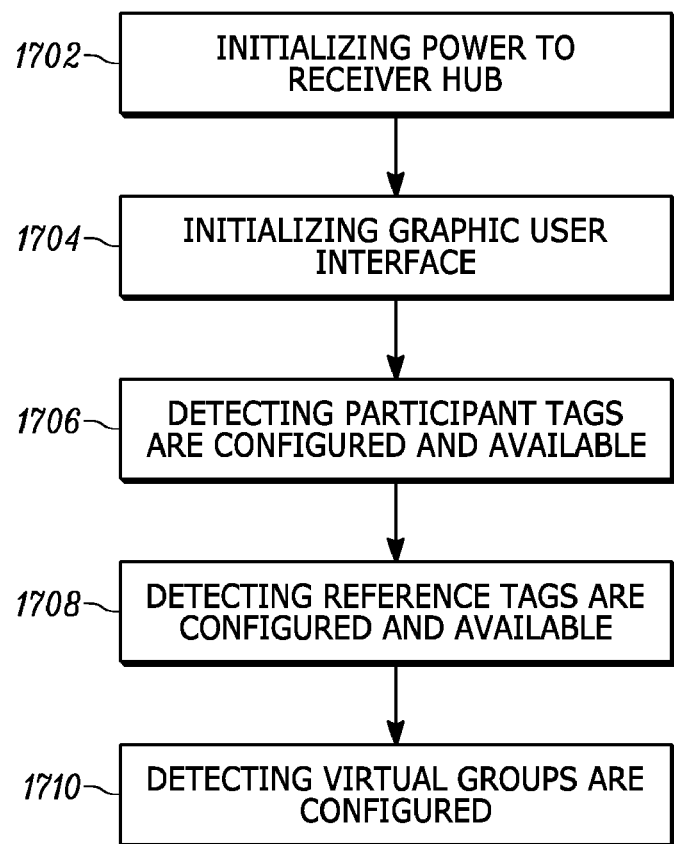
FIG. 17 illustrates a flowchart of an exemplary process for initialization of a system according to an embodiment of the present invention.
Figure 20:
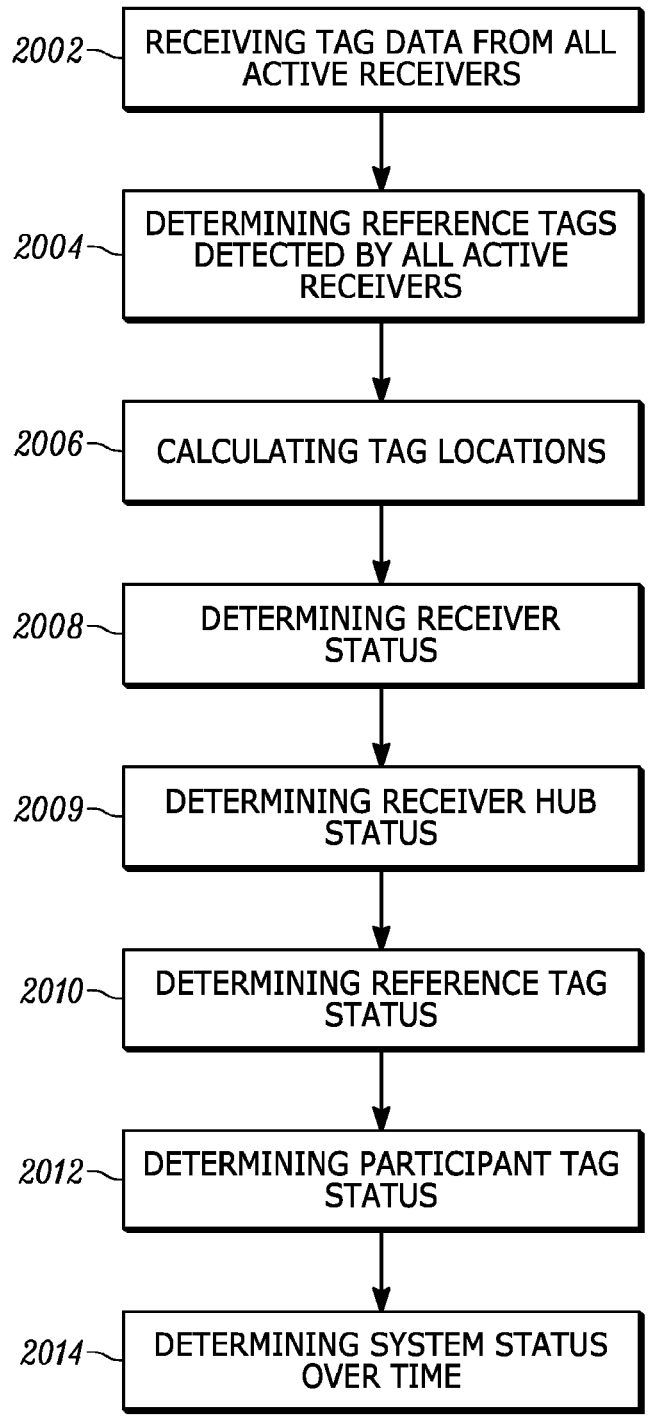
FIG. 20 illustrates a flowchart of an exemplary process of receiver hub operations according to an embodiment of the present invention.

The support and diagnostics GUI 513 may display system statuses including, without limitation, initialization diagnostics and status, operational diagnostics, reference tag status, receiver status, receiver hub status, player participant tag status, object participant tag status, or the like as discussed, for example, in FIGS. 17 and 20.

Figure 25A:
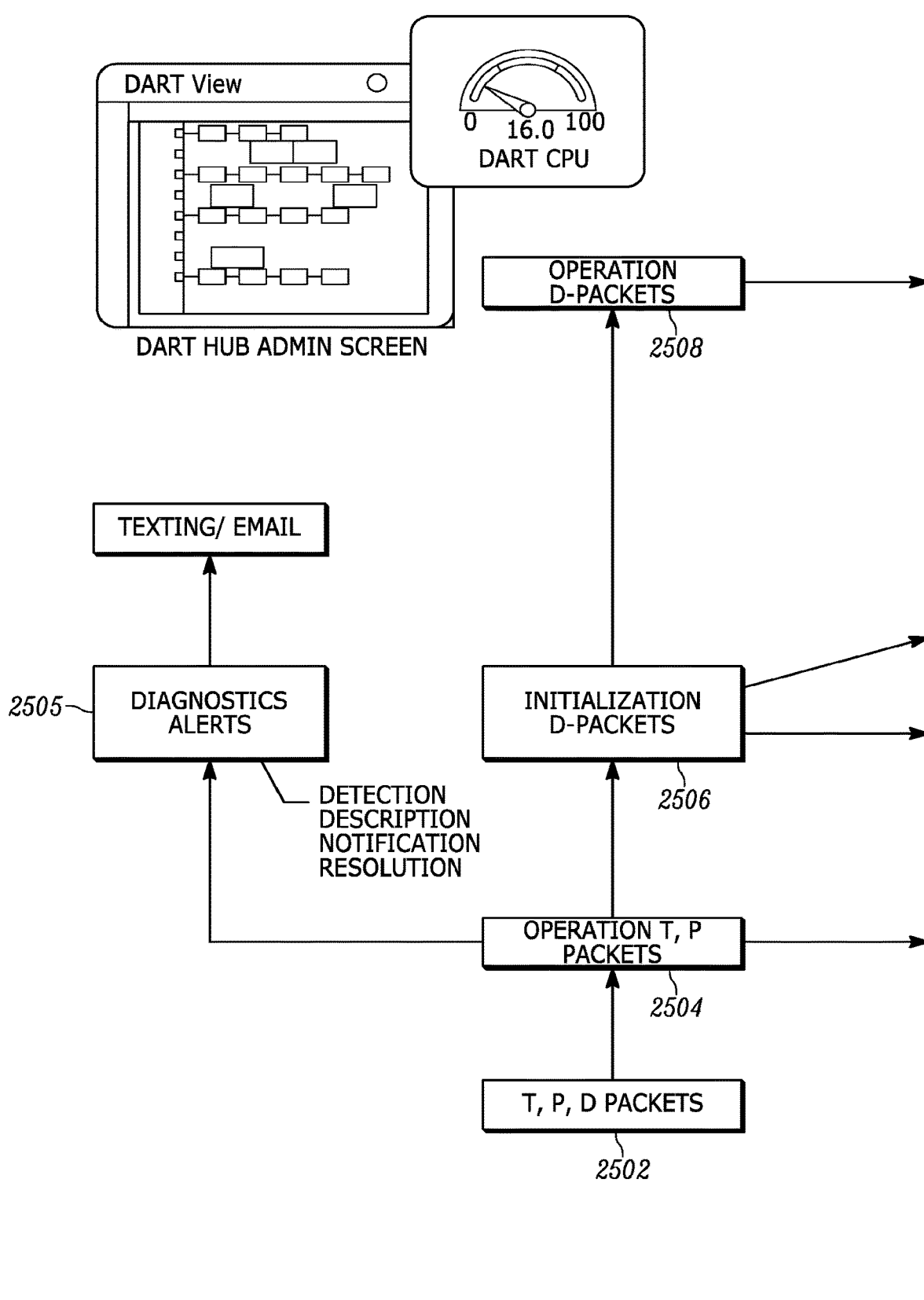
FIGS. 25A and 25B illustrate a flowchart of an exemplary process deliverying packet data to a Graphical User Interface ("GUI") subsystems according to an embodiment of the present invention.
Figure 25B:
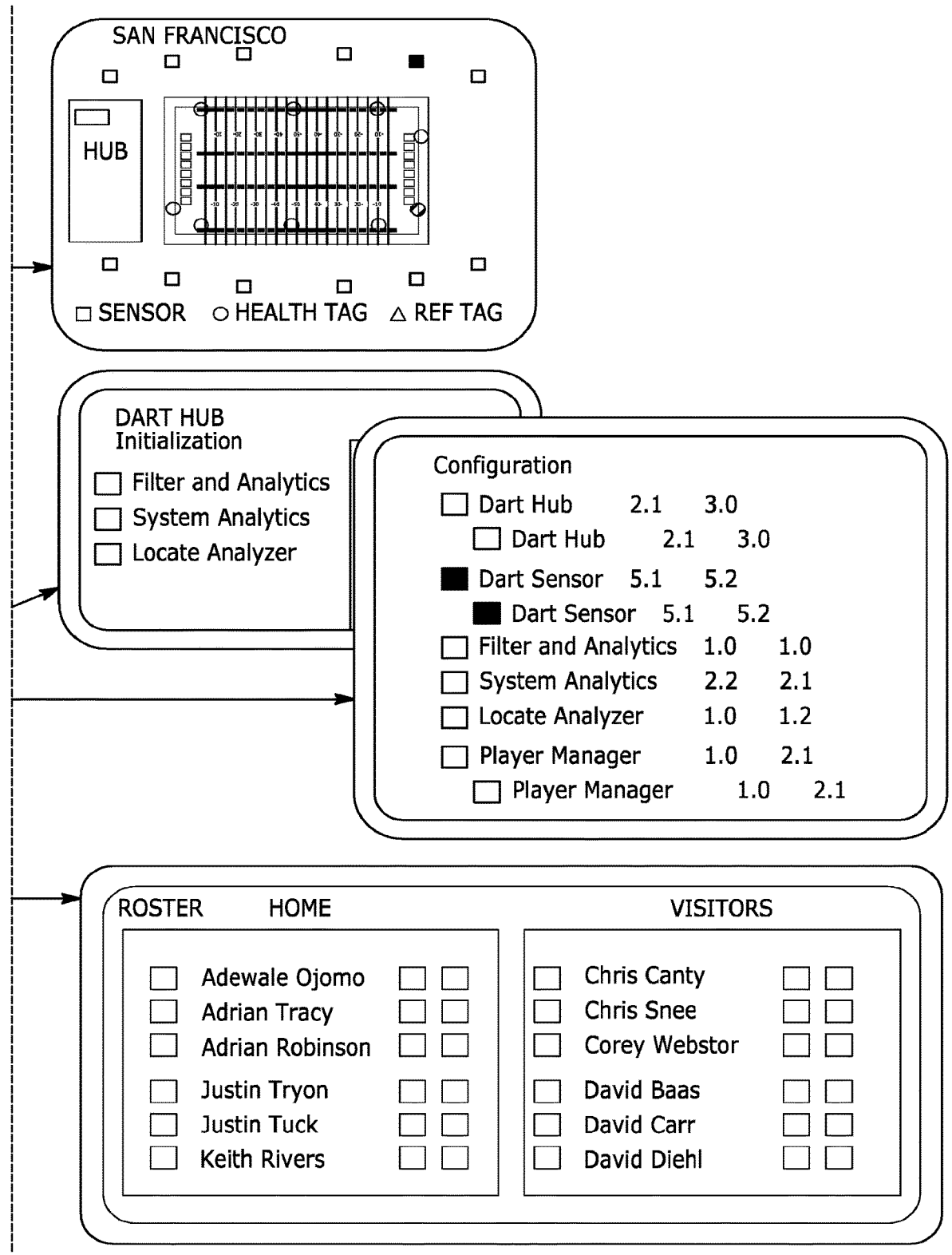

In some embodiments the support and diagnostic GUI 532 may display or otherwise cause the display of alerts based on a change to a player participant dynamics, such as gate, speed, non-linear travel, or the like as discussed, for example, in FIG. 25.

The support and diagnostics engine 513 may send registration data to the tag manager(s) 512 to track changes of tag status during activation, deactivation, replacement, or the like, as discussed in FIG. 7. The support and diagnostics engine 513 may synchronize the registration database with current registration data information. At the completion of the event or at another predetermined time or interval, the support and diagnostics engine 513 may upload the last event registration data to the registration database 544. The registration database 544 may receive the current registration data and synchronize the current registration data with the prior registration data or portion of the event registration data.

The filter and analytics engine 515 may request and receive or otherwise access the registration data for an event from the registration database 544 as described in FIG. 7. Event registration data may include, but is not limited to, portions of the registration data for the teams expected to participate in the event. The filter and analytics engine 515 may send or otherwise cause the event registration data to be sent to the support and diagnostic engine 513.

In further examples, any of the filter and analytics engine 515 and/or support and diagnostics engine 513 may cause data to be stored in the local data storage 541 including without limitation, registration data, tag location data, diagnostic information, raw data files, filtered data files, or the like. Such a local storage may, in some examples, be backed up or otherwise synchronized with a remote server, a cloud storage, or the like.

In some examples, the receiver hub 108 may output data packets to the filter and analytics engine 515 and to the support and diagnostics engine 513. The output data packets are further discussed, for example, in FIG. 20. The receiver hub 108 may output tag location data or "T-packets", in an instance in which a tag location has been calculated from the tag blink data. The receiver hub 108 may output a tag derived data, "P-packets", in an instance in which the receiver hub has received tag blink data, but a location calculation was not possible (e.g., in an instance in which tag blink data is received by less than a predetermined number of receivers 106). The tag derived P-packed may include the tag UID, but no location data. The receiver hub 108 may output a tag derived data, D-packet, in an instance in which a diagnostic error code is included in the packet. The diagnostic error code may be derived from the blink data or may be generated by one or more of receivers 106 and/or receiver hub 108. See e.g., FIG. 20.

Figure 28:
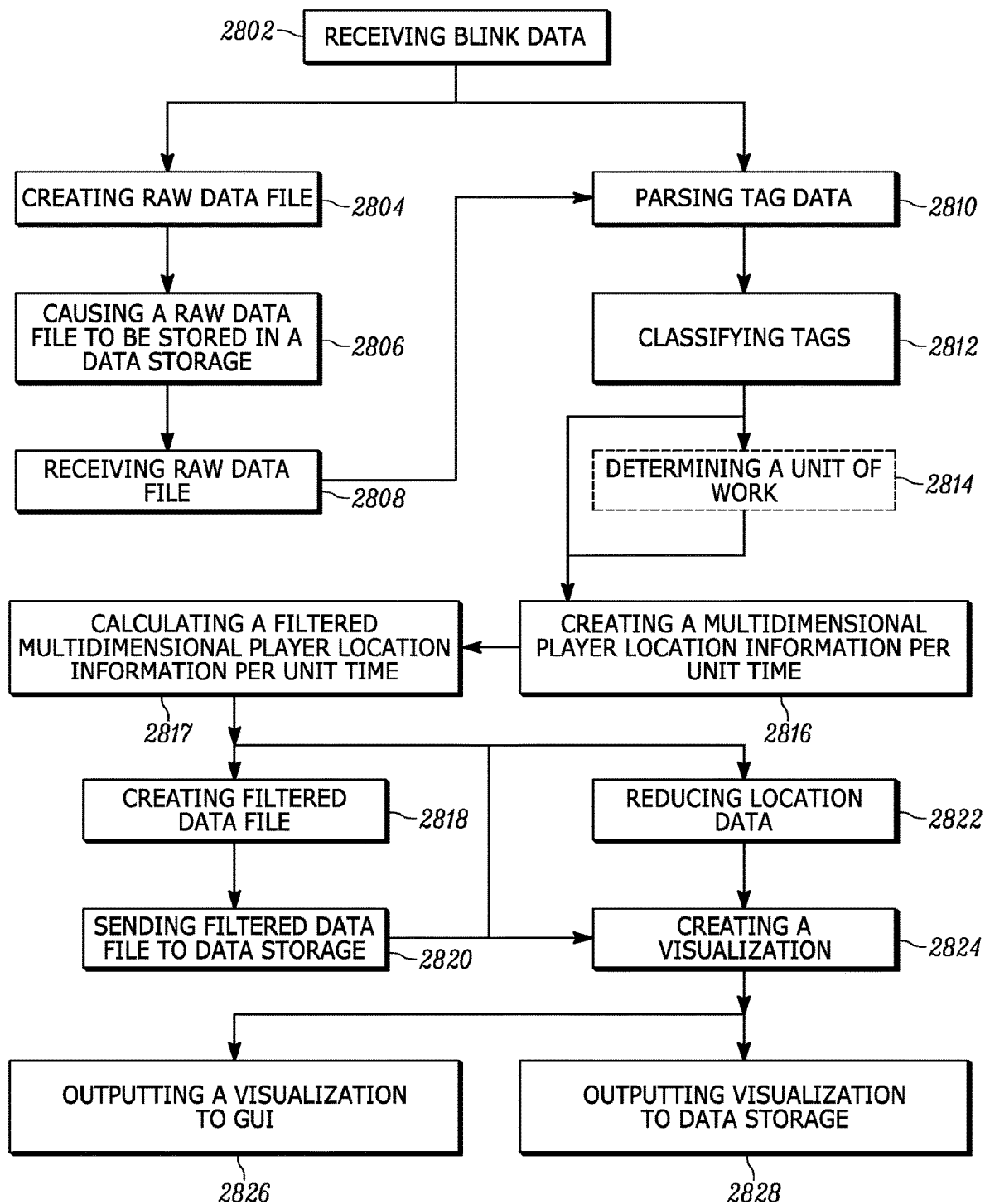
FIGS. 28 and 29 illustrate flowcharts for an exemplary processes of data flow through a filter and analytics engine according to an embodiment of the present invention.

In some embodiments, the filter and analytics engine 515 generates multidimensional (e.g., a two dimensional location, a three dimensional location or the like) player location data per unit time of each tag as discussed in detail in FIG. 28. The filter and analytics engine 515 may receive tag location data packets (T-packets) from the receiver hub 108. The filter and analytics engine 515 may parse the tag location data by data fields and map the locations data for each tag generating multidimensional player location data per unit time.

Figure 29:
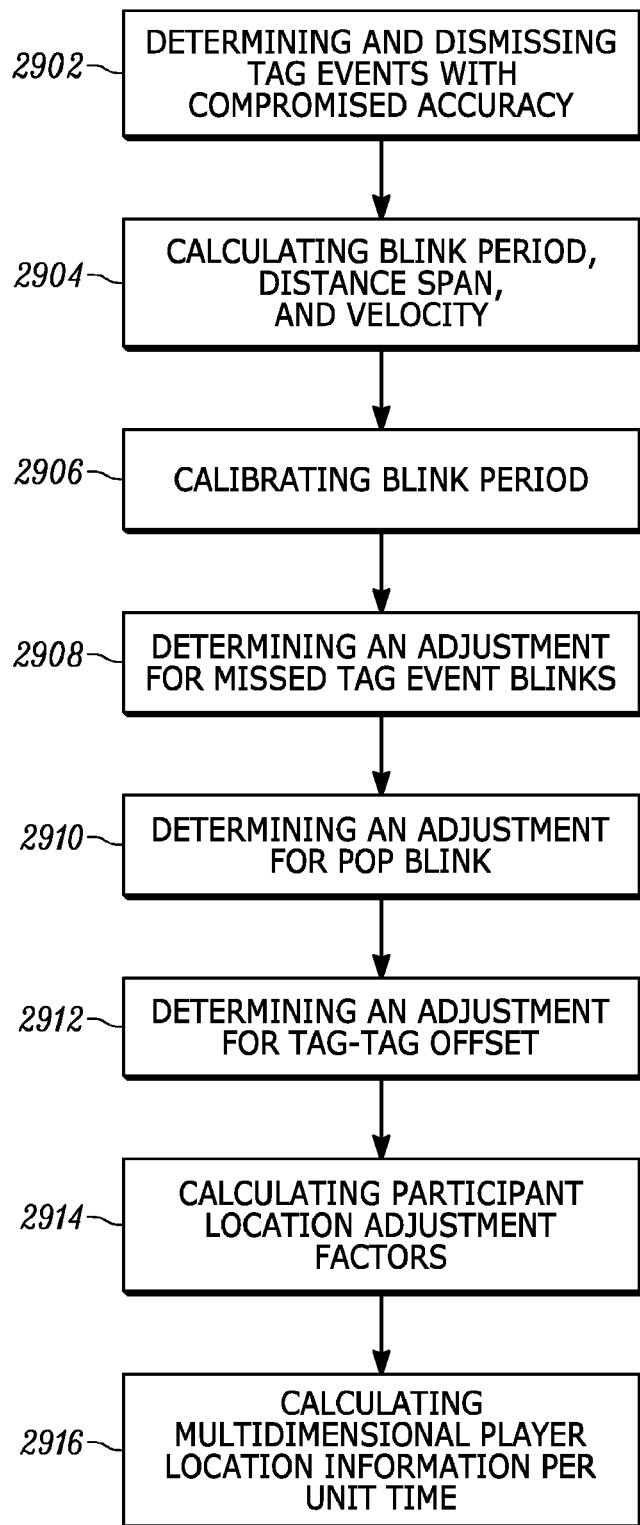

Alternatively or additionally, the filter and analytics engine 515 may apply various filters to the generated multidimensional player location data per unit time including without limitation, dismissing compromised accuracy tag events, missed tag event blink adjustments, pop tag event blink adjustments, tag-tag offset, output to a television broadcast, or the like as described, for example, in FIG. 29. The filter and analytics engine 515 may cause raw or filtered data files to be stored in a local data storage 514 or the data storage 542 of the data center 540. The filter and analytics engine 515 may output the multidimensional player location data per unit time to the visualization and model engine 517.

Figure 31:
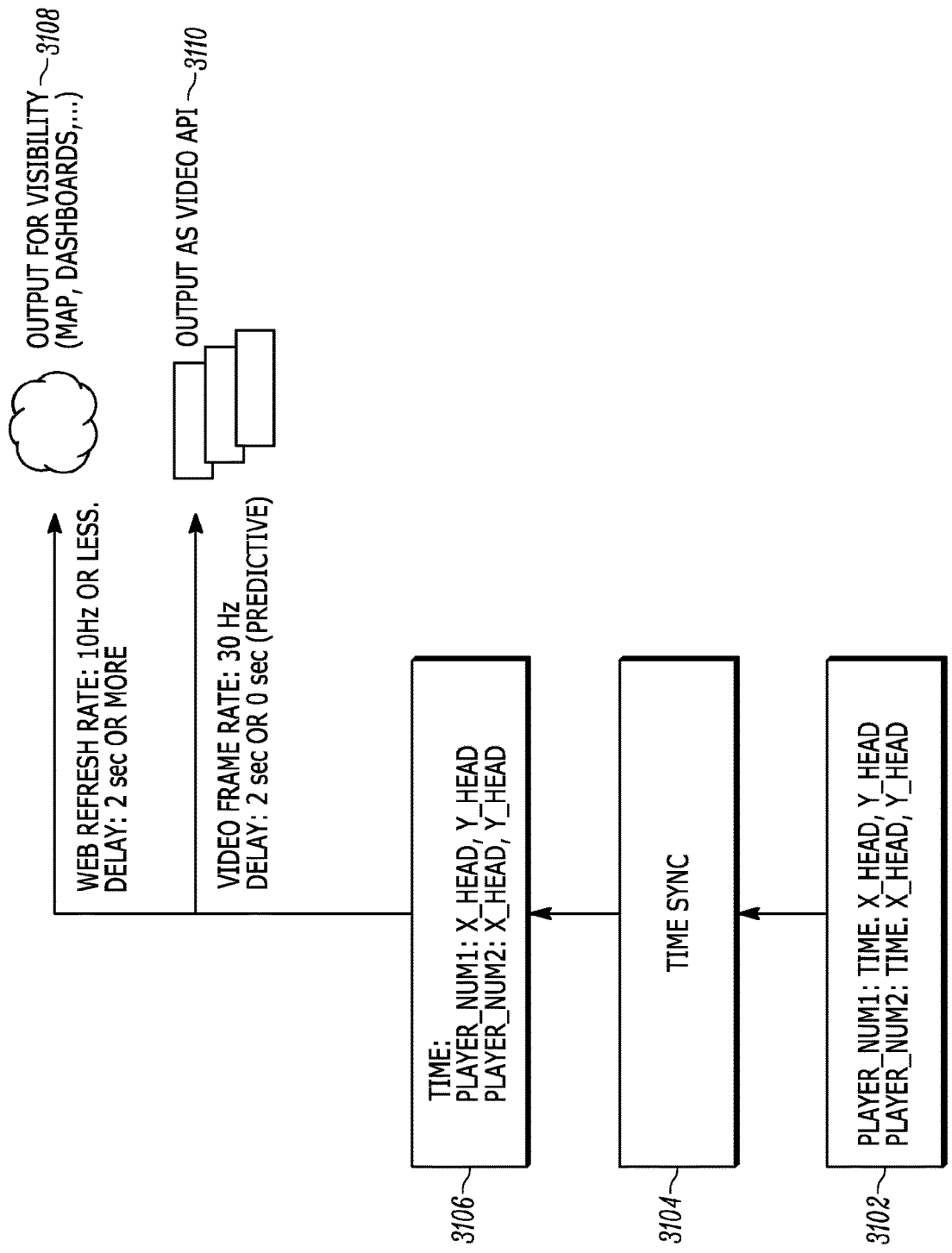
FIG. 31 illustrates a flowchart of an exemplary process for synchronization of participant location at calculated times according to an embodiment of the present invention.

In some examples, the visualization and model engine 517 may create a visualization of multidimensional player location data per unit time as described, for example, in FIG. 31. The visualization and model engine may also cause the visualization to be displayed on the event location GUI 516. The visualization and model engine 517 may cause the visualization to be stored in local data storage 514, the data storage 542, and/or the like.

Although this description makes reference to primarily to player participant tags management, data filter, analysis, storage, and visualization other tags or sensors including, without limitation, line post, reference tag, or heath sensors, object tags, or the like, may be managed, filtered, analyzed, stored, and visualized as described herein.

Exemplary Process for Registration of a Location Tag to a Participant

FIG. 7 illustrates a flowchart for an exemplary process of registering location tags to a participant. A tag manager (e.g. tag manager 512 shown in FIG. 5) may be used to manage the tags (e.g. tags 102 as shown in FIG. 1), such as, registration to a specified player, mounting of tags to participants, and tag status (e.g. active, not-active, or damaged/replacement). A tag manager 512 may be used to complete some or all of 702, 704, 706, 708 and/or 712 receiving of participant tag data. Alternatively a computing device with registration data may be populated independent of the tag manager 512.

Figure 6:
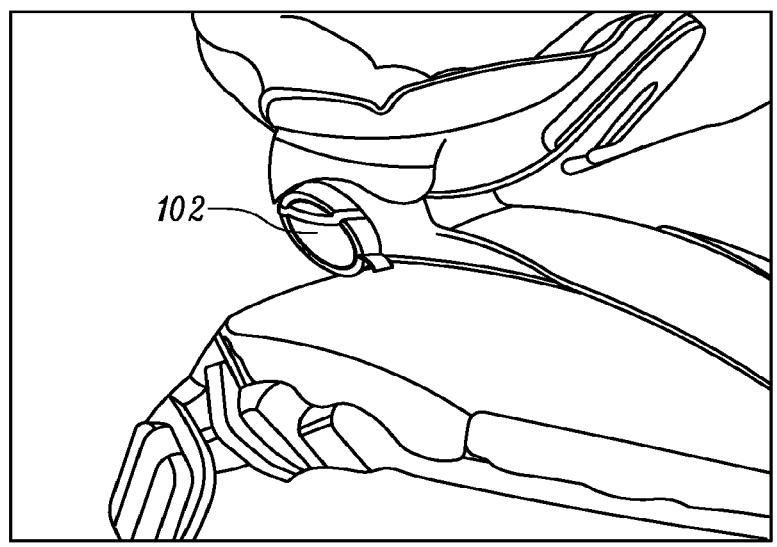
FIGS. 6 and 15 illustrate an example of tag attachment to player participant equipment according to an embodiment of the present invention.

In some examples, each player participant from each team may be assigned at least two tags 102. Each tag 102 may be marked with a tag identification. The tag identification may include a team code, player number, and location data, for example "SEA-34L" would represent the Seattle Chipmunks, jersey number 34, left shoulder pad. The tag 102 or tags may be physically attached to a participant, for example the shoulder pads of a player as depicted in FIGS. 2 and 6.

Figure 15:
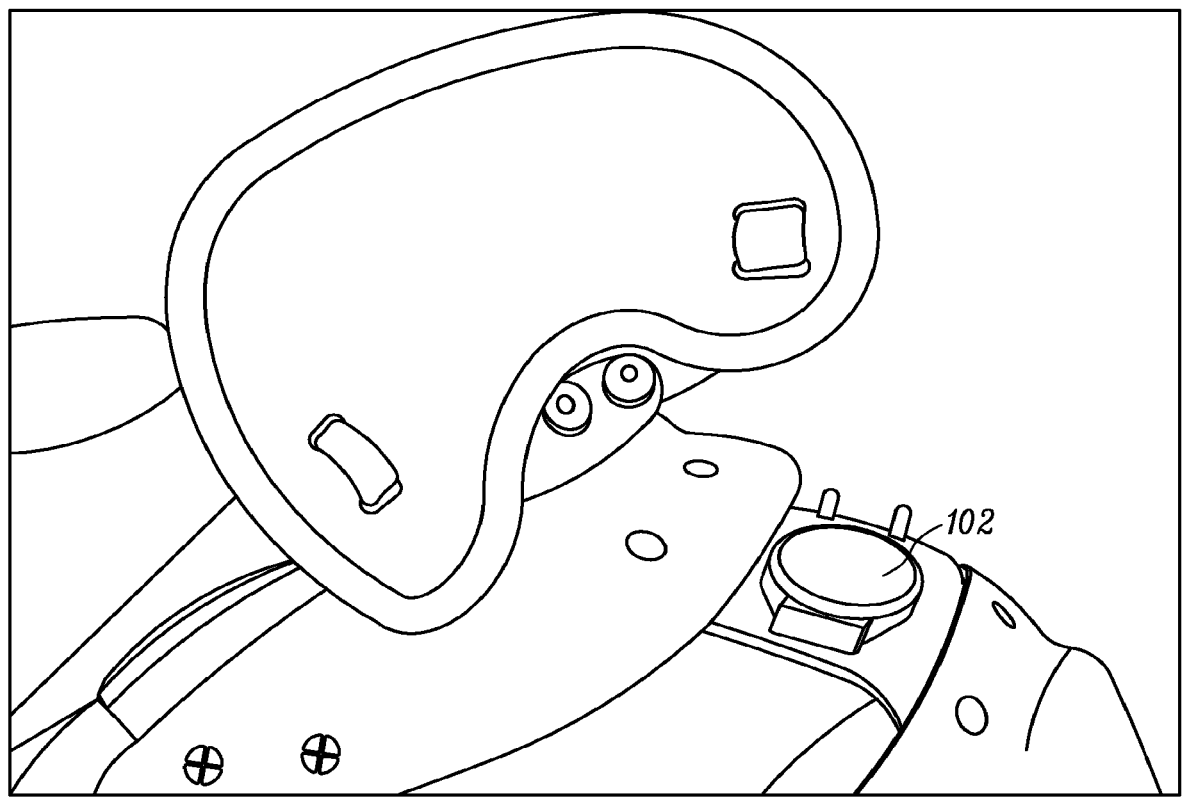

In some examples, the locations for attaching the tag 102 to the participant comprise without limitation, shoulder pads, helmet, shoes, jersey, gloves, wristbands, belt, or the like. The method of attaching the tag 102 to the participant comprise, without limitation, glue, sewing, hook and pile, buttons, molding, clipping, zip tie, or the like. In American football at least two tags 102 are attached to the shoulder pads as illustrated in FIGS. 6 and 15. The tags 102 may be attached to the participant in a manner to ensure that the placement is safe for the participant and tag 102, dependent on the manufacture of the equipment to which the tag is to be attached. Preferably, attaching of tags 102 is performed several days before the team's first event or game. The tags 102 are maintained on the participants or equipment for the duration of the season, with the exception of replacement of damaged tags. The tag manger 512 may simultaneously receive an indication of a change of status to "attached" and correlate the tag UID to the registration data for a tag attachment at block 706.

At block 702, registration data is generated by entering or receiving various participant and tag information including without limitation, tag UID, team data, participant data, tag identification, tag-individual correlator, tag status, or the like. The team data may be received or otherwise accessed by tag manager 512 and entered into registration data. Team data may comprise, without limitation team name, team code, stadium name, stadium city, stadium state, region, league, or the like. Team data may be searched or filtered by team name, stadium name, region, league, or the like. Team data entries may be edited by, adding a team, updating an existing team, or deleting a team. Other methods of correlation, such as by position, role, sport, activity, association or the like may be used in some examples. The registration data may be created well in advance of the game or season or may be entered in real-time or near real-time, by a data entry operator, based on optical character recognition (OCR) of a received video, a readable tag, or other means of identifying a participant and the association of said participant.

The participant data or team roster may be received by the tag manager 512 and entered into registration data, remote storage or the like. Participant data may comprise, without limitation team name, team code, player name, player number, tag identification (e.g., tag UID) assigned to left shoulder, tag identification assigned to right shoulder, or the like. Participant data may be searched or filtered by team name, team identification, player number, player name, player position, or the like. Participant data entries may be edited by adding players/participants, updating an existing player, deleting a player, associating a tag, dissociating a tag, or the like. In an instance in which a participant data is associated with a tag 102, a deletion may be allowed, but a prompt may be included indicating an activate tag association. In some examples, in an instance in which the user selects "yes" the participant and tag data are deleted, in an instance in which the user selects "no" the data may not be allowed to be deleted.

The tag identification data may be received by the tag manager 512 and entered into registration data. The tag identification may be the tag UID or may be generated by the tag manager 512 and then may be linked or otherwise correlated to the tag UID. Tag identification may be searched or filtered by tag code, team code, player number, tag position, or the like. Tag identification is preferably automatically generated by the entry of participant data.

Alternatively, tag data may be entered or edited by adding a tag 102, updating an existing tag, or deleting a tag. When tag identification has been generated and entered into the registration file the tag status may be "registered". Registering the tag 102 in the registration data generates a tag-individual correlator (e.g., by linking a tag UID to a participant in the data store) in the registration data. Tag status values may be beneficial to the registration data for tracking of the installation of tags 102 on participants, multiple tag registration, or multiple tag activation. Tag status may also be beneficial when activating or registering tags 102 with a mobile device without conductivity to update the registration data, in such cases the status would be helpful in synchronizing the updated tag status to the registration data.

Figure 8:
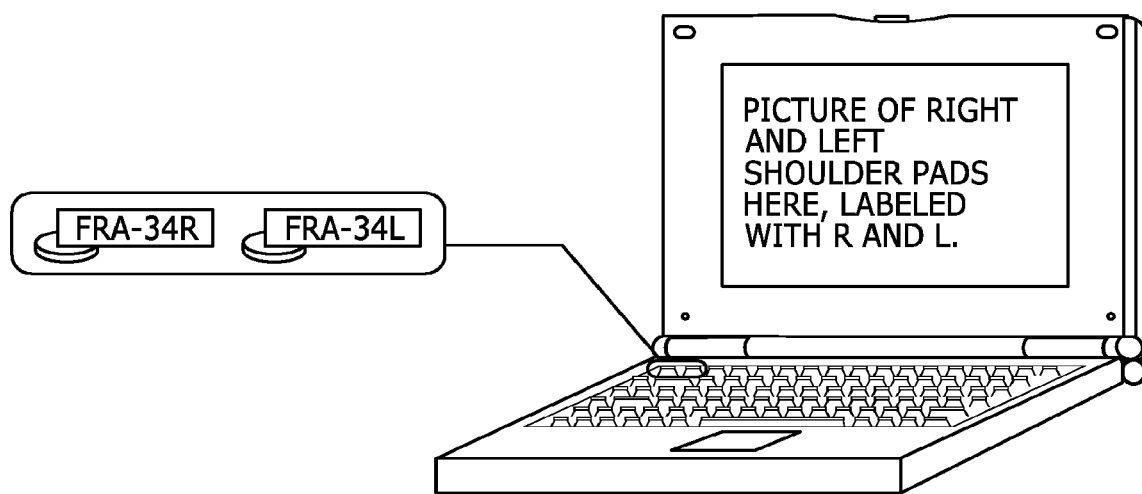
FIG. 8 illustrates an exemplary embodiment of labeling and storage for location tags according to an embodiment of the present invention.

In some examples, the tag 102 may include a tag identification in addition to a tag UID. The tag identification may comprise, without limitation, a team code, player number, and location assignment, for example "SEA-34L" would represent the Seattle Chipmunks, jersey number 34, left shoulder pad. Instead of electronically storing the tag identification in the tag, the tag identification may be affixed to the tag 102 by writing or printed sticker or other durable labeling method as illustrated in FIG. 8 so that it can be identified by a user activating a RF wand. Alternatively, the labels may be placed on bags, each bag having two tags 102, each tag being labeled with a participant location, such as L or R, indicating left or right shoulder pad. The tags 102 with labels are placed in a box, as illustrated in FIG. 8, and transferred to the location to mount the tags. Preferably, tags 102 assigned to the same player are stored in close proximity to each other, and tags assigned to different teams would be placed in separate containers. The containers may be labeled with the team assignment; individual tag storage sites may also be labeled. The tags 102 may be mounted at a central site, but in some examples, the tags be mounted at the event location and placed in locations specified for each participant. For example, the tags 102 when attached to shoulder pads may be placed in a player specific locker, thus preventing or minimizing tags being used by the incorrect participant.

Figure 10:
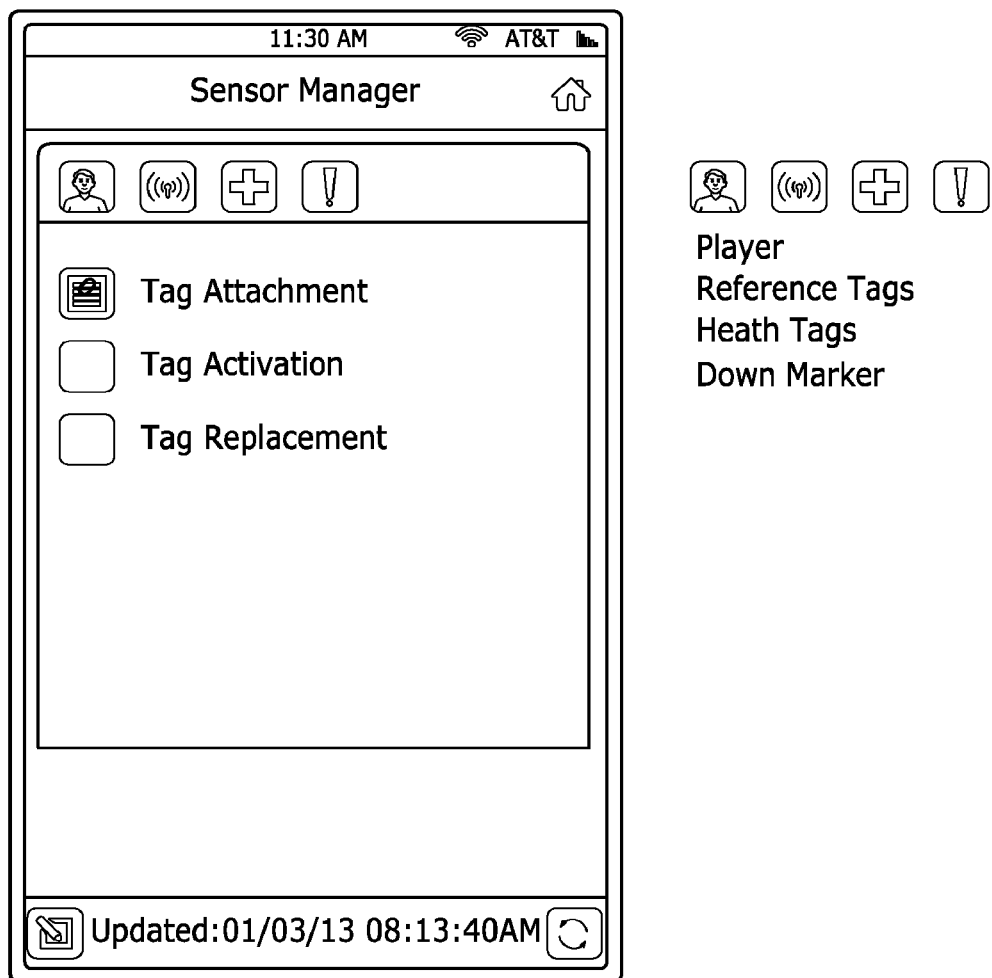

At block 704, tag attachment may be optionally verified, such as by using location, proximity detection or the like. At block 706, an indication status change indication is received and the tag UID is correlated to the registration data. The tag manager 512 may receive a status change indication e.g. attachment of a tag 102 by selection of "tag attachment" or other indication that signals the tag 102 is attached and then specify the type of participant that the tag is being attached, (e.g. player, reference tag, health tag, down marker, or the like), as illustrated in FIG. 10. A participant may be selected from the entered participant data by a search or lists. Once a participant data is selected a barcode scanner may be used in communication with the tag manager 512 to scan the tag UID. The tag UID may be located on the tag label in ISO format, meaning that the tag label will contain a 48-bit hex value the first 6 bits may be a validation value, while the remaining 32 bits may be the tag UID. The tag UID is validated by verifying the validation value, (e.g. first three digits 0003) and converted to a specified format for storage in the registration data. The tag manger 512 correlates the tag UID to the tag-individual correlator of the registration data. Additional methods of scanning or detecting may also be used, such as but not limited to, near field communication, Bluetooth, accessing a passive RFID tag and/or receiving the tag information through a location system and correlating a location of a tag with a received tag UID, such as the system of FIG. 1, or the like.

Figure 9:
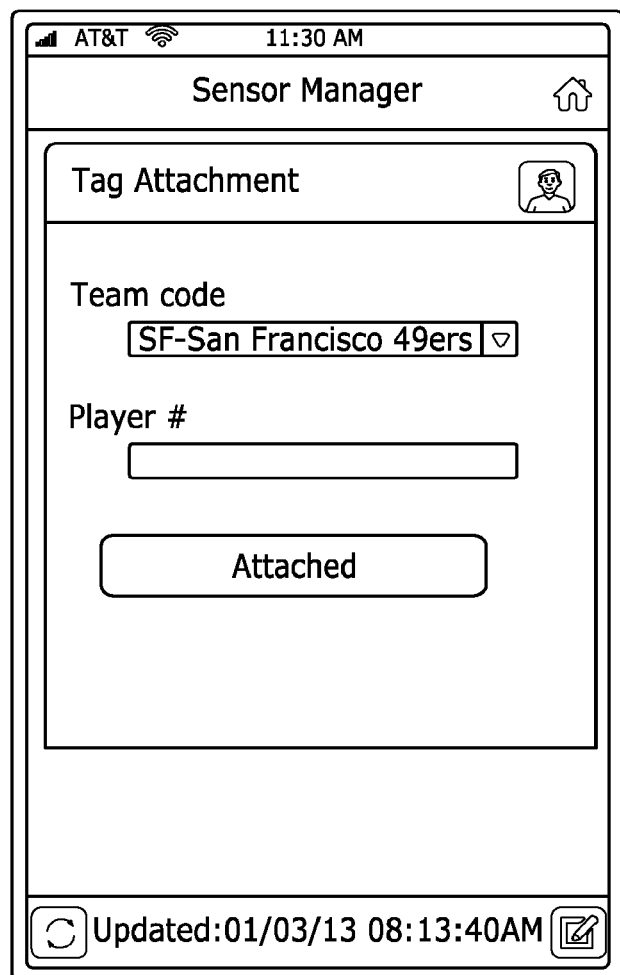
FIGS. 9 and 10 illustrate exemplary embodiments of a tag manager display according to an embodiment of the present invention.

At block 708, the registration file is updated for the change in tag status. The tag manager 512 updates the tag status of the registration data to "attached" or "mounted." Alternatively or additionally, tag(s) 102 may be attached to a participant and then update the registration file by selecting the team and player number or name and selecting "Attached" in the tag manager 512 as illustrated in FIG. 9. In an instance in which the update is successful the tag manager 512 may display a "success" icon for two seconds, blank the player number and disable the attach button, until the next valid player number is entered. In an instance in which the update fails (e.g. player number not recognized, or tags previously associated with player), the tag manager 512 may cause an error message to display (e.g. player number not recognized), the attach button to be disabled, and/or two buttons to appear; "cancel or "override". Selecting cancel may blank the player number and return to the tag attachment screen in an instance in which the user can enter the correct number. Override may record the tag association with "override" in the tag code location. Alternatively, the tag manager 512 may be configured to request entry of the missing data, (e.g. tag code left, and tag code right.) This request may be done in the attachment screen or in a separate screen. Alternatively or additionally, verifying attachment may not be necessary in some examples.

In an instance in which a user attempts to update the registration data for attachment of a tag 102 with participant data for the same tag location, the registration update may not be allowed, a warning may be issued or the like. The user will be prompted or otherwise notified that there is an existing tag 102 attached at that location and in an instance in which the user requests to override. To replace the existing tag UID attached at the location and the tag-individual correlator in the registration data the user selects "yes," in an instance in which "no" is selected the attachment and registration data update is not performed. In an instance in which a tag's 102 registration data has been updated for attachment of the tag status may be "mounted" or "attached."

Alternatively or additionally, an RF wand, such as RF wand 511 as shown in FIG. 5, may be used in communication with a computer or mobile device running or otherwise in communication with the tag manager 512 to read the tag UID. The RF wand 511 may be passed two to eighteen inches, in some examples, from the tags 102. The RF wand 511 may receive the tag UID and then may communicate the tag UID to the tag manager 512. The correlation of tags 102 to participants with the RF wand 511 may be performed in the same or similar manner as the bar code reader, as discussed above.

In alternative example embodiments the association of tags 102 to participants is performed in conjunction with labeling the tag 102 with a tag identifier. Each tag identifier may be selected and a tag 102 updated as attached to a participant in the registration data, using a barcode reader or RF wand 511 in communication with the tag manager 512 as discussed above.

A player list function may be used on the tag manager 512. The player list may show, in some examples, the team name and team code, the player numbers, the attachment status, and/or the like. The player status function provides easy identification of which tags 102 have and have not been updated as attached in the registration data.

In some examples, a tag 102 may be dissociated from participant location by selecting a participant and a tag location and selecting dissociate or registering a new tag for an existing participant. A tag 102 may also be disassociated, in some examples, when the entry for the team or player is deleted, this may also cause a gap in the registration data. In an instance in which a tag 102 has been disassociated from a participant the tag status may be "unregistered." Removal of a record or deletion may implement the status of "damaged" or "unregistered."

In an instance in which attachment of the tag 102 would prevent viewing the tag code label for tag verification purposes, receiving an status change indication 706 and updating the registration data 708 may be performed before verifying attachment of a tag 704.

At block 710, the registration data may be synchronized and caused to be stored in the local data storage 514 or other accessible storage. The tag manager 512 may cause the registration data to be stored in a local data storage (e.g. local data storage 514 as shown in FIG. 5), which may be in communication with the filter and analytics engine 515 and/or the support and diagnostics engine 513. The tag manager 512 may be used to update the registration data either at the location of tag 102 manipulation, at a control location, at a central site and/or the like. The local data storage 514 may store all registration data during the initial tag 102 registration process. The tag 102 registration process comprises, without limitation, assigning one or more tags to each participant, labeling each tag with a tag identification (e.g., using a physical label, using a tag UID in memory, or the like), verifying one or more tags are attached to participants, associating the tag 102 to the participant, updating the registration data, or the like. The local data storage 514 may use a file drop method, a synchronization, a redline or the like to receive and synchronize the new registration data with previous versions in an instance in which the new file is a portion of the existing entries, or only synchronizes manipulated entries. The registration data updates a "last updated" field each time the tag changes status comprising date and time of the last change to the specified tag registration data.

At block 712, the registration data is received, in some examples, by registration database (e.g. registration database 544 as shown in FIG. 5) of the data center (e.g. data center 540 of FIG. 5). In alternative embodiment the registration data may be received by a data storage (e.g. data storage 524 as shown in FIG. 5). A server at a centralized location may serve as the registration database 544 during operation. Once the initial tag 102 registration process has been completed the registration data may be imported into data storage 524, registration database 544 or other shared/accessible memory. The importation of the registration data may be accomplished through a dedicated report that can be extracted from the local data storage 514 as a Comma Separated Values (CSV) file, or the like, on demand, as a scheduled event, or the like. In the alternative, partial or manipulated registration data may be received and synchronized with the prior registration data to maintain the registration database 544 registration data.

Stadium or other area location registration data may include the registration data specific to reference tags (e.g. reference tags 104 as shown in FIG. 1), down markers, field markers, health tags, or the like at a specified location. As such, certain objects may be determined to be a in a fixed location and thus would not need to be shared outside of a particular location registration data, data store, or the like. A stadium registration data may be stored in the local data storage 514. A copy of the stadium registration data may be uploaded, received, and/or synchronized by the registration database 544 after each manipulation.

Exemplary Process for Creating an Event Registration Data File

FIG. 11 illustrates a flowchart of an exemplary process for creating an event registration data store, data file or the like. The event registration data is preferably created at the completion of a prior event, or prior to the start of the scheduled event, during pre-event preparations and/or the like. At block 1102, the filter and analytics engine (e.g. filter and analytics engine 515 as shown in FIG. 5) may receive stadium registration data from the local data storage (e.g. local data storage 514 as shown in FIG. 5) and verify the stadium registration data (e.g., verify the data is current, verify accuracy and/or the like). In an instance in which the stadium registration data is not current, the filter and analytics engine 515 may receive from the registration database (e.g. registration database 544 as shown in FIG. 5) the current stadium registration data.

At block 1104, the filter and analytics engine 515 may receive or otherwise be configured to select the teams participating in the scheduled event. In American football the filter and analytics engine 515 may receive or otherwise select the home team and visiting team. The filter and analytics engine 515 may receive a team(s) registration data file from the registration database 544, which is a subset of the registration data, containing only the registration data for the selected team. In an instance in which the filter and analytics engine 515 is unable to determine what teams are playing in the scheduled event, the filter and analytics engine may receive the complete registration data to allow for latter determination (e.g., based on one or more tags 102 in a given area, based on user input, or the like). In some examples, the team registration data may be described in JSON format:

```
[
  {
    "Season": "2013",
    "GameNumber": "-5",
    "HomeTeam": {
      "name": "49ers",
      "code": "FRA",
      "playerList": [
        {
          "name": "Joe de Maggio", "num": 34
          LEFT: { "id": "0034AD5", "status": "r" },
          RIGHT { "id": "0034BF2", "status": "r" }
        },
        {
          "name": "Joseph White", "num": 23
          LEFT: { "id": "0034F54", "status": "r" },
          RIGHT { "id": "0034F2B", "status": "r" }
        }
      ]
    },
```
```
    "HomeTeam": {
      "name": "Ravens",
      "code": "ATL",
      "playerList": [
        {
          "name": "John Pecci", "num": 9
          LEFT: { "id": "0034344", "status": "r" },
          RIGHT { "id": "0034BAA", "status": "r" }
        },
        {
          "name": "Ron Cavali", "num": 54
          LEFT: { "id": "0034FD8", "status": "r" },
          RIGHT { "id": "00341F0", "status": "r" }
        }
      ]
    }
  }
]
```

The team registration data is preferably received and stored or is otherwise accessible to the local data storage 514 through a wireless connection for convenience, but may be downloaded through wired connection or portable media.

At block 1105, the tag manager (e.g. tag manager 512 as shown in FIG. 5) may receive the registration data from local data storage 514. The tag manager 512 stores, in some examples, the registration data for use in tag (e.g. tag 102 as shown in FIG. 5) activation, deactivation, status monitoring, and replacement. The tag manager 512 maintains a current registration data and notation of manipulated tag data entries, as discussed in FIG. 5.

At block 1106, additional participants may be added to the registration data. Preferably tag 102 is registered in advance by creating registration file as discussed in FIG. 7, but a particular tag or participant may be added prior to the event (e.g. during the season), during the event or at any time. In an instance in which the tag 102 has not been registered prior to the creation of the event registration data, new tags 102 may be added to each player added to the roster, but has not been associated with tags. The additional participant is added by generating registration data, for example as discussed in FIG. 7, and the additional registration data is received and synchronized to both the event registration data and the registration data. The tags 102 may be attached and registered alone or may be combined with 1108 to activate at completion of registration. Once the registration data and event registration data have been updated for the new player participant, the tag manager 512 may attach and/or correlate the tags 102, for example as discussed in FIG. 7.

Figure 12:
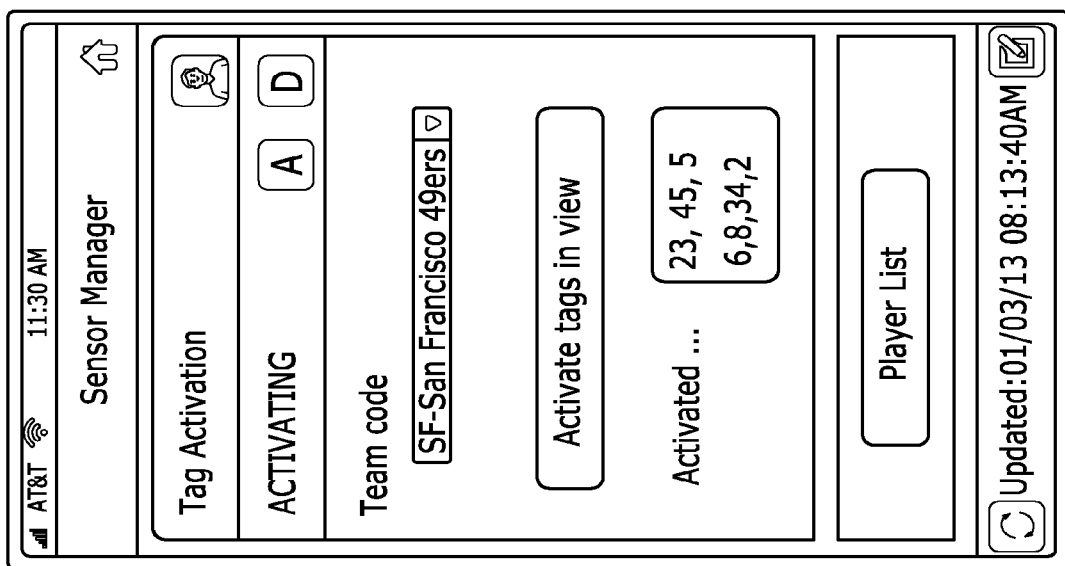

At block 1108, the player and object tags (e.g., tags 102 on said player or object) may be activated with use of the RF wand (RF wand 511 as shown in FIG. 5) or other signaling means (e.g., a portal, RF activation pad, a fixed wand, or the like). Prior to the beginning of the event, preferably prior to players dressing out, tags 102 are activated, such as by the RF wand 511. On the tag manager 512 "tag activation" may be selected from the function menu. The tag activation menu may allow the user to select active or deactivate by selecting "A" or "D". Activating, in some examples, may cause a green background and green activation button, as illustrated in FIG. 12. Deactivation may change the background and button, in some examples, to red to alert the user that they are about to deactivate tags.

At block 1110, the tag manger may receive a tag status change indication. The RF wand 511 in communication with the tag manager 512 may detect the tag status change to active, e.g. transmitting blink data, tag status change may be detected by one or more receivers (e.g. receivers 106 as shown in FIG. 1), and/or the like. The tag manager 512 may correlate the tag UID to the tag-individual correlator of the registration data. The RF wand 511 may detect tag discrepancies such as low battery, or failure to respond and/or the like, and displays the discrepancy on the display of the tag manager 512. Tags 102 may be replaced, repaired, and/or new tags 102 registered as necessary to ensure all participants have properly functioning tags. In an instance in which no discrepancies are detected the tag manager 512 updates the status of each activated tag 102 in the event registration data.

Figure 13:
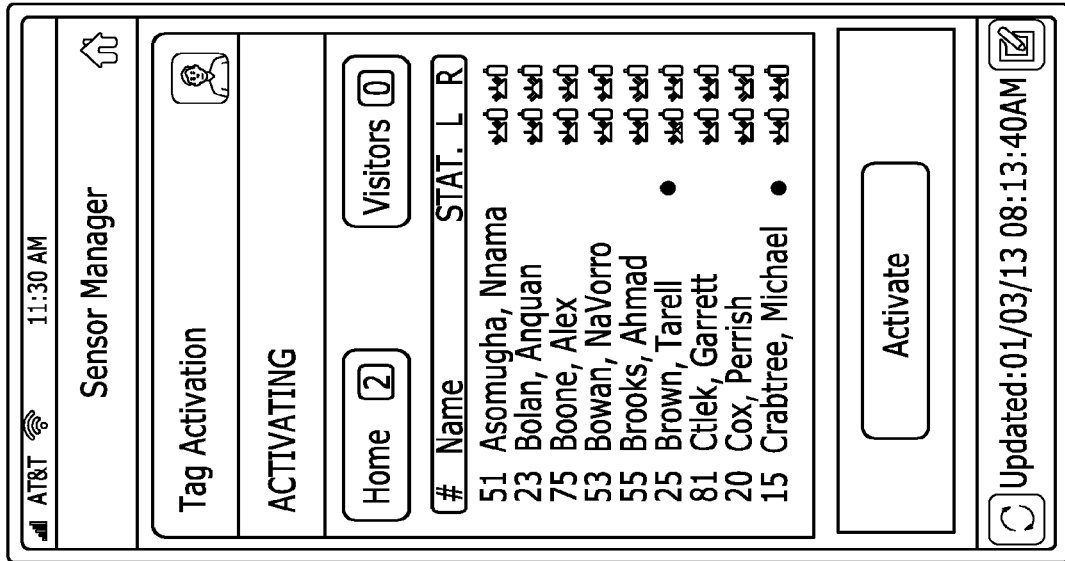
FIGS. 12-14, 16 illustrate exemplary embodiments of a tag manager display according to an embodiment of the present invention.
Figure 14:
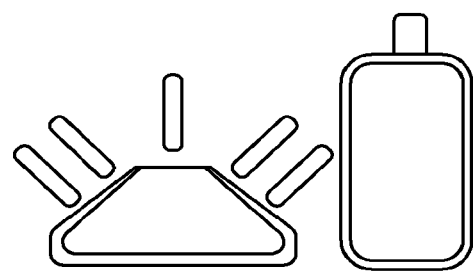

The player list view within the tag 102 activation function view, in some examples, may be selected as illustrated in FIG. 13. The player list view may show team status in the event registration data. The team status indicates in an instance in which there are any conditions that need to be resolved in connection to a tag 102 assigned to a player on that team. In an instance in which there is no deficient condition the team status may indicate zero and have a green background. In an instance in which there is a deficient condition the team status may indicate a number of deficiencies and have a red back ground, this allows for notification of deficient conditions when the player with the deficiency would not appear on the screen and must be scrolled to view. The player list comprises, without limitation, player number, player name, player tag status, left tag transmission, right tag transmission, and battery status, as illustrated in FIG. 14. In an instance in which there is any deficient condition the status column may indicate a red dot to alert the user of the player with the deficiency for further investigation. The left and right tag status columns indicate battery life and may, in some examples, be green in an instance in which above a predetermined value; yellow is lower than the first predetermined value and higher than a second predetermined value; red in an instance in which below the second predetermined value; and grey in an instance in which unknown (e.g. no battery data received). The tag transmission status may be indicated by a white tag with RF lines for transmitting, e.g. blinking, tags or a black tag without RF lines for a non-transmitting, e.g. non-blinking, or deactivated tag 102.

At block 1112, deficient tags 102 may be indicated as needing to be replaced, such as by a participant, an assistant, or the like. After the activation of the tags 102, in an instance in which a tag has a deficiency (e.g. low battery, not blinking, not able to communicate with the RF wand 511, blinking at incorrect rate, physical damage, not properly mounted to participant, lost or removed from participant, tag identification removed or illegible, tag already attached with same or different player, tag status "damaged," or the like) is noted, the user may use the tag replacement function to indicate a tag is to be replace the tag (e.g., by causing a transmission to an equipment manager) and further flag the need for an update the event registration data and/or monitor for a new tag in the monitored area. The detection and replacement of deficient tags 102 may occur at activation, during the event, or at de-activation. A new tag 102 may be mounted in the location of the deficient tag. The old tag 102 may be removed or left in place to be repaired at a later time.

Figure 16:
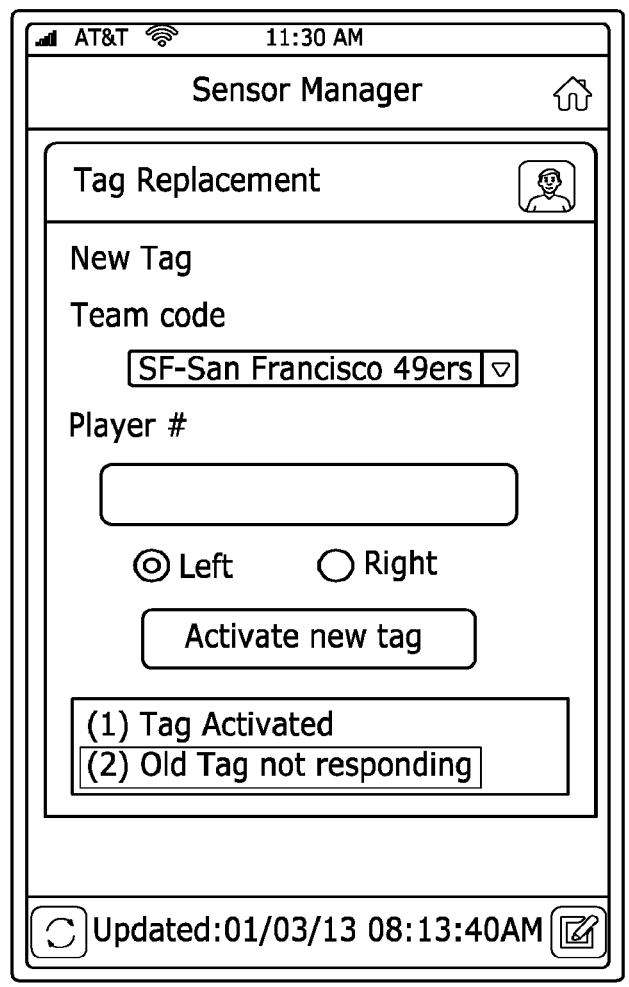

One example interface for swapping a tag 102 may include a selectable team name on the tag replacement window on the tag manager 512 (e.g., to filter), as illustrated in FIG. 16. Said interface may include an input box for a player number. The location of the tag 102 may be selected, e.g. left or right shoulder, helmet, or the like. The RF wand 511 or other activation/deactivation device may be used to send and receive an activation signal, receive tag status change indication, and correlate the tag new tag UID with the tag-individual correlator data of the registration file as discussed in 1108 and 1110. After the tag manager detects the new tag 102, "activate new tag" may be selected. The tag manager 512 may activate the new tag 102 and deactivate the old tag. The tag manager 512 may display the status of the old tag 102 and new tag in a tag status field, which may be specific to the player and location selected. Once the replacement is completed the tag manager 512 may update the event registration data and/or the registration data in the local data storage 521.

At block 1114, the local data storage 521 may receive the registration data from the tag manager 512. The tag manager 512 may, in some examples, record a transaction in the appropriate registration data for each tag 102 assignment, tag activation, tag deactivation, tag replacement, and new player added. The tag manager 512 may upload the registration data through a wireless connection with the local data storage in an instance in which connectivity is available. In an instance in which connectivity is not available the tag manager 512 may upload the registration data through a wired connection to the local data storage 514 or may store the data until a connection is available. The received registration data is synchronized or otherwise updated with the registration data stored in the local data storage 514 or registration database 544.

At block 1116, the tags 102 may be deactivated and the tag manager 512 may receive status change indication with the RF wand 511, indicating the tags are deactivated. In order to deactivate the tags, a "tag deactivation" may be selected from the function menu on the tag manager 512. The tag activation menu may allow the selection of active or deactivate tags 102 by selecting "A" or "D". The tag 102 or tags that may be in view of the RF wand 511 appear on the deactivation screen and deactivation is commenced, in some examples, by selecting "Deactivate tags in view" or automatically after a predetermined time period.

In some examples, a warning message may be displayed to warn the user that they will be deactivating tags 102 and in an instance in which they wish to continue, to prevent inadvertent deactivation. In an instance in which "yes" is selected, the tag manager 512 sends a signal through the RF wand 511 to deactivate each tag 102 (e.g. terminate blink transmissions). In some example embodiments, the tag 102 may transmit a deactivation signal which may be received by the RF wand 511. In an instance in which "no" is selected, the sensor menu returns to the deactivation menu. FIG. 17 illustrates a flowchart of an exemplary process for initialization of the system (e.g. system 500 as shown in FIG. 5). At block 1702, power is initialized to the receiver hub (e.g. receiver hub 108 as shown in FIG. 1). The power may be initialized by switch, plug, or computer program. The receiver hub 108 may detect system configuration settings and detect receiver hub status during initialization.

Figure 18:
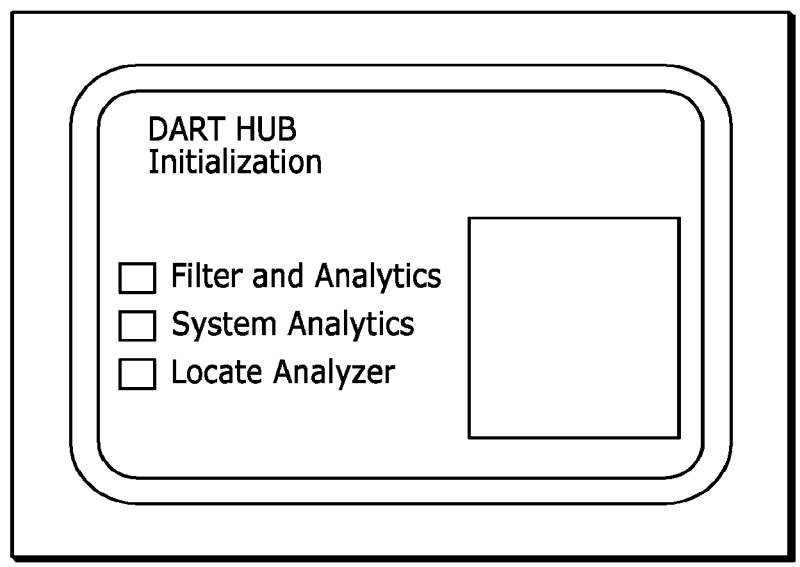
FIG. 18 illustrates an exemplary embodiment of an initialization display according to an embodiment of the present invention.

At block 1704, a GUI (e.g. event location GUI 516 and/or support and diagnostics GUI 532 as shown in FIG. 5) may be initialized and/or otherwise caused to display system initialization status. An example GUI may cause the display of a general status the system and/or of each subsystem as it initializes, such as the filter and analytics, locate analyzer (receiver hub), or the like. The example GUI may also indicate a status icon color to indicate the status of a system during initialization on an initialization display as illustrated in FIG. 18. For example, Green may indicate fully initialized and ready, yellow may indicate currently initializing with no detected errors, and red may indicate errors detected. The example GUI may indicate the diagnostic errors or tag derived data D-packets in a window in the initialization display.

Figure 19:
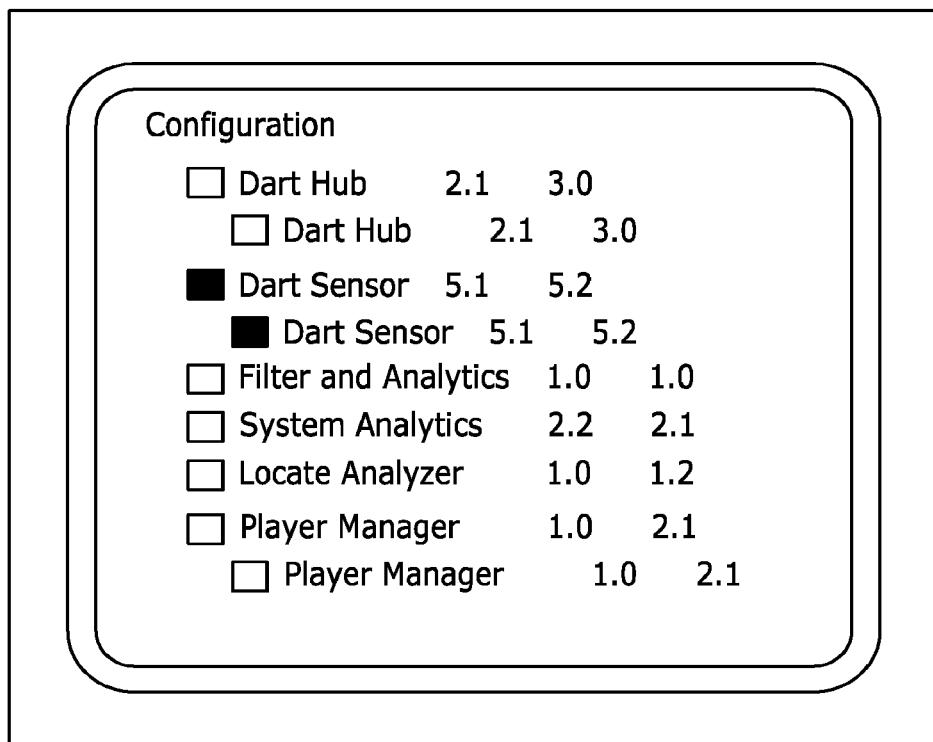
FIG. 19 illustrates an exemplary embodiment of a configuration display according to an embodiment of the present invention.

Alternatively or additionally, the example GUI may also cause the display of the configuration data for each subsystem as illustrated in FIG. 19, on a configuration display and/or a visual indication of system status.

At block 1706, the receiver hub 108 detects participant tags 102 configuration and status. The receiver hub 108 may receive blink data from each tag that may include a tag UID. As is described herein, tag UID or other tag identified may be compared to the tag-individual correlator data of the registration data to determine in an instance in which all tags 102 are detected and/or whether each of the known participants is detected. The receiver hub 108 may compare tag location data T-packets to the tag list, to determine in an instance in which all tags 102 have been located, are active, and are not indicating an error or are otherwise not functioning correctly.

Various tag derived data D-packet or diagnostic packets may be output by the receiver hub 108 during participant tag 102 initialization. The tag derived data D-packets that may be received during participant tag 102 initialization comprise, without limitation and in some examples:

No Sensor detected—D,0,0,0,0,0,timestamp,DpacketID, 'Error: no receiver detected'—Sent continuously until the error condition is cleared.

No Sensor enabled—D,0,0,0,0,0,timestamp,DpacketID,'Error: no receiver enabled'—Sent continuously until the error condition is cleared.

No Sensor activated—D,0,0,0,0,0,timestamp,DpacketID, 'Error: no receiver' Sent continuously until the error condition is cleared.

Enabled Sensor detected—D,sen #,x,y,z,0,timestamp, DpacketID,'Enabled receiver detected'—The packet will be sent only once after a receiver hub firmware restart.

Enabled Sensor not detected—D,sen #,x,y,z,0,timestamp, DpacketID,'Warning: Enabled receiver not detected'—The warning packet will be sent only once after a receiver hub firmware restart.

Unknown Sensor detected—D,senID,0,0,0,0,timestamp, DpacketID,'Warning: unknown receiver'—This warning packet will be sent only once upon the detection after a receiver hub firmware restart.

The tag derived data D-packets may be parsed into D-packet objects comprising, without limitation, sensor/tag ID, float x, float y, float z, reference tag ID, time, D-packet ID, character message, or the like. The tag derived data D-packet objects may be processed by updating a tag status and/or the like.

Tag location data T-packets may be output by the receiver hub 108 comprising location data for a tag. Tag derived data P-packets may be output by the receiver hub 108 comprising a tag UID detected information, but no location data. A tag derived data P-packet occurs when a tag location cannot be determined, for example in an instance in which less than three receivers, e.g. receivers 106 as shown in FIG. 1, have detected the tag blink transmission.

At block 1708, the receiver hub 108 may detect configuration and status for the one or more reference tags (e.g. reference tag 104 as shown in FIG. 1). The receiver hub 108 may receive blink data from each of the one or more reference tags 104. Similar to tags 102, blink data from reference tags 104 may include a tag UID which may be compared to the tag-individual correlator in the registration data to determine in an instance in which all tags 104 are being detected. The receiver hub 108 may be configured, in some examples, to verify each reference tag 104 is properly configured e.g. blinking at the correct rate. Tag location data T-packets are output from the receiver hub 108 for available reference tags 104 for which a location has been calculated. Reference tag locations and/or phase offset may be suspended (e.g. stored in memory) in some examples. A tag derived data P-packet, tag identification, or tag UID without a location data may be output in an instance in which a tag 102 location cannot be determined, for example less than three receivers 106 have detected the tag blink transmission.

In an example embodiment in which the receiver hub establishes suspended reference phase offsets, the receiver hub may receive reference tag blink data, calculate a reference phase offset for each reference tag to receiver pair, as described in FIG. 1, and generate a suspended reference phase offset table which is stored to memory and used for subsequent tag location calculations. Further examples of establishing a suspended reference phase offset are described in commonly owned U.S. Provisional Patent Application 62/008,298 filed on Jun. 5, 2014 which is incorporated herein in its entirety.

Various tag derived data D-packet may be output by the receiver hub 108 during reference tag 104 initialization. The D-packets that may be received during reference tag initialization comprise, without limitation, No reference tag enabled—D,0,0,0,0,0,timestamp,DpacketID,'Warning: no reference tag enabled'—Reference tag not found.

No virtual group enabled—D,0,0,0,0,0,timestamp,DpacketID,'Warning: no virtual group enabled' This warning packet will be sent once after a receiver hub firmware restart.

At block 1710, the receiver hub 108 may detect that virtual groups are configured. A virtual group may be a group of receivers 106, e.g. three or more receivers, which have been defined by the receiver hub 108 as a zone within the monitored area, as described in the commonly owned U.S. Pat. No. 7,710,322 filed Jan. 13, 2006 which is incorporated herein in its entirety. In some embodiments virtual groups may overlap, e.g. one or more receivers may be assigned to two or more virtual groups. The receiver hub 108 may detect the assignment configuration of the receivers to each virtual group.

FIG. 20 illustrates a flowchart of an exemplary process of receiver hub (e.g. receiver hub 108 as shown in FIG. 1) operations. At block 2002 the receiver hub 108 may receive the participant tag blink data for all active receivers (e.g. receivers 106 as shown in FIG. 1).

At block 2004, the receiver hub 108 may determine an identification of and a location for reference tags (e.g. reference tags 104 as shown in FIG. 1). The receiver hub 108 may receive a reference tag blink data from one or more active receivers 106. The receiver hub 108 may receive the time stamp for each tag (e.g. tag 102 as shown in FIG. 5) for each active receiver 106. The receiver hub 108 may determine in an instance in which any reference tags 104 are not detected by any of the active receivers 106. At block 2006, the receiver hub 108 may calculate the tag 102 location which is described in additional detail in FIGS. 1-4. In some example embodiments, the reference tag 104 may be received by a subset of the receivers 106, such as by a virtual group.

In an instance in which the receiver hub 108 has calculated a location data for a tag 102 a tag location data T-Packet may be output to various subsystems including, but not limited to the filter and analytics engine (e.g. filter and analytics engine 515 as shown in FIG. 5), support and diagnostics engine (e.g. support and diagnostics engine 513 as shown in FIG. 5), or the like. In an instance in which the receiver hub 108 has insufficient tag data to calculate a tag location, such as less than three receivers 106 detecting tag blink data, a tag derived data P-Packet may be output to various subsystems.

Figure 21:
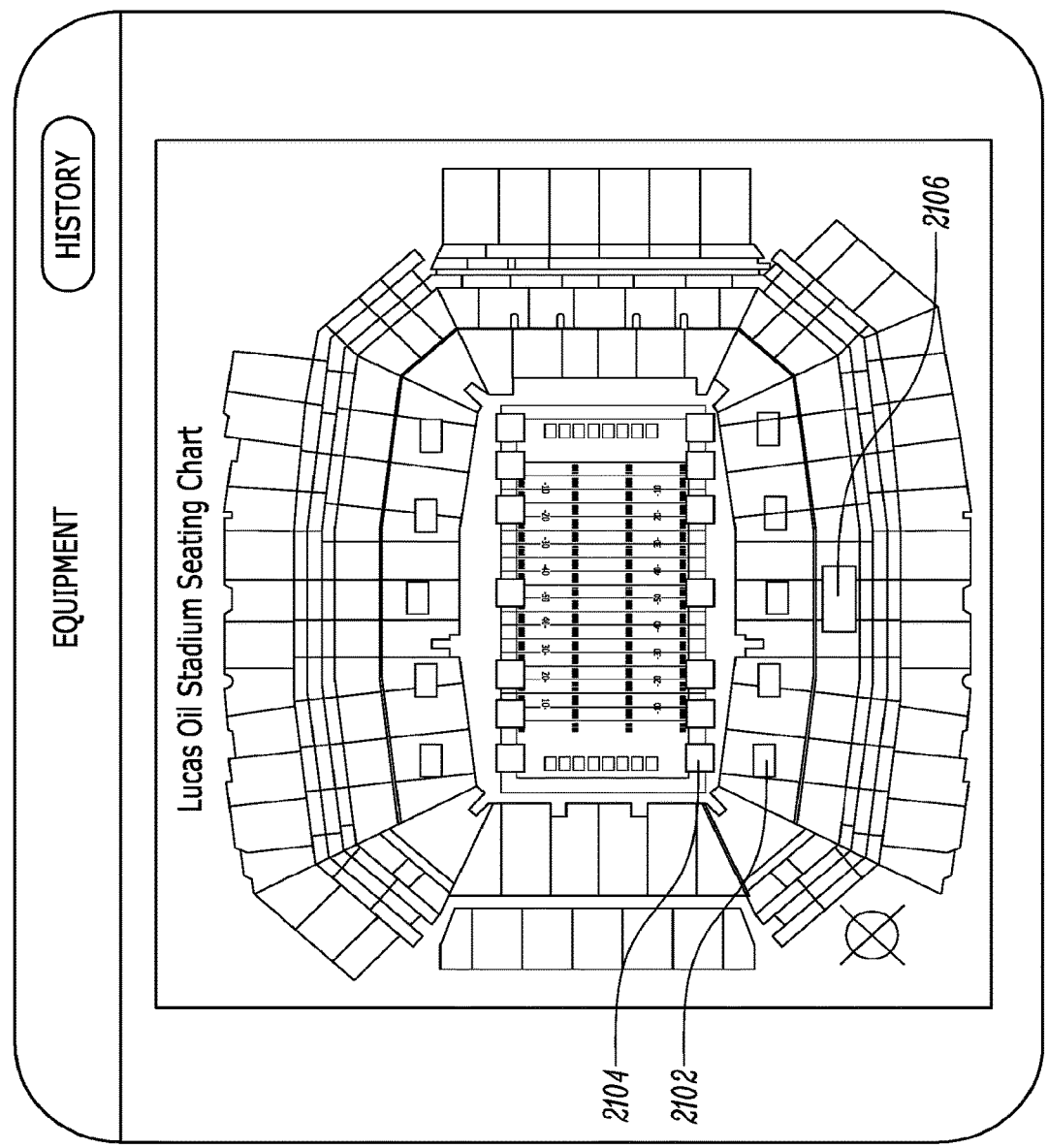
FIG. 21 illustrates an exemplary embodiment of an equipment status display according to an embodiment of the present invention.

At block 2008, the receiver hub 108 may determine receiver status and cause display of receiver status 2102 on the GUI (e.g. event location GUI 516 and/or support and diagnostic GUI 532 as shown in FIG. 5) on an equipment status display, as illustrated in FIG. 21. The receiver hub 108 may determine that the receiver 106 is properly communicating by checking for data transmission times, based on a receiver time stamp. Further the receiver hub 108 may compare the number of reference tags 104 detected by each receiver to a predetermined value, threshold, or the like. An indication of the receiver status 2102 may be overlaid, in an example GUI 516/532, on the approximate position of the receiver 106 on a stadium map. In an instance in which the data transmission or number of reference tags 104 detected does not satisfy a predetermined value, e.g. is below said threshold, the receiver status 2102 may be green. In an instance in which the data transmission time, for example, exceeds a predetermined value the receiver status 2102 may be yellow. In an instance in which the receiver 106 is not detecting a reference tag 104 a visual notation may be made next to the indicated receiver. The notation may take the form of the number or tag UID of the reference tag 104 that is not being detected or the number of reference tags not detected.

At block 2009, the receiver hub 108 may also determine receiver hub status 2106 and cause a display of receiver hub status on a GUI 516/532. An indication of receiver hub status 2106 may be overlaid on the approximate position of the receiver hub 108 on a stadium map. In an instance in which the receiver hub 108 is functioning properly the receiver hub status 2106 may indicate green. In an instance in which the receiver hub is not functioning properly, e.g. system configuration errors detected, the receiver hub status 2106 may be indicated as red or some other visual indication that indicates a malfunction, error or the like.

At block 2010, the receiver hub 108 may determine reference tag status 2104 and cause reference tag status to be displayed on the GUI 516/532, as is illustrated in FIG. 21. The receiver hub 108 may determine that the reference tag 104 is properly functioning by verifying the receivers 106 are detecting the particular reference tag. An indication of the reference tag status 2104 is overlaid, in some examples, on the approximate position of the reference tag 104 on a stadium map. In an instance in which the reference tag 104 is being detected by at least a predetermined number of receivers 106 the reference tag status 2104 may be indicated as green. In an instance in which the reference tag 104 is not detected by at least a predetermined number of receivers 106, the reference tag status 2104 may be indicated as red. Other errors, such as communication errors or the like may also be indicated using a visual indication, such as a color.

The receiver hub 108 may also verify that the reference tag 104 battery life. When a reference tag 104 battery life satisfies a first predetermined value the tag may send a "battery ok" data as part of the blink transmission. In an instance in which the battery life does not satisfy the first predetermined value but satisfies a second predetermined value the tag may send a "battery low" data as part of the blink transmission. In an instance in which the battery does not satisfy the second predetermined value the reference tag 104 may send a "battery critical" or "battery dead" data as part of the blink transmission. Alternatively, the tag 104 may send battery life data or an indication thereof (e.g., a flag bit) as part of the blink data and the determination of corresponding predetermined values may occur at the receiver hub 104 or other subsystem. A battery icon may be indicated adjacent to the reference tag status 2104 and indicate the battery status by color. In an instance in which the battery life satisfies a first predetermined value the reference tag 104 battery life icon may indicate or otherwise be presented as green. In an instance in which the battery life does not satisfy the first predetermined value, but satisfies the second predetermined value the reference tag battery life icon may indicate yellow. In an instance in which the battery life does not satisfy the second predetermined value the reference tag battery life icon may indicate red.

At block 2012, the receiver hub 108 may determine participant tag 102 status and cause the participant tag status to be displayed on the GUI 516/532 on a player equipment status display, as illustrated in FIG. 22. A tag 102 status may be indicated on a player roster or equipment roster screen. A player roster screen may indicate, without limitation, player number, player name, player position, status warning, tag transmission status, tag battery life status, tag location status, or the like for each player and tag 102.

The receiver hub 108 may determine the participant tags 102 are properly functioning by verifying the receivers 106 are detecting the participant tag 102 blink transmissions. The GUI 516/532 may provide an indication of properly blinking tag 102 with a green tag blink status icon. In an instance in which a tag 102 blink transmission has not been received for a first predetermined time value (e.g. 2 seconds) the participant tag blink status icon may indicate yellow. In an instance in which the blink transmission has not been received for a time exceeding a second predetermined time value (e.g. 5 seconds) the participant tag blink status icon may indicate red.

The battery life of a participant tag 102 is determined in the same or similar manner as a reference tag 104 as discussed above at block 2010. The tag 102 battery life status icon may indicate green for charged (e.g., having a charge above a threshold) or normal, yellow for low battery, and red of critical or dead battery. In an instance in which battery data is not available the battery status icon may indicate grey.

The receiver hub 108 may determine location status by comparing the last location time to predetermined time values. In an instance in which the receiver hub 108 has a current location or the location data time has not satisfied a first predetermined value the participant tag location status icon may indicate green. In an instance in which the location time satisfies a first predetermined time value (e.g. 2 seconds since last locate), the participant tag location status icon may indicate yellow. In an instance in which the location time satisfies a second predetermined time value (e.g. 5 seconds since last locate), the participant location status icon may indicate red.

The status warning indication is normally white, in an instance in which there are no deficiencies detected with the participant tags 102, in an instance in which all status icons indicate green. In an instance in which a participant tag 102 has a deficiency indicated by a status icon of red, yellow, or grey, the status warning icon indicates red. The red color of the status warning indicator draws attention to the participant for further evaluation of the participant tags 102.

At block 2014, the receiver hub 108 may determine system status over time and may cause the system status data to be stored in a memory for later evaluation or use by other subsystems. The receiver hub 108 may also cause the system status data to be displayed on the GUI 516/532 for a player tag status history or an equipment status history. The player tag status history as illustrated in FIG. 23 may indicate, without limitation, team name, player number, player position, home or away status, event period, blink status, location status, battery life status, or the like. The tags 102 associated with a player or participant may be indicated by a horizontal bar. The GUI 516/532 may be configured to plot (e.g., in a linear graph) the tag 102 status at a predetermined interval (e.g. 5 seconds). A user may select the time period to view by selecting an event period, such as a quarter in American football. A user may select what tag status data is displayed by selecting battery, location, blink, or the like. The status indication bar may indicate the color of the status icon discussed above at each plotted time. The GUI 516/532 may also display one or more alerts. In further examples, the GUI 516/532 may report a status of any exceptions or any other relevant information, such as shoulder distance, an indication of a fallen tag (e.g., one tag is still moving, while a pair tag remains stationary) and/or the like.

Figure 24:
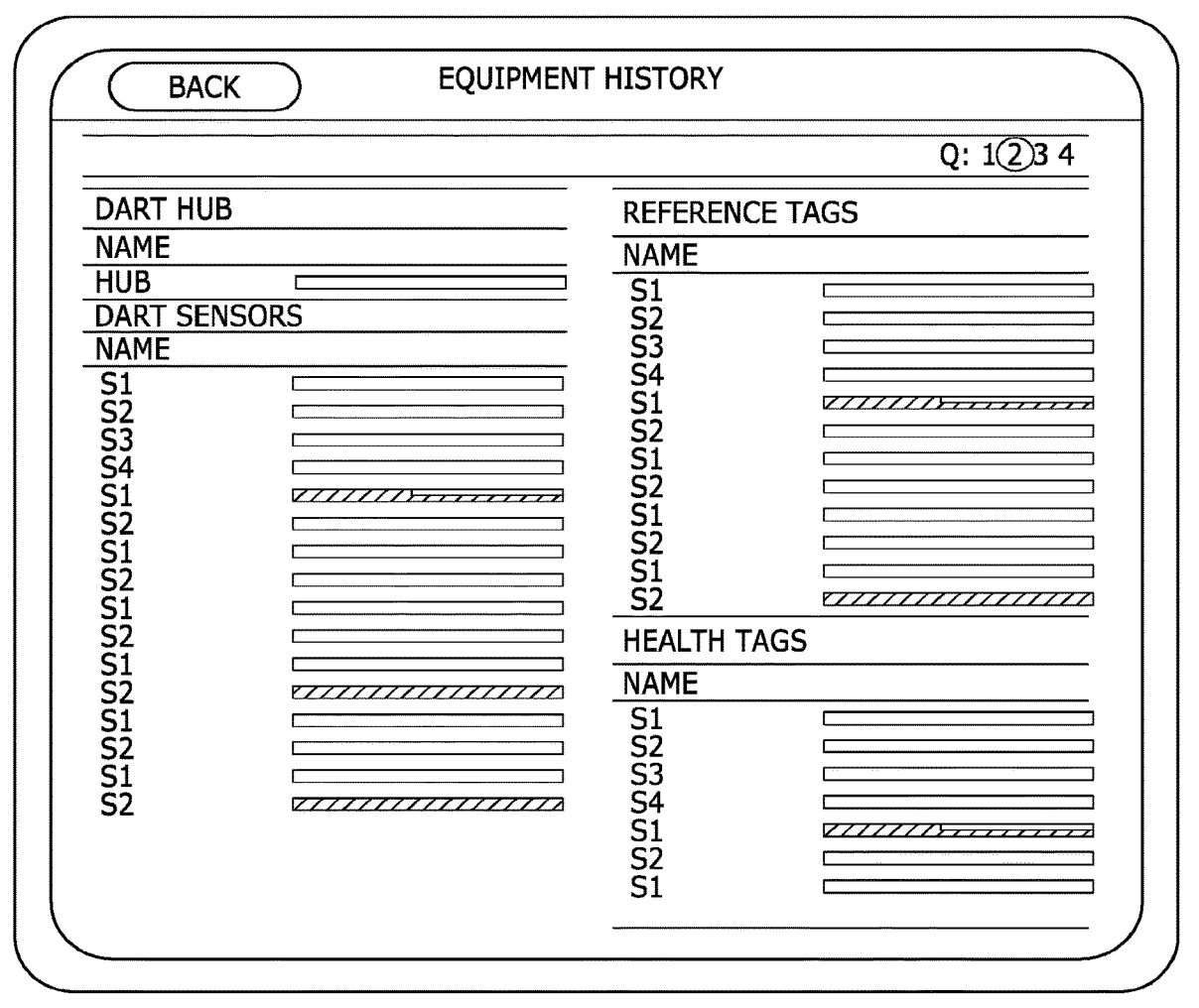

The equipment status history, such as the example history in FIG. 24, may indicate, without limitation, receiver hub 108 status, receiver 106 designations, receiver status, reference tag 104 designations, reference tag status, and/or other sensor information and/or status event period, or the like. An example equipment status is indicated by a horizontal bar. The GUI 516/532 plots the equipment status at a predetermined interval (e.g. 5 seconds). A user may select an event period to view by selecting an event period. The equipment status information may be selected for each equipment type, as discussed above, such as battery life, location or blink status for a reference or health tag.

Process for Delivering Packet Data to GUI Subsystems

FIG. 25 illustrates a flowchart of an exemplary process delivering packet data to GUI 516/532 subsystems. At block 2502, the receiver hub (e.g. receiver hub 108 as shown in FIG. 1) outputs tag location data T-packets, tag derived data P-packets, and tag derived data D-packets and initialization tag derived data D-packets to the GUI (e.g. event location GUI 516 and/or support and diagnostics GUI 532 as shown in FIG. 5).

At block 2504, the GUI 516/532 is updated based on the operation tag location data T-packets and tag derived data P-packets. In some examples, the player roster status screen, equipment status history display and player status history display may be updated. The GUI 516/532 may also indicate that the operation tag location data T-packets and tag derived data P packets to the diagnostics and alerts interface. In some examples, the diagnostics and alerts interface provides a notification of detection of tags, receivers, etc. description of the one or more tags 102, activity of the tags or the like, notification of one or more alerts, etc. and/or an indication of a resolution.

At block 2505, the diagnostics and alerts interface sends text, email, short message service (SMS), or other notification status updates of a change to player dynamics, diagnostic error codes, or the like. Alerts based on a change to player dynamics may be used in an instance in which the player participant is equipped with multiple tags, and may include without limitation, change to speed or gate, non-linear travel (e.g. stumbling or weaving), or the like. Diagnostic codes as discussed in FIGS. 17 and 20 may be sent to the diagnostics and alerts interface for support personnel to resolve and report correction.

At block 2506, the GUI 516/532 selects the initialization tag derived data D-packets and updates the system initialization status display and the configuration status display as discussed above at blocks 1706 and 1708 of FIG. 17.

At block 2108, operation tag derived data D-packets update the equipment status display and the equipment status history display as discussed above at blocks 2008, 2009, 2010, and 2012 of FIG. 20.

In some examples, one or more administrative displays may be used for configuration setting, health settings or the like. A CPU reserve display may be provided to display the available CPU availability. The CPU display may indicate digital readout of the percent of CPU available for additional processing. The CPU display may indicate as analog style meter display of the range of CPU validity (e.g. 0-100%).

Example Apparatus

Figure 26:
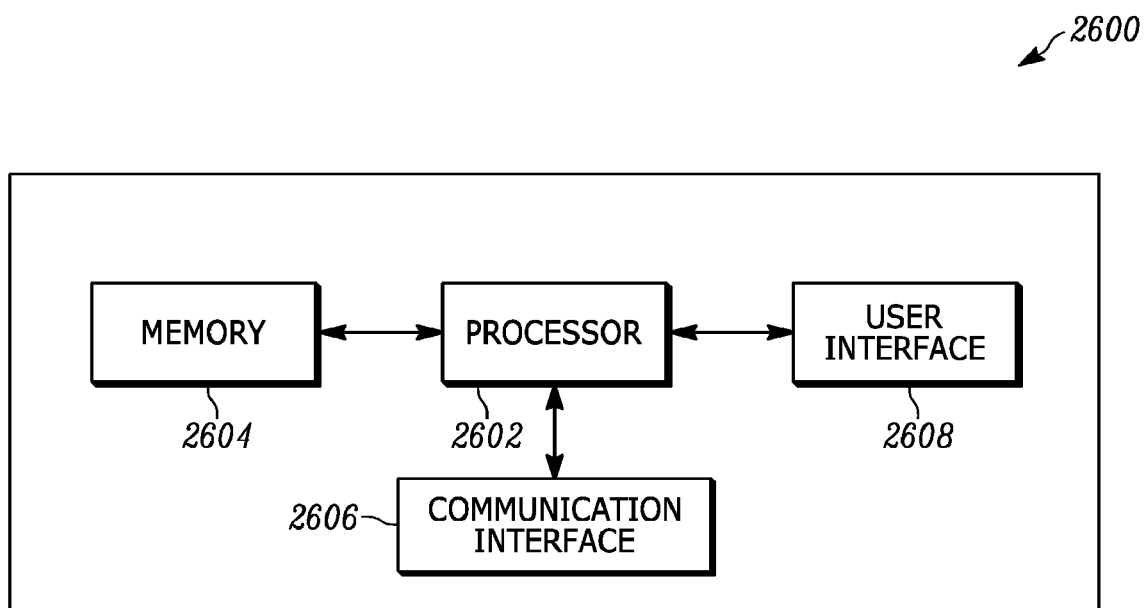
FIG. 26 illustrates a block diagram of components that may be included in an apparatus that may determine play events according to an embodiment of the present invention.

FIG. 26 shows a block diagram of components that may be included in an apparatus 2600 is configured to collect and display sporting event data based on real time, or near real time data for proximity and movement of objects in accordance with embodiments discussed herein. The apparatus 2600, may be embodied in or otherwise associated with the receiver hub 108, receiver processing and distribution system 101/510/3800, performance and analytics system 300/3900. In some examples, apparatus 2600 may be embodied by or enable operation of one or more blocks as described herein. Apparatus 2600 may comprise one or more processors, such as processor 2602, one or more memories, such as memory 2604, communication circuitry 2606, and user interface 2608. Processor 2602 can be, for example, a microprocessor that is configured to execute software instructions and/or other types of code portions for carrying out defined steps, some of which are discussed herein. Processor 2602 may communicate internally using data bus, for example, which may be used to convey data, including program instructions, between processor 2602 and memory 2604.

Memory 2604 may include one or more non-transitory storage media such as, for example, volatile and/or non-volatile memory that may be either fixed or removable. Memory 2604 may be configured to store information, data, applications, instructions or the like for enabling apparatus 2600 to carry out various functions in accordance with example embodiments of the present invention. For example, the memory could be configured to buffer input data for processing by processor 2602. Additionally or alternatively, the memory could be configured to store instructions for execution by processor 2602. Memory 2604 can be considered primary memory and be included in, for example, RAM or other forms of volatile storage which retain its contents only during operation, and/or memory 2604 may be included in non-volatile storage, such as ROM, EPROM, EEPROM, FLASH, or other types of storage that retain the memory contents independent of the power state of the apparatus 2600. Memory 2604 could also be included in a secondary storage device, such as external disk storage, that stores large amounts of data. In some embodiments, the disk storage may communicate with processor 2602 using an input/output component via a data bus or other routing component. The secondary memory may include a hard disk, compact disk, DVD, memory card, or any other type of mass storage type known to those skilled in the art.

In some embodiments, processor 2602 may be configured to communicate with external communication networks and devices using communications circuitry 2606, and may use a variety of interfaces such as data communication oriented protocols, including X.25, ISDN, DSL, among others. Communications circuitry 2606 may also incorporate a modem for interfacing and communicating with a standard telephone line, an Ethernet interface, cable system, and/or any other type of communications system. Additionally, processor 1202 may communicate via a wireless interface that is operatively connected to communications circuitry 2606 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1× EV-DO, GPRS, W-CDMA, LTE, and/or any other protocol.

The apparatus 2600 may include a user interface 2608 that may, in turn, be in communication with the processor 2602 to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 2604, and/or the like).

Figure 27:
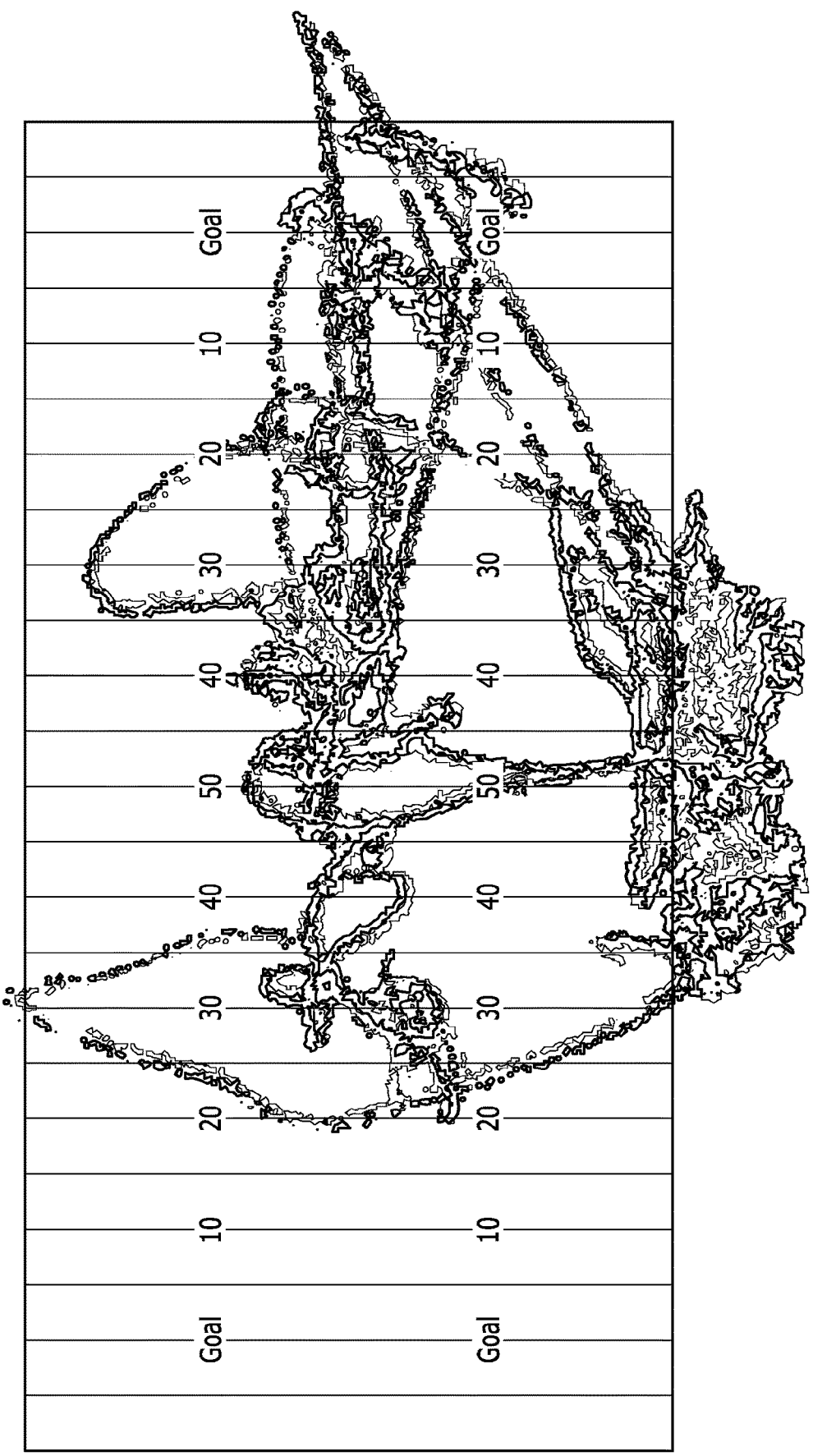
FIG. 27 illustrates an example field event rendering of multidimensional player location data per unit time for an event according to an embodiment of the present invention.

FIG. 27 illustrates an example field event rendering of multidimensional player location data per unit time for an event according to an embodiment of the present invention. The multidimensional player location per unit time depicted may be an entire or significant portion of an event without filtering as discussed in FIG. 29.

FIG. 28 illustrates a flowchart for an exemplary process of data flow through a filter and analytics engine. At block 2802 blink data is received from one or more tags (e.g. tags 102 as shown in FIG. 1) by a receiver hub (e.g. receiver hub 108 as shown in FIG. 1). The receiver hub 108 outputs tag location data T-packets and tag derived data D-packets. The tag location data T-packets may comprise, without limitation, packet type, tag UID, X/Y/Z location coordinates, battery life, ID Unit data quality index (DQI), RTLS error rate (e.g. bit error rate), end-of-life (EOL), or the like. The receiver hub 108 may send the tag location data T-packets and tag derived data D-packets to a filter and analytics engine (e.g. filter and analytics engine 515 as shown in FIG. 5).

At block 2804 the filter and analytics engine 515 may create a raw data file. A raw data file may contain all of the tag derived data D-packets and tag location data T-packets for a predetermined period of time (e.g. 20 sec).

At block 2806, the filter and analytics engine 515 the filter and analytics engine may cause the raw data file to be stored in a data storage, a remotely accessible storage or local data storage (e.g. the data storage 542 and local data storage 514 as shown in FIG. 5). The raw data may be stored in data storage 524 for later analysis of the tag location data or for system diagnostics. The raw data may be stored as a complete file, as smaller time increments (e.g. 1 sec files), stored by tag, stored by participant, or the like. At block 2808, the raw data file is received from the data storage 514 by the filter and analytics engine 515. The raw data file may be retrieved during the event or at a later time for analysis.

At block 2810, the filter and analytics engine 515 may parse the tag derived data D-packets and tag location T-packets. The filter and analytics engine 515 may route data packets for processing based on status as a tag location data or diagnostic tag derived data. The filter and analytics engine 515 may send the tag derived data D-Packets to a support and diagnostics engine (e.g. support and diagnostics engine 513 as shown in FIG. 5). The filter and analytics engine 515 may parse the text data of each tag location T-packets.

At block 2812, the filter and analytics engine 515 may classify the tag location data. The filter and analytics engine 515 may correlate tag location data to a tag identifier in registration data based on the tag-individual correlator; creating a tag event. A tag event may comprise, without limitation, tag identifier, x and y coordinates, time, battery life, DQI, RSSI, or the like. After the filter and analytics engine 515 creates a tag event, the filter and analytics engine may filter the tag event data at block 2816.

Optionally, at block 2814, the filter and analytics engine 515 may process tag events in parallel by processing tag event data as a predefined unit of work. The filter and analytics engine 515 determines a unit of work or predetermined unit time of accumulated tag event data (e.g. one second). A unit of work may include all tag events for the unit of time for both the left and right shoulder tag for a player. The average time, for example two seconds, may require the next unit of work to include blink data events from the previous unit of work.

At block 2816, the filter and analytics engine 515 creates multidimensional player location information per unit time. The multidimensional player location information per unit time may contain the last predetermined number of tag events (e.g. 20, 100, or the like) for each tag. The multidimensional player location information per unit time may have a searchable hierarchy. The hierarchy may comprise a map of all tag event data, a list of all participants by tag code, a tag event list for each tag, a tag event, and participant data.

At block 2817, the filter and analytics engine 515 calculates the filtered multidimensional player location information per unit time. The filter and analytics engine 515 may process and adjust for missed tag event blinks, filters pops, stabilizes jitter, player head direction, or the like and dismisses compromised accuracy as discussed in further detail in FIG. 29. The filter and analytics engine 515 may determine that a tag location data accuracy for a tag event is compromised and dismiss the tag event blink from the multidimensional player location information per unit time when the DQI fails to meet a predetermined value, RSSI fails to meet a predetermined value, a tag derived data D-packet has been received for the tag 102, or the like. In an instance in which a tag location data is dismissed the tag event may be processed as a missed tag event blink. The filter and analytics engine 515 may process the multidimensional player location information per unit time as stream of tag events/multidimensional player location information or may process multidimensional player location information per unit time as a predefined unit of time. The filter and analytics engine 515 may calculate a adjusted multidimensional player location information per unit time from the filtered tag events creating a filtered multidimensional player location information per unit time. Additionally, the filter and analytics engine 515 may calculate participant metric data including, without limitation distance traveled maximum speed, average speed, or the like. The participant metric data may be per game, play event, or the like.

At block 2818, the filter and analytics engine 515 is configured to create a filtered data file. The filtered data file may contain all or a portion of the multidimensional player location information per unit time that has been processes by the filter and analytics engine 515 for a predetermined time period, as illustrated on a field event rendering visualization in FIG. 27. A field event rendering may be a depiction of an event field, such as a football field which includes multidimensional player location data per unit time. Additionally, the filter and analytics engine 515 may create a participant metric data file containing all or a portion of the metric data associated with a particular participant or group of participants for a predetermined period of time.

At block 2820, the filter and analytics engine 515 may cause the filtered data file to be stored in data storage 514/542. The filter and analytics engine 515 may also cause a participant metric data file to be stored in data storage 514/542. The filtered data file and or the participant metric data file may be retrieved from data storage 514/542 for later analysis, processing or system diagnostics. The participant metric data files may be associated by participant for later analysis of season or lifetime metrics.

At block 2822, the filter and analytics engine 515 reduces filtered multidimensional player location information per unit time. The filter and analytics engine 515 may associate the filtered multidimensional player location information per unit time for a player participant with filtered multidimensional player location information per unit time for other participants, for example by matching time stamps of tag events to create a reduced filtered multidimensional player location data per unit time.

At block 2824, the filtered data file or the participant metric data file may be received by a visualization and model engine (e.g. visualization and model engine 517 as shown in FIG. 5). The visualization and model engine could also receive alternative or additional reduced filtered multidimensional player location information per unit time from the filter and analytics engine 515. The visualization and model engine 517 may transfer tag coordinate data from the filtered multidimensional player location information per unit time or the reduced filtered multidimensional player location information per unit time file to a corresponding location on rendering or other visual indication of an event field.

The event field rending may comprise without limitation, a two dimensional graphic representation of the event field and participants locations, a three dimensional graphic representation of the event field and participant locations, time, game time, play count, play type, possession of object, tag code IDs, update time for tags 102, tag time without update, number of tags, tag errors by category, player names, player positions, or the like. The visualization and model engine 517 may create a visualization file for data storage and/or for display on a GUI, map, or dashboard (e.g. event location GUI 516 or support and diagnostics GUI 532). Additionally, participant metric data may be selected and entered into the visualization file from the participant metric data file on the GUI 516/532.

At block 2826, the visualization and model engine may cause the visualization file to be displayed on GUIs 516/532. At block 2828, the visualization and model engine may cause the visualization data file to be stored in data storage 514/542 for later analysis, display or system diagnostics.

Exemplary Process for Filtering and/or Analysis of Participant Location Data

FIG. 29 is a flowchart of an exemplary process for filtering and/or analysis of participant location data. At block 2902, the filter and analytics engine (e.g. filter and analytics engine 515 shown in FIG. 5) may determine tag events with compromised accuracy. In some cases, the filter and analytics engine 515 may dismiss selected tag events from further analysis. A dismissed tag event is treated as a missed tag event blink for the duration of the analysis. The filter and analytics engine 515 may determine a tag event is compromised in an instance in which the DQI satisfies a predetermined threshold, the RSSI satisfies a predetermined threshold, the RTLS error rate satisfies a predetermined threshold, the tag code check fails, e.g. error codes, or other tag blink data quality indicators. At block 2904, the filter and analytics engine 515 may calculate a tag data filter parameter, such as, tag blink period, blink distance span, and blink velocity. A blink period may be the time period between tag event blinks, e.g. 0.5 seconds, 1 second, 3 seconds, or any other time period. The blink distance span may be the difference in location between tag event blinks, e.g. the difference in calculated tag location between tag event blinks, such as 5 feet, 5 yards, 50 yards, or any other distance. The blink velocity may the difference in location between tag event blinks divided by the time period between tag event blinks, e.g. 5 yards per second, 10 yards per second, or other distance over time value.

At block 2906, the filter and analytics engine 515 may perform a blink period calibration in some examples. The filter and analytics engine 515 compares the time period between tag events to the blink rate or blink period. In some examples, in an instance in which the time period between tag events is greater than the blink period, the filter and analytics engine 515 calculates the number of missing tag event blinks.

At block 2908, the filter and analytics engine 515 may determine a missed tag event blink adjustment factor. The missed tag event blink adjustment factor is applied to affect the weight of the current and previous blink calculation of a participant location. In an instance in which there are no missed tag events blinks the current and previous tag events are weighted equally, such as at 50%. In an instance in which there are missing tag event blinks the current tag event is weighted higher than the previous tag event. In an instance in which there are a predetermined number of consecutive missed tag events (e.g. one second of blink data or 12 blinks) the previous tag event is discounted (e.g. weighted at 0%).

At block 2910, the filter and analytics engine 515 determines a pop blink adjustment factor. The filter and analytics engine 515 may compare the velocity of each tag event previous and current to a predetermined max velocity. In an instance in which the tag event velocity is greater than the predetermined max velocity, then an error may be determined. For example, in an instance in which a participant human being travels the length of a football field in under two seconds, the filter an analytics engine 515 may determine that the tag event velocity exceeds a the predetermined max velocity. In an example embodiment the determination of a pop blink may be performed after determining and dismissing tag events with compromised accuracy 2902, in such an instance the pop blink is considered to have compromised accuracy and is dismissed from further analysis, similar to a missed tag event blink.

At block 2912, the filter and analytics engine 515 determines a tag 102 to tag offset factor. At block 2914, the filter and analytics engine 515 may calculate the adjustment factors to each of the of the tag events. The filter analytics engine 515 may filter jitter from the location calculation by applying a weighted average to the current and previous four tag events.

At block 2916, the filter and analytics engine 515 may calculate a multidimensional player location information per unit time for each participant, as discussed in FIG. 1 using the adjusted location calculations for each player.

Alternatively or additionally, using a kinematic model of the tag/sensor motion for each tag, and a kinematic model for the player/object, allowed motion can be captured while restricting jitter and pop. The tag model may contain location (x,y), velocity (vx,vy), and acceleration (ax,ay). The tag model is not limited to these values, as it can have less or more dynamic parameters, in some example. The model parameters are limited based on the player object, such as has a maximum speed, and maximum acceleration, and a minimum locations change at low speed to allow for good static behavior (low or no jitter). The player model contains the same parameters as the tag model, but also, angle (a), angular velocity (v). The player model is not limited to these values, as it can have less or more dynamic parameters. The player model parameters are limited based on the player object, such as has a maximum speed. The limits can be different for each tag 102 and for the players. In addition, there are example constraints at player level, that may affect the tag model, such as relative tag location. For example, as shoulder width when two tags are mounted on a player shoulder pads.

In some examples, a player location is derived from the tag location, and this becomes the 'raw' player location. The player model operates in a similar fashion, with raw player data guiding the player model motion. An initial value for all parameters is assumed, like x,y,vx,vy,ax,ay=0. As the raw location data becomes available, in sequential time order, with precise time stamps, the model predicts the model m_x,m_y, based on the model. In an instance in which the next actual x,y shows a discrepancy, the various parameters are adjusted. The higher order parameters, like acceleration are allowed more adjustment than the lower order parameters like model location. In this way the model drives the behavior, and not the actual data, that is use more as a guide.

For example:

Example Tag/Sensor Model

```
__dTime__model = __dTime;
    double dPeriod = __pPrev->__dTime - __pPrev2->__dTime;
    //X
    double dVelX = (__pPrev->__dX__model - __pPrev2->__dX__model)/
    dPeriod;
//limit Velocity to known max Velocity of the object.
    if( dVelX > gApp__Config.__dMaxVelocity) dVelX =
    gApp__Config.__dMaxVelocity;
    if( dVelX < -gApp__Config.__dMaxVelocity) dVelX =
    -gApp__Config.__dMaxVelocity;
//X prediction
    double dX__predict = __pPrev->__dX__model + dVelX * dPeriod;
    double dX__error = __fX - dX__predict;
//if the x error is small, do not move, To avoid/reduce jitter while static.
    if( (dX__error < gApp__Config.__dMaxXYError ) && ( dX__error > -
    gApp__Config.__dMaxXYError ))
        __dX__model = dX__predict +
    gApp__Config.__dXYErrorCorrectionFactor * dX__error;
        else
        __dX__model = __fX;
```

Example Player Model

The player raw x, y is calculated from the tag model output (for two tags in this case)

```
pPlayer->__dX__raw = (pBlink__this->__dX__model +
    pBlink__that->__dX__model)/2.0;
pPlayer->__dY__raw = (pBlink__this->__dY__model +
    pBlink__that->__dY__model)/2.0;
pPlayer->__dTime__raw = (pBlink__this->__dTime + pBlink__that-
    >__dTime)/2.0;
```

The above player x, y and time input feeds into the player model, in the same way as for the tag as described above. For player orientation, the tag positions (shoulders) are calculated at the same times as the Player time, via this equation.

$p$Player→_$d$ShoulderLeft$X$=$p$Blink_left→_$fX$+ $p$Blink_left→_$d$SkVel$X$*$dtL$;

The orientation of the player is in some examples

```
double dDirX = - ( pPlayer->__dShoulderRightY -
    pPlayer ->__dShoulderLeftY );
    double dDirY = pPlayer ->__dShoulderRightX -
    pPlayer ->__dShoulderLeftX;
double dAbsDir = sqrt( dDirX*dDirX + dDirY*dDirY );
    double uX = dDirX / dAbsDir;
    double uY = dDirY / dAbsDir;
```

Figure 30:
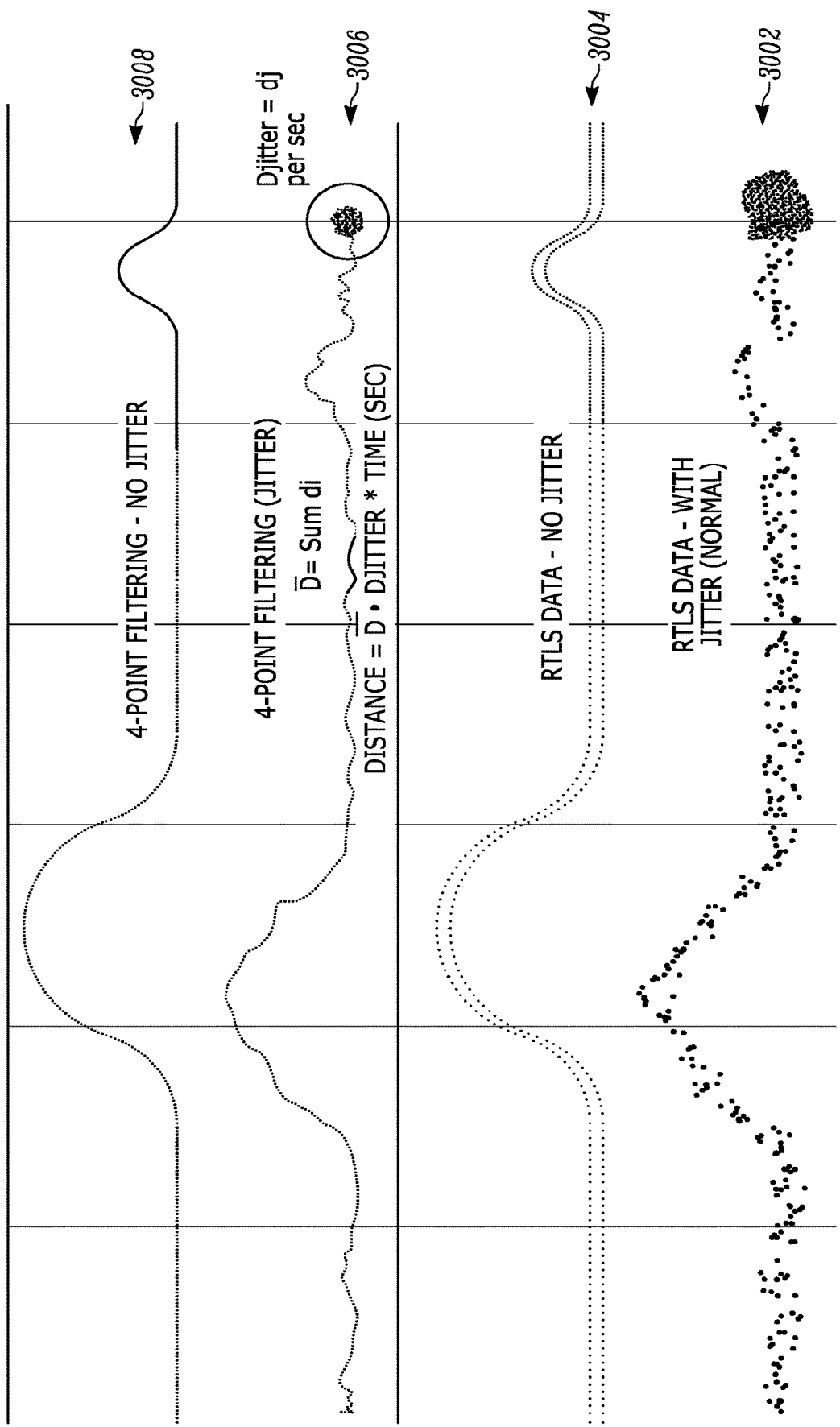
FIG. 30 illustrates an exemplary output of a filter and analytics engine with various jitter filtering applied according to an embodiment of the present invention.

The orientation angle is, in some examples: angle=a tan 2(uX,uY);

Additionally or alternatively, the 2 and 4 point filtering may be applied, as described in FIG. 30.

Exemplary Output of a Filter and Analytics Engine

FIG. 30 illustrates an exemplary output of a filter and analytics engine (e.g. filter and analytics engine 515 as shown in FIG. 5) with jitter filtering applied. The RTLS data with jitter may comprise the raw location data for left and right shoulder tags. The bottom data line 3002 depicts the raw RTLS data from a participant equipped with two location tags 102 mounted to each shoulder. In some embodiments a jitter filter may be applied to the RTLS raw data, as discussed above in FIG. 29. The RTLS data-no jitter 3004 may be a smoother depiction of the participant location data, clearly depicting the location of the participant shoulders at each unit of time.

Additionally or alternatively, the filter and analytics engine 515 may perform multiple point filtering, such as 2 point filtering or 4 point filtering. Multiple point filtering may be an average of the RTLS location data prior to or after jitter filtering. In an example embodiment, the filter and analytics engine 515 may average the location data of the left and right shoulder location data for the participant, resulting in a single location representing approximate location of the center of the participant. Alternatively, 2 point filtering may average the current and previous location data for the participant or tag 102, resulting in the approximate location of the participant or tag between the last two location data calculations.

In some example embodiments, the filter and analytics engine 515 may apply a 4 point filter 3006 by averaging the location data for the left and right shoulder and the current and previous location data resulting in the approximate location of the center of the participant between the last two location data calculations. The application of two or four point filtering may generate a more smooth and in some instances more accurate representation, of the participants travel through the monitored area. The 4 point filter with no jitter 3008 may generate a smooth accurate single trace of location data over a period of time.

In an example embodiment, the jitter, no-jitter, 2 point filter, and/or 4 point filter location data may be displayed as overlays in different colors for analysis of filtering performance.

Exemplary Process for Synchronizing Multidimensional Player Location Per Unit Time FIG. 31 illustrates a flowchart of an exemplary process for synchronizing multidimensional player location information per unit time at calculated times. At block 3102, the visualization and model engine (e.g. visualization and model engine 517 as shown in FIG. 5) receives the filtered multidimensional player location information per unit time from a filter and analytics engine (e.g. filter and analytics engine 515 as shown in FIG. 5). A filtered multidimensional player location information per unit time may comprise participant locations at calculated times for each participant tag 102 (e.g. tag 102 as shown in FIG. 1) or participant. It is desirable to provide location data for all participant tags 102 to the visualization and model engine 515 at the same time. The tag (e.g. tag 102 as shown in FIG. 5) locations are not synchronized when received by the visualization and model engine 517.

At block 3104, the visualization and model engine 517 synchronizes the calculated time for the participant locations based on time stamps associated with each participant location calculation. At block 3106, the visualization and model engine 517 outputs synchronized participant coordinate data, e.g. two or more multidimensional player locations per unit time synchronized by time stamp data, for rendering for display.

At block 3108, the synchronized participant coordinate data is transferred to corresponding location on an event field rendering. The field event rendering may be a digital media, such as streaming video. The event field rendering may be sent to a GUI (e.g. event location GUI 516 and/or support and diagnostics GUI 532 as shown in FIG. 5) for display, broadcast over a website or file server, or the like. Each location data file is synchronized and transferred to the event field rendering. The GUI 516/532 is sent the next rendering or refreshed at a predetermined rate (e.g. 10 Hz or less). The event field rendering transmission to the GUI 516/532 may be delayed by a predetermined time value (e.g. two seconds).

At block 3110, the synchronized participant coordinate data is transferred to corresponding location on an event field rendering. The event field rendering may be a video application program interface (API) in some examples. The API may be configured to transfer the event field rendering video to remote systems for display. Additionally or alternatively, the field event rendering may be a television broadcast output. Each location data file is synchronized and transferred to the event field rendering. The GUI 516/532 is sent the next rendering or refreshed at a predetermined rate (e.g. 30 Hz). The event field rendering transmission to a video display may be delayed by a predetermined time value (e.g. two seconds).

In some examples, the location data file may be used in conjunction with a live or near-live television broadcast. In such examples, the location data is scaled such that it is providing location information at a predetermined refresh rate that is synchronous with the display rate/refresh rate of the television. In further examples, the system may receive one or more inputs from the live video feed (e.g., camera locations, camera orientations, camera system coordinates, camera focus, camera zoom, etc.) to relate a participant as shown on the video to the location data related to the same player. As a result, a halo, an indicator or other visual cue may be placed around the participant to indicate his/her real time location. In such cases, as the participant moves, a travel line, heat indicator, speed indicator, name, statistics or the like may be displayed on the video, live TV or the like.

In some examples, the visualization and model engine 517 may determine camera data which has camera control system coordinates which may be associated with the synchronized participant coordinate data, e.g. the camera data may include at least one of the participants associated with the synchronized participant coordinate data. The visualization and model engine 517 may synchronize the camera data and the synchronized participant coordinate data based on time stamps. In some example embodiments, the visualization and model engine may, additionally or alternatively, synchronize the camera data and the synchronized participant coordinate data based on location coordinates and the camera system coordinates.

In some example embodiments, the visualization and model engine 517 may receive individual or aggregate player and team statistical data from the filter and analytics engine 515. The field event rendering may include the statistical data, such as speed, impact force, distance, or the like. The statistical data may be rendered adjacent to participant movement rendering within the field event rendering or overlaid on top of the field event rendering, such as on or near the participant rendering for which the statistical data is associated with.

Similarly, in an example embodiment, the visualization and model engine may receive participant, (e.g. names, positions, or the like), group (e.g. squad, offence, defense, or the like), or team identifiers, (e.g. names, logos, or the like), which may be based on tag-individual correlators. The visualization and model engine 517 may render participant, group, or team identifiers, adjacent to and/or overlaid on the field event rendering.

Exemplary Process for Setting Receiver Hub and Video Camera Coordinates

Figure 32:
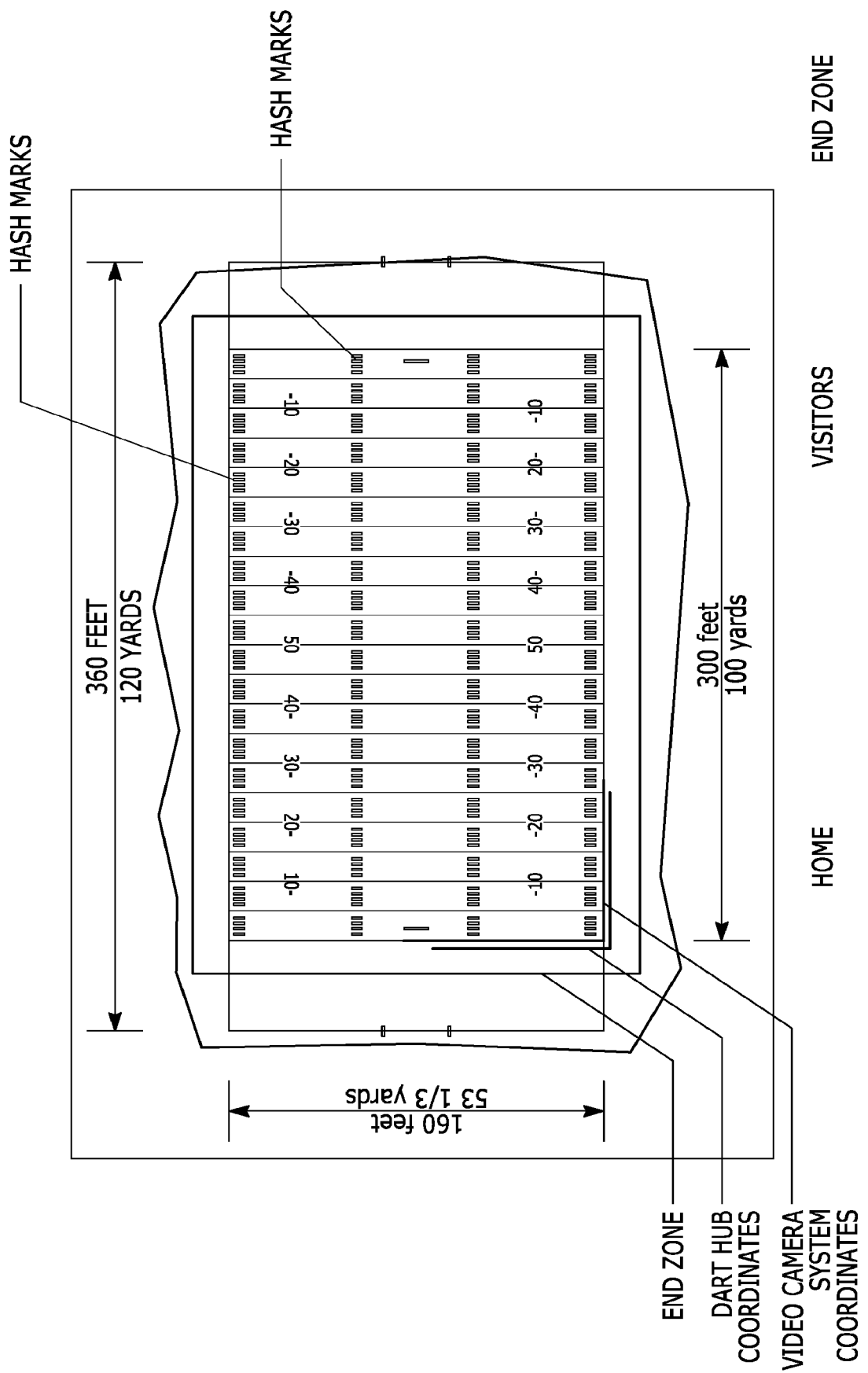
FIG. 32 illustrates an exemplary embodiment for setting receiver hub and video camera coordinates according to an embodiment of the present invention.

FIG. 32 illustrates an exemplary embodiment for setting receiver hub and video camera coordinates. The receiver hub (e.g. receiver hub 108 as shown in FIG. 1) coordinates may be set once with 0,0 at the bottom left of the home side of the field. The home side of the field may change depending on the game and may be set prior to the game. Units may be set for three feet equaling one yard.

Video camera system coordinates may be set before each game based on the field lines that are marked each game. The 0, 0 position may be set at the bottom-left of the home side of the field. The video camera system coordinates and receiver hub coordinates may be correlated so that video camera data may be matched and synchronized with tag location data. For example, tag location data, multidimensional player location per unit time, or the like may be rendered adjacent to or over the camera data based on the video camera coordinate and receiver hub coordinates. As such, location data and real time location of participants on the video can be synchronized and/or overlaid.

In some example embodiments, the video camera system coordinates may be used to control one or more cameras, based on receiver hub coordinates associates with one or more participants. For example, the camera system may be configured to direct one or more cameras to capture camera data including the participant object ball or participant player. The receiver hub coordinates for the location data associated with the participant may be correlated with the video camera system coordinates and the cameras trained to capture camera data of the designated participant.

Example Field Event Renderings

Figure 33:
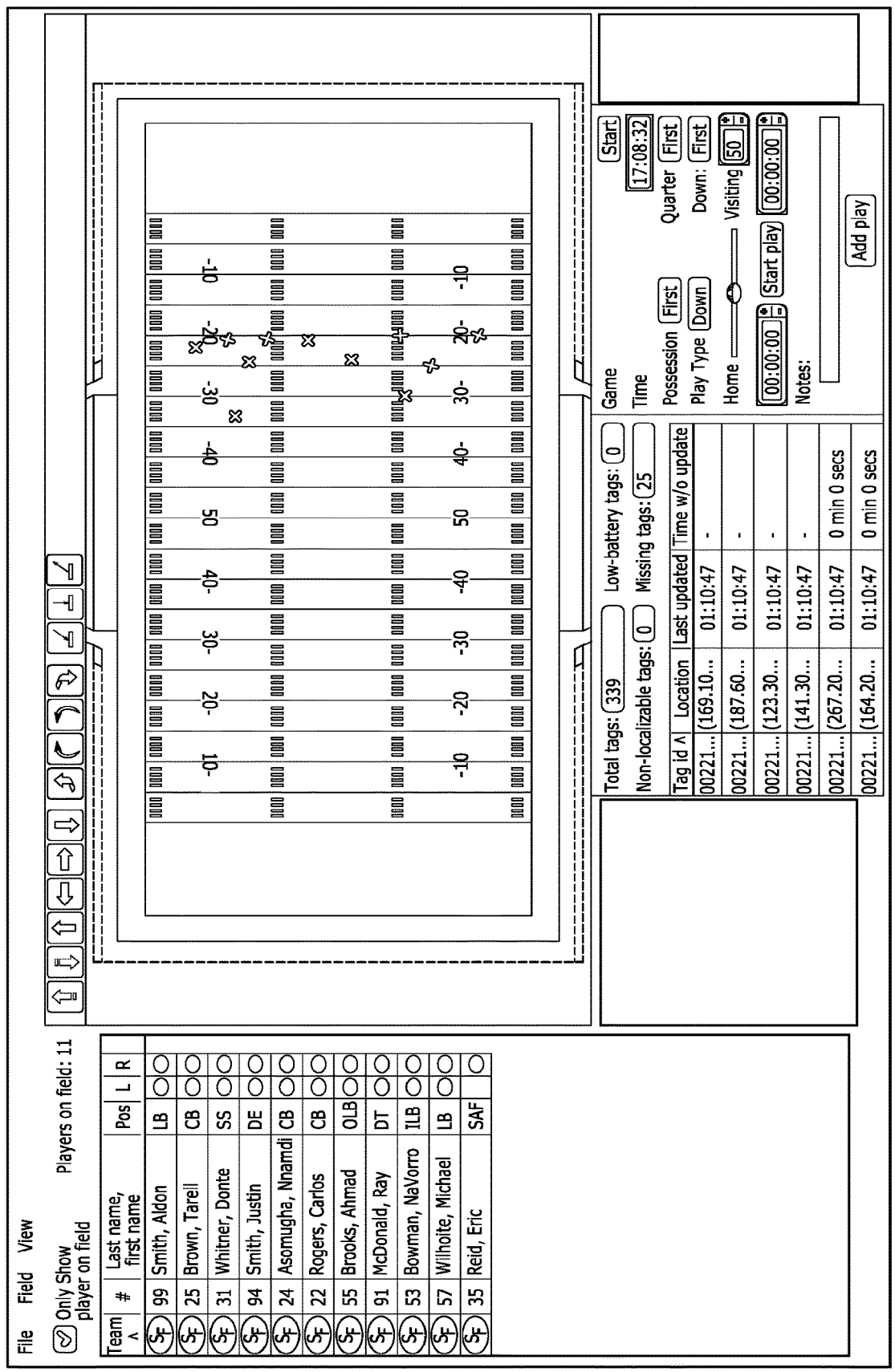
FIGS. 33-37 illustrate exemplary embodiments of field event renderings according to an embodiment of the present invention.

FIG. 33 illustrates an example of an event field rendering. The event field rendering may comprise a two dimensional game field (American football field), participant locations, participant tag data, time, game event fields, or the like. The participant locations (illustrated with Xs) may change position on the game field for each coordinate data over time.

Figure 34:
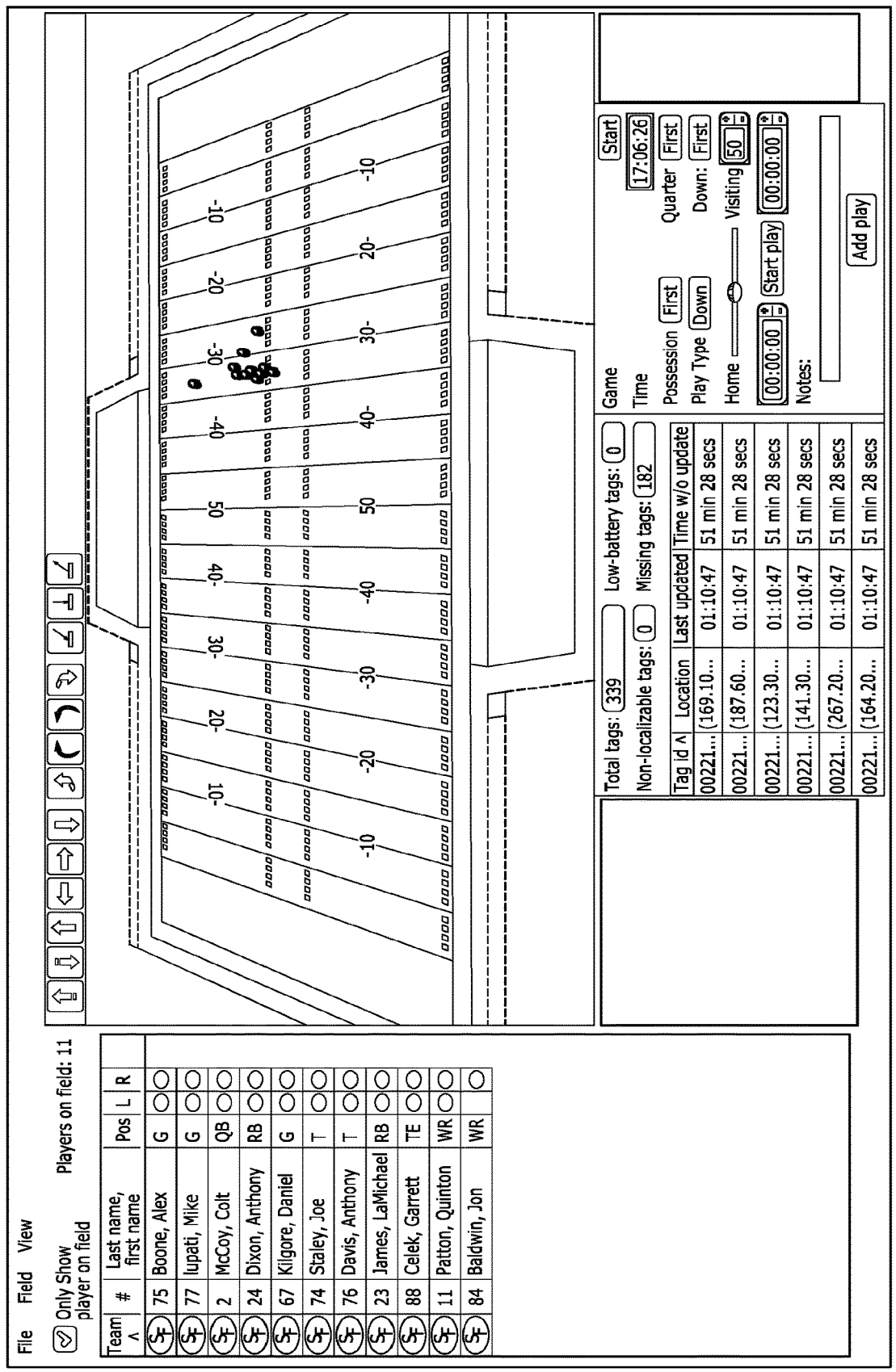

FIG. 34 illustrates an example of an event field rendering. The event field rendering may comprise a three dimensional game field (American football field), participant locations, participant tag data, time, gave event fields, or the like. The participant locations (indicated with American football helmets) may change position on the game field for each coordinate data over time.

Figure 35:
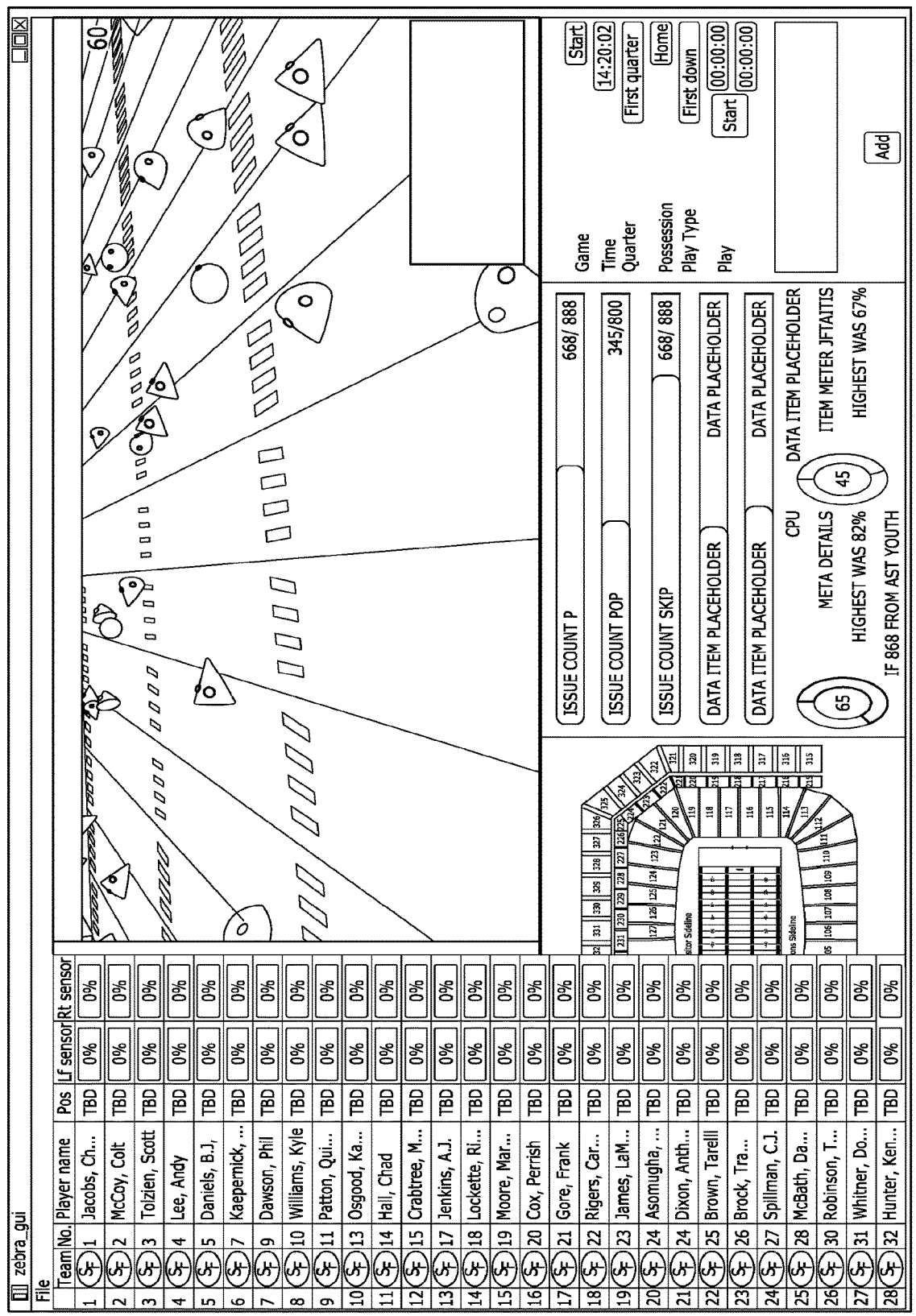

FIG. 35 illustrates an example of a field event rendering. The field event rendering may comprise a selected portion of a three dimensional game field (American football field), participant locations, participant tag data, CPU usage, error counters, player names player numbers, player positions, player tag data, player team label, or the like. The participant locations (indicated with cones) may change position on the game field for each coordinate data over time. The participant location cones indicate direction of the player participant; the circles on each cone indicate the left and right shoulder tag (e.g. tag 102 as shown in FIG. 1).

Figure 36:
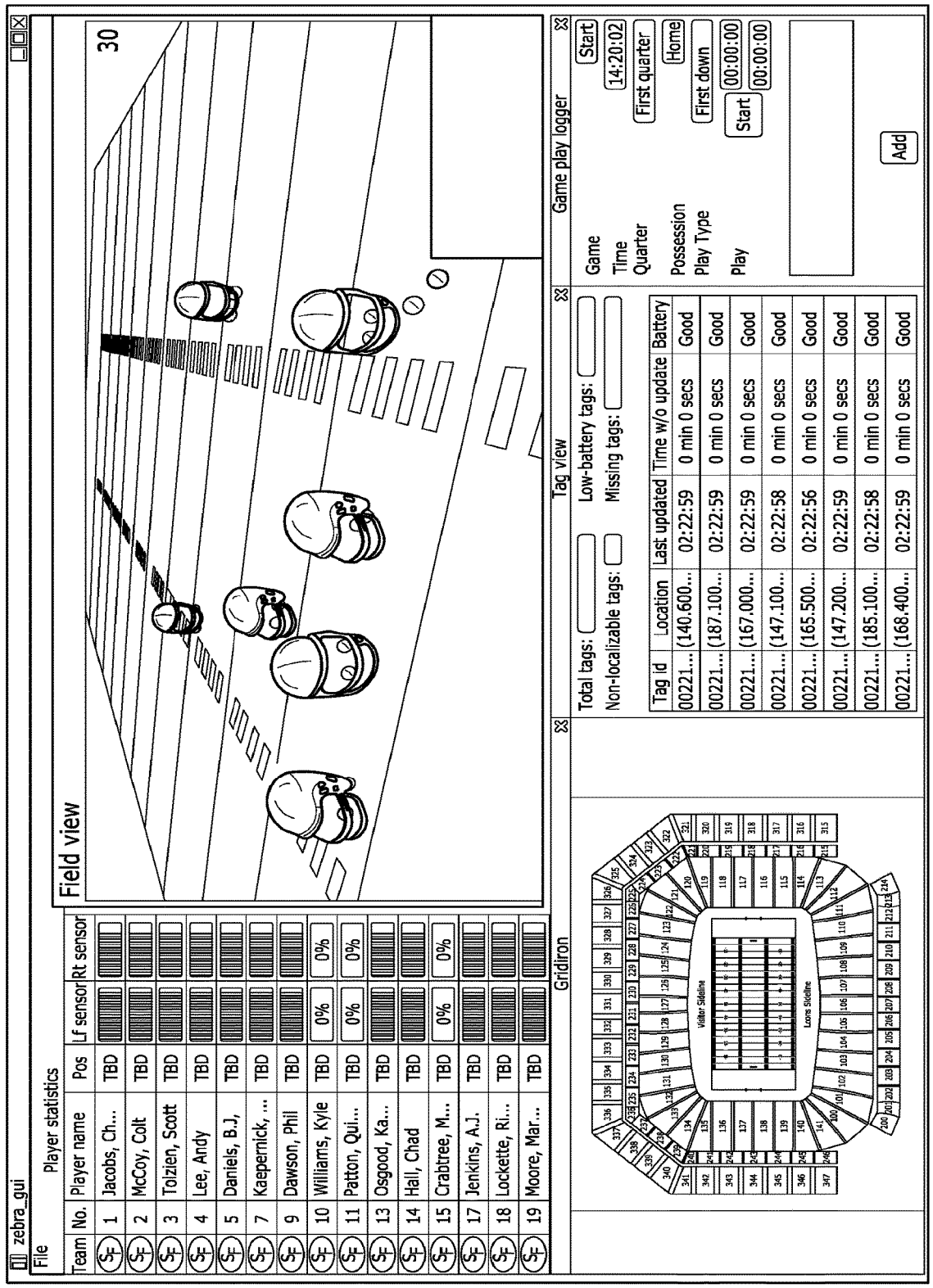

FIG. 36 illustrates an example of a field event rendering. The field event rendering may comprise a selected portion of a three dimensional game field (American football field), participant locations, participant tag data, two dimensional field event rendering with participant tag locations, player names, player team logos, or the like. The participant locations (indicated with American football helmets) may change position for each coordinate data over time. The participant location helmets indicate direction of the player participant; the circles in each helmet may indicate the left and right shoulder tags (e.g. tag 102 as shown in FIG. 1).

Figure 37:
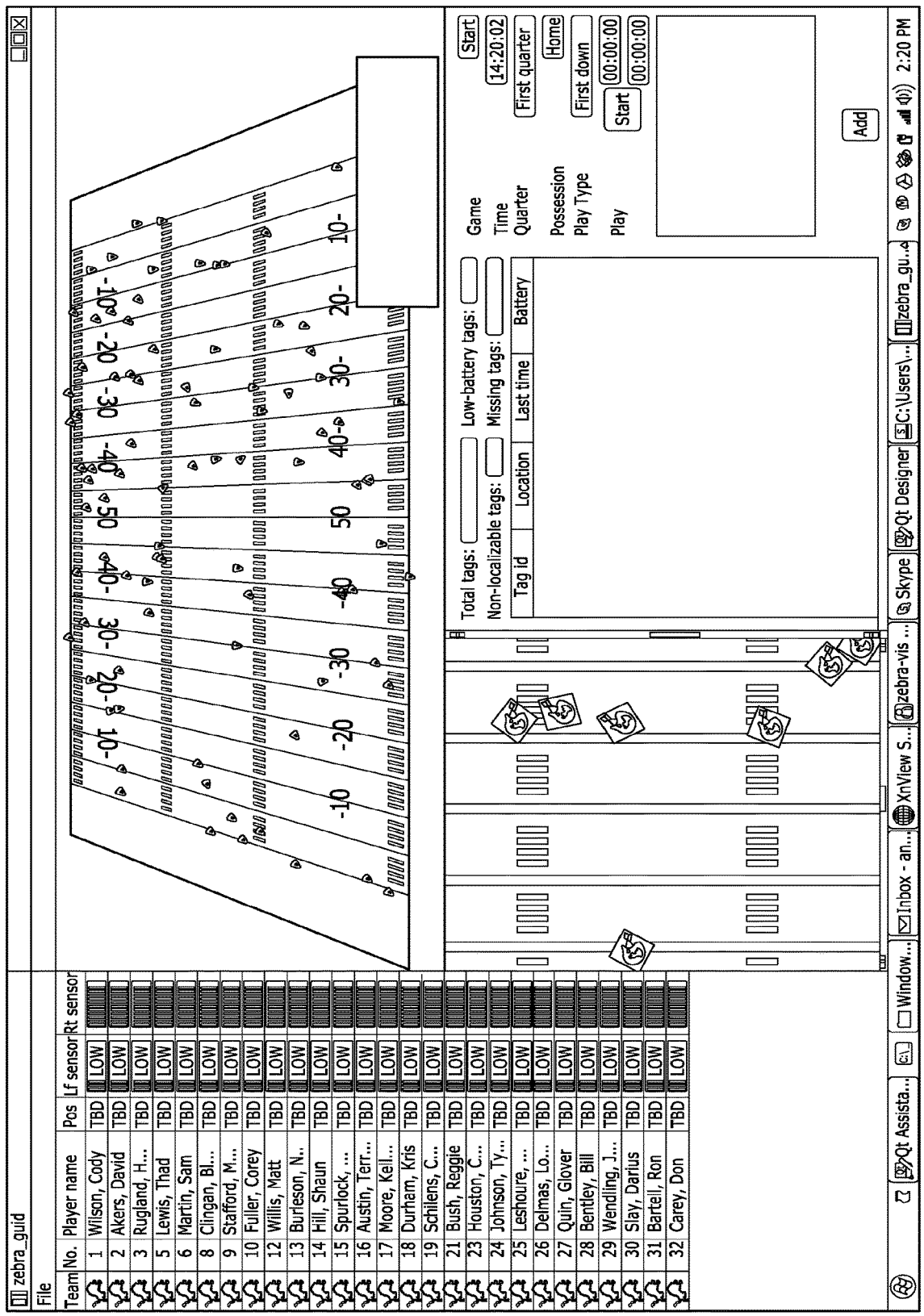

FIG. 37 illustrates an example of a field event rendering. The field event rendering may comprise a three dimensional game field (American football field), participant locations, participant tag data, participant tag diagnostics, player names, player numbers, player positions, or the like. The event field rendering may further include a selected area of a two dimensional game field. The participants may be indicated by player team logos or cones.

Exemplary Processing and Distribution System

Figure 38:
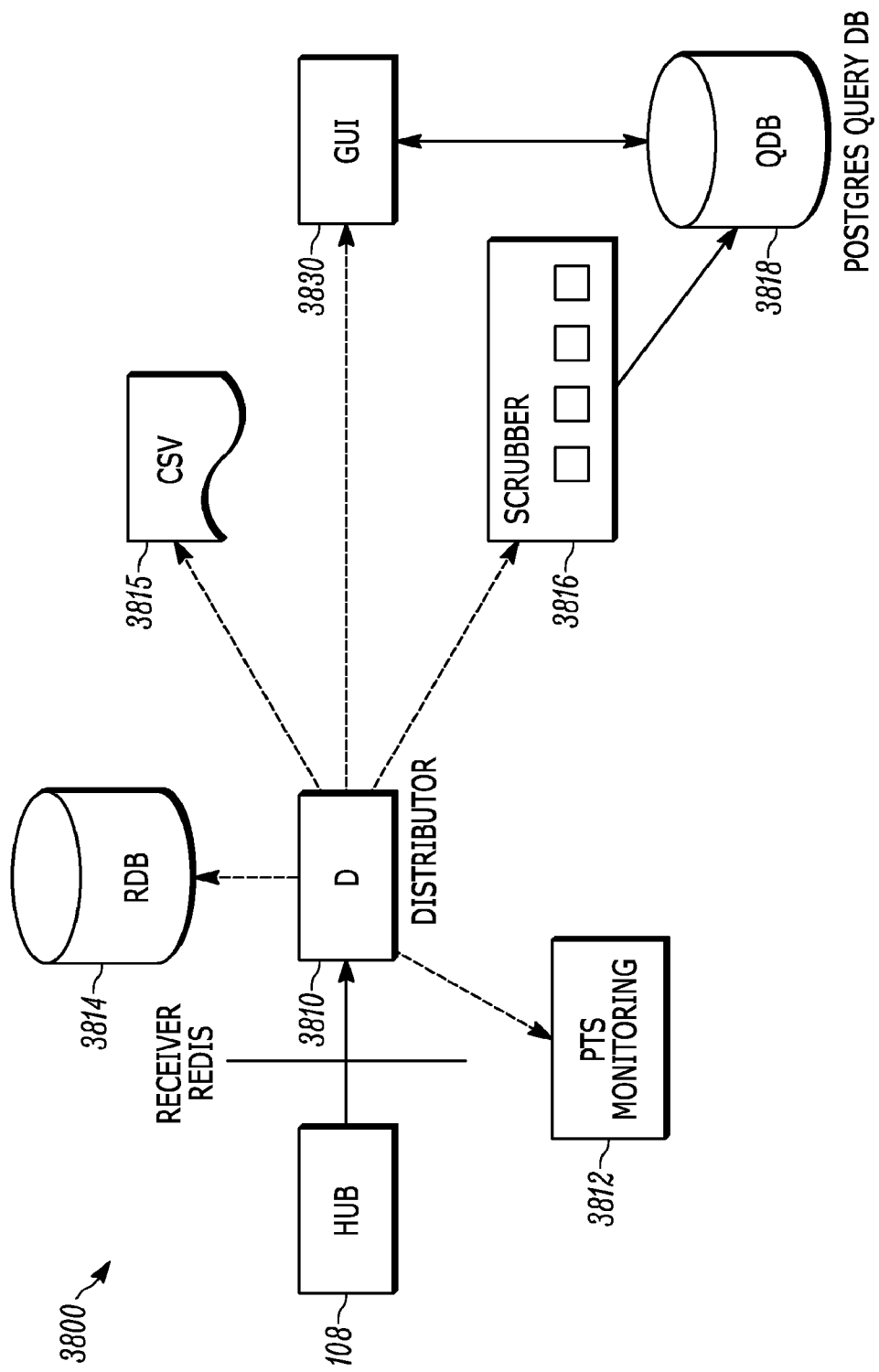
FIG. 38 illustrates a exemplary receiver distribution system diagram for collecting sporting event data according to an embodiment of the present invention.

FIG. 38 illustrates an exemplary receiver processing and distribution system 3800 diagram for collecting sporting event data or other event data according to an embodiment of the present invention. The system may include a receiver hub 108, a distributor 3810, a PTS monitoring interface 3812, a raw data storage 3814, a comma separated value (CVS) file 3815, a scrubber 3816, a GUI 3817, and a query data storage 3818.

The receiver hub 108 receives tag (e.g. tag 102 as shown in FIG. 1) data from receivers (e.g. receivers 106 as shown in FIG. 1) as described in FIGS. 1-4. The distributor 3810 receives data from a socket on the receiver hub and distributes the tag data to the raw data storage 3814, the CSV file 3815, the scrubber 3816, the GUI 3830, and the location monitoring interface 3812. The receiver hub 108 may be limited to a predetermined number of simultaneous data requests. The distributor 3810 may allow multiple requests for tag data to be made without the requests being made to the receiver hub 108 directly, therefore allowing a single communication line on the receiver hub 108 to satisfy more simultaneous data requests than could be satisfied by the receiver hub directly.

The distributor 3810 may parse tag data into fields and create a CSV file 3815 for distribution to other subsystems or data storage. The CSV file may include location data, tag UID, tag individual correlator, or any other tag derived data. The CSV file may be stored in raw data storage 3814 or sent to monitoring and analysis engines. The raw data storage 3814 stores the tag data for further analysis or system diagnostics. The distributor 3810 may send data to a PTS monitoring station 3855 that is configured to provide access to location data output from the hub by one or more third parties.

The distributor 3810 may send tag data to the scrubber 3816; the tag data may include tag location data, multidimensional player location information per unit time, or the like. The scrubber 3816 may filter tag location data or multidimensional player location information per unit time in a manner similar to the filter and analytics engine (e.g. filter and analytics engine 515 as shown in FIG. 5) as discussed in FIG. 29.

The scrubber 3816 may send the filtered multidimensional player location information per unit time to the query data storage 3818. The filtered multidimensional player location information per unit time may be stored for later analysis and system diagnostics, or requested for visualization. In some examples, scrubber may take the form of or otherwise embody any of 302-338 and in some cases 340-352 of FIG. 4.

The GUI 3830 may receive raw tag data including but not limited to tag UID, location data, battery life data, and diagnostic data, or the like from the distributor 3856. The GUI 3830 may request filtered location data from the query data storage 3818. The GUI 3830 may render visualizations such as event field renderings or support and diagnostic displays based on the raw tag data and filtered location data or filtered multidimensional player location data per unit tine received.

Exemplary Performance Analytics System

Figure 39:
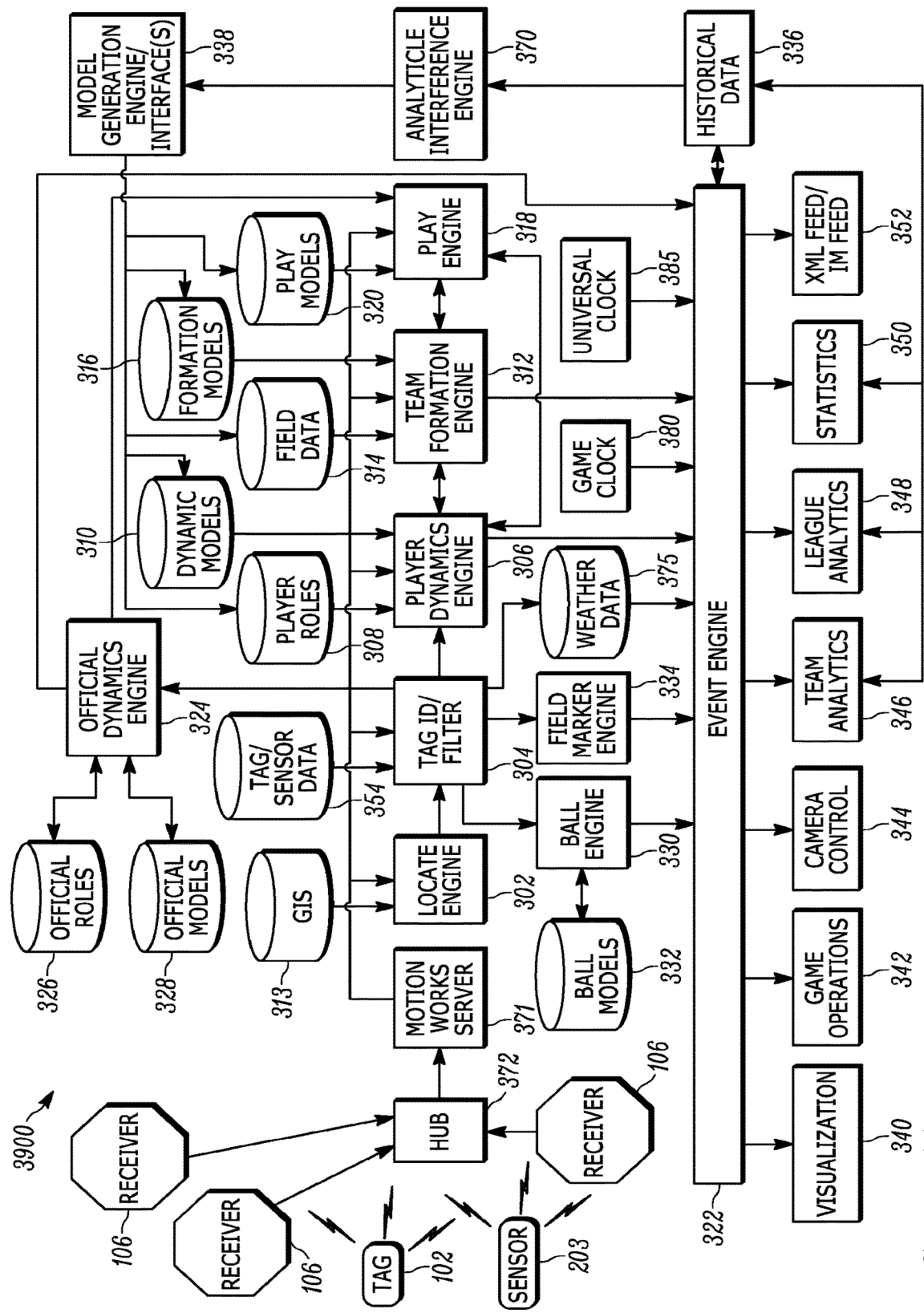
FIG. 39 illustrates an exemplary system for providing performance analytics according to an embodiment of the present invention.

FIG. 39 illustrates an exemplary system 3900 for providing performance analytics in accordance with some embodiments of the present invention. The system 3900 is similar, in some examples, to the system 300 illustrated in FIG. 4, system 3900 further comprising a receiver hub 372, a motionworks server 371, and an analytical inference engine 370.

The tags 102 provide various X, Y location data in blink transmissions received by receivers 106. The receivers 106 send the tag data to the receiver hub 108 as discussed in FIG. 1. The motionworks server 371, in some examples, samples or monitors the tag data received by the receiver hub 108 at a continuous or near continuous interval. The motionworks server 371 may provide the location data to various data filters and engines including, without limitation, locate engine 302, tag ID/filter 304, player dynamics engine 306, team/formation engine 312, play engine 318, official dynamics engine 324, or the like. The motionworks server 371 may provide tag data to multiple data filters and engines simultaneously, with a single data link to the receiver hub 108.

The player dynamics engine 306 may request tag location data form the motionworks server 371 and player roles from the player roles database 308. The player dynamic engine 306 may request participant or player data for the location data from the Tag ID/filter 304 based on the tag code. The player dynamic engine 306 may then associate the tag location data, player data and player role. The player dynamics engine may output the player location and role data to the event engine 322.

The team formation engine 312 may receive player location and role data for a plurality of player participants from motionworks server 371 or the player dynamic engine 306. The team formation engine may aggregate the player location and role data, creating a team location data. The team formation engine 312 may compare team location data to formation model data which may be provided by the formation engine 316. The team formation engine may output the aggregate team location data and likely play formations to the event engine 322.

The play engine 318 may receive player location data, team location data and role data from the motionworks server 371, player dynamics engine 306 and the team formation engine 312 respectively. The play engine may receive play models based on the rules for a predetermined sport from the play model engine 320. The play engine may then compare the location and movement of a player and or team to determine the start of a play event. For example the players on a team may move to a line of scrimmage prior to the start of the play. The players or at least some players may stop based on roles. The play event engine may then determine a play has started when all or most of the player begin to move. The play event engine may determine the play has ended when the players or object participant (e.g. the ball) stops moving within a predetermined tolerance. The play event engine 318 may output the determination of a play event and the start and stop times of the play event to the event engine 322.

Additionally or alternatively, play events may be manually entered by a using an user interface. A user may designate the start or stop of a play based on the location and motion of the participants as depicted in a field event rendering. The user input play event start and stop may be used for categorization and analysis of location data. In an example embodiment, the user entered play event start and stop times may be utilized for machine learning, e.g. to train the play engine 318, or other engines to recognize start and stop times of the plays and/or the type of play or deviations from play formations based on the location and movement of the participants. In some examples, a mobile device may be used to indicate play start/stop.

In some example embodiments, the play engine 318 or other engines may dynamically change field parameters, e.g. the size of the monitored area 100. For example, the play engine may reduce the monitored area during a play to 3 yards within the field lines. The dynamic change in field parameters may provide further detail to the play be removing participants which are not part of the play, but which may be on or across the field lines.

The event engine 322 is configured to collect and compile the player location data, team location data, play formations, or the like, for a time period specified by the play event. The event engine may output the team location, player location, team formation data or the like to subsystems, including without limitation visualization 340, game operations 342, camera control 344, team analytics 348, league analytics 348, statistics 350, XML feed/IM feed 352, historical database 336, or the like.

The analytical inference engine 370 may receive event data, including without limitation, player, team, formation, league, or the like. The analytic inference engine 370 may compare the historical event data and make inferences of when plays start and stop, where and how a player may move, team plays based on formation, new formations based on team locations during a play event, or the like. The analytic inference engine 370 may output the historical event data and inference determinations to the model generation engine/interface 338.

The model generation engine/interfaces 338 may receive the historical event data and inference determinations form the analytical inference engine 370. The model generation engine/interface 338 may generate dynamic models, formation models, play models, or the like based on the historical event data and inference determinations. The system 3900 is self-learning, in that, the process of analyzing the historical event data, determining inferences and creation of new models may be performed by the system without user input. A user may approve or modify generated models in the model generation engine/interface 338 to expedite the self-learning process and correct any errors in inference determination or model generation. The model generation engine/interface 338 may output new models to the dynamics model database 310, the formation model database 316, the play model database 320, or the like.

Exemplary Visualization

Figure 40:
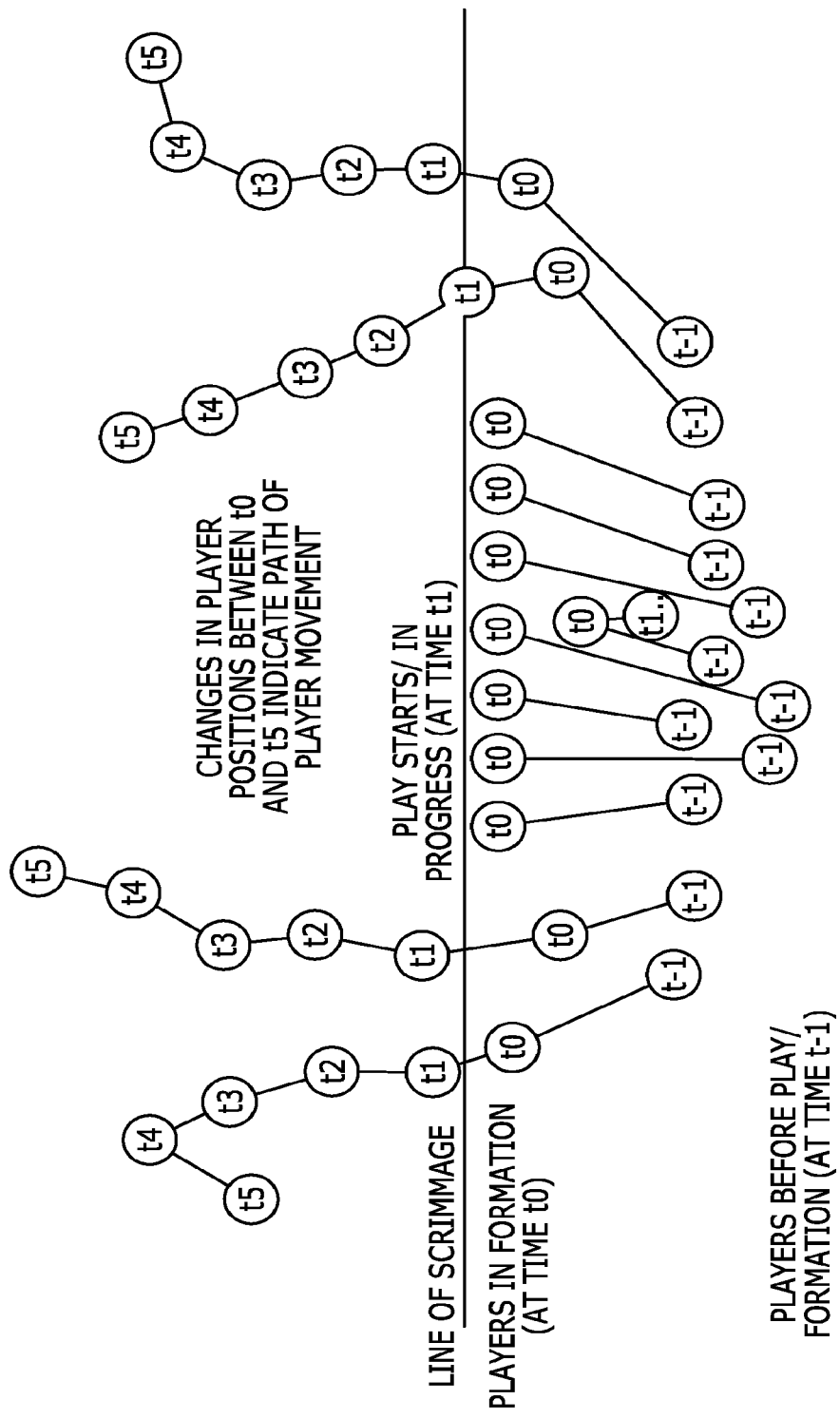
FIG. 40 illustrates a schematic representation of example object tracking over time in the form of a visualization in accordance with some embodiments of the present invention.

FIG. 40 illustrates example participant (e.g., player) tracking over time in the form of a visualization in accordance with some embodiments of the present invention. More specifically, FIG. 40 illustrates the changing position of an offensive team during game action in a fashion that could be provided via one or more visualizations described herein. Such tracking of changing positions may be useful for visualization in order to provide an in game experience (e.g., a game tracker application). For example, at a first time, t−1, the tag located data indicates that the tracked players are positioned well behind the line of scrimmage and therefore not set for a particular player. At a second time, t0, certain of the tracked players (e.g., offensive linemen and receivers) have positioned themselves proximate the line of scrimmage, thus, suggesting a high probability of a pro set offensive formation and the start of a play. At a third time, t1, certain tracked players (e.g., the receivers and the quarterback) move away from the line of scrimmage, thus, suggesting that a play has begun. Additional times t2 through t5 may be similarly tracked as shown. The tag location data recorded at times t−1 through t5 provide for a data stream indicating the motions/paths of the various players throughout the duration of a play. It is noted that FIG. 40 does not illustrate tracking of all the players after t0 in order to simplify the illustration. The rendering of visualizations is discussed in further detail in FIGS. 41-43, 45, and 50 below.

Figure 41:
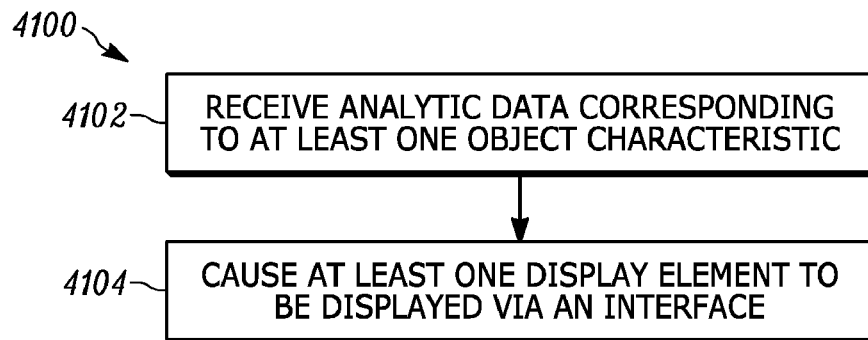
FIG. 41 illustrates a flowchart detailing operations performed by a system configured to provide analytic data according to an example embodiment of the present invention.
Figure 44:
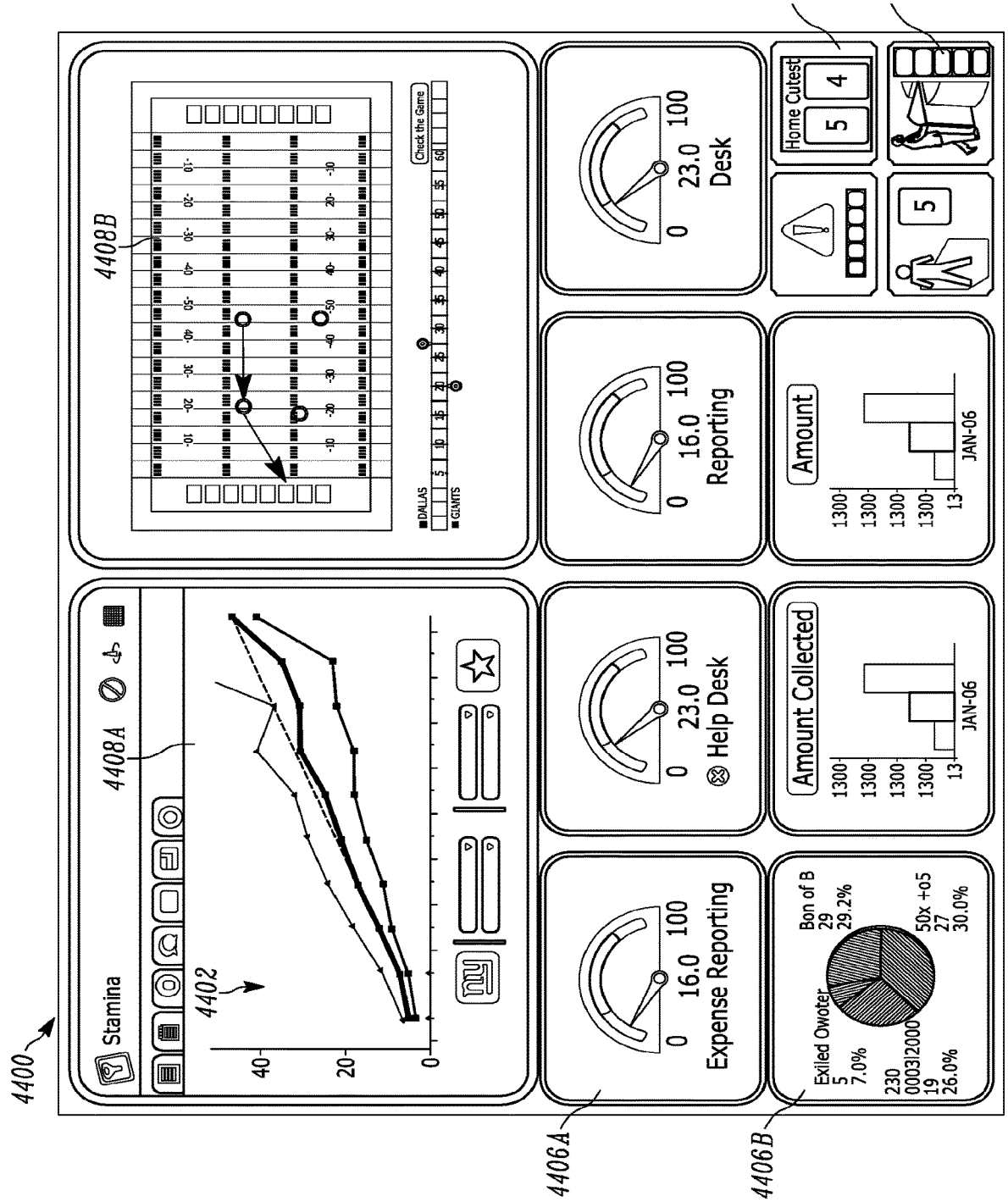
FIG. 44 illustrates an interface configured to display analytic data provided by a system according to an example embodiment of the present invention.

FIG. 41 illustrates an exemplary method, such as process 4100, that may be executed by one or more devices (some examples of which are discussed in connection with FIGS. 4, 5, and 39) to provide a display, such as a touch screen display 4400 of FIG. 44, with an interface configured to display analytic and event data that is derived based on location data, multidimensional player location data per unit time, sensor derived data, tag derived data, and/or the like.

At block 4102, a visualization engine, such as visualization engine 340 or visualization and model engine 517, may receive analytic and/or event data corresponding to at least one object characteristic. For example, a sports analytics interface system 112, as shown in FIG. 1, may receive analytic and/or event data corresponding to a location of an participant over a period of time. In some embodiments, the visualization engine 340/517 may be configured to receive analytic and/or event data corresponding to an participant characteristic, such as a football player's conditioning, weight, stamina, status, and/or the like.

At block 4104, the visualization engine 314/517 may be configured to cause at least one display element (i.e., dashboard) to be displayed via an interface. For example, as shown in FIGS. 44 and 46-49, a display 4400, such as a touch screen display, may be configured to display an interface providing visualizations corresponding to analytic and/or event data, such as sport analytics data. With respect to FIG. 44, a display 4400 may include a plurality of display elements 4402. In some embodiments, the display elements 4402 may comprise an icon form 4404, a graph form 4406, a panel form 4408 and/or the like. The display elements or dashboards are further described with reference to FIG. 51 and, in some examples, are defined as a function of the screen area that they occupy (e.g., icon—1/64 of view area, graph—1/16 of view area, panel—1/4 of view area, full function—whole of view area and/or the like). In some embodiments, the plurality of display elements may comprise a full function form 4410, as shown in FIG. 47.

Figure 42:
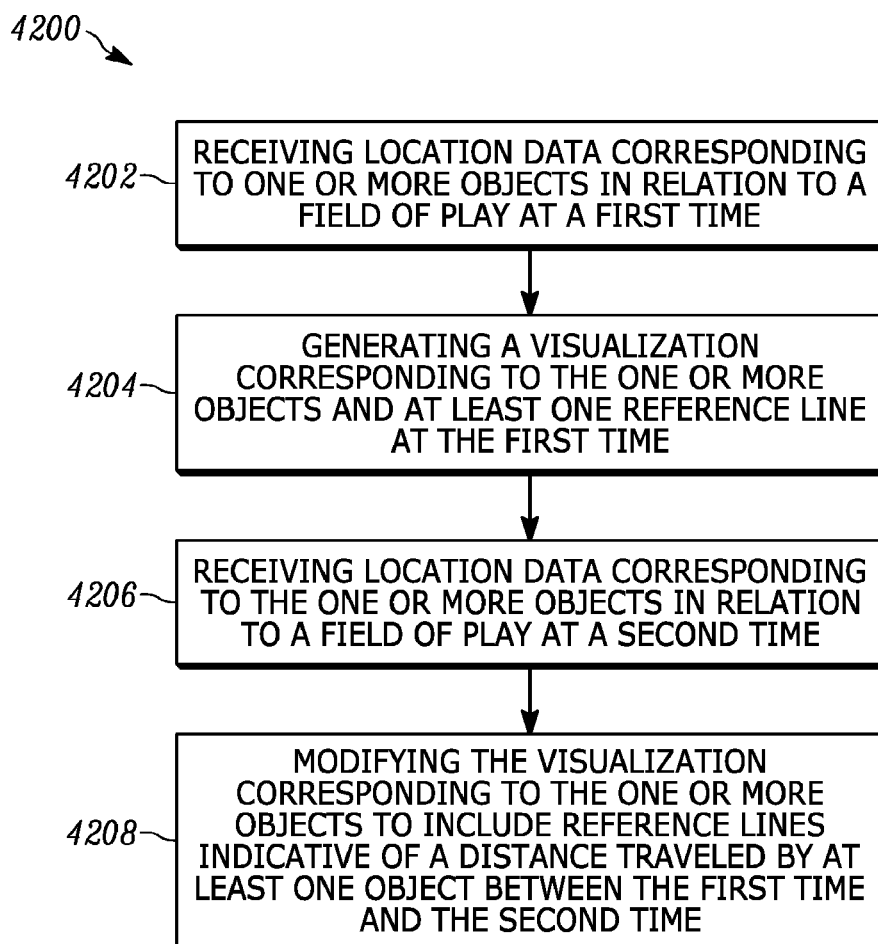
FIG. 42 illustrates a flowchart detailing operations performed by a system configured to generate visualizations corresponding to an object according to an example embodiment of the present invention.

Exemplary Process for Providing an Interface Configured to Display Visualizations FIG. 42 illustrates a process for providing an interface configured to display visualizations corresponding to analytic data, which may include participant data, event data, metric data, statistical data, or the like. At block 4202, the visualization engine 340/517 may receive location data corresponding to one or more participants in relation to a monitored area, such as a field of play. In some embodiments, the visualization engine 340/517 may receive participant data at a first time, such as the football player's location at the beginning of the play.

The term "participant data" as used herein refers to data derived from one or more tags, e.g., tag data, tag unique ID, tag-individual correlator, tag-sensor correlator, tag data packets, blink data, time measurements (e.g. time of arrival, time difference of arrival, phase), signal measurements (e.g., signal strength, signal direction, signal polarization, signal phase) and tag location data (e.g., including tag location estimates), and data derived from one or more sensors, e.g., sensor unique ID, stored sensor data, sensor-individual correlator, environmental measurements, and sensor information packets. Participant data may further include profile data concerning the object, e.g., biographical data, biometric data, name, identity data, uniform number, team, tag and/or sensor position on the object, and the like.

At block 4204, visualization engine 340/517 may be configured to generate a visualization corresponding to the one or more participants and at least one reference line at the first time. For example, the visualization engine 340/517 may be configured to generate a visualization corresponding to the football player's location and a reference line corresponding to the change in location from a previous play to the football player's location at the first time, such as at the beginning of the present play.

At block 4206, the visualization engine 340/517 may be configured to receive location data corresponding to one or more participants in relation to a monitored area at a second time. For example, the visualization may be configured to receive location data corresponding to the location of a football player in relation to a field of play at a second time, such as the during or at the end of a play.

At block 4208, the visualization engine 340/517 may be configured to modify a visualization corresponding to the one or more participants to include reference lines indicative of a distance traveled by the at least one participant between the first time and the second time. For example, the visualization engine 340/517 may be configured to provide an interface displaying a modified visualization corresponding to the football player's location at the end of the play that began at the first time corresponding to blocks 4202 and 4204. For example, as shown in FIG. 44, one visualization, such as a panel form 4408B, and/or FIG. 40 may correspond to the location data received at a first time and a second time during a process 4200. In addition, the visualization engine 340/517 may be configured to modify the visualization, such as the panel form 4408B, such that the visualization displayed corresponds to an object and at least one reference line at a first time, such as a football player's location and a reference line indicative of a distance traveled prior to a first time, while the modified visualization displayed illustrates the football player's location at a second time and a reference line indicative of the distance traveled by the football player between the first time and the second time.

In some examples, the visualization may comprise a line that tracks one or more participants and their respective paths of travel for a set duration of time, such as a play. For example, each offensive and defensive player may be tracked so as to provide a viewer with a real time (or near real time) visualization of the play. In some examples, the ball may be tracked to provide an accurate representation of the current play or activity. As such, this visualization may provide a game like experience to a viewer not able to watch the game live or via some other audio/visual means. Such visualization data may also be stored for purposes of coaching, future analytics, and/or the like.

Figure 43:
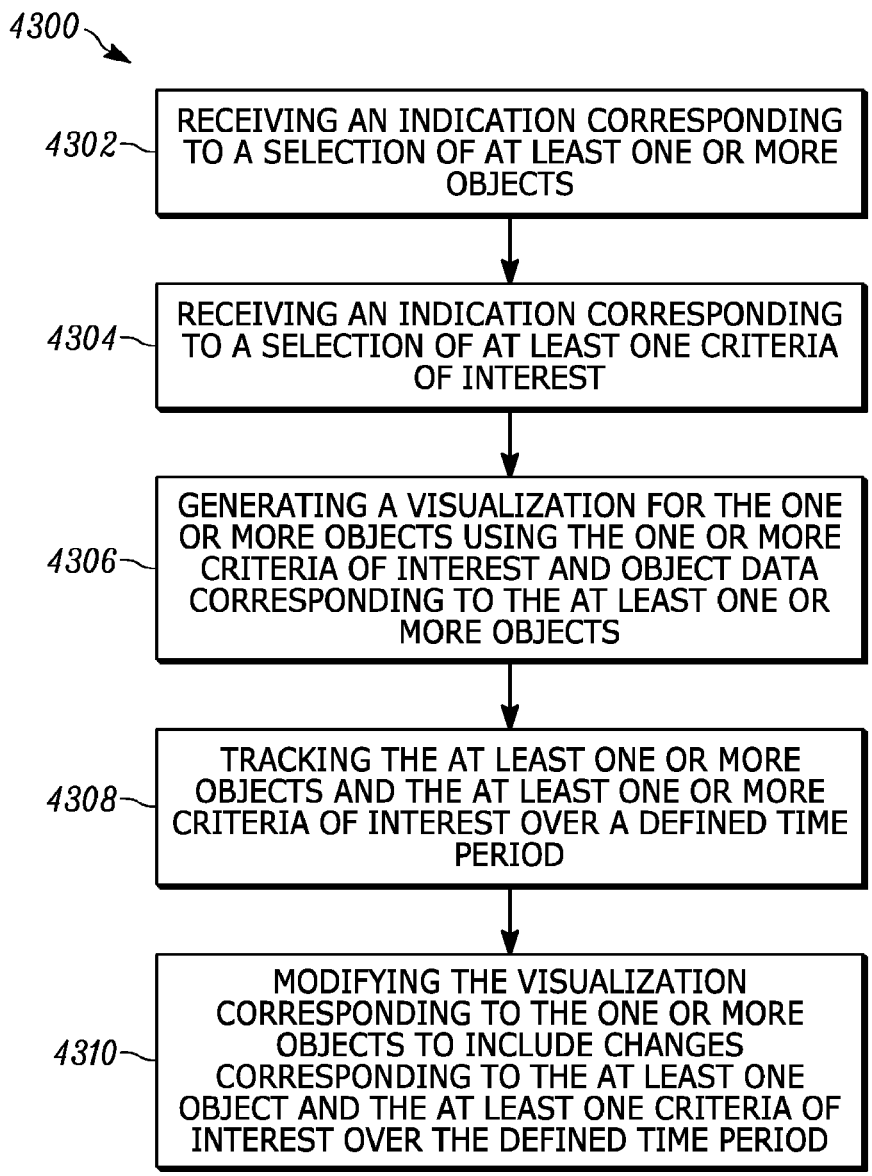
FIG. 43 illustrates a flowchart detailing operations performed by a system configured to generate visualizations corresponding to an object according to an example embodiment of the present invention.

Exemplary Process for Generating a Visualization for a Participant and at Least One Criteria FIG. 43 illustrates a process for generating a visualization corresponding to an participant and at least one criteria of interest according to some example embodiments of the present invention. An exemplary method, such as process 4300, may be executed by a visualization engine 340/517. At block 4302 the visualization engine 340/517 may receive an indication corresponding to a selection of at least one or more participants. such as a team, a player, a position, a piece of machinery, and/or the like. In some embodiments, a user may provide an indication corresponding to a selection of a participant, such as the user's favorite player. In some examples, a group of participants may be selected, such as a group of players on a team or within a defined area.

At block 4304, a sports analytics interface system may be configured to receive an indication corresponding to a selection of at least one criteria of interest. In some embodiments, the at least one criteria of interest may correspond to the at least one participant. The user may provide an indication corresponding to at least one criteria of interest, such as the number of rushing yards a particular player accrues on average in a particular game, or other participant metric.

At block 4306, the visualization engine 340/517 may be configured to generate a visualization for the one participant (i.e., the user's favorite team) using the one or more criteria of interest (i.e., the amount of rushing yards a particular team amasses per game). In addition, the visualization engine 340/517 may be configured to provide the visualization to an interface via a display element, such as any of the display elements shown in FIG. 44.

At block 4308, the visualization engine 340/517 may be configured to track the at least one or more participants and the at least one or more criteria of interest over a defined time period. In some examples, the time period may be defined by a domain specific time range (e.g., last x plays, last y games, games a through b, last z operations, or the like), may defined based on the passage of time (e.g., last x minutes, last y weeks, or the like), and/or the like. In other examples, time may be defined as a function of a domain measure, for example, a clock in a football game, a production cycle clock, a shift clock or the like. In such cases, clock data may be captured and compared to the analytic data received. For example, the visualization engine 340/517 may be configured to track a user's favorite team and the amount of rushing yards the user's favorite team accrues over each of the next 5 games.

At block 4310, the visualization engine 340/517 may be configured to modify the visualizations corresponding to the one or more participants to include changes corresponding to the at least one participant and the at least one criteria of interest over the defined time period. As such, for example, the visualizations may be modified to display the amount of rushing yards the user's favorite team amasses in the next 5 games after the completion of the 5 games. In another embodiment, the visualizations may be modified to display the amount of rushing yards the user's favorite team gains after each game of the next 5 games.

In another example embodiment, a user may provide and the visualization engine 340/517 may receive an indication corresponding to a selection of a participant, such as a particular football player at block 4302. At block 4304, the user may provide and the visualization engine 340/517 may receive an indication corresponding to a selection of at least one criteria of interest, such as a particular player's stamina level.

Accordingly, at block 4306, the visualization engine 340/517 may be configured to generate a visualization corresponding to the particular football player and the football player's stamina level. Stamina is a measure that is defined in part based on distance travel based on location data, but may also include measurements that define a level of force applied, number of calories burned, or the like. In some examples, a computational learning model may be trained to learn objects stamina levels over time. While stamina may be derived based on a knowledge of that players stamina compared to a current amount of effort expended, other criteria related to statistics derived from the analytic or event data or the like may be displayed. At block 4308, the visualization engine 340/517 may be configured to track the participant football player and the participant football player's stamina level over a defined time period, such as throughout a particular game. As such, at block 4310, the visualization engine 340/517 may be configured to modify the visualization such that any changes in the participant football player's stamina level throughout the defined time period (i.e., the football game) is displayed via an interface configured to display the modified visualization.

Exemplary Visualizations

Figure 49:
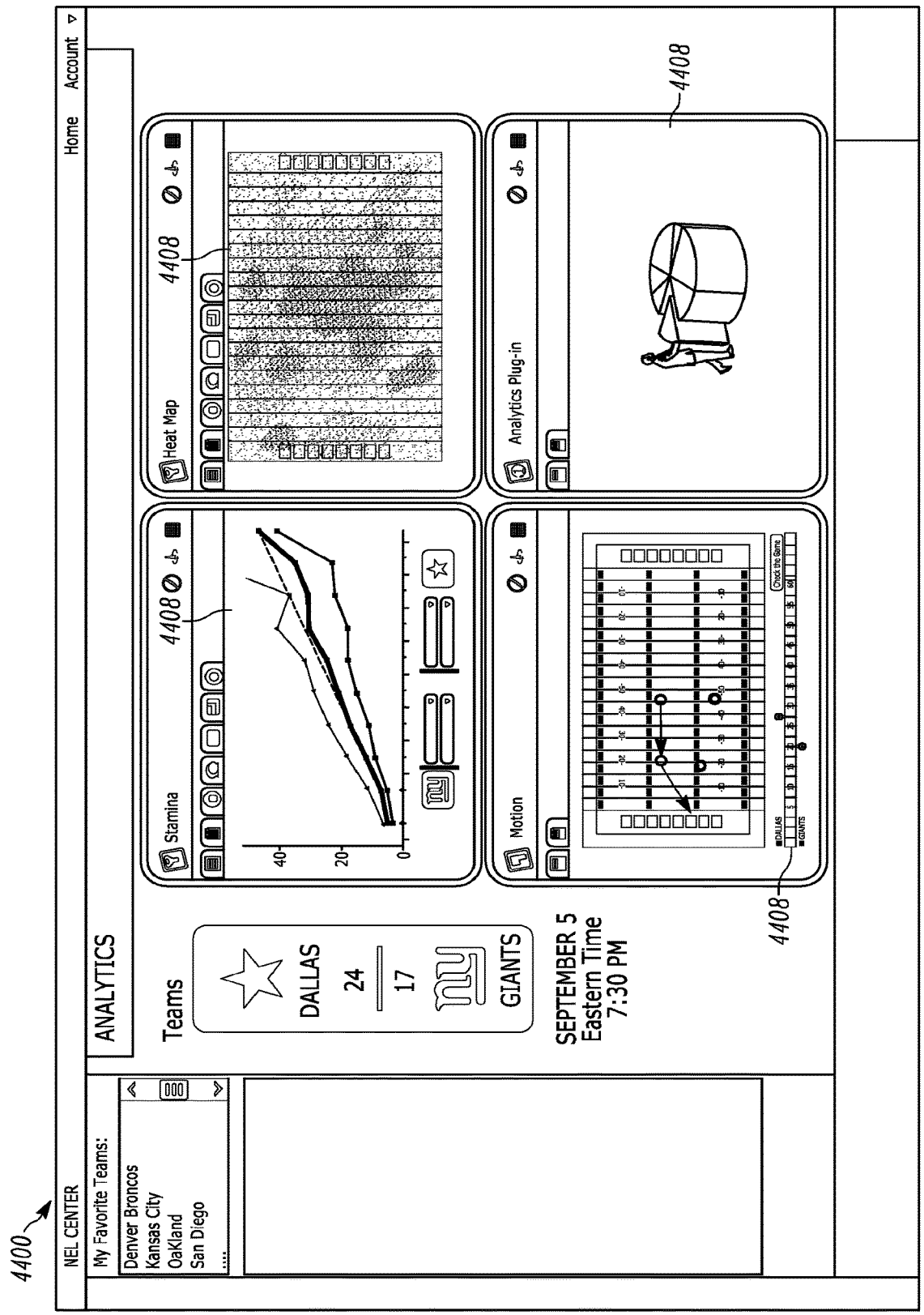
FIG. 49 illustrates an interface configured to display analytic data provided by a system according to an example embodiment of the present invention.

Referring to FIG. 44, FIG. 44 illustrates a display 4400 illustrating a plurality of display elements 4402 (i.e., dashboards) configured to provide at least one visualization according to an example embodiment. In some embodiments, the visualizations provided by a display element may differ in size with respect to one another. Accordingly, a visualization engine 340/517 may be configured to provide a visualization providing analytic data in accordance with the particular size of a particular display element. In one embodiment, each of the display elements 4402 may be proportional sized with respect to one another. For example, a display element such as an icon form 4404 may be one-quarter the size of a graph form 4406. Likewise, a graph form 4406 may be one quarter the size of a panel form 4408. According to some embodiments, a panel form 4408 may be one-quarter the size of a full function form 4410 (e.g. the entire view area). Although FIGS. 44 and 49 illustrate display elements 4402 being one-quarter the size of the next larger sized display element, one skilled in the art may appreciate in light of this disclosure that display elements may be sized in any suitable fashion to effectively display analytic data. For example, a display element, such as a graph form, may be optionally sized to be double the size of another display element, such as an icon form.

In addition, each of the display elements 4402 may be configured to provide analytic data in an effective fashion that corresponds to the display element size. For example, as shown in FIG. 44, an icon form 4404 may be configured to convey basic context data that may be derived from analytic data or may be derived from one or more other sources, such as the score of a game. A larger sized display element, such as a panel form 4408 may be configured to convey greater detailed analytic data, such as particular locations of football players during a particular football play in a game. Likewise, a graph form 4406 may be configured to convey analytic data in greater detail than a smaller display element, such as an icon from 4104, but convey less detailed analytic data than a larger display element, such as a panel form 4408 and/or a full function form 4410.

Exemplary Process for Displaying a Visualization

Figure 45:
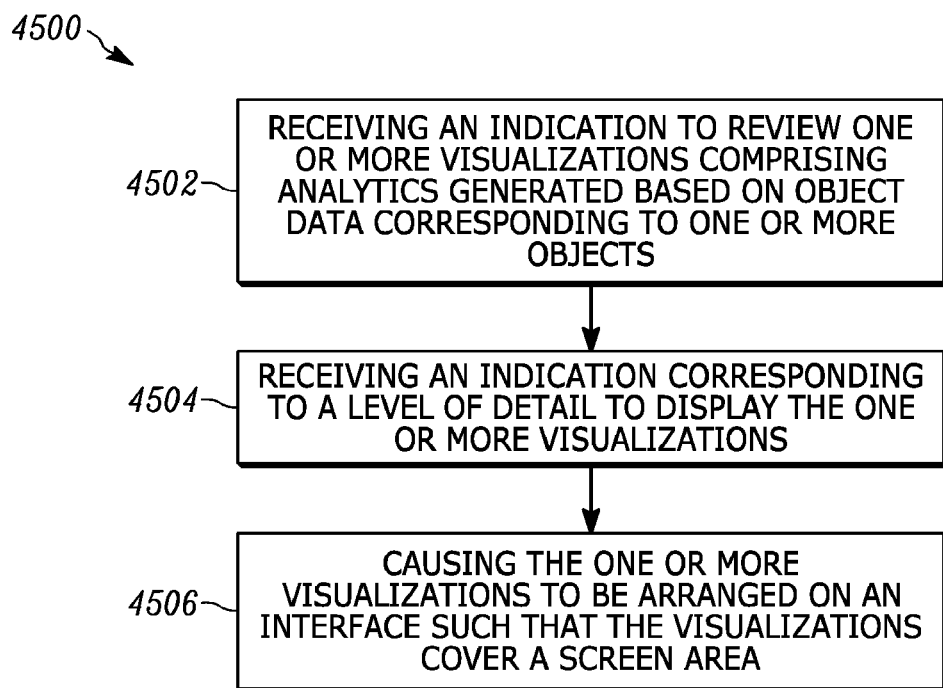
FIG. 45 illustrates a flowchart detailing operations performed by a system configured to modify visualizations corresponding to an object according to an example embodiment of the present invention.

In this regard, FIG. 45 illustrates a process for displaying a visualization on an interface according to some embodiments of the present invention. An exemplary method, such as process 4500 may be executed by a visualization engine 340/517. At block 4502, the visualization engine 340/517 may be configured to receive an indication corresponding to a user input to review one or more visualizations comprising analytics generated based on analytic and/or event data corresponding to one or more participants. In some embodiments, a display 4400 may provide an interface configured to display the one or more visualizations comprising analytics generated based on the analytic and/or event data.

At block 4504, the visualization engine 340/517 may be configured to receive an indication corresponding to the level of detail to display in the one or more visualizations provided by the interface. For example, as discussed herein, the display 4400 may display an interface comprising a plurality of display elements 4402 configured to provide at least one visualization comprising analytics corresponding to an participant. In addition, the display elements 4402 may vary in size, and in some embodiments, may vary the amount of analytics displayed in accordance with the display element size.

At block 4506, the visualization engine 340/517 may be configured to display one or more visualizations on an interface such that the visualizations cover a screen area of a display 4400. For example, a user may provide at least one indication, such as via a touch input to a touch screen display, corresponding to the level of detail to display the plurality of visualizations. As shown in FIG. 44, the indication may correspond with displaying an analytic, such as the stamina of a particular football player in a larger display element, such as a panel form 4408A, and displaying another analytic, such as the score of a game, time of possession or the like in a smaller display element, such as icon form 4404A.

Figure 46:
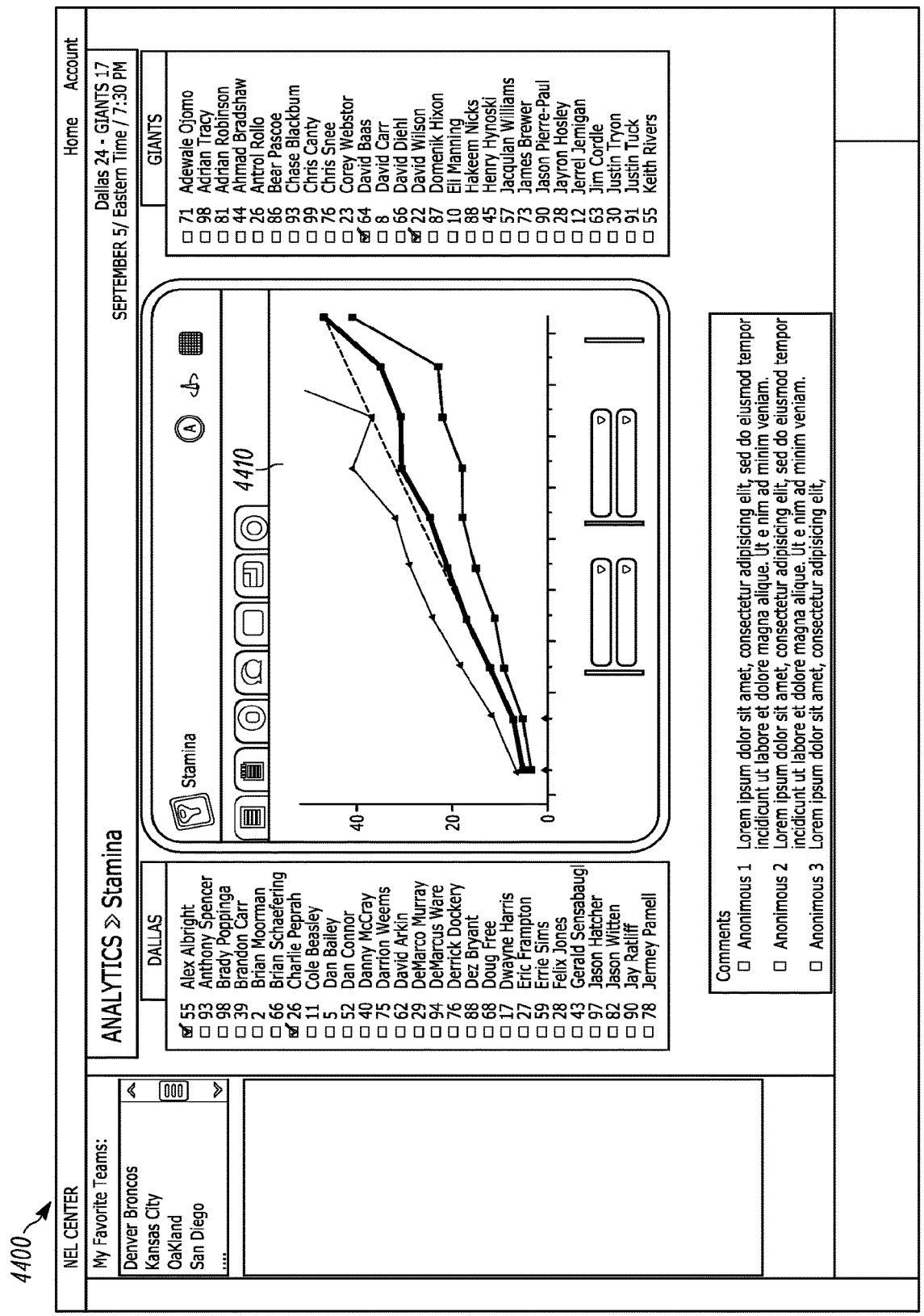
FIG. 46 illustrates an interface configured to display analytic data provided by a system according to an example embodiment of the present invention.
Figure 47:
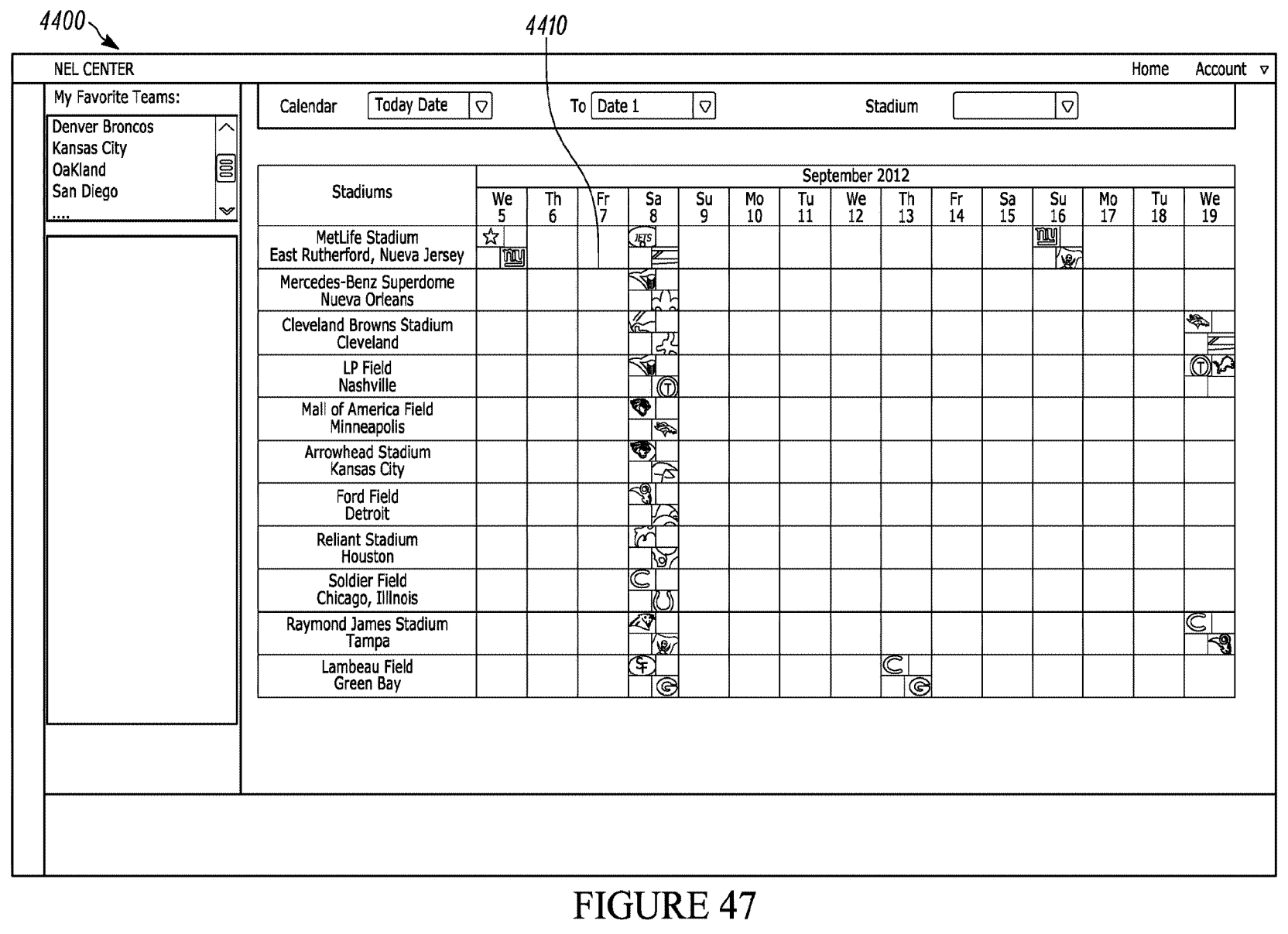

According to another embodiment, larger sized display elements 4402, such as a full function form 4410 may be configured to provide an interface user with greater interaction, analytic data, and/or the like, as shown in FIG. 46. For example, a display element, such as a full function form 4410, may be configured to display a scheduling calendar of past games previously played, games currently in progress, and/or upcoming games to be played. In addition, the full function form 4410 displaying a scheduling calendar, as shown in FIG. 47, may be configured to receive a user input, such as a touch input on a touch screen display configured to display the interface. In some embodiments, a user may provide a touch input corresponding to a selection of a particular game. The interface may be configured to receive the touch input corresponding to the selection of a particular game and may be further configured to display analytic data corresponding to the particular game.

Figure 48:
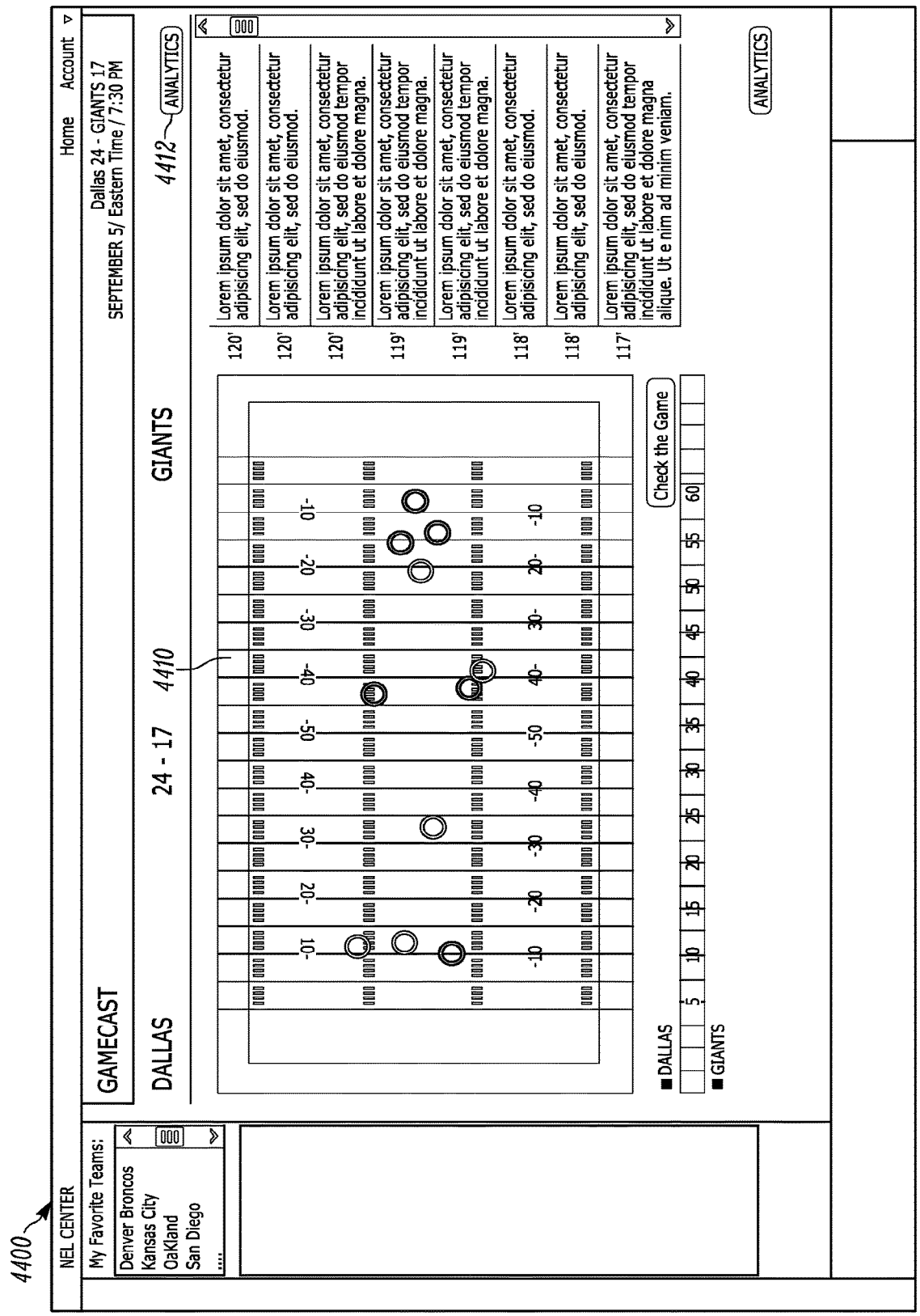
FIG. 48 illustrates an interface configured to display analytic data provided by a system according to an example embodiment of the present invention.

As shown in FIG. 48, a user input selecting a game between two football teams may cause the interface to display a full function form 4410 display element configured to provide analytic data corresponding to the selected game. For example, FIG. 48 illustrates a full function form 4410 providing analytic data corresponding to a historical record of the particular game selected. In some embodiments, a display element such as any one of the icon form 4404, graph form 4406, panel form 4408, and/or full function form 4410 may include additional display elements, such as button 4412, as shown in FIG. 48. Selection of button 4412 via providing a touch input to the touch display proximate the button 4412 may be configured to cause the interface to provide additional analytic data. For example, as is shown in FIG. 48, a user input corresponding to a selection of button 4412 may cause the interface to display analytic data corresponding to greater detailed historical analytic data. In some embodiments, a user input corresponding to a selection of another display element, such as button 4412, may cause the interface to display a plurality of display elements, such as panel forms 708, as shown in FIG. 49.

Exemplary Process for Configuring Visualizations

Figure 50:
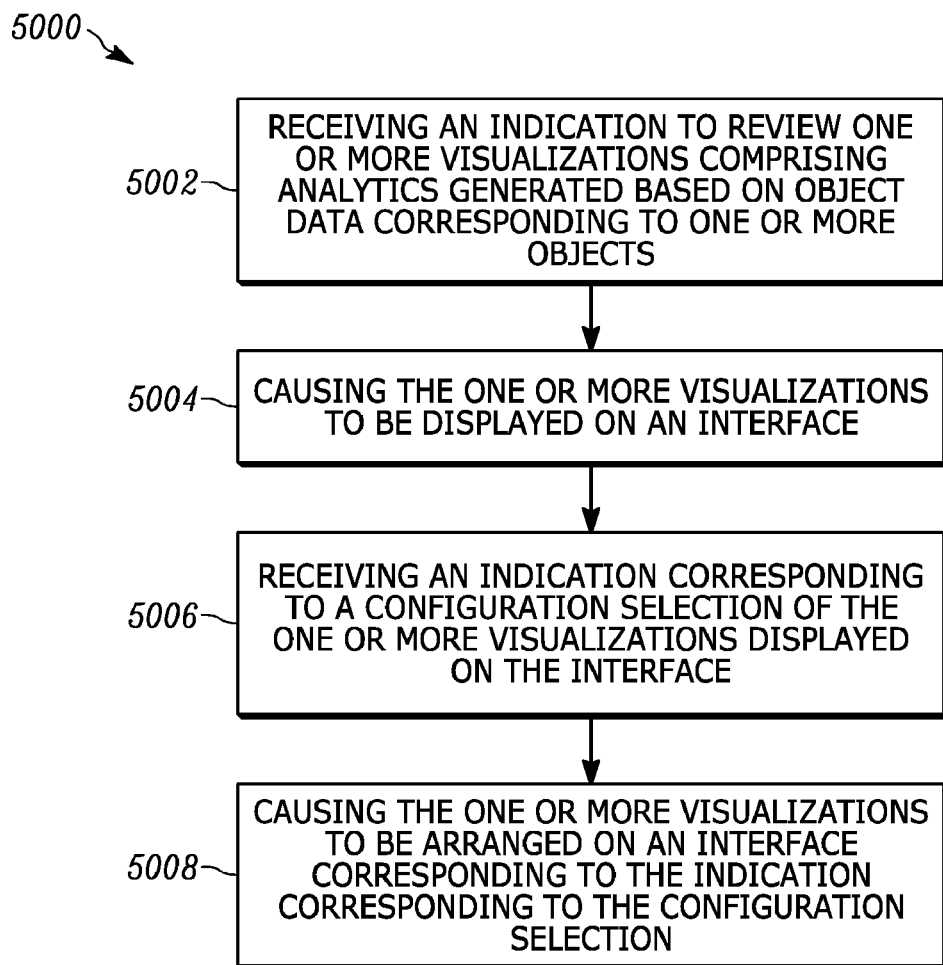
FIG. 50 illustrates a flowchart detailing operations performed by a system configured to configure the display of visualizations according to one example embodiment of the present invention.

In this regard, FIG. 50 illustrates a process for configuring visualizations corresponding to analytics generated based on analytic and/or event data corresponding to one or more participants. An exemplary method, such as process 5000, may be executed by a visualization engine 340/517. At block 5002, the visualization engine 340/517 may be configured to receive an indication to review one or more visualizations comprising analytics generated based on analytic and/or event data corresponding to one or more visualizations. For example, a touch screen display 4400 may be configured to receive a touch input corresponding to a user's input requesting a plurality of analytics to be displayed on an interface whereas other input methods may be used in other example embodiments.

As such, at block 5004, the visualization engine 340/517 may be configured to display the one or more visualizations on an interface that may be displayed on a touch screen display. For example, a user may wish to view analytics corresponding to a number of participants and a number of criteria of interest. In another example, a user may wish to view analytics for all running backs of a particular time corresponding to the stamina levels, the amount of playing time, the total yards rushed, and the number of touchdowns in the last 5 games. Accordingly, at block 5004, the visualization engine 340/517 may be configured to display a number of display elements on a touch screen display corresponding to each of the participants and each of the criteria of interest. In some embodiments, the analytics may be displayed in various forms in accordance with the amount of detail the user wishes to view.

For example, the stamina level for each of the running backs may be displayed in a line graph form in a panel form 4408 corresponding to stamina level at every minute for the past 5 games. In addition, the interface may be configured to display the number of touchdowns in an icon form displaying the total number of touchdowns for each of the running backs in the last 5 games.

In some examples, stamina, injury status and/or other analytics that may be derived from location data, sensors on an participant such as accelerometers, gyroscopes, temperature sensors, calorie monitors or the like and cannot be derived based on statistics alone. For example, stamina cannot be accurately described as a function statistics like yards per carry or yards per reception, but instead may be tracked based on location data and other sensor data captured herein. For example, a receiver may have a single reception of 10 yards in a game, however that same receiver may have run a total of 1000 yards during the game without every catching the ball.

At block 5006, the user may provide and the visualization engine 340/517 may receive an indication corresponding to a configuration selection of the one or more visualizations displayed on the interface. In some embodiments, an interface configuration module, such as the interface configuration module 130, may be configured to cause the one or more visualizations to be arranged and/or modified on an interface corresponding to the indication corresponding to the configuration selection.

For example, at block 5006, the user may provide an indication corresponding to a desire to see a particular analytic in greater detail and another analytic in less detail. As such, the visualization engine 340/517 may be configured to modify and/or change a visualization in accordance with such an indication. For example, the stamina level of all of the running backs as previously displayed in a line graph form, which was previously provided in a panel form 4408 via the interface, may be modified to display the current stamina level of all of the running backs after the last 5 games in a number form. In another embodiment, the sports analytics interface system may be configured to change and/or modify a visualization provided via an icon form, such as the total number of touchdowns in the last 5 games for a particular team's running backs, to a modified visualization provided via a panel form, such as a bar graph presented via the panel form indicating the number of touchdowns a particular running back had in each of the 5 games.

Alternatively or additionally, as a visualization or is resized, the visualization may ingest or otherwise calculate different statistics. For example, a simple estimation of stamina (e.g., a stamina score out of a 100, a red, yellow or green indication or the like) level may be provided in a first visualization. In a second or larger visualization, data may be displayed that correlates to the underlying data used to calculate stamina. Such a display would allow a domain expert, such as a coach, to determine the meaning of the data. In some cases, the domain expert may see an excess of high impact hits that are suggestive of a concussion or a reduction in ability to perform at a high level. In other cases, a level of stationary, high force activity (blocking) may have a greater impact on a wide receiver when compared to a lineman. In alternative embodiment, a computational learning system may be used.

Alternatively or additionally, the visualizations may include a coach's view that may display or otherwise convey raw location data, raw sensor data or the like. In such cases, a domain expert may want to view the underlying data so as to come to their own conclusions. For example, while yards traveled or yards per catch may be indicative of the performance of a player, a coach may want to view actual location tracking of each route run, position of defender with respect to each route run, effort applied to each block or the like. Such visualizations may allow domain experts to analyze and evaluate behavior in more detail.

In another embodiment, the visualization engine 340/517 may be configured to increase or decrease the number of visualizations displayed on an interface via the plurality of display elements. For example, a plurality of display elements may provide a plurality of visualizations corresponding to a plurality of analytics on the touch screen display. At block 5006, the user may provide an indication corresponding to a desire to see a particular analytic in greater detail. Accordingly, the visualization engine 340/517 may be configured to increase the size of the display element to cover the screen area such that a particular analytic is shown in greater detail. For example, the interface may be configured to display a plurality of display elements, such as plurality of panel forms, one panel form displaying the stamina level for a particular running back during each of the 5 past games. Upon receiving an indication corresponding to a configuration selection of the stamina visualization, the visualization engine 340/517 may be configured to cause the particular visualization to increase in size such that the particular analytic is shown in greater detail. For example, an indication to display the panel form of the stamina visualization in greater detail may cause the visualization engine 340/517 to display a stamina visualization in a full function form, such as the full function form 4410, that covers the entire screen area. In addition, the full function form of a stamina visualization may provide the stamina level of the running back at each minute for each of the past 5 games.

Figure 51:
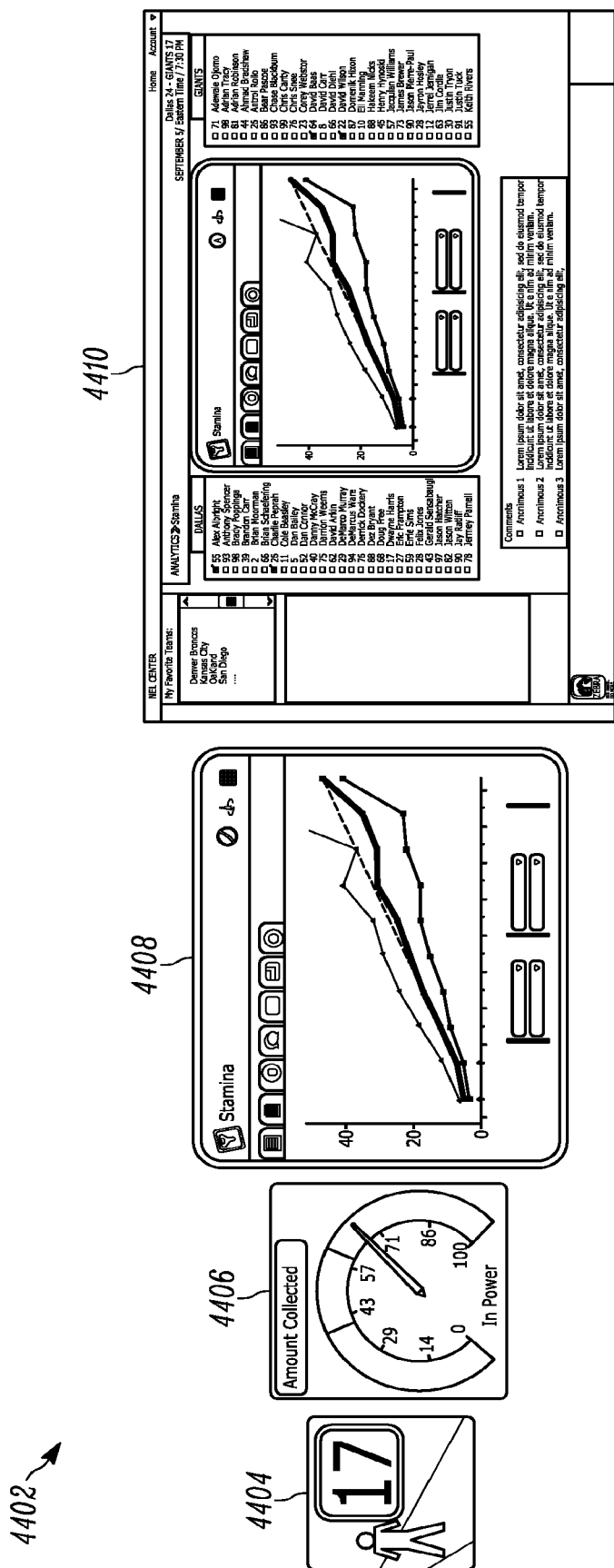
FIG. 51 illustrates various display elements configured to display analytic data provided by a system according to an example embodiments.

Accordingly, the sports analytics interface system may provide, not only a larger display size, but additional detail not previously provided in a previous visualization. Such additional detail is shown, for example, with respect to Figure to FIG. 51. FIG. 51 illustrates various display elements 4402 that may be configured to display various analytics in accordance with the size of the display element. As previously mentioned, the display elements 4402 may comprise an icon form 4404, a graph form 4406, a panel form 4408, a full function form 4410 and/or the like. According to some embodiments, the visualization engine 340/517 may provide analytics corresponding to a particular object and a criteria of interest (e.g., a particular running back and the running back's stamina level). In some embodiments, the sports analytics interface system may provide varying levels of analytic detail based at least in part on the size of the display element. As such, generalized analytics corresponding to a particular participant and a criteria of interest may be displayed when the display element 4402 comprises an icon form 4404, while detailed analytics corresponding to the same particular participant and the same criteria of interest may be displayed when the display element comprises a larger sized display element, such as a panel form 4408. According to some embodiments, the level of detail may increase in accordance with an increase in size of the display element. As such, a full function form 4410 may display greater detailed analytics (e.g., a graph that includes a roster and a series of descriptive comments or social media) than a panel form 4408 (e.g., the graph alone), which may display greater detail than a graph form 4406 (e.g., an indication of a current value in a dial and not the value over time as tracked in the graph), which may display greater detail than an icon form 4404 (e.g., a number alone).

Figure 52:
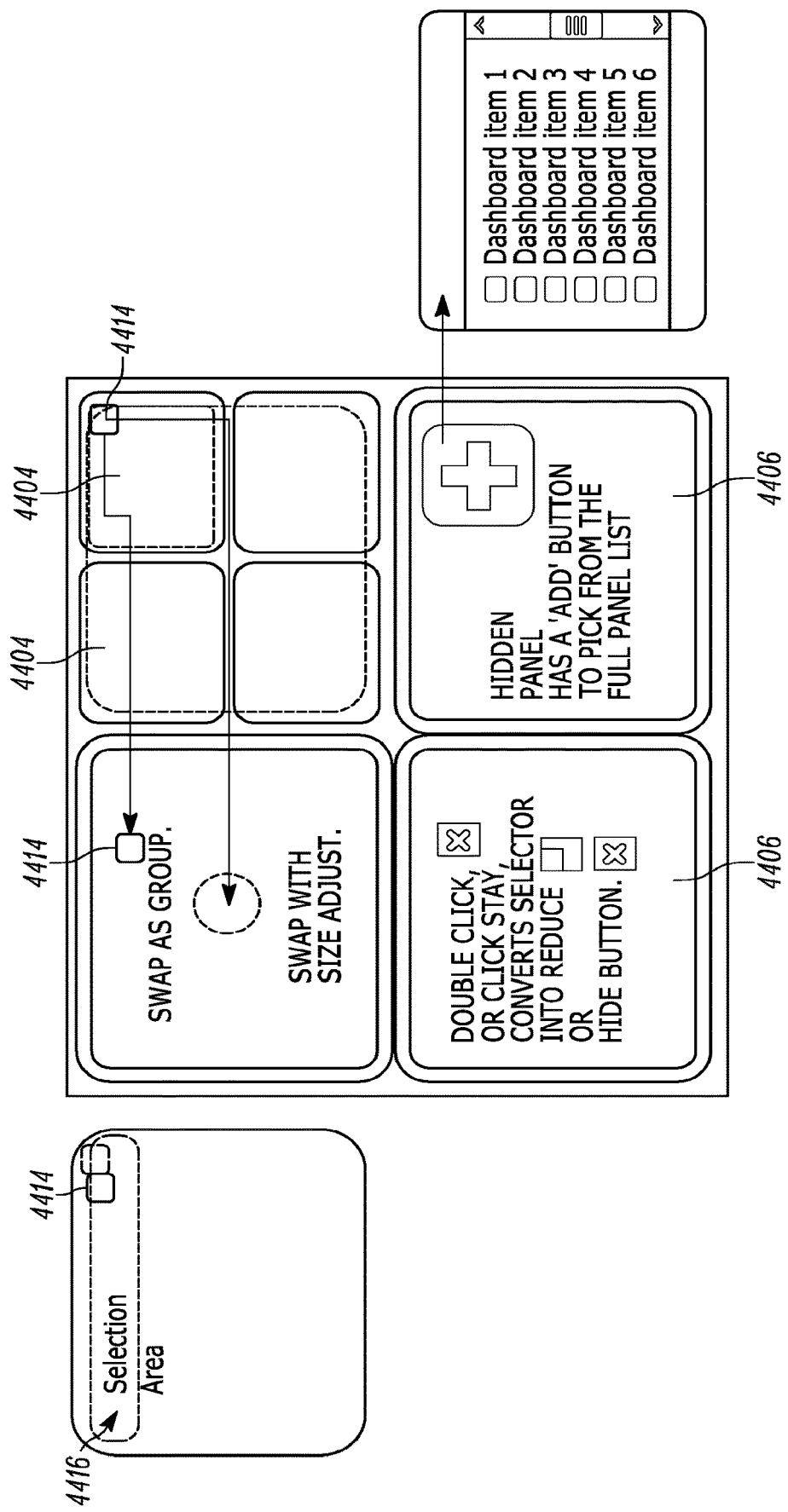
FIG. 52 illustrates an interface configured to display analytic data provided by a system according to an example embodiment.

FIG. 52 illustrates an interface configured to display analytics provided by a system in accordance with some embodiments of the present invention. More specifically, FIG. 52 illustrates various inputs that may be provided to an interface so as to configure the display elements displayed by the interface. For example, a user may select a group of icon forms 4404 by providing an input 4414, such as a touch input, disposed proximate an upper corner of a group of icon forms. A user may swap the position of a group of icon forms 4404 with a graph form 4406 by providing an input corresponding to a selection of the group of icon forms and dragging the group of icon forms to a location proximate an upper corner of the graph form 4406 the user wishes to swap positions. In some embodiments, the interface may be configured to swap not only the positions of a particular group of display elements with another display element, but may also be configured to change the size of a particular display element being relocated. For example, a user may decide to select a particular icon form 4404 to swap positions with a particular graph form 4406. In addition, the user may wish to resize the selected icon form 4404 to a graph form 4406 so as to view additional analytics corresponding to the analytics currently being displayed in the icon form 4404. As such, the user may select the particular icon form 4404 by providing a touch input 4414 disposed proximate an upper corner of the particular icon form 4404 and dragging the particular icon form 4404 to the center of graph form 4406. As such, the graph form 4406 may be resized and repositioned as an icon form in the now vacated position of the particular icon form 4404 that has been resized as a graph form 4406.

According to some embodiments, the interface may be configured to receive additional inputs corresponding to additional actions for configuring the display of particular display elements. In some embodiments, an input corresponding to a double tap of a selection area 4416 may cause the interface to hide and/or close a particular display element. In another embodiment, an input 4414 corresponding to an extended tap of a selection area may cause the particular display element to reduce in size. In some embodiments, providing an input 4414 corresponding to a tap of a selection area of a hidden display element (e.g., an empty display element, a blank display element, and/or the like) may cause the interface to display a list of display elements that may be displayed by the interface. Accordingly, a user may provide an input 4414 corresponding to a tap of a selection area of a hidden display element to add additional display elements displaying additional analytics currently displayed (i.e., a larger sized display element displaying analytics corresponding to a smaller sized display element currently being displayed). In some embodiments, a user may provide an input 4414 corresponding to a tap of a selection area of a hidden display element to add additional display elements displaying analytics not currently displayed (i.e., a display element displaying analytics corresponding to a new object and/or a new criteria of interest).

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method comprising:
    generating registration data for a locationing system including a plurality of receivers configured to receive signals from at least one location tag that enable a first calculation of a first location of the at least one tag, wherein the registration data comprises at least a tag-individual correlator and a status;
    receiving a status change indication for the at least one tag, wherein the at least one tag is identified by a tag unique identifier;
    correlating the tag unique identifier and the tag-individual correlator in the registration data;
    when the status change indication corresponds to an error condition, requesting an override confirmation or entry of missing information from a device;
    when the status change indication corresponds to a success condition, updating the status in the registration data according to the status change indication and causing the device to disable a user interface button until a next input is received;
    calculating, using a processor of the locationing system, a second calculation of a second location of the at least one tag based on the updated status in the registration data; and
    outputting visualization data indicative of the second location of the at least one tag based on the updated status in the registration data.

2. The method of claim 1, further comprising causing the at least one tag to be activated such that the at least one tag transmits the tag unique identifier at a predetermined interval, wherein:
    receiving the status change indication comprises receiving an indication that the at least one tag has changed to active; and
    updating the status in the registration data comprises updating the status in the registration data as active.

3. The method of claim 1, further comprising causing the at least one tag to be deactivated such that the at least one tag stops transmitting the tag unique identifier at a predetermined interval, wherein:
    receiving the status change indication comprises receiving an indication that the at least one tag has changed to deactivated; and
    updating the status of the registration data comprises updating the status in the registration data as deactivated.

4. The method of claim 1, wherein the at least one tag is configured to transmit the tag unique identifier at a first blink rate, and the method further comprises causing, in response to the status change indication, the at least one tag to be adjusted such that the at least one tag is configured to transmit the tag unique identifier at a second blink rate.

5. The method of claim 1, further comprising:
    receiving an indication of a tag replacement comprising a replacement tag unique identifier;
    updating the tag-individual correlator with the replacement tag unique identifier; and
    replacing the tag unique identifier in the registration data with the replacement tag unique identifier.

6. The method of claim 1, wherein receiving the status change indication comprises receiving an indication that the at least one tag has been attached to a participant, and updating the status in the registration data comprises updating the status in the registration data as attached.

7. An apparatus comprising at least one processor and at least one memory including computer program code, the at least one memory and computer program code configured to, with the processor, cause the apparatus to at least:
    generate registration data for a locationing system including a plurality of receivers configured to receive signals from at least one location tag that enable a first calculation of a first location of the at least one tag, wherein the registration data comprises at least a tag-individual correlator and a status;
    receive a status change indication for the at least one tag, wherein the at least one tag is identified by a tag unique identifier;
    correlate the tag unique identifier and the tag-individual correlator in the registration data;
    when the status change indication corresponds to an error condition, request an override confirmation or entry of missing information from a device;
    when the status change indication corresponds to a success condition, update the status in the registration data for the status change indication and cause the device to disable a user interface button until a next input is received;
    calculate a second calculation of a second location of the at least one tag based on the updated status in the registration data; and
    output visualization data indicative of the second location of the at least one tag based on the updated status in the registration data.

8. The apparatus of claim 7, wherein:
    the at least one memory and the computer program code are configured to cause the at least one tag to be activated such that the at least one tag transmits the tag unique identifier at a predetermined interval;

receiving the status change indication comprises receiving an indication that the at least one tag has changed to active; and updating the status in the registration data comprises updating the status in the registration data as active.

9. The apparatus of claim 7, wherein:

the at least one memory and the computer program code are configured to cause the at least one tag to be deactivated such that the at least one tag stops transmitting the tag unique identifier at a predetermined interval;

receiving the status change indication compromises receiving an indication that the at least one tag has a changed to deactivated; and updating the status in the registration data comprises updating status in the registration data as deactivated.

10. The apparatus of claim 7, wherein the at least one tag is configured to transmit the tag unique identifier at a first blink rate, and the at least one memory and the computer program code are configured to cause, in response to the status change indication, the at least one tag to be adjusted such that the at least one tag transmits the tag unique identifier at a second blink rate.

11. The apparatus of claim 7, wherein the at least one memory and the computer program code are further configured to:

receive an indication of a tag replacement comprising a replacement tag unique identifier;

update the tag-individual correlator with the replacement tag unique identifier; and replace the tag unique identifier in the registration data with the replacement tag unique identifier.

12. The apparatus of claim 7, wherein receiving the status change indication comprises receiving an indication that the at least one tag has been attached to a participant, and updating the status in the registration data comprises updating the status in the registration data as attached.

13. A computer program product comprising at least one non-transitory computer-readable storage medium having computer-executable program code portions stored therein, the computer-executable program code portions comprising program code instructions configured to:

generate registration data for a locationing system including a plurality of receivers configured to receive signals from at least one location tag that enable a first calculation of a first location of the at least one tag, wherein the registration data comprises a tag-individual correlator and a status;

receive a status change indication for the at least one tag, wherein the at least one tag is identified by a unique identifier;

correlate the tag unique identifier and the tag-individual correlator in the registration data;

when the status change indication corresponds to an error condition, request an override confirmation or entry of missing information from a device;

when the status change indication corresponds to a success condition, update the status in the registration data for the status change indication and cause the device to disable a user interface button until a next input is received;

calculate, using a processor of the locationing system, a second calculation of a second location of the at least one tag based on the updated status in the registration data; and output visualization data indicative of the second location of the at least one tag based on the updated status in the registration data.

14. The computer program product of claim 13, wherein:

the computer-executable program code portions comprise program code instructions configured to cause the at least one tag to be activated such that the at least one tag transmits the unique identifier at a predetermined interval;

receiving the status change indication comprises receiving an indication that the at least one tag has changed to active; and updating the status in the registration data further comprises updating the status in the registration data as active.

15. The computer program product of claim 13, wherein:

the computer-executable program code portions further comprise program code instructions configured to cause the at least one tag to be deactivated such that the at least one tag stops transmitting the tag unique identifier at a predetermined interval;

receiving the status change indication comprises receiving an indication that the at least one tag has changed to deactivated; and updating the status in the registration data comprises updating the status in the registration data as deactivated.

16. The computer program product of claim 13, wherein the at least one tag is configured to transmit the tag unique identifier at a first blink rate, and the computer-executable program code portions comprise program code instructions configured to cause, in response to the status change indication, the at least one tag to be adjusted such that the at least one tag transmits the tag unique identifier at a second blink rate.

17. The computer program product of claim 13, wherein the computer-executable program code portions comprise program code instructions configured to:

receive an indication of a tag replacement comprising a replacement tag unique identifier;

update the tag-individual correlator with the replacement tag unique identifier; and replace the tag unique identifier in the registration data with the replacement tag unique identifier.

18. The computer program product of claim 13, wherein receiving the status change indication comprises receiving an indication that the at least one tag has been attached to a participant, and updating the status in the registration data comprises updating the status in the registration data as attached.

\* \* \* \* \*